United States Patent
Takeuchi et al.

(10) Patent No.: US 11,480,750 B2
(45) Date of Patent: Oct. 25, 2022

(54) APPARATUS FOR CABLE ROUTING

(71) Applicant: Go!Foton Holdings, Inc., Somerset, NJ (US)

(72) Inventors: Kenichiro Takeuchi, North Brunswick, NJ (US); Haiguang Lu, Los Altos, CA (US); Alla Shtabnaya, Hillsborough, NJ (US); Frank Rumore, Flemington, NJ (US); Patrick Anderson, Woodstock, MD (US)

(73) Assignee: Go!Foton Holdings, Inc., Somerset, NJ (US)

( * ) Notice: Subject to any disclaimer, the term of this patent is extended or adjusted under 35 U.S.C. 154(b) by 34 days.

(21) Appl. No.: 17/010,012

(22) Filed: Sep. 2, 2020

(65) Prior Publication Data
US 2020/0400907 A1    Dec. 24, 2020

Related U.S. Application Data

(63) Continuation of application No. 16/372,510, filed on Apr. 2, 2019, now Pat. No. 10,795,106, which is a
(Continued)

(51) Int. Cl.
  *G02B 6/44*    (2006.01)
  *G02B 6/38*    (2006.01)
(Continued)

(52) U.S. Cl.
CPC ......... *G02B 6/4453* (2013.01); *G02B 6/3897* (2013.01); *G02B 6/445* (2013.01);
(Continued)

(58) Field of Classification Search
CPC .... G02B 6/4453; G02B 6/3897; G02B 6/445; G02B 6/4452; H04Q 1/025; H04Q 1/06;
(Continued)

(56) References Cited

U.S. PATENT DOCUMENTS

| 3,335,326 A | 8/1967 | Bonin et al. |
| 4,097,683 A | 6/1978 | Summers |

(Continued)

FOREIGN PATENT DOCUMENTS

| AU | 2007358520 A1 | 3/2009 |
| CN | 1193252 A | 9/1998 |

(Continued)

OTHER PUBLICATIONS

Extended European Search Report for Application No. 21183297.7, dated Oct. 14, 2021, 7 pages.
(Continued)

*Primary Examiner* — Ellen E Kim
(74) *Attorney, Agent, or Firm* — Lerner, David, Littenberg, Krumholz & Mentlik, LLP

(57) ABSTRACT

A communication system may include a first chassis having first and second side walls and adapted to slidably receive therein a plurality of cassettes. A first cable hanger assembly may have a first side edge hingedly coupled to the first side wall of the first chassis, the first cable hanger assembly including a plurality of first hangers adapted to support cables thereon. An axis of rotation of the first cable hanger assembly may be substantially orthogonal to a direction in which the plurality of cassettes are slideable. The cable hanger assembly may be rotatable from a first position to a second position so that during rotation from the first position to the second position, the plurality of first hangers move toward front faces of the plurality of cassettes.

22 Claims, 116 Drawing Sheets

Related U.S. Application Data continuation of application No. 15/917,965, filed on Mar. 12, 2018, now Pat. No. 10,310,206.

(60) Provisional application No. 62/710,365, filed on Feb. 16, 2018, provisional application No. 62/628,418, filed on Feb. 9, 2018, provisional application No. 62/615,195, filed on Jan. 9, 2018, provisional application No. 62/581,887, filed on Nov. 6, 2017, provisional application No. 62/509,281, filed on May 22, 2017.

(51) Int. Cl.
*H04Q 1/02* (2006.01)
*H04Q 1/06* (2006.01)

(52) U.S. Cl.
CPC ........... *G02B 6/4452* (2013.01); *H04Q 1/025* (2013.01); *H04Q 1/06* (2013.01); *H04Q 1/13* (2013.01)

(58) Field of Classification Search
CPC ...... H04Q 1/13; H05K 7/1447; H05K 7/1448; H05K 7/1454
See application file for complete search history.

(56) References Cited

U.S. PATENT DOCUMENTS

| | | |
|---|---|---|
| 4,183,601 A | 1/1980 | Barber et al. |
| 4,243,834 A | 1/1981 | Logioco |
| 4,541,209 A | 9/1985 | Hoag |
| 4,709,980 A | 12/1987 | Coll et al. |
| 4,722,585 A | 2/1988 | Boyer |
| 4,776,138 A | 10/1988 | Sumner et al. |
| 4,984,982 A | 1/1991 | Brownlie et al. |
| 5,049,700 A | 9/1991 | Kobayashi et al. |
| 5,069,516 A | 12/1991 | Kohy et al. |
| 5,122,069 A | 6/1992 | Brownlie et al. |
| 5,133,038 A | 7/1992 | Zipper |
| 5,189,723 A | 2/1993 | Johnson et al. |
| 5,267,122 A | 11/1993 | Glover et al. |
| 5,389,737 A | 2/1995 | Kobayashi et al. |
| 5,401,902 A | 3/1995 | Middlebrook et al. |
| 5,402,515 A | 3/1995 | Vidacovich et al. |
| 5,446,823 A | 8/1995 | Bingham et al. |
| 5,473,717 A | 12/1995 | Baptiste et al. |
| 5,499,887 A | 3/1996 | Verra |
| 5,548,678 A | 8/1996 | Frost et al. |
| 5,556,060 A | 9/1996 | Bingham et al. |
| 5,588,076 A | 12/1996 | Peacock et al. |
| 5,653,559 A | 8/1997 | Stieb et al. |
| 5,657,412 A | 8/1997 | Caudrelier |
| 5,684,911 A | 11/1997 | Burgett |
| 5,706,384 A | 1/1998 | Peacock et al. |
| 5,825,963 A | 10/1998 | Burgett |
| 5,896,478 A | 4/1999 | Dauber et al. |
| 5,930,111 A | 7/1999 | Yamazaki et al. |
| 5,939,669 A | 8/1999 | Finzel et al. |
| 6,085,013 A | 7/2000 | Yatsu |
| 6,130,982 A | 10/2000 | Diermeier et al. |
| 6,181,861 B1 | 1/2001 | Wenski et al. |
| 6,426,462 B1 | 7/2002 | Mignon et al. |
| 6,427,035 B1 | 7/2002 | Mahony |
| 6,496,641 B1 | 12/2002 | Mahony |
| 6,522,804 B1 | 2/2003 | Mahony |
| 6,539,147 B1 | 3/2003 | Mahony |
| 6,542,652 B1 | 4/2003 | Mahony |
| 6,614,980 B1 | 9/2003 | Mahony |
| 6,625,375 B1 | 9/2003 | Mahony |
| 6,668,127 B1 | 12/2003 | Mahony |
| 6,802,724 B1 | 10/2004 | Mahony |
| 6,807,355 B2 | 10/2004 | Dofher |
| 6,829,424 B1 | 12/2004 | Finzel et al. |
| 6,869,296 B2 | 3/2005 | Van Leest |
| 6,920,274 B2 | 7/2005 | Rapp et al. |
| 6,990,279 B2 | 1/2006 | Vogel et al. |
| 7,050,683 B2 | 5/2006 | Dofher |
| 7,120,347 B2 | 10/2006 | Blackwell, Jr. et al. |
| 7,198,409 B2 | 4/2007 | Smith et al. |
| 7,218,827 B2 | 5/2007 | Vongseng et al. |
| 7,233,731 B2 | 6/2007 | Solheid et al. |
| 7,313,311 B1 | 12/2007 | Benbow |
| 7,330,625 B2 | 2/2008 | Barth |
| 7,333,320 B2 | 2/2008 | Standish et al. |
| 7,333,708 B2 | 2/2008 | Blackwell, Jr. et al. |
| 7,381,888 B2 | 6/2008 | Burke et al. |
| 7,385,137 B2 | 6/2008 | Burke et al. |
| 7,397,997 B2 | 7/2008 | Ferris et al. |
| 7,433,570 B2 | 10/2008 | Day |
| 7,483,617 B2 | 1/2009 | Barth |
| 7,547,051 B2 | 6/2009 | Burke et al. |
| 7,600,720 B2 | 10/2009 | Vogel et al. |
| 7,633,742 B2 | 12/2009 | Standish et al. |
| 7,653,282 B2 | 1/2010 | Blackwell, Jr. et al. |
| 7,756,380 B2 | 7/2010 | Ruiz et al. |
| 7,760,984 B2 | 7/2010 | Solheid et al. |
| 7,809,233 B2 | 10/2010 | Smith et al. |
| 7,809,234 B2 | 10/2010 | Smith et al. |
| 7,816,602 B2 | 10/2010 | Landry et al. |
| 7,844,161 B2 | 11/2010 | Reagan et al. |
| RE42,258 E | 3/2011 | Thompson et al. |
| 8,125,785 B2 | 2/2012 | Nelson et al. |
| 8,249,411 B2 | 8/2012 | Burke |
| 8,263,861 B2 | 9/2012 | Landry et al. |
| 8,542,973 B2 | 9/2013 | Fabrykowski et al. |
| 8,588,571 B1 | 11/2013 | Lam et al. |
| 8,705,929 B2 | 4/2014 | Kowalczyk et al. |
| 8,811,791 B2 | 8/2014 | Solheid et al. |
| 8,847,070 B2 | 9/2014 | Burke |
| 8,891,930 B2 | 11/2014 | Anguiano et al. |
| 8,938,147 B2 | 1/2015 | Krampotich et al. |
| 8,939,792 B2 | 1/2015 | Takeuchi et al. |
| 9,122,021 B2 | 9/2015 | Elenbaas et al. |
| 9,201,206 B2 | 12/2015 | Smith et al. |
| 9,212,765 B1 | 12/2015 | Chia et al. |
| 9,287,693 B2 | 3/2016 | Burke |
| 9,323,020 B2 | 4/2016 | Cao et al. |
| 9,329,353 B2 | 5/2016 | Solheid et al. |
| 9,557,507 B2 | 1/2017 | Liu et al. |
| 9,568,699 B2 | 2/2017 | Geens et al. |
| 9,678,297 B2 | 6/2017 | Dofher |
| 9,851,523 B2 | 12/2017 | Takeuchi et al. |
| 2001/0011009 A1 | 8/2001 | Harada et al. |
| 2003/0000198 A1 | 1/2003 | Hermey et al. |
| 2003/0123935 A1 | 7/2003 | Dofher |
| 2004/0001686 A1 | 1/2004 | Smith et al. |
| 2004/0063076 A1 | 4/2004 | Van Leest |
| 2005/0031287 A1 | 2/2005 | Dofher |
| 2005/0036749 A1 | 2/2005 | Vogel et al. |
| 2005/0100301 A1 | 5/2005 | Solheid et al. |
| 2005/0135769 A1 | 6/2005 | Makooi et al. |
| 2005/0163448 A1 | 7/2005 | Blackwell et al. |
| 2005/0201074 A1 | 9/2005 | Huang |
| 2005/0207711 A1 | 9/2005 | Vo et al. |
| 2006/0201213 A1 | 9/2006 | Burke et al. |
| 2006/0204187 A1 | 9/2006 | Dofher |
| 2006/0231279 A1 | 10/2006 | Burke et al. |
| 2006/0254794 A1 | 11/2006 | Burke et al. |
| 2006/0268495 A1 | 11/2006 | Standish et al. |
| 2006/0278426 A1 | 12/2006 | Barth |
| 2006/0280420 A1 | 12/2006 | Blackwell et al. |
| 2007/0122100 A1 | 5/2007 | Day |
| 2007/0167074 A1 | 7/2007 | Palmer |
| 2008/0019655 A1* | 1/2008 | Vongseng ............ G02B 6/4452 385/135 |
| 2008/0031585 A1 | 2/2008 | Solheid et al. |
| 2008/0069511 A1 | 3/2008 | Blackwell et al. |
| 2008/0240665 A1 | 10/2008 | Barth |
| 2008/0285934 A1 | 11/2008 | Standish et al. |
| 2009/0175588 A1 | 7/2009 | Brandt et al. |
| 2009/0257726 A1 | 10/2009 | Redmann et al. |
| 2009/0263096 A1 | 10/2009 | Solheid et al. |
| 2009/0307983 A1 | 12/2009 | Nelson et al. |

(56) References Cited

U.S. PATENT DOCUMENTS

| | | |
|---|---|---|
| 2010/0027952 A1 | 2/2010 | Ruiz et al. |
| 2010/0111483 A1* | 5/2010 | Reinhardt ............ G02B 6/4452 |
| | | 385/135 |
| 2010/0220968 A1 | 9/2010 | Dagley et al. |
| 2010/0310221 A1 | 12/2010 | Le Dissez |
| 2011/0116757 A1 | 5/2011 | Vanmeulen et al. |
| 2011/0211799 A1 | 9/2011 | Conner et al. |
| 2011/0228473 A1 | 9/2011 | Anderson et al. |
| 2011/0262094 A1 | 10/2011 | Burke |
| 2011/0262096 A1 | 10/2011 | Fabrykowski et al. |
| 2011/0268404 A1 | 11/2011 | Cote et al. |
| 2012/0106910 A1 | 5/2012 | Koller |
| 2013/0034336 A1* | 2/2013 | Cassell ................ G02B 6/4447 |
| | | 385/135 |
| 2013/0044990 A1 | 2/2013 | Dofher |
| 2013/0089298 A1 | 4/2013 | Holmberg et al. |
| 2013/0101262 A1 | 4/2013 | Wei et al. |
| 2013/0196538 A1 | 8/2013 | Takeuchi et al. |
| 2013/0266283 A1 | 10/2013 | Baldassano et al. |
| 2013/0287356 A1 | 10/2013 | Solheid et al. |
| 2014/0044400 A1 | 2/2014 | Anguiano et al. |
| 2014/0117018 A1 | 5/2014 | Burke |
| 2014/0196380 A1 | 7/2014 | Burke |
| 2014/0219621 A1 | 8/2014 | Barnette, Jr. et al. |
| 2014/0241691 A1 | 8/2014 | Solheid et al. |
| 2014/0248028 A1 | 9/2014 | Campbell et al. |
| 2014/0354131 A1 | 12/2014 | Takeuchi et al. |
| 2014/0355217 A1 | 12/2014 | Takeuchi et al. |
| 2014/0357118 A1 | 12/2014 | Takeuchi et al. |
| 2015/0230008 A1 | 8/2015 | Elford et al. |
| 2015/0268434 A1 | 9/2015 | Barnette, Jr. et al. |
| 2016/0033735 A1 | 2/2016 | Liu et al. |
| 2016/0100493 A1 | 4/2016 | Alarcon et al. |
| 2016/0109036 A1 | 4/2016 | Elford et al. |
| 2016/0109678 A1 | 4/2016 | Schwengler et al. |
| 2016/0112779 A1 | 4/2016 | Barnett, Jr. et al. |
| 2016/0341924 A1 | 11/2016 | Park et al. |
| 2016/0352417 A1* | 12/2016 | Vastmans ............. G02B 6/4452 |
| 2017/0082815 A1 | 3/2017 | Takeuchi et al. |
| 2017/0110784 A1 | 4/2017 | Vermes et al. |
| 2018/0081139 A1* | 3/2018 | Geens ................. G02B 6/3897 |

FOREIGN PATENT DOCUMENTS

| | | |
|---|---|---|
| CN | 1513093 A | 7/2004 |
| CN | 102089692 A | 6/2011 |
| CN | 102934000 A | 2/2013 |
| CN | 103199359 A | 7/2013 |
| CN | 203657975 U | 6/2014 |
| CN | 104205866 A | 12/2014 |
| CN | 104968316 A | 10/2015 |
| EP | 1160603 A1 | 12/2001 |
| JP | H10-048434 A | 2/1998 |
| JP | 2000231020 A | 8/2000 |
| JP | 2002372634 A | 12/2002 |
| WO | 2009126860 A3 | 12/2009 |
| WO | 2013122998 A1 | 8/2013 |
| WO | 2014100744 A2 | 6/2014 |

OTHER PUBLICATIONS

Extended European Search Report for EP20195164.7 dated Jan. 27, 2021; 8 pages.
International Search Report for Application No. PCT/US16/052787 dated Jan. 31, 2017.
Extended European Search Report and Written Opinion for EP Application No. 16849466.4, dated Apr. 11, 2019.
Chinese Search Report for Application No. 201680066543.0 dated Oct. 16, 2019, pp. 1-2.
Chinese Search Report for Application No. 201810492966X dated Feb. 22, 2020, 2 pages.
Chinese Search Report for Application No. 201911392221.7 dated Nov. 17, 2020, 1 page.

* cited by examiner

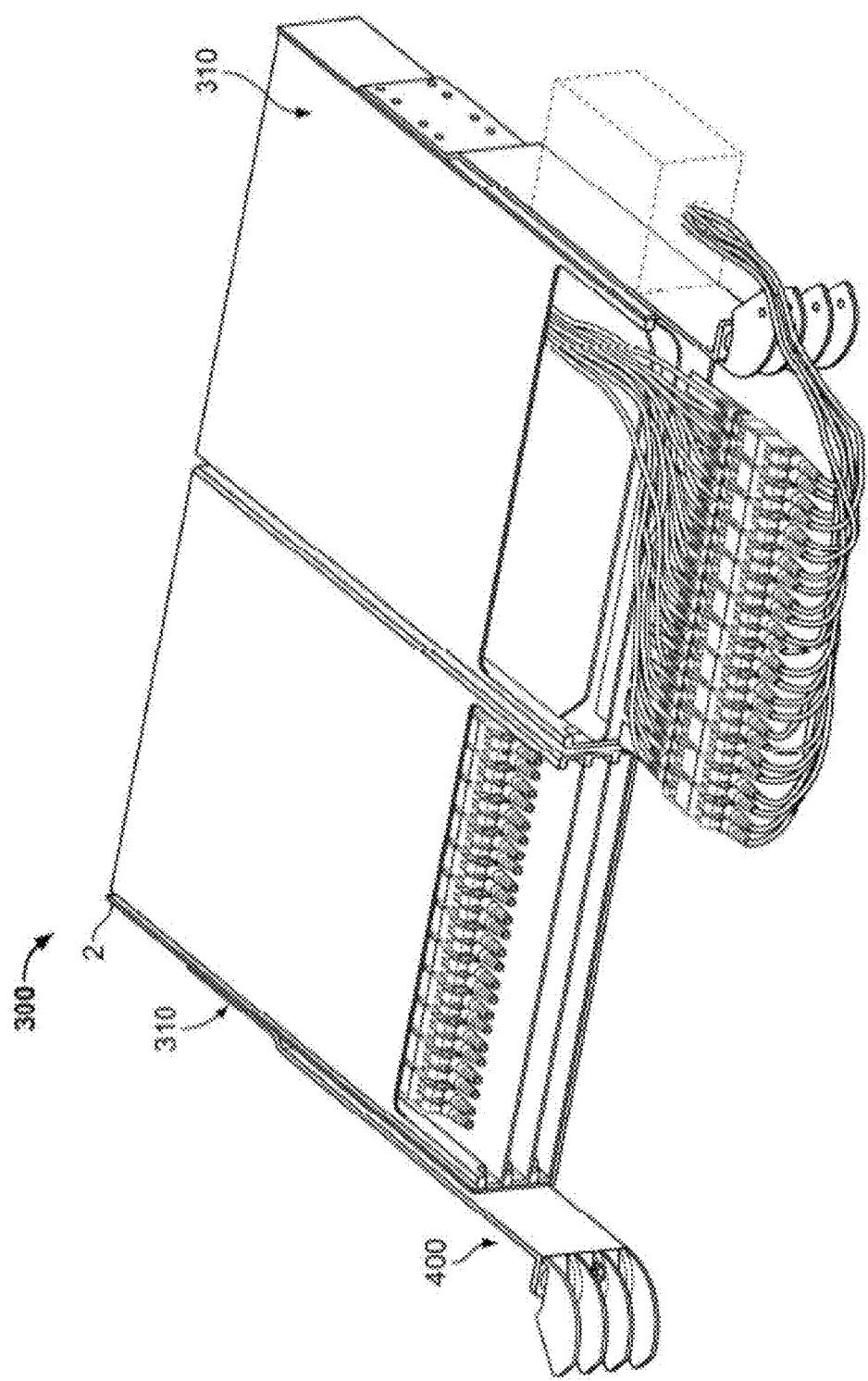

APPARATUS FOR CABLE ROUTING

CROSS-REFERENCE TO RELATED APPLICATIONS

The present application is a continuation of U.S. patent application Ser. No. 16/372,510, filed Apr. 2, 2019, which is a continuation of U.S. patent application Ser. No. 15/917, 965, (now U.S. Pat. No. 10,310,206) filed Mar. 12, 2018, which claims the benefit of the filing dates of the following U.S. Provisional Patent Applications, all of which are hereby incorporated by reference herein: (i) U.S. Provisional Patent Application No. 62/710,365, filed Feb. 16, 2018 and titled "Apparatus for Cable Routing," (ii) U.S. Provisional Patent Application No. 62/628,418, filed Feb. 9, 2018 and titled "Apparatus for Cable Routing," (iii) U.S. Provisional Patent Application No. 62/615,195, filed Jan. 9, 2018 and titled "Apparatus for Cable Routing," (iv) U.S. Provisional Patent Application No. 62/581,887, filed Nov. 6, 2017 and titled "Apparatus for Cable Routing," and (v) U.S. Provisional Patent Application No. 62/509,281, filed May 22, 2017 and titled "Apparatus for Cable Routing."

BACKGROUND OF THE DISCLOSURE

The present disclosure generally relates to a device and a system for routing and managing cables coupled to communication connectors, adapters, and/or ports. More particularly, the present disclosure relates to cable routing and management systems for patch panel devices.

In communications cabinets and racks, a multitude of cables are interconnected to one another through connectors, e.g., adapters. A cable organization unit typically has a tray or a shelf or a similar platform, which supports the connectors. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate accessing communication adapters and/or cables supported by communication patching devices and systems.

BRIEF SUMMARY

According to one aspect of the disclosure, a communication system includes an outer housing, an inner housing, a hanger plate assembly, and a plurality of hangers. The outer housing has first and second side walls. The inner housing is at least partially positioned within the outer housing and has first and second side walls and is configured to receive a plurality of patch panel devices therein in a stacked arrangement. The hanger plate assembly includes a plurality of hanger plates, the plurality of hanger plates having opposing first and second surfaces and including a first hanger plate hingedly coupled to the first side wall of the inner housing. At least one additional hanger plate is hingedly coupled to the first hanger plate, and a terminal hanger plate is operably coupled to the at least one additional hanger plate and has a free edge. The plurality of hangers is connected to the first surface of one of the plurality of hanger plates in a stacked arrangement, each hanger adapted to support a cable thereon. The hanger plate assembly has a pulled out condition in which the hanger plate assembly is at least partially positioned outside the outer housing, and a stored condition in which the hanger plate assembly is fully positioned within the outer housing and the second surface of the terminal hanger plate confronts the first side wall of the inner housing.

The inner housing may include a plurality of slots, each slot configured to receive one of the patch panel devices therein. The hanger plate assembly may include a number of hangers equal to or greater than a number of patch panel devices received in the plurality of slots. A plurality of cable retainers may be connected to the first surface of a selected at least one of the plurality of hanger plates excluding the first hanger plate. The cable retainers may include a rounded portion extending transversely from the first surface of the selected hanger plate. The cable retainers may include a flat portion coupled to and extending transversely from the rounded portion. The selected hanger plate may be the terminal hanger plate. A cover may be hingedly coupled to the terminal hanger plate, the cover being pivotable from a first position exposing the cable retainers to a second position overlying the cable retainers. The at least one additional hanger plate may include an opening extending from the first surface of the second surface of the at least one additional hanger plate to allow a cable to pass through the at least one additional hanger plate. A cable support may have a first end coupled to the first surface of one of the plurality of hanger plates and a second free end, the second free end spaced a first distance from the first surface of the one hanger plate when the hanger plate assembly is in the pulled out condition, and a second distance from the first surface of the one hanger plate when the hanger plate assembly is in the stored condition, the first distance being greater than the second distance. The first end of the cable support may be rotatably coupled to the first surface of the one hanger plate. The cable support may have a telescopic configuration so that the second free end of the cable support is translatable toward or away from the first end of the cable support. The selected hanger plate may include a first edge that is translatable relative to a second edge of the selected hanger plate. The cable retainers may be translatable along the first surface of the selected hanger plate from a first position to a second position, the cable retainers being nearer a first edge of the selected hanger plate in the first position, and nearer a second edge of the selected hanger plate in the second position.

According to another aspect of the disclosure, a communication system includes a housing, a hanger plate assembly, and a plurality of hangers. The housing has an open proximal face configured to receive a plurality of patch panel devices therein in a stacked arrangement. The hanger plate assembly includes a hanger plate having opposing first and second surfaces, the hanger plate extending from a first edge hingedly coupled to the housing to a second free edge. The plurality of hangers is connected to the first surface of the hanger plate in a stacked arrangement, each hanger adapted to support a cable thereon. The hanger plate assembly has a stored condition in which the first surface of the hanger plate at least partially covers the open proximal face of the housing and an installation condition in which the first surface of the hanger plate does not cover the open proximal face of the housing.

The housing may include a plurality of slots, each slot configured to receive one of the patch panel devices therein. The hanger plate assembly may include a number of hangers equal to or greater than a number of patch panel devices received in the plurality of slots. A plurality of cable retainers may be connected to the first surface of the hanger plate between the hangers and the second free edge of the hanger plate. The cable retainers include a rounded portion extending transversely away from the first surface of the hanger plate. The cable retainers may include a flat portion coupled to the rounded portion extending toward a top or bottom edge of the hanger plate. The hanger plate may include at least one vertical slot in a top or bottom edge of the hanger plate configured to allow cables to pass from the first surface to the second surface of the hanger plate. The vertical slot may be positioned between the plurality of hangers and the first edge of the hanger plate, or between the plurality of hangers and the second free edge of the hanger plate. In the stored condition of the hanger plate assembly, the housing and the hanger plate may be collectively substantially cylindrical. The hanger plate assembly may include an additional hanger plate having opposing first and second surfaces, the additional hanger plate extending from a first edge hingedly coupled to the housing to a second free edge, the first edge of the hanger plate and the first edge of the additional hanger plate being positioned on opposite sides of the open proximal face of the housing. In the stored condition of the hanger plate assembly, the first surface of the additional hanger plate may at least partially overlie the second surface of the hanger plate.

According to still another aspect of the disclosure, a communication system includes a housing and a hanger plat assembly. The housing may have first and second side walls and a plurality of patch panel devices received therein in a stacked arrangement. The hanger plate assembly may include a first hanger plate and a second hanger plate. The first hanger plate may have a side edge hingedly coupled to the first side wall of the housing, the first hanger plate including an exterior surface and a plurality of first hangers attached to an interior surface of the first hanger plate in a stacked arrangement, each of the first hangers adapted to support a cable thereon. The second hanger plate may have a side edge hingedly coupled to the second side wall of the housing, the second hanger plate including a plurality of second hangers attached to an interior surface of the second hanger plate in a stacked arrangement, each of the second hangers adapted to support a cable thereon. In a stored condition of the hanger plate assembly, the interior surface of the second hanger plate may confront front faces of the plurality of patch panel devices, and the interior surface of the first hanger plate may confront an exterior surface of the second hanger plate. In a maintenance condition of the hanger plate assembly, the front faces of the plurality of patch panel devices may be exposed. The exterior surface of the first hanger plate may have a convex curvature, which may extend along an entirety of the exterior surface of the first hanger plate. The interior surface and the exterior surface of the second hanger plate may be substantially flat. The housing may include a plurality of slots, each of the slots configured to receive one of the patch panel devices therein. A number of the plurality of first hangers may be equal to or greater than a number of patch panel devices received in the plurality of slots. The housing may include a frame including a bottom and a top. The frame may be formed of metal. The system may include a base configured to be fixedly coupled to the bottom of the frame. The system may include a cover adapted to couple to the base and at least partially surround the frame when the hanger plate assembly is in the stored condition. The top of the frame may include a first top end extending a first distance beyond the first side wall, and a second top end extending a second distance beyond the second side wall. The cover may include a first interior guide slot shaped to receive the first top end of the frame and a second interior guide slot adapted to receive the second top end of the frame, the first and second interior guide slots being positioned on opposite sides of the cover. When the first and second top ends of the frame are received respectively within the first and second interior guide slots of the cover, and the cover is coupled to the base, the first side wall of the housing may be spaced a third distance from a first adjacent portion of an interior surface of the cover, and the second side wall of the housing may be spaced a fourth distance from a second adjacent portion of the interior surface of the cover. The base may include at least one latch for latching the cover to the base. The cover may include an exterior surface having a bottom end with an upward facing hook, and the at least one latch may include a lever member coupled to a hook member, the hook member having a downward facing hook adapted to engage the upward facing hook of the cover. The lever member may be in contact with an interior surface of the base. The lever member may be pivotably coupled to the hook member and pivoting the lever member may draw the cover into engagement with the base when the downward facing hook is engaged with the upward facing hook. The base may include a circumferential groove and a gasket member positioned at least partially within the circumferential groove. At least one of the base and the cover may include a circumferential groove and a gasket member positioned at least partially within the circumferential groove, and the other of the base and the cover may include a protrusion adapted to press against the gasket member when the cover is assembled to the base. The upward facing hook may include an interior surface continuous with an interior surface of the cover, the interior surface of the upward facing hook being in contact with the gasket member when the cover is engaged with the base. The system may include a cartridge rotatably coupled to a rear of the housing, the cartridge having a stored condition and an access condition, wherein in the stored condition, the cartridge and a rear portion of the housing define a substantially closed interior space, and in the access condition, the cartridge and the rear portion of the housing define a substantially open interior space. The housing may include a frame, and a first side hanger may be coupled to a first side of the frame, the first side hanger including a plurality of first protrusions for guiding cables. A second side hanger may be coupled to a second side of the frame opposite the first side, the second side hanger including a plurality of second protrusions for guiding cables. The system may also include a first bar having a stored condition and a maintenance condition, the first bar positioned adjacent the side edge of the first hanger plate and extending between a bottom of the housing and a top of the housing in the stored condition of the first bar, and the first bar extending from the first side wall of the housing toward the second side wall of the housing in the maintenance condition of the first bar. The first bar may have a top end and a bottom end, the first bar being pivotable about the top end to transition the first bar from the stored condition of the bar to the maintenance condition of the bar. A second bar may have a stored condition and a maintenance condition, the second bar positioned adjacent the side edge of the second hanger plate and extending between the bottom of the housing and the top of the housing in the stored condition of the second bar, and the second bar extending from the second side wall of the housing toward the first side wall of the housing in the maintenance condition of the second bar. The first bar and the second bar may each have a top end and a bottom end, the first bar being pivotable about the top end thereof to transition the first bar from the stored condition to the maintenance condition, and the second bar being pivotable about the bottom end thereof to transition the second bar from the stored condition to the maintenance condition. In the stored condition of the first bar, the hanger plate assembly may be transitionable from the stored condition to the maintenance condition. In the maintenance condition of the first bar, the first bar may restrict the hanger plate assembly from transitioning from the maintenance condition to the stored condition. The first bar may have a curved surface shaped in accordance with a minimum bending radius for an optical fiber. The plurality of first hangers may extend from a first end coupled to the first hanger plate to a second end, the second end including a first portion and a second portion, the first portion defining a lip, and a latch member hingedly coupled to the second portion. The first portion of a first one of the first hangers may be aligned with the second portion of a second one of the first hangers, the first one of the first hangers being adjacent the second one of the first hangers. The latch member may include a latch feature having a shape complementary to the lip. In a latched condition of a first one of the first hangers, the latch feature of a latch member coupled to the first one of the first hangers may be engaged with the lip of a second one of the first hangers, the first one of the hangers being adjacent to the second one of the first hangers. The system may include a water sensor operably coupled to the housing, the water sensor including a first sensor component having a front face and a second sensor component having a front face. The water sensor may also include an optical fiber extending along a nominal axis between the front faces of the first sensor component and the second sensor component so that a first portion of the optical fiber is adjacent the front face of the first sensor component and a second portion of the optical fiber is adjacent the front face of the second sensor component. The first sensor component and the second sensor component may be formed of a material that swells upon contact with water so that the first and second sensor components each have a first size in a dry condition and a second size in a wet condition, the second size being larger than the first size. The first and second sensor components may be configured such that, in the dry condition, the first size of the first and second sensor components is such that the first and second sensor components do not extend not beyond the nominal axis and the first and second portions of the optical fiber are substantially straight, and in the wet condition, the first and second sensor components having the second size extend beyond the nominal axis such that the first and second portions of the optical fiber are substantially curved. A cable organizer may be coupled to the interior surface of the first hanger plate in a position between the side edge of the first hanger plate and a free edge of the first hanger plate, the cable organizer having a plurality of ribs having first portions positioned relatively close to the side edge of the first hanger plate and second portions positioned relatively close to the free edge of the first hanger plate. Adjacent first portions of the ribs may be spaced apart a first distance, and adjacent second portions of the ribs may be spaced apart a second distance smaller than the first distance. The plurality of ribs may include a top-most rib and a bottom-most rib, the second portion of the top-most rib extending in a direction toward the bottom-most rib, the second portion of the bottom-most rib extending in a direction toward the top-most rib. The first portion of each rib may be substantially aligned with a corresponding one of the first hangers. The cable organizer may define a plurality of cable routing paths, each cable routing path being defined by at least one surface of one of the ribs. Each cable routing path may include a first portion relatively close to the side edge of the first hanger plate and a second portion relatively close to the free edge of the first hanger plate, the first portions of adjacent cable routing paths being spaced apart by a first distance, and the second portions of adjacent cable routing paths being spaced apart by a second distance smaller than the first distance.

According to a further aspect of the disclosure, a communication system includes a first patch panel system and a second patch panel system. The first patch panel system may include a first housing and a first hanger plate assembly, and the second patch panel system may include a second housing and a second hanger plate assembly. The first housing may have first and second side walls and a plurality of first patch panel devices received therein in a stacked arrangement. The first hanger plate assembly may include a first hanger plate hingedly coupled to the first side wall of the first housing, the first hanger plate including an exterior surface and a plurality of first hangers attached to an interior surface of the first hanger plate in a stacked arrangement, each of the first hangers adapted to support a cable thereon, and a second hanger plate hingedly coupled to the second side wall of the first housing, the second hanger plate including a plurality of second hangers attached to an interior surface of the second hanger plate in a stacked arrangement, each of the second hangers adapted to support a cable thereon. The first hanger plate assembly may include a stored condition in which the interior surface of the second hanger plate confronts front faces of the plurality of first patch panel devices, and the interior surface of the first hanger plate confronts an exterior surface of the second hanger plate, and the first hanger plate assembly includes a maintenance condition in which front faces of the plurality of first patch panel devices are exposed. The second housing may have first and second side walls and a plurality of second patch panel devices received therein in a stacked arrangement. The second hanger plate assembly may include a third hanger plate hingedly coupled to the first side wall of the second housing, the third hanger plate including an exterior surface and a plurality of third hangers attached to an interior surface of the third hanger plate in a stacked arrangement, each of the third hangers adapted to support a cable thereon, and a fourth hanger plate hingedly coupled to the second side wall of the second housing, the fourth hanger plate including a plurality of fourth hangers attached to an interior surface of the fourth hanger plate in a stacked arrangement, each of the fourth hangers adapted to support a cable thereon. The second hanger plate assembly may include a stored condition in which the interior surface of the fourth hanger plate confronts front faces of the plurality of second patch panel devices, and the interior surface of the third hanger plate confronts an exterior surface of the fourth hanger plate, and the second hanger plate assembly may include a maintenance condition in which front faces of the plurality of second patch panel devices are exposed. The first patch panel system may be positioned adjacent the second patch panel system and a rear of the first housing may faces a rear of the second housing. The exterior surfaces of the first and third hanger plates may each have a convex curvature, and each convex curvature may extend along an entirety of the respective exterior surface. The system may include a base, a bottom of the first housing configured to be fixed to the base and a bottom of the second housing configured to be fixed to the base. The system may include a cover adapted to couple to the base and at least partially surround the first housing and the second housing when the first hanger plate assembly is in the stored condition thereof and the second hanger plate assembly is in the stored condition thereof.

According to yet another aspect of the disclosure, a communication system includes a housing having a top wall, a bottom wall, and a rear wall. A plurality of patch panel devices may be positioned within the housing in a stacked arrangement. A hanger plate assembly may be operably coupled to the housing and have a maintenance condition in which front faces of the patch panel devices are exposed and a stored condition in which the front faces of the patch panel devices are concealed. At least one hanging element may have a first portion coupled to a first portion of the housing and being configured to contact a wire to suspend the communication system from the wire. The at least one hanging element may include a second end portion coupled to a second portion of the housing, the at least one hanging element forming a closed boundary with the housing. The hanger plate assembly may include a first hanger plate and a second hanger plate, the first hanger plate having a side edge hingedly coupled to the housing, the first hanger plate including an exterior surface having a convex curvature, the second hanger plate having a side edge hingedly coupled to the housing. In the stored condition of the hanger plate assembly, an interior surface of the second hanger plate may confront the front faces of the patch panel devices, and an interior surface of the first hanger plate may confront an exterior surface of the second hanger plate. The hanger plate assembly may include a single hanger plate having a bottom edge hingedly coupled to the bottom wall of the housing. The at least one hanging element may include two hanging elements, the first portions of the two hanging elements coupled to the top wall of the housing, the second portions of the two hanging elements coupled to the rear wall of the housing.

According to another embodiment of the disclosure, a system includes an output cable having a first terminal end coupled to a splitter module, and a coupling element coupled to a second terminal end of the output cable opposite the first terminal end of the output cable. A plurality of individual cables each have a first terminal end and a second terminal end opposite the first terminal end. The first terminal end of each of the plurality of individual cables may be coupled to the coupling element, and the second terminal end of each of the plurality of individual cables may be coupled to an output connector for connecting to a secondary device. A plurality of optical fibers may extend continuously from the splitter module, through the output cable, and respectively through the plurality of individual cables to the output connectors respectively of the plurality of individual cables. Each individual cable of the plurality of individual cables may have a transverse cross-sectional area defined by an outer surface of each individual cable, and the output cable may have a transverse cross-sectional area defined by an outer surface of the output cable. A sum of the transverse cross-sectional areas of the plurality of individual cables may be greater than the transverse cross-sectional area of the output cable. At least one input cable may have a first terminal end coupled to the splitter module, and at least one second terminal end opposite the first terminal end. An input connector may be coupled to each of the at least one second terminal ends of the at least one input cable. One input optical fiber may extend continuously between each input connector and the splitter module. Each of the at least one input cable may have a single first terminal end and a single second terminal end, or a single first terminal end and more than one second terminal end. The output cable may have a diameter at the outer surface thereof between about 2 mm and about 5 mm. Each of the plurality of individual cables may have a diameter at the outer surface thereof between about 0.9 mm and about 1.6 mm. A communication system may include a plurality of the systems described above, wherein a total number of the output cables is smaller than a total number of the plurality of individual cables. In the communication system, a total number of the at least one input cable may be less than or equal to a total number of the input connectors. The total number of the input connectors may be less than the total number of the plurality of individual cables. The splitter modules of the plurality of splitter module systems may be provided in a stacked configuration within a housing. A plurality of patch panel cassettes may be provided in a stacked configuration within the housing. At least some of the output connectors of the plurality of individual cables may be configured to attach to ports of the patch panel cassettes. Each of the splitter modules may be provided on a splitter tray that is slidable with respect to the housing. Each of the plurality of patch panel cassettes may be slidable with respect to the housing.

According to an aspect of the disclosure, a communication system for routing a signal from a signal provider to a signal subscriber includes an enclosure having a top and a bottom. A first chassis may be positioned within the enclosure, and a plurality of cassettes may be slidably received within the first chassis. A second chassis may be within the enclosure, the second chassis coupled to the first chassis and positioned vertically adjacent (e.g. above or below) the first chassis. The second chassis may be adapted to receive a plurality of splitter cassettes having splitter modules therein. A base may be positioned within the enclosure, the base coupled to the second chassis and positioned vertically adjacent (e.g. above or below) the second chassis, the base including a panel that, together with a front face of the base, forms a trough for storing cables extending between splitter cassettes and the plurality of cassettes received within the first chassis. A first panel may be coupled to a first side of the first chassis and a second panel may be coupled to a second side of the first chassis opposite the first side, the first panel having a first hanger unit positioned thereon for supporting the cables and the second panel having a second hanger unit positioned thereon for supporting the cables.

According to another aspect of the disclosure, a communication system for routing a signal from a signal provider to a signal subscriber includes an enclosure having a top and a bottom. A first chassis may be positioned within the enclosure. A plurality of cassettes may be slidably received within the first chassis. A second chassis may be within the enclosure, the second chassis coupled to the first chassis and positioned vertically adjacent (e.g. above or below) the first chassis. The second chassis may be adapted to receive a plurality of splitter cassettes having splitter modules therein. A front face of the second chassis may be positioned a spaced distance from a front face of the first chassis so as to form a trough for storing cables extending between splitter cassettes and the plurality of cassettes received within the first chassis. A bottom face of the second chassis may be positioned a spaced distance from a top face of the first chassis so that bottom edges of splitter cassettes received within the second chassis are positioned a spaced distance from the top face of the first chassis.

According to yet another aspect of the disclosure, a communication system for routing a signal from a signal provider to a signal subscriber includes an enclosure having a top and a bottom. A first chassis may be positioned within the enclosure, and a plurality of cassettes may be slidably received within the first chassis. A second chassis may be positioned within the enclosure, the second chassis positioned a spaced distance from the first chassis and adapted to receive a plurality of splitter cassettes having splitter modules therein. A base may be positioned within the enclosure, the base including a front portion and a rear portion extending a distance above the front portion, the first chassis and second chassis being coupled to the rear portion of the base. A panel may be hingedly coupled to the front portion of the base, so that a trough is formed by the panel, the front portion of the base, and the rear portion of the base, the trough adapted to store cables extending between splitter cassettes and the plurality of cassettes received within the first chassis.

According to still a further aspect of the disclosure, a communication system may include a first chassis and a second chassis. The first chassis may be adapted to slidably receive therein a plurality of cassettes. A second chassis may be coupled to the first chassis and may be positioned vertically adjacent the first chassis. The second chassis may be adapted to receive a plurality of splitter cassettes having splitter modules therein. A base may be coupled to the second chassis and may be positioned vertically adjacent the second chassis. The base may include a trough panel that at least partially forms a trough for storing cables extending from the splitter cassettes respectively to the plurality of cassettes. The second chassis may be positioned beneath the first chassis, and the base may be positioned beneath the second chassis. A first hanger unit may be coupled to a first side of the first chassis, the first hanger unit including a plurality of first hangers for supporting the cables. A second hanger unit may be coupled to a second side of the first chassis opposite the first side, the second hanger unit including a plurality of second hangers for supporting the cables. The first hanger unit may be coupled to a first guide panel that is hingedly coupled to the first side of the first chassis. The first guide panel may include a plurality of fins each extending between a first end and a second end, the plurality of fins configured to guide the cables. The first ends of the plurality of fins may be positioned adjacent a first side wall of the first chassis and extend to the second ends in a direction away from the first side wall and toward the trough. The plurality of fins may include a first fin, a second fin, and a third fin. The first end of the first fin may be positioned adjacent a top of the first chassis. The first end of the second fin may be positioned between the first end of the first fin and the second chassis, and the second end of the second fin may be positioned closer to the first side of the first chassis than is the second end of the first fin. The first end of the third fin may be positioned between the first end of the second fin and the second chassis, and the second end of the third fin may be positioned closer to the first side of the first chassis than is the second end of the second fin. A first group of the cassettes may be positioned adjacent the top of the first chassis, a second group of the cassettes are positioned beneath the first group of cassettes, and a third group of the cassettes may be positioned beneath the second group of cassettes. The first end of the first fin may be positioned adjacent a top of the first group of the cassettes, the first end of the second fin may be positioned adjacent a top of the second group of the cassettes, and the first end of the third fin may be positioned adjacent a top of the third group of the cassettes. The trough panel may be coupled to the base. The trough panel may include a first panel face extending in a first direction substantially parallel to a front face of the first chassis from a first side end to a second side end. The trough panel may include a first side panel extending from the first side end of the first panel face in a second direction substantially orthogonal the first direction. The trough panel may include a second side panel extending from the second side end of the first panel face in the second direction. The system may include an enclosure housing the first chassis and the second chassis. The second chassis may include a first section having an interior volume and a second section having an interior volume, the interior volumes of the first section and the second section being separated by at least one wall, the first section configured to receive a first group of the splitter cassettes, the second section configured to receive a second group of the splitter cassettes.

According to a further aspect of the disclosure, a communication system may include a first chassis having first and second side walls and adapted to slidably receive therein a plurality of cassettes. A first cable hanger assembly may have a first side edge hingedly coupled to the first side wall of the first chassis, the first cable hanger assembly including a plurality of first hangers adapted to support cables thereon. An axis of rotation of the first cable hanger assembly may be substantially orthogonal to a direction in which the plurality of cassettes are slideable. The cable hanger assembly may be rotatable from a first position to a second position so that during rotation from the first position to the second position, the plurality of first hangers move toward front faces of the plurality of cassettes. In an embodiment, a second chassis may be coupled to the first chassis and positioned vertically adjacent the first chassis, the second chassis adapted to receive a plurality of splitter cassettes having splitter modules therein. In that embodiment, a base may be coupled to the second chassis and positioned vertically adjacent the second chassis, the base including a trough panel that at least partially forms a trough for storing cables extending from the splitter cassettes respectively to the plurality of cassettes. The second chassis may be positioned beneath the first chassis, and the base may be positioned beneath the second chassis. In an embodiment, a second cable hanger assembly has a second side edge hingedly coupled to the second side wall of the first chassis, the second cable hanger assembly including a plurality of second hangers adapted to support cables thereon, an axis of rotation of the second cable hanger assembly being substantially orthogonal to the direction in which the plurality of cassettes are slideable. In a stored condition of the system, an interior surface of the second cable hanger assembly confronts the front faces of the plurality of cassettes, and an interior surface of the first cable hanger confronts an exterior surface of the second cable hanger assembly. The plurality of first hangers may be coupled to a first guide panel of the first cable hanger assembly, the first guide panel including a plurality of fins each extending between a first end and a second end, the plurality of fins configured to guide the cables. The first ends of the plurality of fins may be positioned adjacent the first side wall of the first chassis and extend to the second ends in a direction away from the first side wall and toward a bottom of the first chassis. The plurality of fins may include a first fin, a second fin, and a third fin. The first end of the first fin may be positioned adjacent a top of the first chassis. The first end of the second fin may be positioned between the first end of the first fin and the bottom of the first chassis, and the second end of the second fin may be positioned closer to the first side wall of the first chassis than is the second end of the first fin. The first end of the third fin may be positioned between the first end of the second fin and the bottom of the first chassis, and the second end of the third fin may be positioned closer to the first side wall of the first chassis than is the second end of the second fin. A first group of the cassettes may be positioned adjacent the top of the first chassis, a second group of the cassettes may be positioned beneath the first group of cassettes, and a third group of the cassettes may be positioned beneath the second group of cassettes. The first end of the first fin may be positioned adjacent a top of the first group of the cassettes, the first end of the second fin may be positioned adjacent a top of the second group of the cassettes, and the first end of the third fin may be positioned adjacent a top of the third group of the cassettes. In an embodiment, the first position of the cable hanger assembly is a maintenance condition and the second position of the cable hanger assembly is a stored condition, the front faces of the plurality of cassettes being exposed in the maintenance condition. A base may be configured to be fixedly coupled to a bottom of the first chassis, and a cover may be adapted to couple to the base and at least partially surround the first chassis when the first cable hanger assembly is in the stored condition. The base may include at least one latch for latching the cover to the base, wherein the cover includes an exterior surface having a bottom end with an upward facing hook, and the at least one latch may include a lever member coupled to a hook member, the hook member having a downward facing hook adapted to engage the upward facing hook of the cover. A first side hanger may be coupled to the first side wall of the first chassis, the first side hanger including a plurality of first protrusions adapted to guide cables. The first cable hanger assembly may be rotatable a maximum of about 180 degrees about the axis of rotation. The plurality of cassettes may include patch panel cassettes and storage cassettes.

BRIEF DESCRIPTION OF THE DRAWINGS

By way of description only, embodiments of the present disclosure will be described herein with reference to the accompanying drawings, in which:

FIG. 4D is a perspective view of the cable management system of FIGS. 4A-C;

Figure 36A:
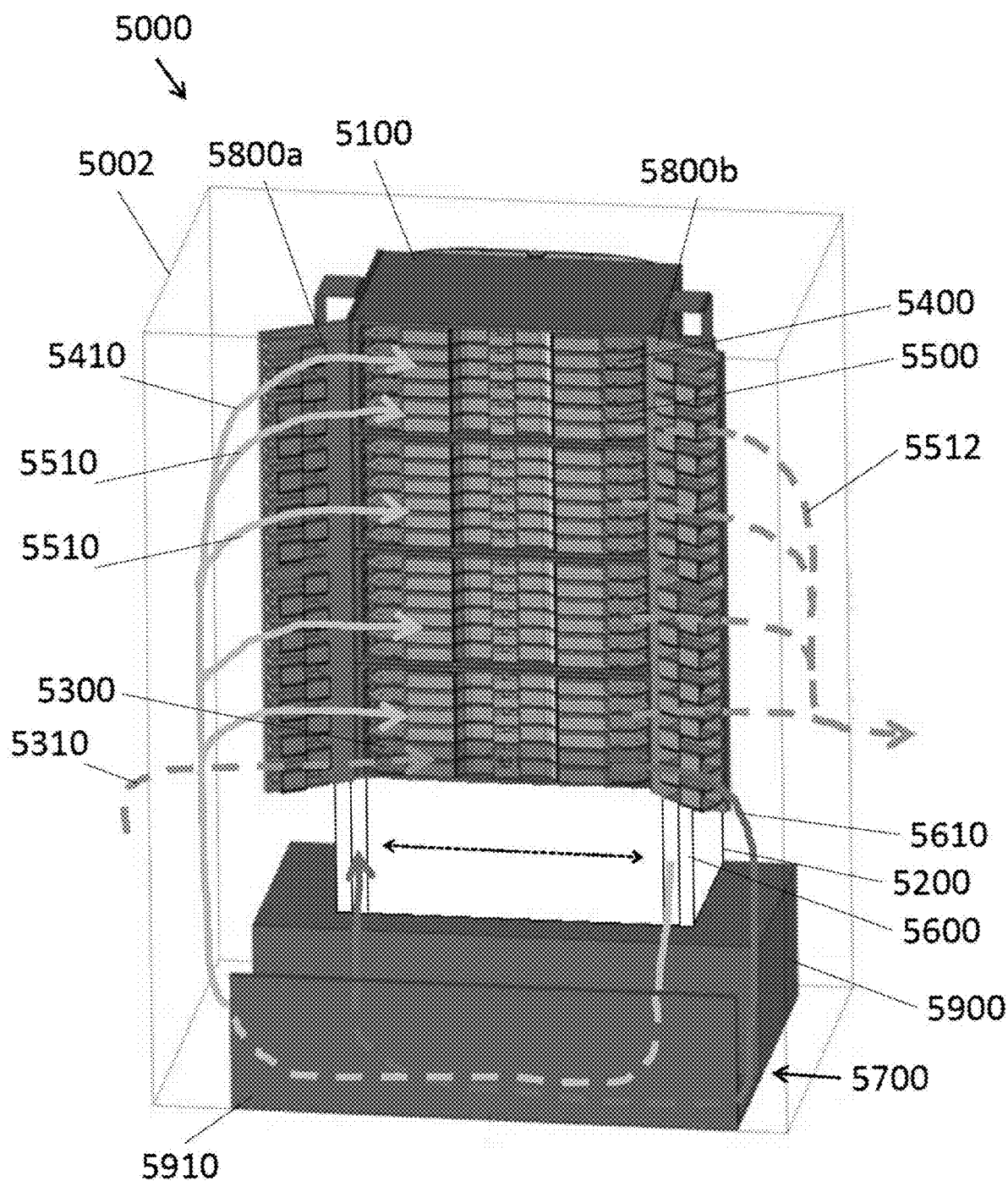
FIG. 36A is a perspective view of a communication system according to yet another embodiment of the disclosure.
Figure 36B:
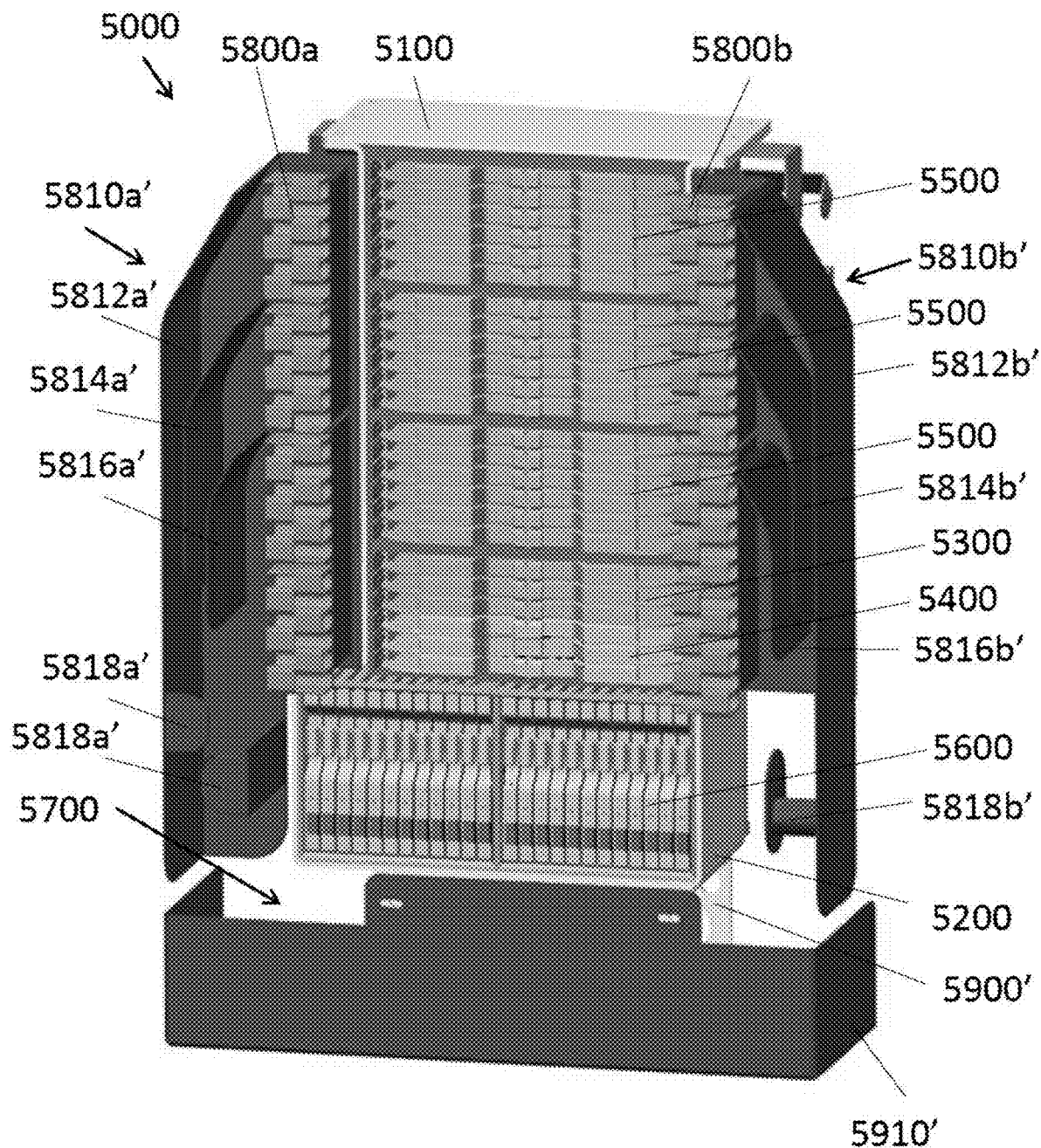
FIG. 36B is a perspective view of the communication system of FIG. 36A with certain additions and alterations.
Figure 36C:
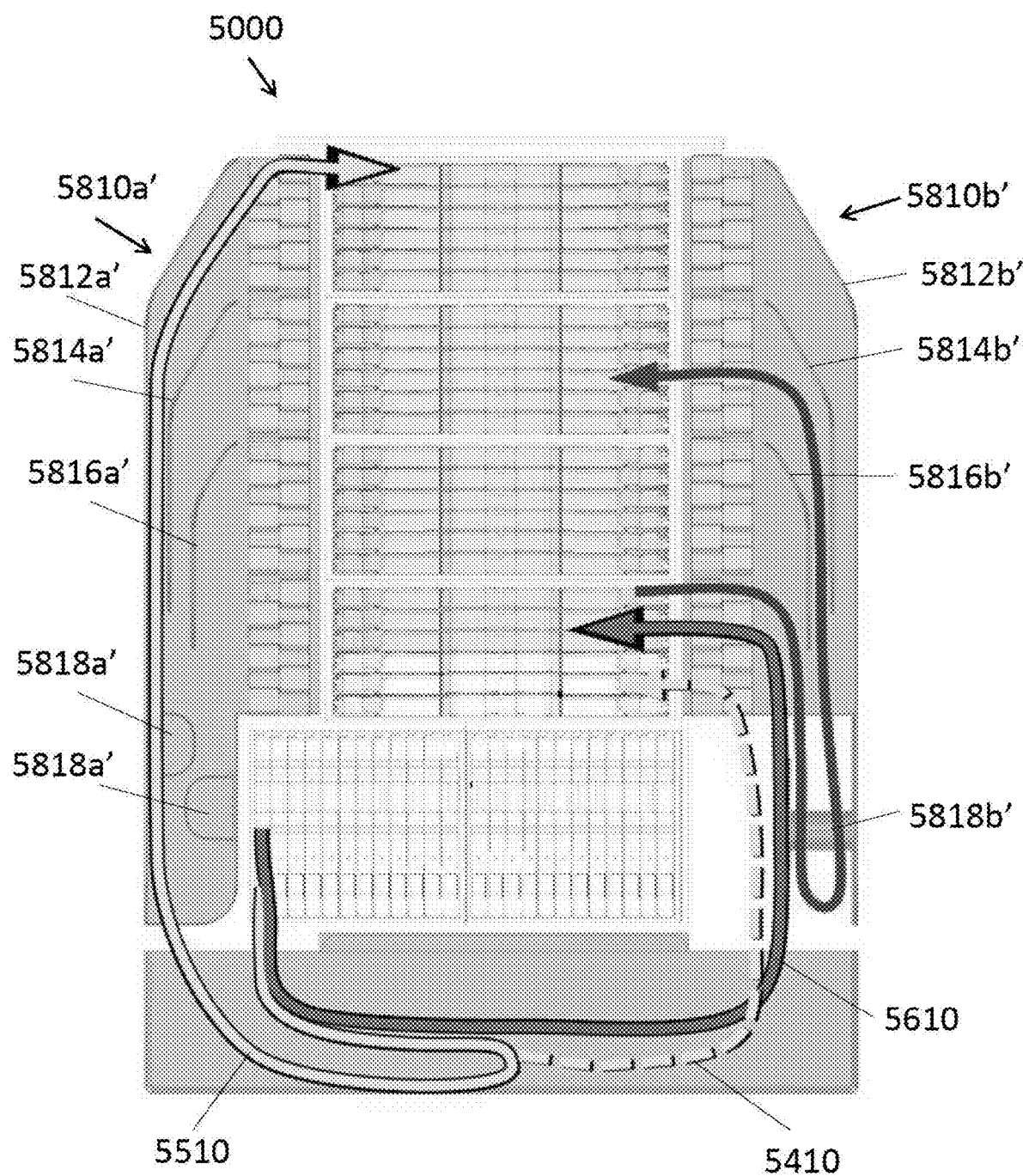
FIG. 36C is a schematic view of certain cables coupled to and guided by components of the system of FIG. 36B.
Figure 36D:
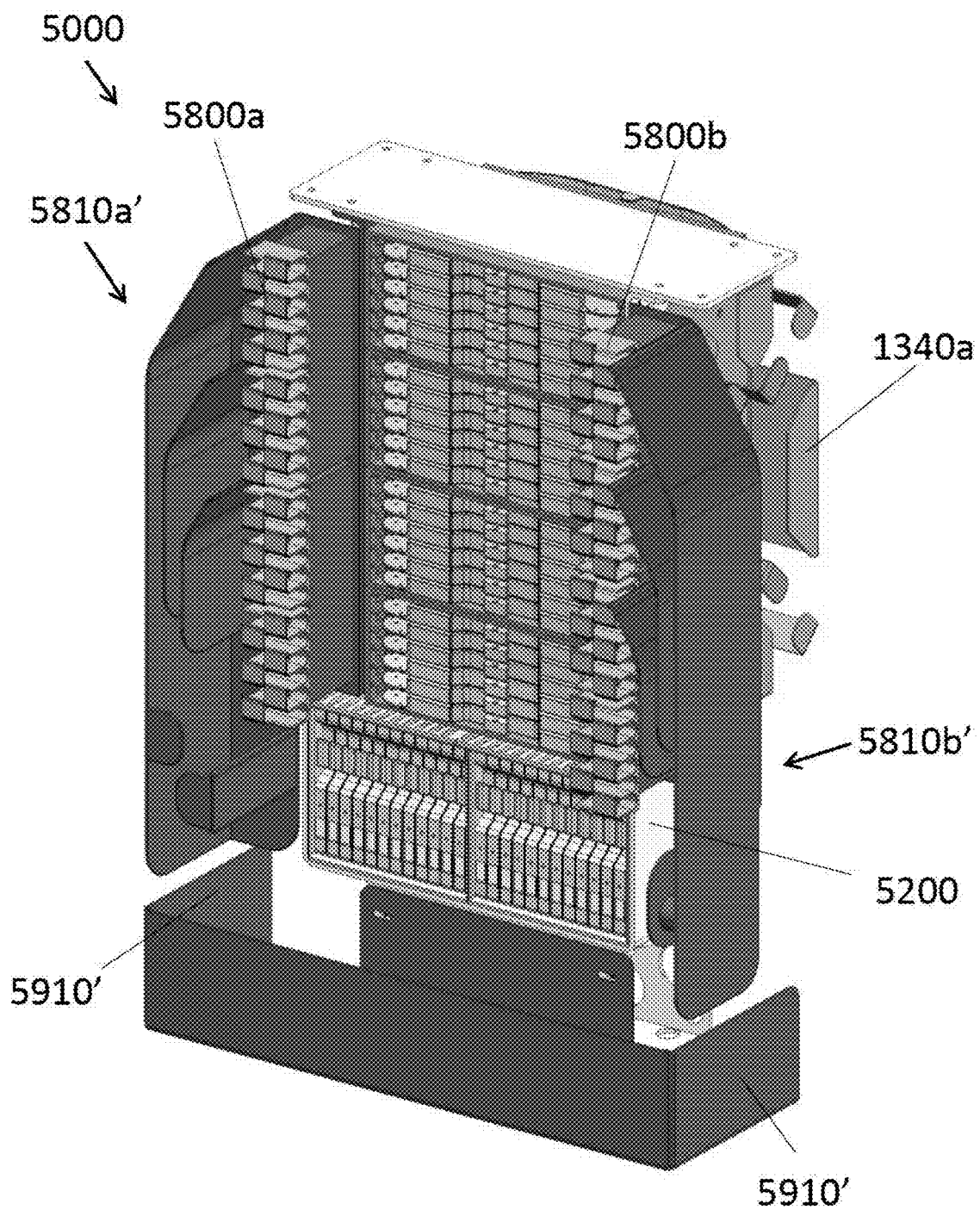
FIG. 36D is another perspective view of the system of FIG. 36B.
Figure 36E:
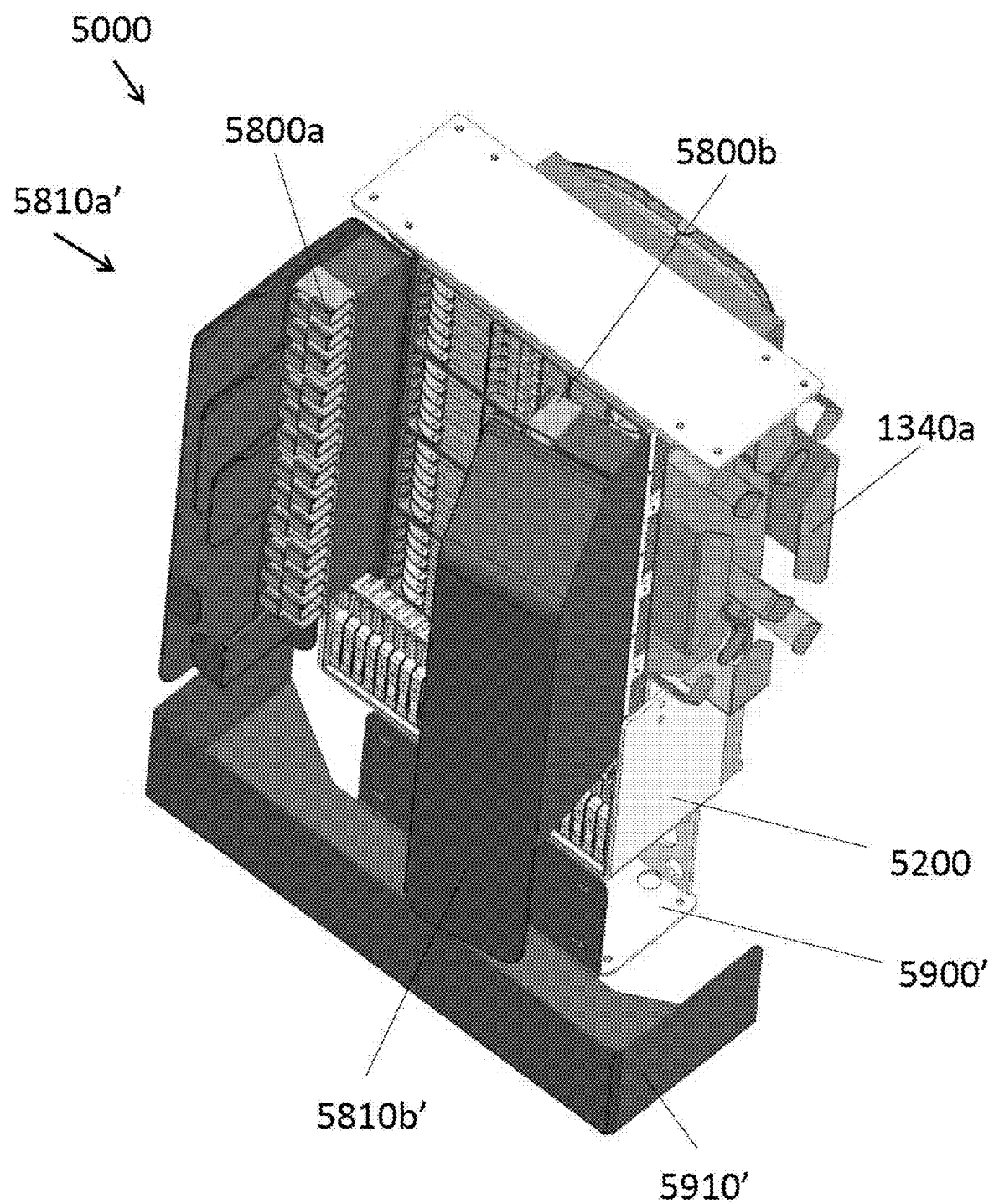
FIG. 36E is a perspective view of the system of FIG. 36D with a hanger unit on a cable guide in a different position than shown in FIG. 36D.
Figure 36F:
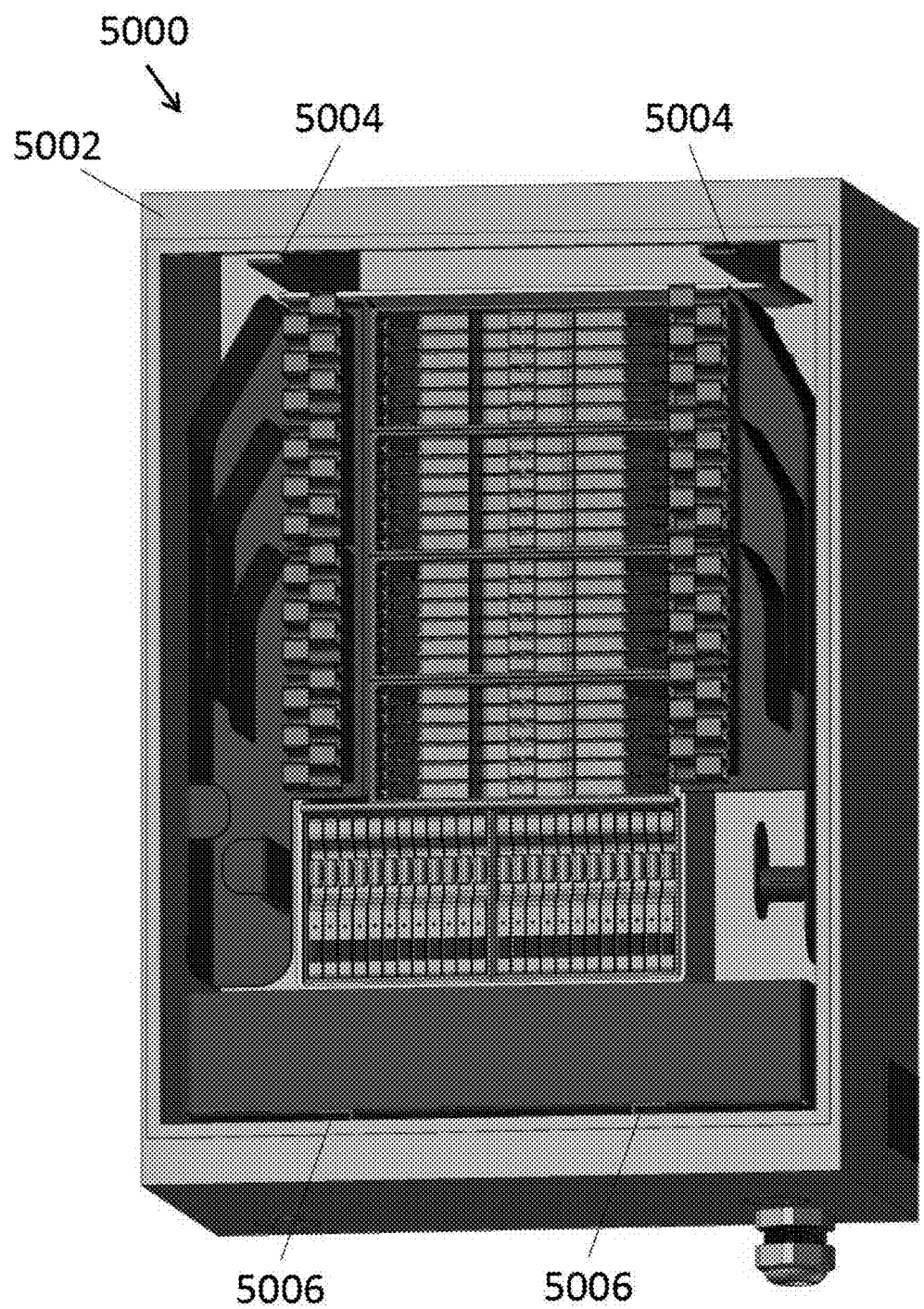
Figure 36G:
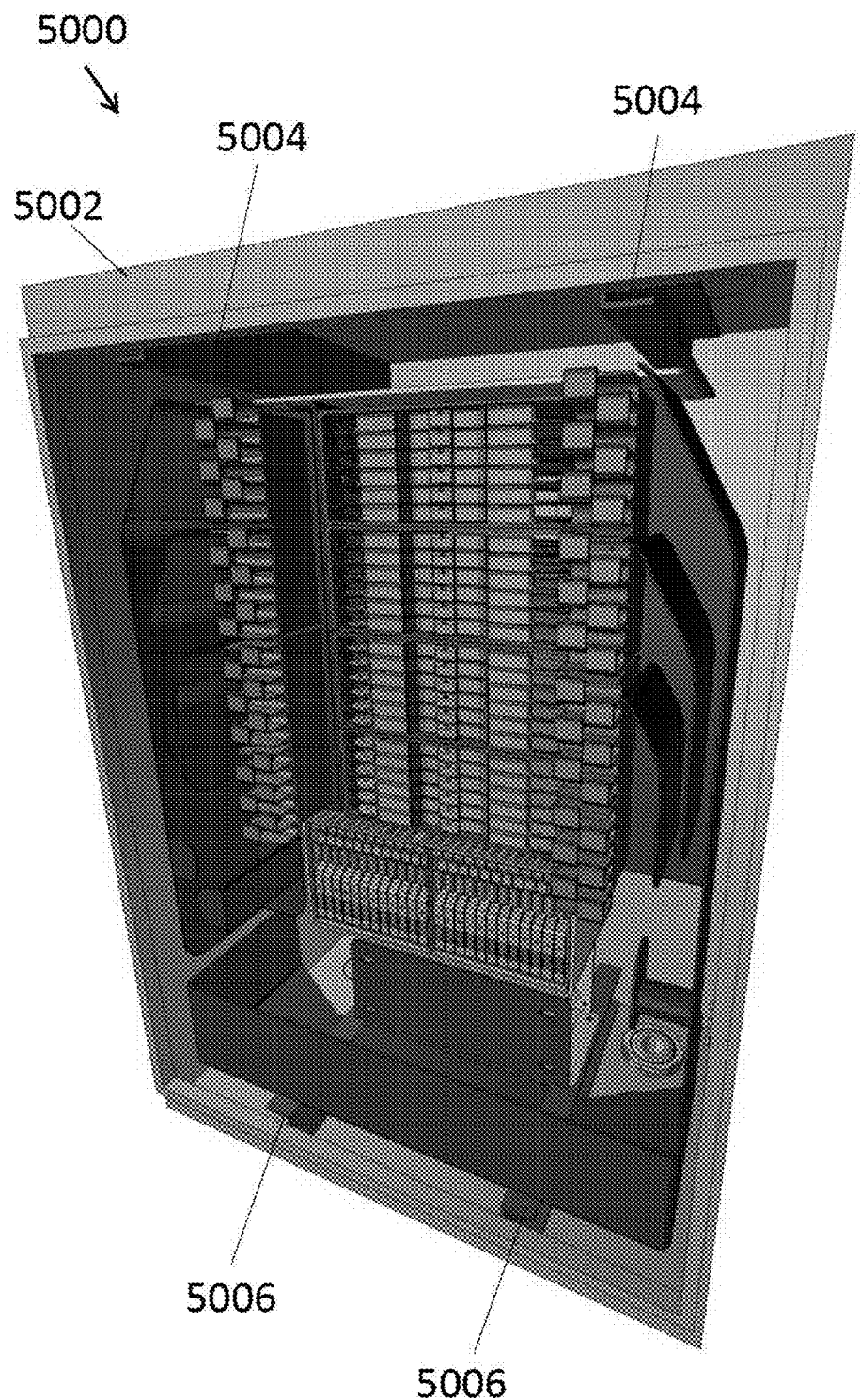
Figure 36H:
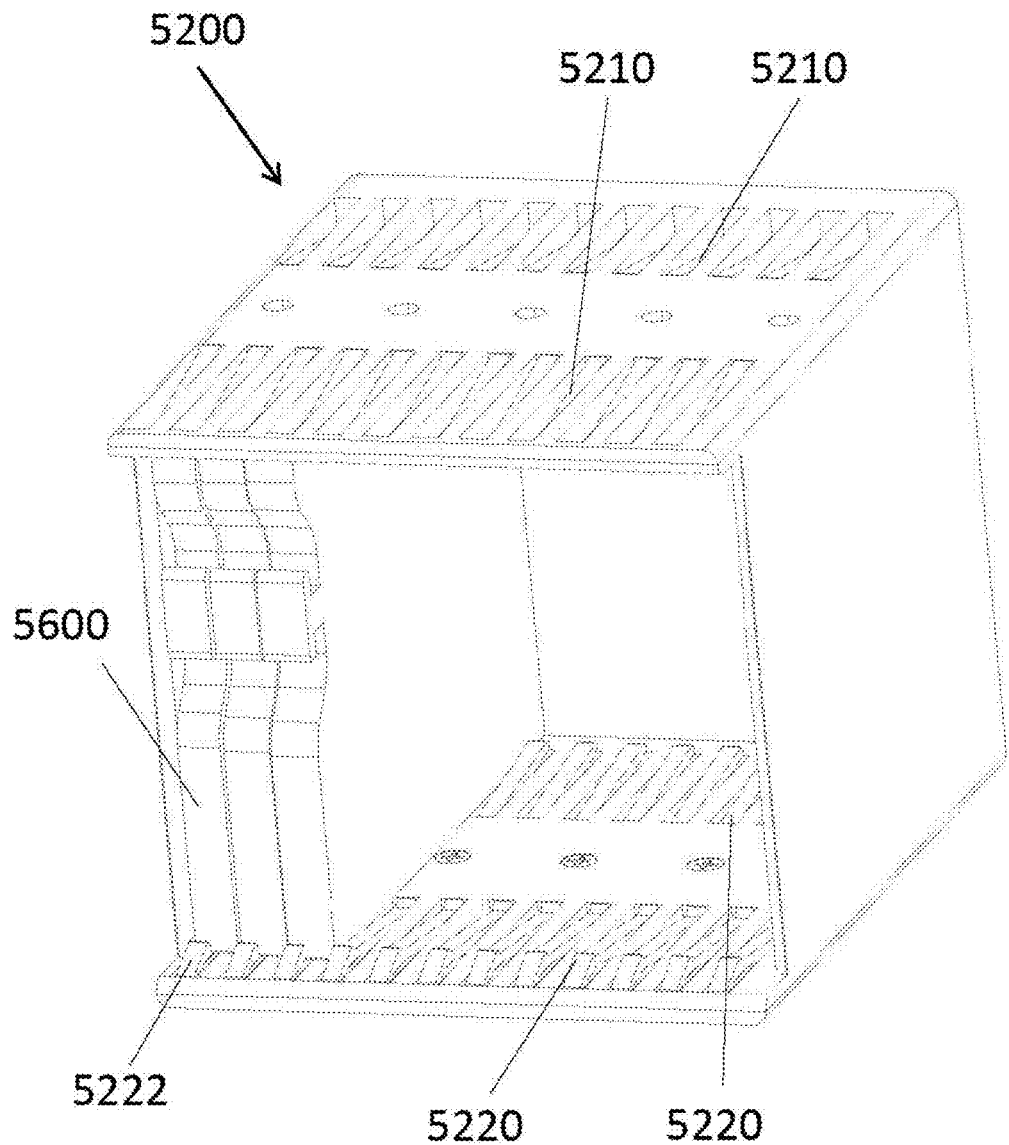
Figure 36I:
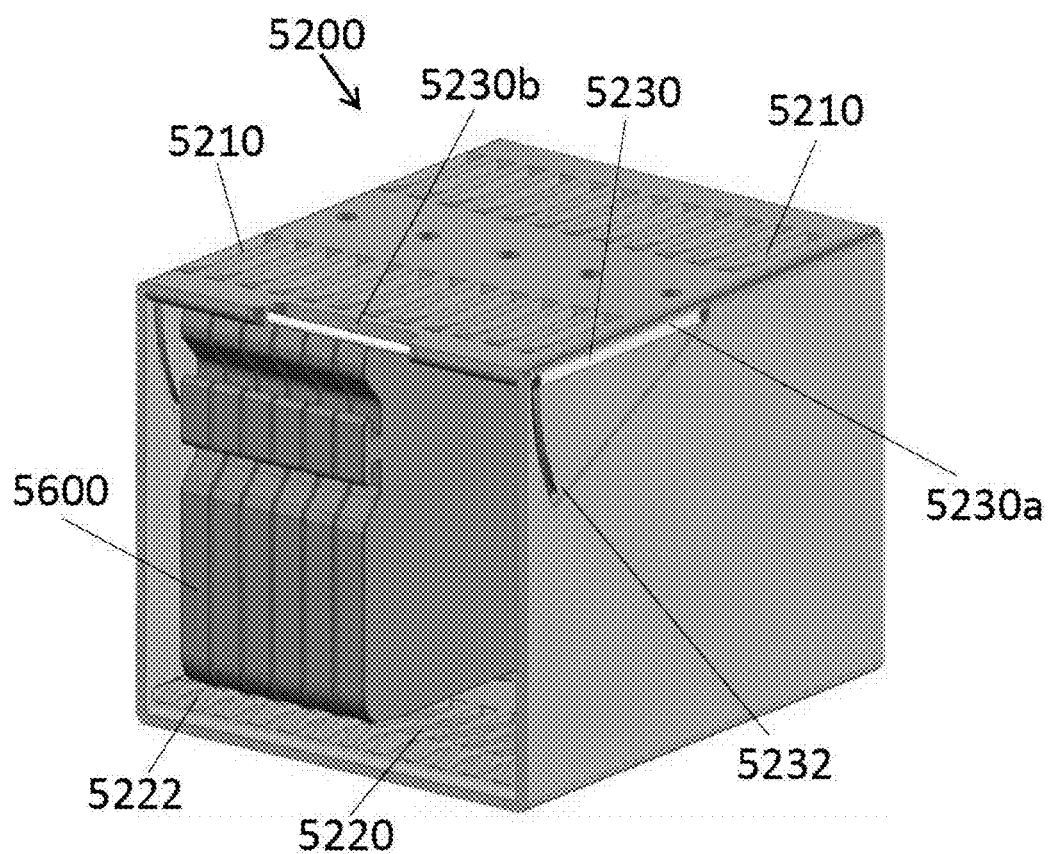
Figure 36J:
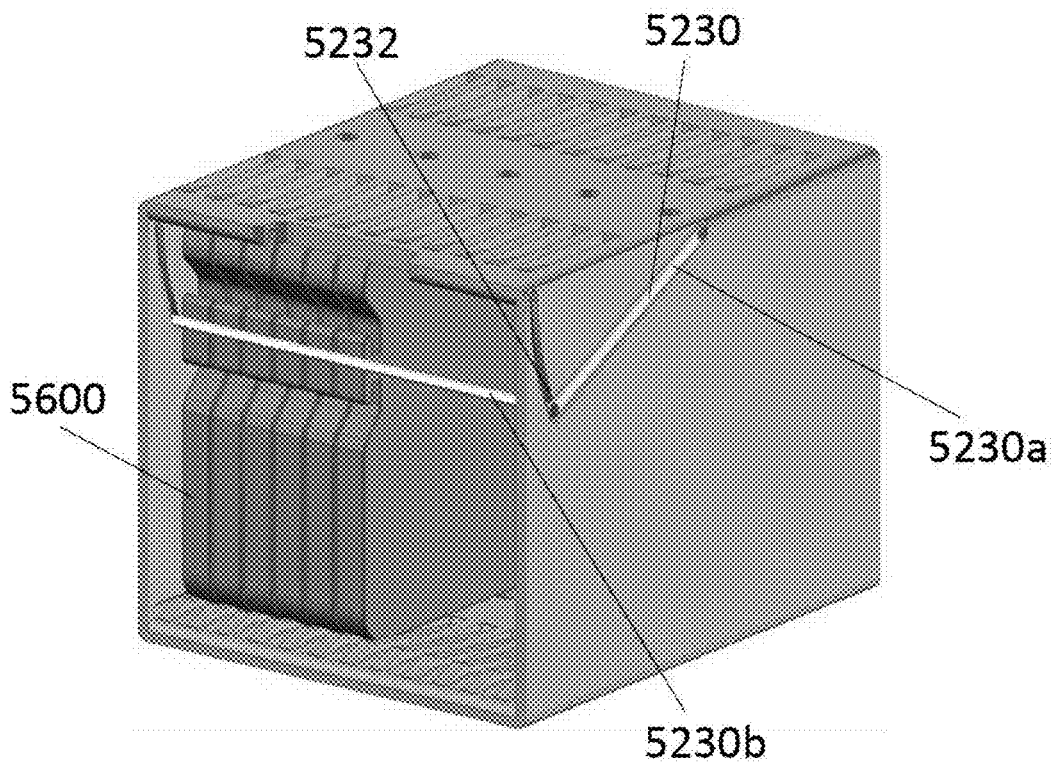
Figure 36K:
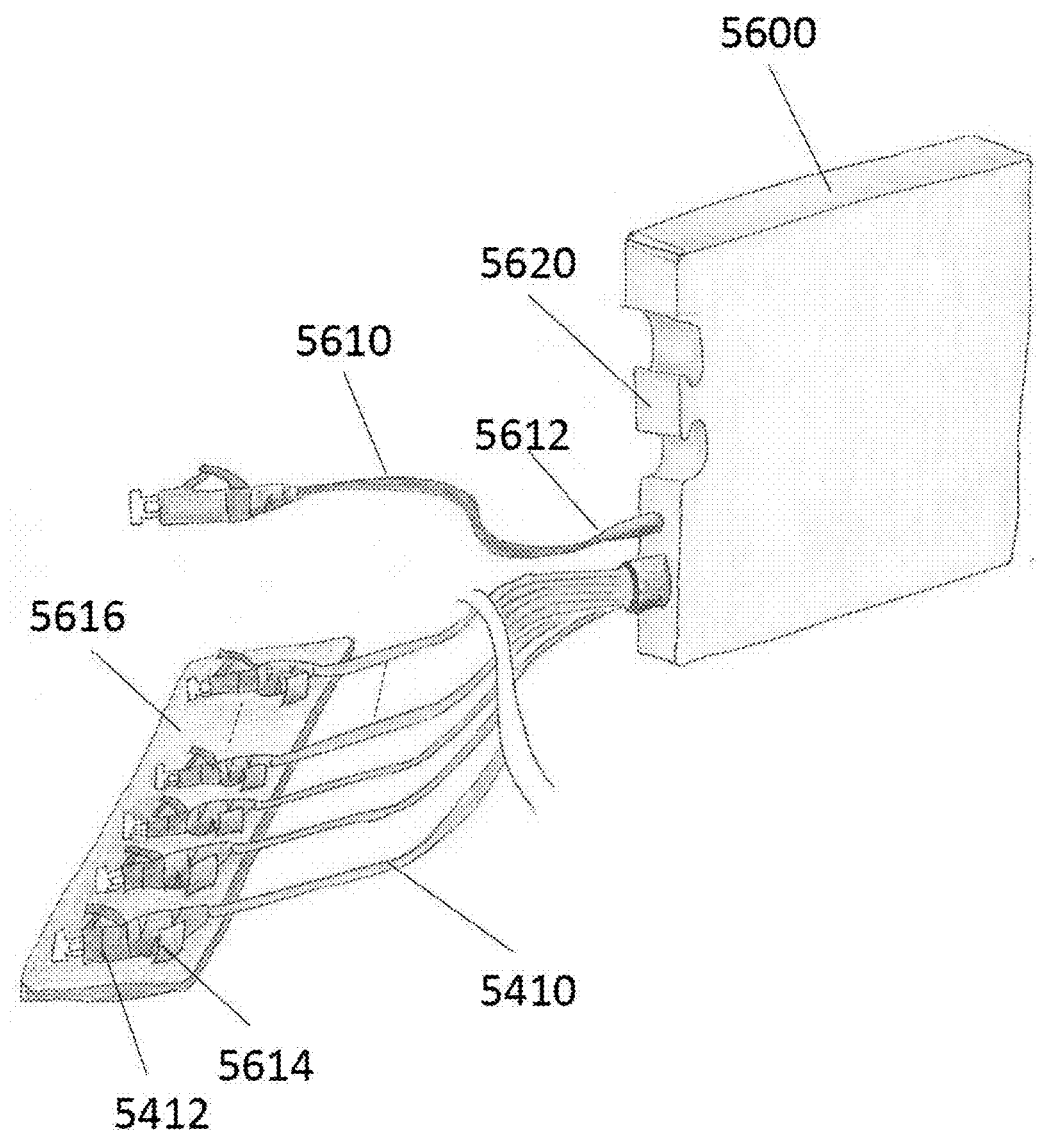
Figure 37A:
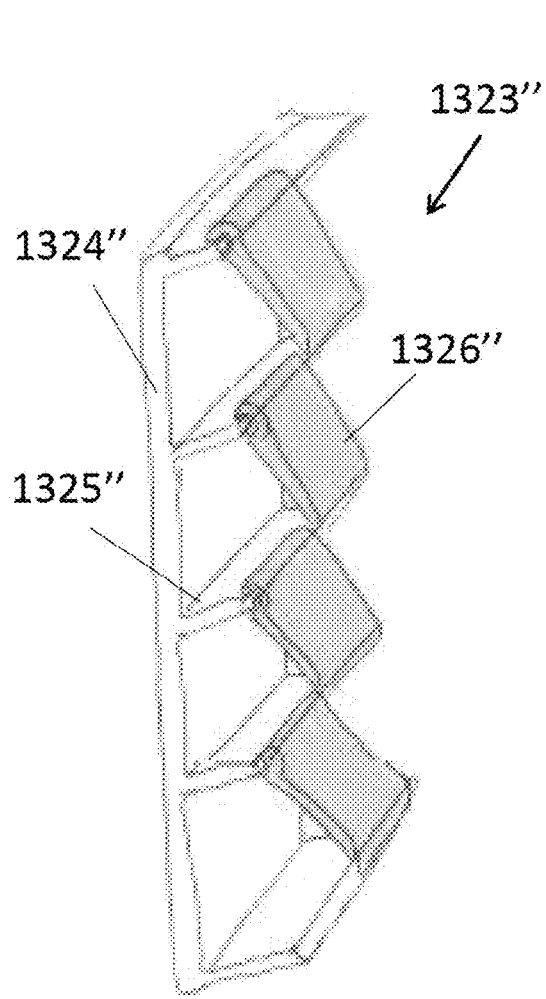
Figure 37B:
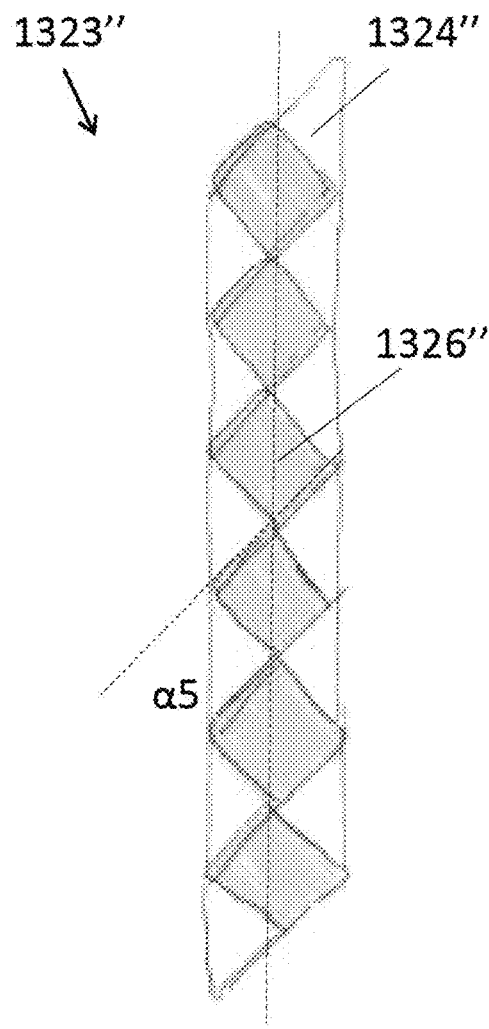
Figure 37C:
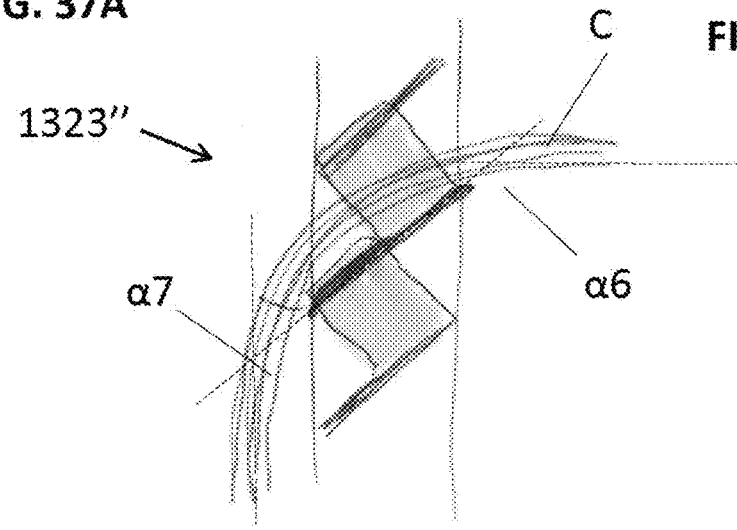

FIGS. 36F-G are views of the system of FIG. 36G mounted within an example of a housing;

FIG. 36H is a perspective view of a chassis of the system of FIG. 36B with splitter cassettes received therein;

FIG. 36I is a perspective view of a chassis similar to that shown in FIG. 36H with a locking bar in an unlocked position;

FIG. 36J is a perspective view of the chassis of FIG. 36I with the locking bar in a locked position;

FIG. 36K is a perspective view of an example of one of the splitter cassettes of FIG. 36H; and FIGS. 37A-C are various views of a hanger unit according to another aspect of the disclosure.

DETAILED DESCRIPTION

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figure 1A:
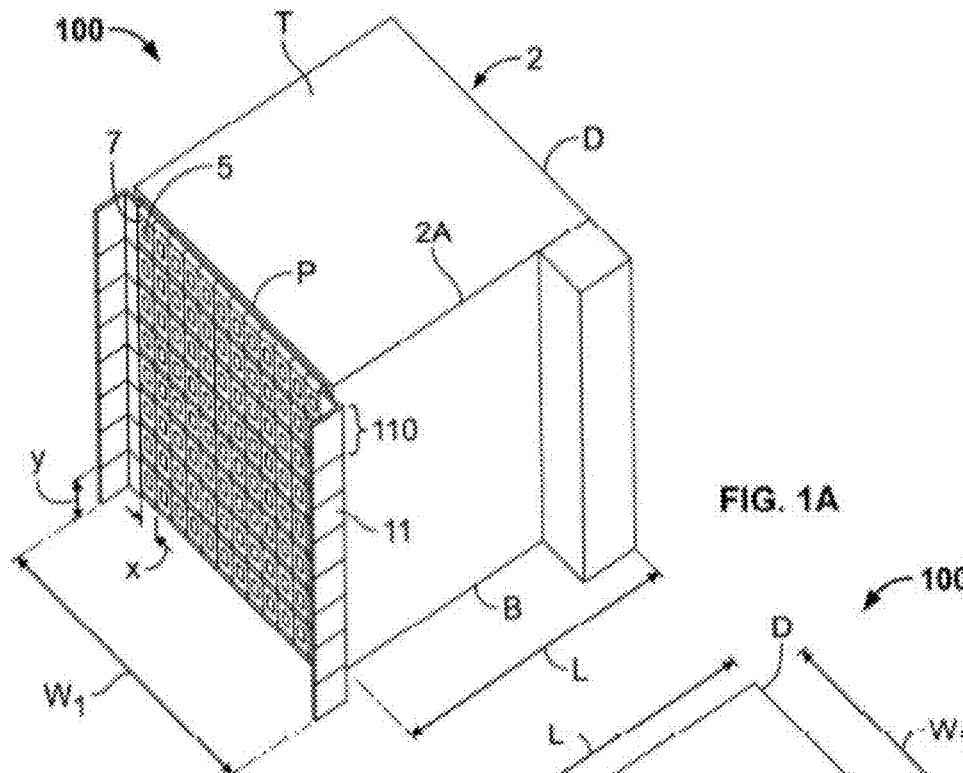
FIG. 1A is a front perspective view of a communication patching system including multiple patch panel devices shown in a first state.
Figure 1B:
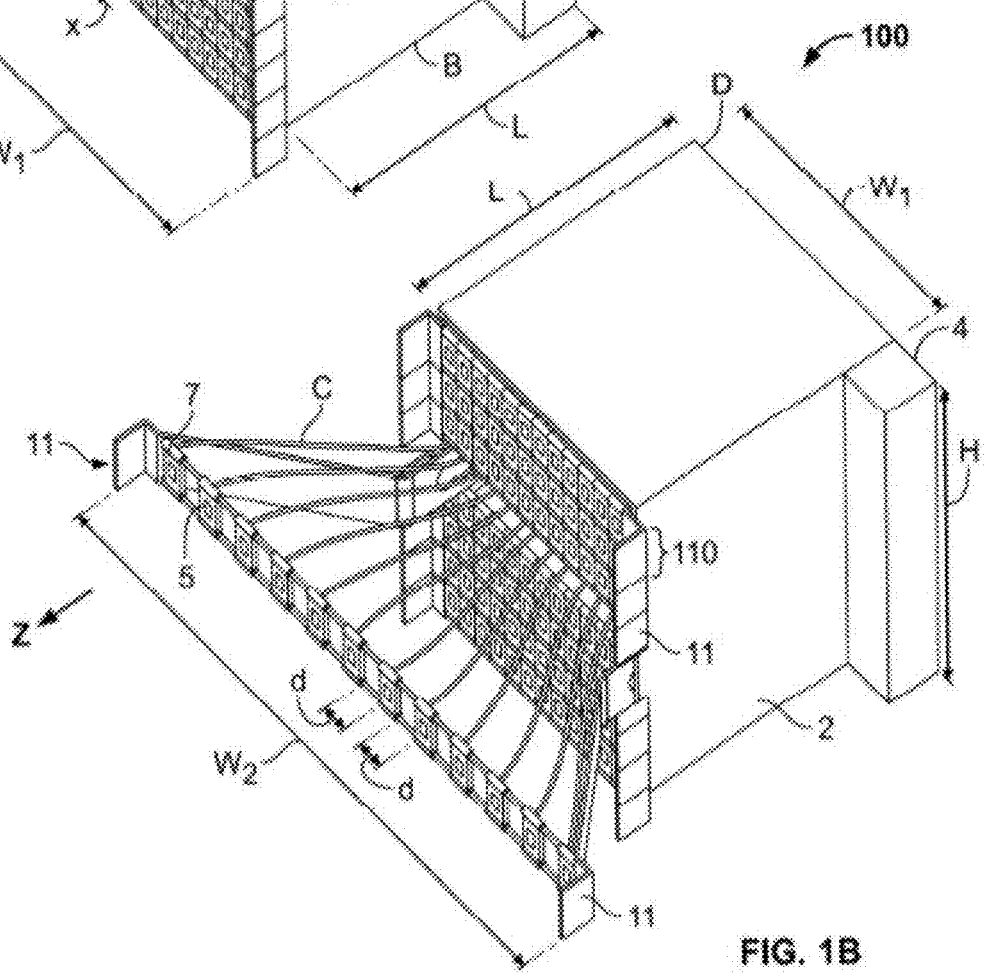
FIG. 1B is the communication patching system of FIG. 1A shown in a second state.
Figure 1C:
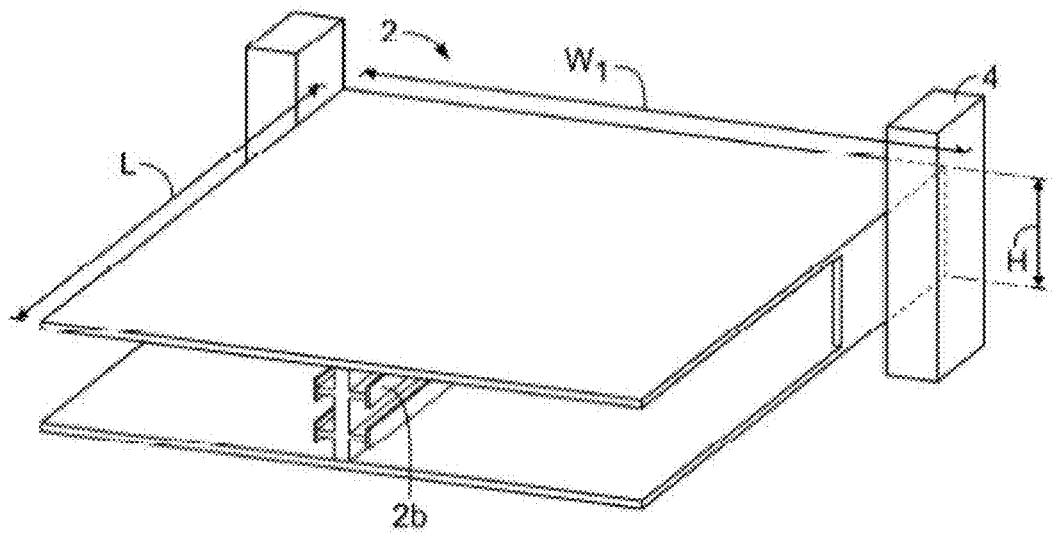
FIG. 1C is a front perspective view of a housing and cable trough, without a patch panel device placed therein.

Now referring to FIGS. 1A-C, a communication patching system 100 may include a housing 2, e.g., a rack or a cabinet. The housing 2 may define a length L, a height H, and a width W1. The housing 2 may support one or more patch panel devices 110, with each device 110 held in vertical alignment with a guide rail 2b (FIG. 1C), a plurality of which may also be disposed in vertical alignment along at least one side of the housing 2. A cable trough 4 may be positioned adjacent to the housing 2, for example at a proximal corner, a distal corner, or intermediate the proximal and distal corners. The cable trough 4, which may be attached to the frame of the system 100 (which may include, e.g., poles, walls, and other supports), may be configured to receive therein a plurality of cables C extending vertically therethrough. The cable trough 4 may take any suitable form to house and guide cables including, for example, a plurality of guide rings, a groove or other hollow passageway.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width W1.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be disposed proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
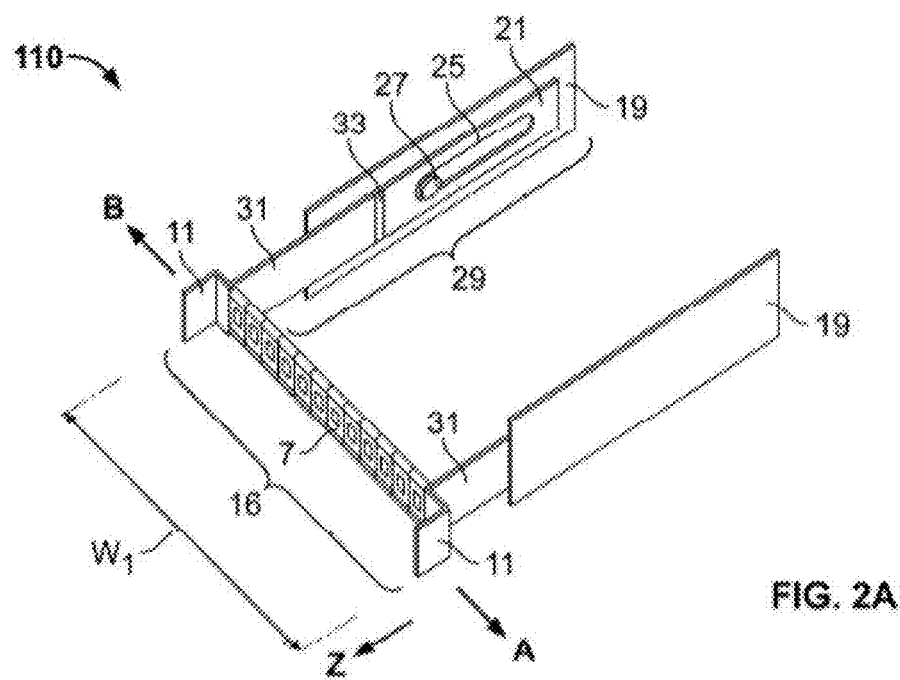
FIG. 2A is one of the patch panel devices of FIG. 1A shown in a first state.
Figure 2B:
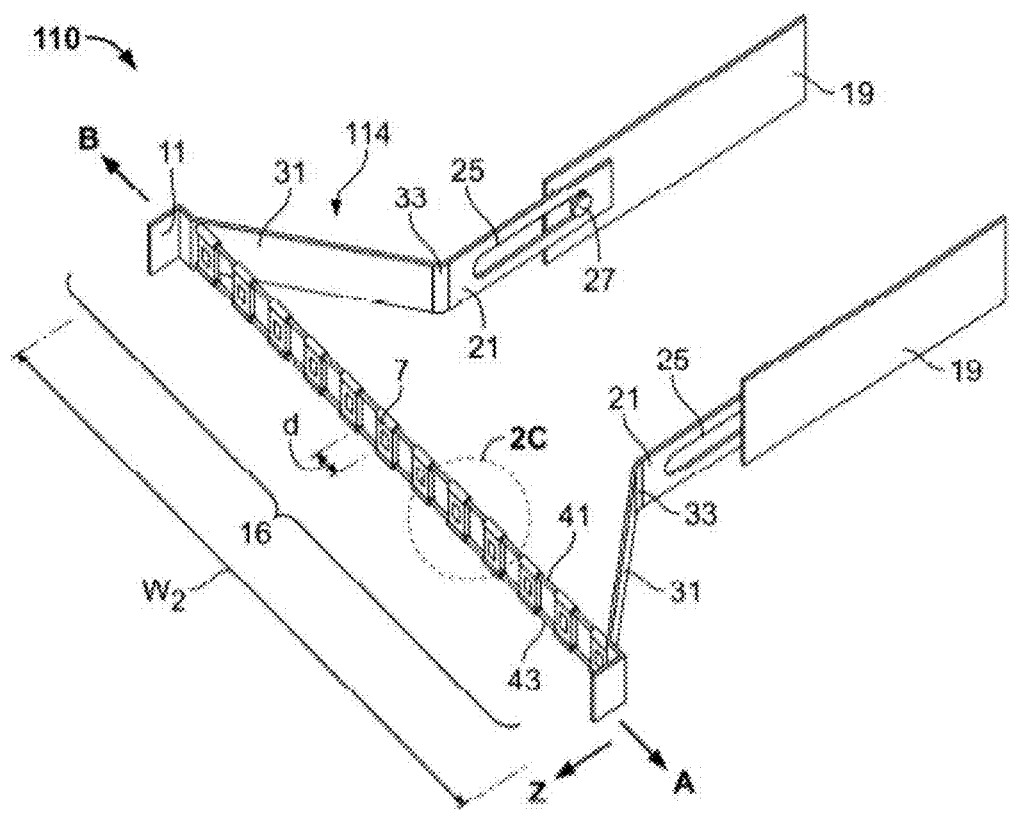
FIG. 2B is the patch panel device of FIG. 2A shown in a second state.
Figure 2C:
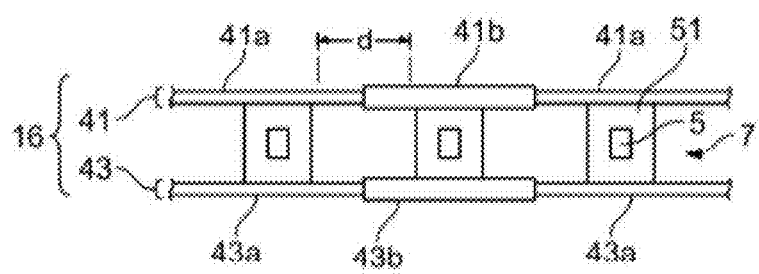
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width W1 (FIG. 2A) to a second, expanded width W2 (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by a user.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connections means 16. A resilient or biasing member (not shown) may be placed within a hollowed out center of each of the rails 41, 43 to bias the connection means 16 to one of the first or second dimensions W1, W2, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement of the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. Patent Publication Nos. 2014/0355217, 2014/0357118, and 2014/0354131, the disclosures of which are hereby incorporated by reference herein.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle 247 in which the connector 249 may be releasably secured such that the connector 249 may be separated from the attachment member 232.

The movable members 246 may be positioned spaced a distance from an edge 231a of the tray 231 to permit the movable members 246 to rotate relative to the tray 231. In one embodiment, the tray 231 may include a cut-out (not shown) at the movable members 246 to facilitate a range of movement of the movable members 246 relative to the tray 231. The tray 231 may have an axis z extending along its length, an axis y extending along its height, and an axis x extending its width. The securement member 244 may be coaxially aligned with the axis z extending along the length of the tray 231. A plurality of securement members 244 may be positioned in a row extending along axis x along the width of the tray 231.

Figure 3A:
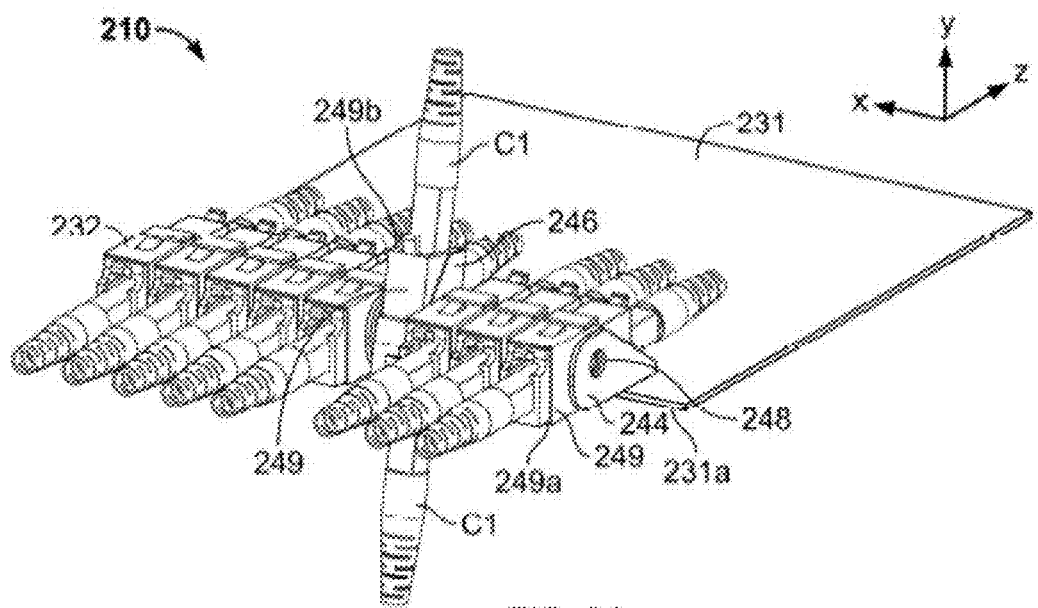
FIG. 3A is a perspective view of another embodiment of a patch panel device including a plurality of attachment members.
Figure 3B:
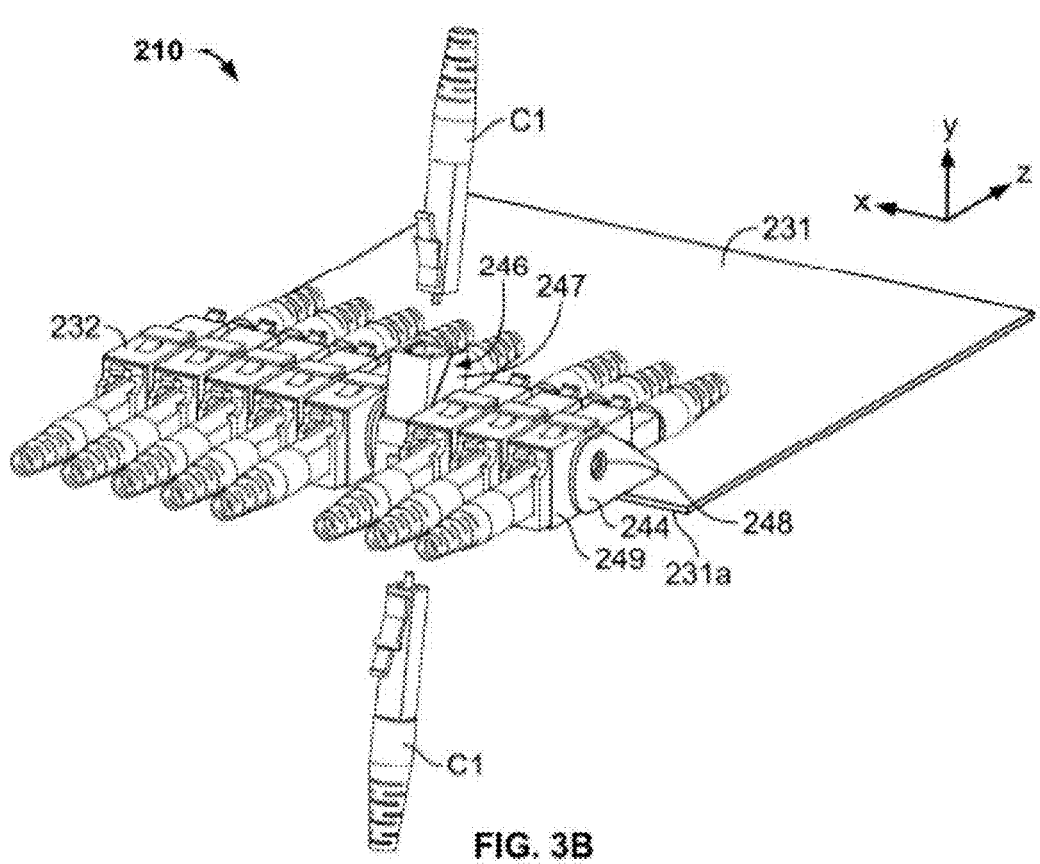
FIG. 3B is a perspective view of the patch panel device of FIG. 3A in which cables have been separated from one of the attachment members.
Figure 3C:
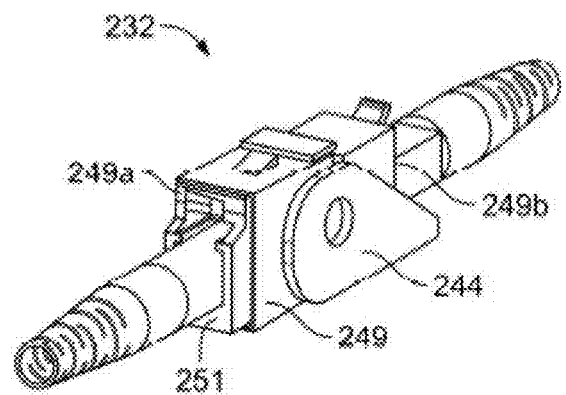
FIG. 3C is a perspective view of one of the attachment members of FIG. 3A shown in a first condition.
Figure 3D:
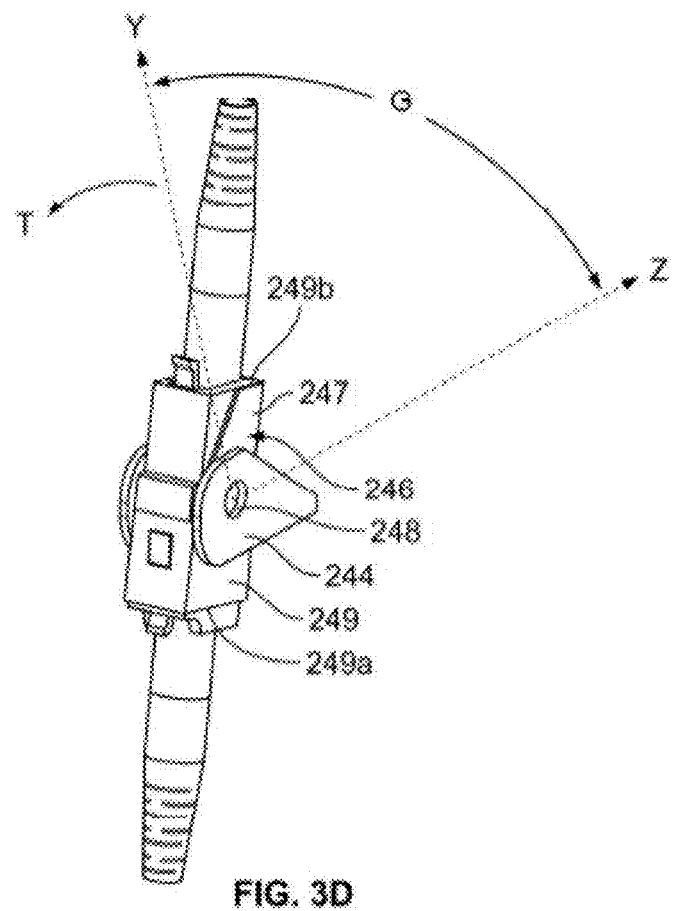
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counter-clockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing 2 (see FIGS. 1A-C), and may be translatable into or out from the housing 2 in a direction along axis z. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246 (as shown in FIG. 3B).

As noted above in connection with FIGS. 1A-C, a number of cables C may be coupled to ports 7 of a particular patch panel device, with the cables C extending vertically through cable trough 4. A number of systems for routing and managing cables C of patch panel systems are described below.

One embodiment of a cable management system 300 is shown in FIGS. 4A-D. Cable management system 300, as well as other embodiments of cable managements systems described herein, may be used with any suitable patch panel device, including suitable devices described herein and suitable devices described in U.S. Patent Publication Nos. 2014/0355217, 2014/0357118, and 2014/0354131, the disclosures of which are hereby incorporated by reference herein. Cable management system 300 is illustrated in FIGS. 4A-D as being used with a patch panel device 310 similar to patch panel device 210, with certain differences described in greater detail below. The cable management system 300 may include one or more cable guides 400 having a fixed position in relation to housing 2. In the embodiment shown in FIGS. 4A-D, cable management system 300 includes cable guides 400 mounted to each side of housing 2, although any configuration in which one or more cable guides 400 have a fixed position relative to housing 2 may be suitable. Cables C may be routed from ports 7, through or via cable guide 400, and to cable trough 4 (or any other suitable cable destination) so that as a tray 331 to which ports 7 are attached is pulled out of housing 2, a suitable amount of slack is maintained in cables C at different positions of tray 331. Prior to describing the function of cable guides 400 in more detail, the structure of an exemplary cable guide 400 is described in connection with FIGS. 5A-D.

Figure 5A:
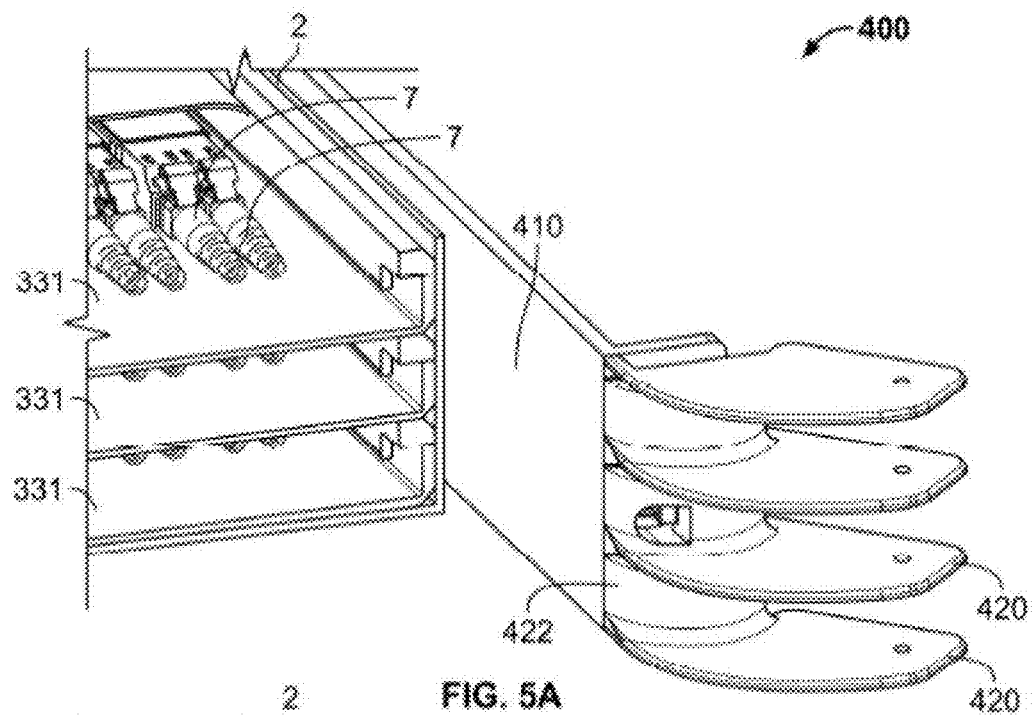
FIG. 5A is an enlarged perspective view of the cable guide of FIGS. 4A-C.

FIG. 5A shows an enlarged partial view of a lateral side of cable management system 300. In particular, three trays 331 carrying ports 7 within housing 2 are shown adjacent cable guide 400. In the illustrated embodiment, cable guide 400 includes a mounting arm 410 fixedly mounted to housing 2. In addition, the cable guide may include a shelving unit having a plurality of shelves 420 positioned at a front end portion of cable guide 400. Shelves 420 may include substantially flat top and bottom surfaces, although other configurations which allow cables C to rest upon the shelves 420 may be suitable. In one embodiment, cable guide 400 may include a pair of adjacent shelves 420 for each tray 331 connected to cables C, each adjacent pair of shelves 420 being spaced apart by a vertical distance substantially similar to the vertical distance between adjacent trays 331. Each adjacent pair of shelves 420 may be substantially open at a front portion and side portions, and connected, or otherwise bounded by, a rear or distal surface 422. Each distal surface 422 may be rounded, preferably with a convex curvature, so that a cable C extending along the surface 422 has a desired minimum bending radius along the surface.

Figure 5B:
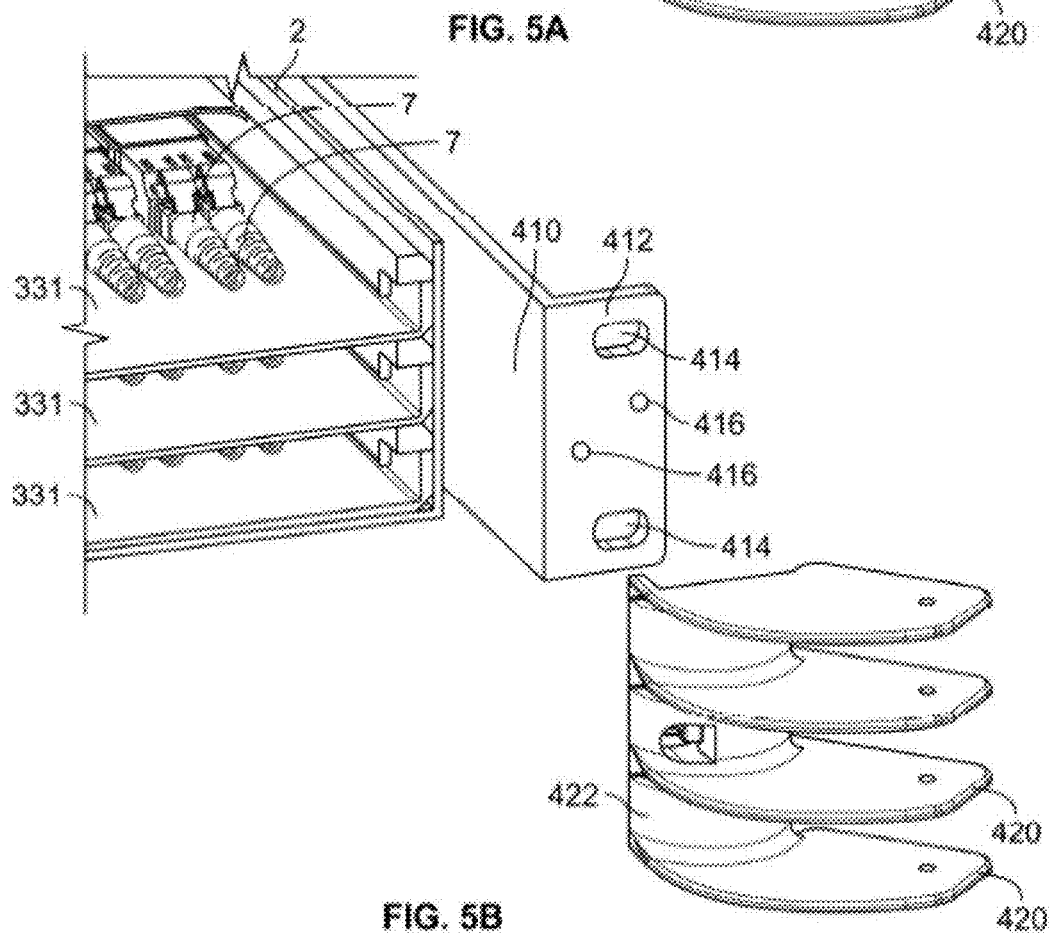
FIG. 5B is an enlarged perspective disassembled view of the cable guide of FIGS. 4A-C.
Figure 5C:
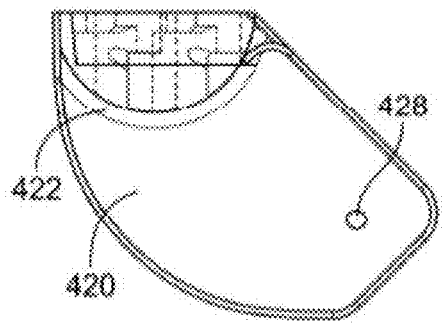
FIG. 5C is a top view of a portion of the cable guide of FIGS. 4A-C.
Figure 5D:
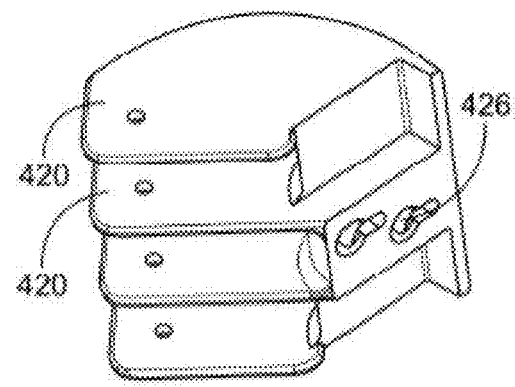
FIG. 5D is a rear perspective view of a portion of the cable guide of FIGS. 4A-C.

As shown in FIG. 5B, mounting arm 410 may include a bracket 412 with a plurality of apertures 414 for coupling to a device such as cable trough 4, or for mounting to a chassis assembly or other components that may be used in conjunction with cable management system 300. Bracket 412 may also include fasteners 416, such as bolts or pins, extending proximally from the bracket 412 to facilitate coupling the shelving unit to mounting arm 410. For example, one or more of surfaces 422 between adjacent shelves 420 may include apertures 426, best shown in FIG. 5D, shaped to mate with fasteners 416 so that the shelving unit may be quickly and securely coupled to bracket 412. One or more of the shelves 420 may include an aperture 428 (see FIG. 5C) extending therethrough for coupling accessories, such as hook and loop fasteners, to the shelf 420. Examples of these accessories are described in greater detail below in connection with FIG. 6B. It should be noted that although mounting arm 410 and shelves 420 are illustrated as separate components, the components may be provided as an integral unit. Similarly, although three pairs of adjacent shelves 420 in connection with mounting arm 410, larger or smaller mounting arms may be provided to support a greater or fewer number of pairs of shelves 420. Still further, depending on the number of trays 331 in cable management system 300, as many cable guides 400 as desired may be stacked vertically to provide suitable guidance for sets of cables C connected to each tray 331.

Figure 4A:
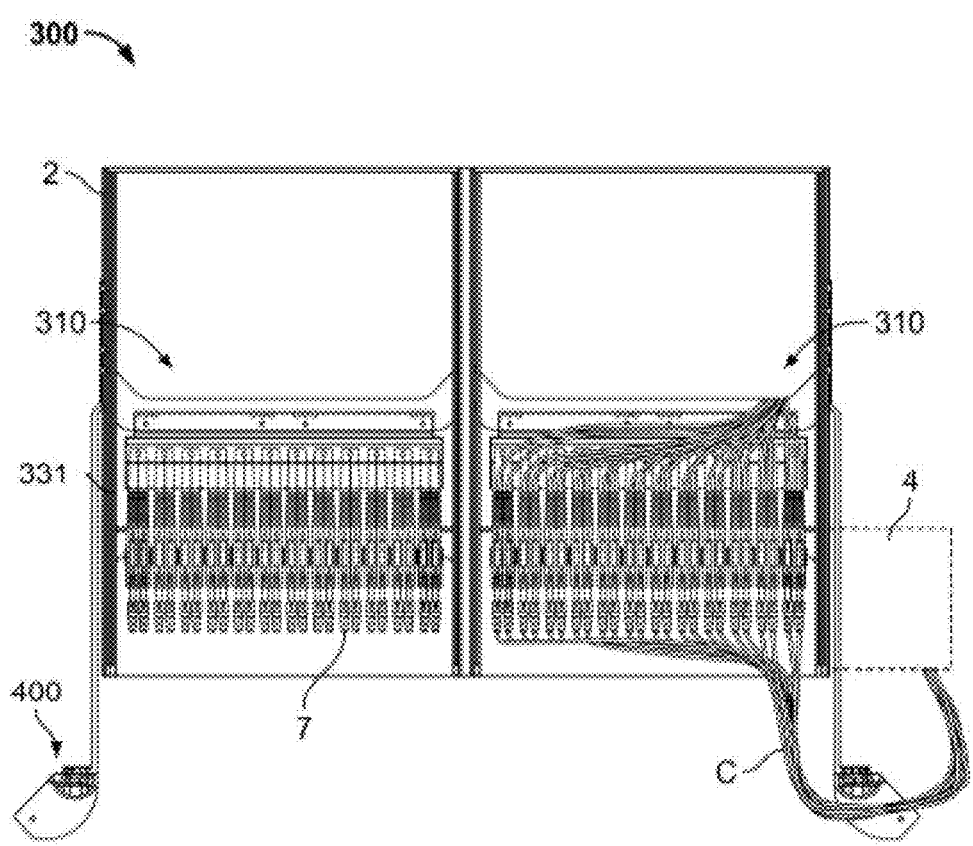
FIGS. 4A-C are top cutaway views of a cable management system having a cable guide in different states of operation.

Referring back to FIGS. 4A-D, the use of cable guide 400 in combination with cable management system 300 is described in greater detail. FIG. 4A illustrates a top cutaway view of cable management system 300, including a housing 2 having a first plurality of trays 331 stacked vertically adjacent a second plurality of trays 331 stacked vertically (only one tray 331 from each group visible in FIG. 4A). The trays 331 are shown in FIG. 4A in an installed or stored position in which the trays 331 are fully or substantially fully positioned within housing 2. The trays 331 are slidable with respect to housing 2 so that, when in a pulled out condition, as shown in the right tray 331 in FIG. 4B, the ports 7 are more easily accessible to a user. In the embodiment shown in FIGS. 4A-D, the ports 7 are pivotally connected to tray 331 at a rear portion of the port 7 so that the ports 7 may swing side-to-side with respect to one another (see FIG. 4C) to create additional space when the tray is in the pulled out position. One set of cables C is connected to front or proximal ends of ports 7 and routed through cable guide 400 into cable trough 4. Patch panel systems having pivoting ports are described in greater detail in U.S. Pat. No. 8,939,792, the disclosure of which is hereby incorporated by reference herein.

Each port 7 may include a front cable C coupled to the front end and a rear cable C coupled to the rear end. In the embodiment shown in FIGS. 4A-D, a front set of cables is coupled to the proximal end of ports 7 and passed through cable guide 400 and into cable trough 4. A rear set of cables C is coupled to the distal end of ports 7 and passed into a rear portion of housing 2. These rear cables C may be connected to electronic components in a module in the rear of housing 2, to a connector in the rear wall of housing 2 that provides a connection to other cables outside the housing, or they may be passed through an opening in the back of housing 2. In other embodiments, the rear cables C may pass through the front of housing 2, through cable guide 400 and into cable trough 4 (or other suitable destination), similar to the front cables C.

Generally, when cables are attached to ports on a sliding tray in a patch panel communication type system, cable management may become difficult. For example, for cables coupled to a front of a set of ports, as the tray is moved from the stored position to a pulled out position, slack in the front cables increases from a minimum to a maximum. When the tray is at a position in which the cables have a maximum slack, if there is too much slack, the likelihood that the cables get caught on or otherwise interfere with components of the system may be increased. Further, too much slack may make it more difficult to manipulate the cables when the tray is in the pulled out position. Too little slack may also complicate the ability to manipulate the cables, for example by limiting the ability of ports to move away from one another, and may otherwise increase the risk of detrimental stresses being placed on the cables. As is described in greater detail below, cable management system 300, in combination with cable guide 400, may provide cable management, including slack management, in a simple and effective fashion.

Figure 4B:
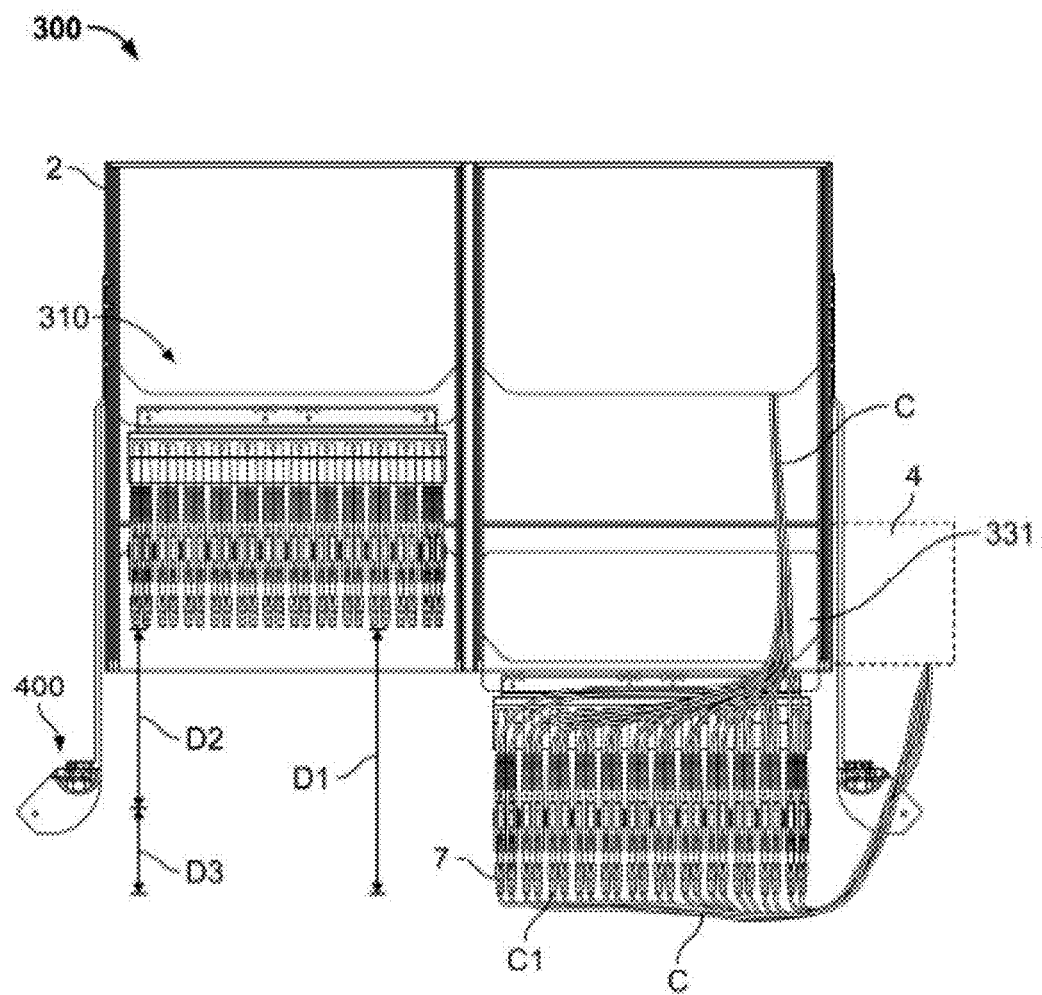
Figure 4C:
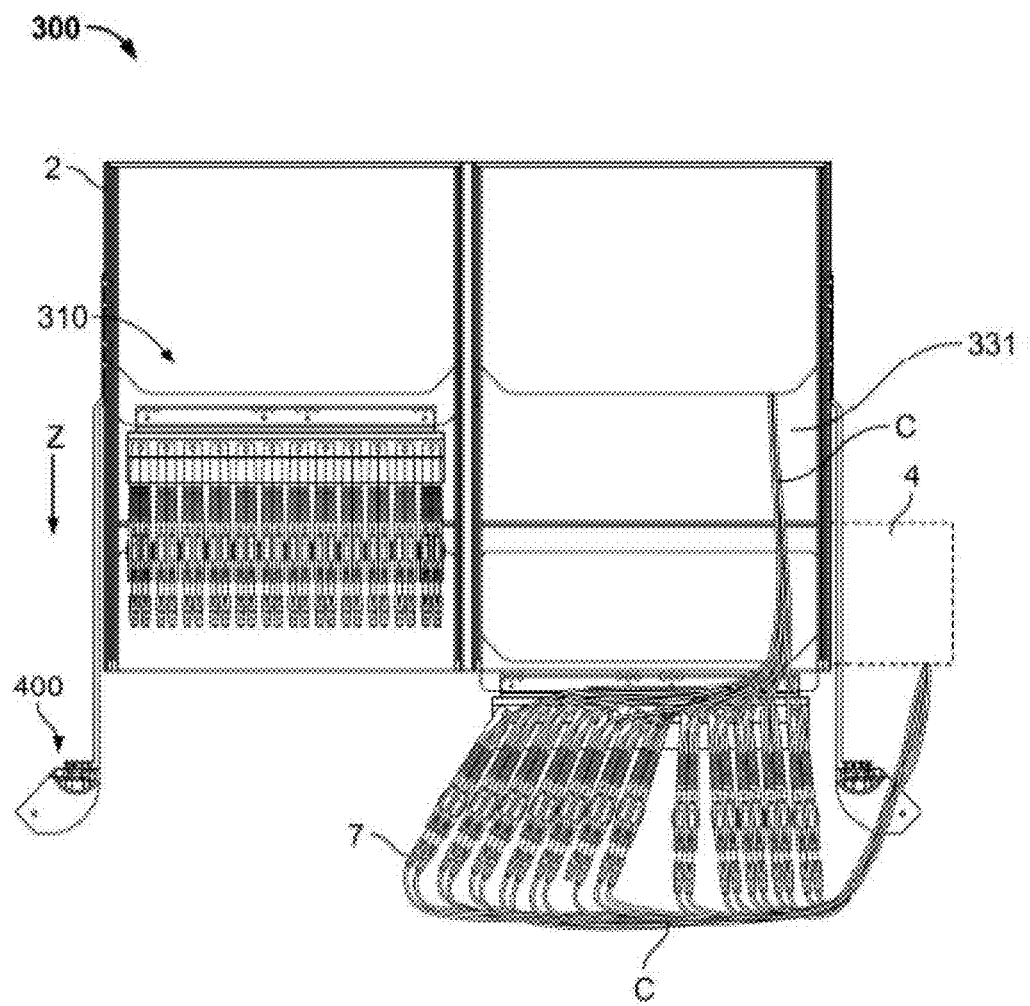

As shown in FIGS. 4B-C, ports 7 have a maximum slidable distance in the Z direction of D1, representing the distance between the stored position, represented by the left tray 331 in FIG. 4B, and the pulled out position, represented by the right tray 331 in FIG. 4B. The shelves 420 of cable guide 400 are positioned lateral to the lateral-most port 7. In addition, shelves 420 may be positioned a distance D2 in the Z direction from the proximal end of ports 7 when tray 331 is in the stored position, and a distance D3 in the Z direction from the proximal end of ports 7 when tray 331 is in the pulled out position. In the illustrated system 300, the distance D2 is greater than the distance D3, with the sum of distances D2 and D3 being equal to the distance D1. With this configuration, front cables C may be managed in the system 300 where the front cables C are connected at one end C1 to a front of the ports 7, and each of the front cables is supported by the cable guide at the shelves 420 at a portion of the front cable a predetermined length of the front cable from the one end C1. In such cable connection arrangement, the slack in front cables C increases as tray 331 is pulled out until the tray 331 travels the distance D2, where the proximal ends of ports 7 are transversely aligned with shelves 420. At this point, the slack in the cables is at a maximum, as the cables remain supported at the cable guide at the portions that are respectively predetermined lengths from the ends C1. As a user continues to pull tray 331 further proximally to the completely retracted position represented by the right tray 331 in FIG. 4B, the slack begins to decrease as the cables become tauter, the cables again remain supported at the cable guide at the portions that are respectively predetermined lengths from the ends C1. It should be understood that in other examples, the cable guide 400 may be positioned a different distance in the Z direction. For example, the shelves 420 of the cable guide 400 may be positioned proximal to the front face of ports 7 when the tray 331 is in the stored position as well as in the pulled out position.

In the configuration illustrated in FIGS. 4A-D, there is more slack in front cables C when the tray 331 is in the pulled out position than when the tray 331 is in the stored position. When tray 331 is in the stored position, front cables C are generally not manipulated since the ports 7 are within, or flush with the front of, housing 2. Because the front cables C are generally not manipulated when the tray 331 is in the stored position, the front cables C can be relatively taut to help maintain the cables C in an organized fashion. On the other hand, if a user intends to manipulate front cables C, he or she may generally transition tray 331 into the pulled out position. Further, when in the pulled out position, the ports 7 are capable of moving laterally apart (or vertically apart in a system similar to the patch panel device 210 of FIG. 3A) with respect to one another to provide the user better access to the ports 7, as shown in FIG. 4C. For these reasons, it is desirable for at least some slack to remain in the front cables C when the tray 331 is in the pulled out condition. However, the slack is desirably the minimum amount to allow for the motion of ports 7 and manipulation of front cables C. Thus, it is desirable that the slack in the front cables C is not at a maximum when in the tray 331 is in the pulled out position. It is noted that in the pulled out position of the tray, when one of the ports 7 is manipulated from a normal position such as shown on the left tray of FIG. 4B, the one front cable C connected thereto may move such that the portion of the one front cable C is not positioned at, and therefore not supported by, the cable guide. However, when the port 7 is returned to a normal position, the portion of the one front cable C connected thereto may return to a state at which the portion of the one front cable C is positioned at, and supported by, the cable guide. Each of the conditions described above is met with the cable management system 300 and cable guides 400 illustrated in FIGS. 4A-C. It should further be understood that effective cable management may still be provided when the cable guide 400 is positioned differently. For example, even if the shelves 420 of cable guide 400 are positioned proximal to the front face of ports 7 in all positions of tray 331, slack management and cable organization may be provided in an effective and relatively simple fashion. With that configuration, cables C may have maximum slack when tray 331 is in the pulled out position, which maximum slack is desirably enough to manipulate cables C at ports 7, with the slack reducing as tray 331 is pushed into the stored position. The configuration described in connection with FIGS. 4A-D may also help limit or eliminate movement of the cables C within the cable trough 4, and also between cable guide 400 and the cable trough 4, during movement of the tray 331.

In order to achieve the benefits described above, it is desirable that cables C passing over a surface of a shelf 420 of cable guide 400 remain positioned on or at the shelf 420 and/or within the boundaries of adjacent shelves 420, when the position of the tray is switched among the completely retracted, pulled out and stored positions and there is no user manipulation of the ports or the front cables. One way to help achieve this result is by adding one or more features to cable guide 400 to provide vertical limits on the movement of cables C and/or constraints on the ability of the cables C to otherwise move. The features described below may also help to further limit or eliminate movement of the cables C within the cable guide 400, as well as to limit or eliminate movement of the cables C in the cable trough 4 or at positions between the cable guide 400 and the cable trough 4.

Figure 6A:
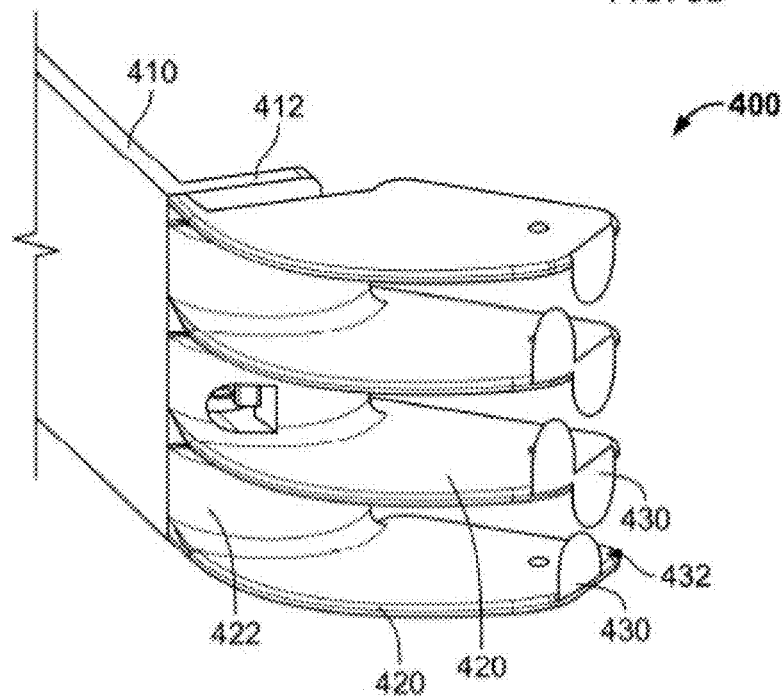
FIG. 6A is a perspective view of a portion of the cable guide of FIGS. 4A-C with cable retaining features.

One structure that may aid in maintaining the cables C within adjacent shelves are the fins 430 illustrated in FIG. 6A. In the illustrated embodiment, one or more fins 430 are positioned on a free end of each shelf 420. In particular, a first shelf 420 may include a fin 430 on a free end extending substantially perpendicular to the surface of the first shelf toward a second adjacent shelf. Similarly, the second adjacent shelf 420 may include a fin 430 on a free end extending substantially perpendicular to the surface of the second shelf toward the first shelf. In this embodiment, fins 430 are substantially rigid, although using deflectable fins may be suitable, as described in greater detail below. The fins 430 may not extend completely toward the adjacent shelf 420, and the fins that extend toward one another are offset so that an opening 432 is defined between the fins 430. With this configuration, cables C may be relatively easily inserted into, or removed through, the space between adjacent shelves 420 through the opening 432 if a user desires to install or remove a cable C from the system. However, the opening 432 is preferably small enough and oriented with respect to cables C so that, during normal operation of the cable management system 300, the cables C are unlikely to pass through opening 432 unintentionally.

Although two fins 430 are shown in each space between adjacent shelves 420, other configurations may be suitable. For example, a single fin may extend nearly all the way to the adjacent shelf 420, with a small opening or slot being defined between the end of the fin and the adjacent shelf 420. Still further, a single fin 430 could extend to touch the adjacent shelf 420 with the fin being deflectable so that a user could push a cable C toward the fin, causing the fin to deflect inward until the cable C passes into the space between adjacent shelves 420. Once the cable C is positioned between the adjacent shelves 420, the fin would return to its original position extending from a first shelf and touching the adjacent shelf, isolating the cable C between the adjacent shelves 420. The deflectable fin may have enough stiffness such that cables C would be unlikely to apply enough force to the fin during normal operation of the cable management system 300 to cause significant deflection of the fin. Still other variations may be suitable, such as two fins 430 extending toward one another from adjacent shelves 420 so that the fins touch, but the fins being deflectable so that a cable C may be pushed toward the fins causing them to deflect to allow the cable C to pass beyond the fins.

Figure 6B:
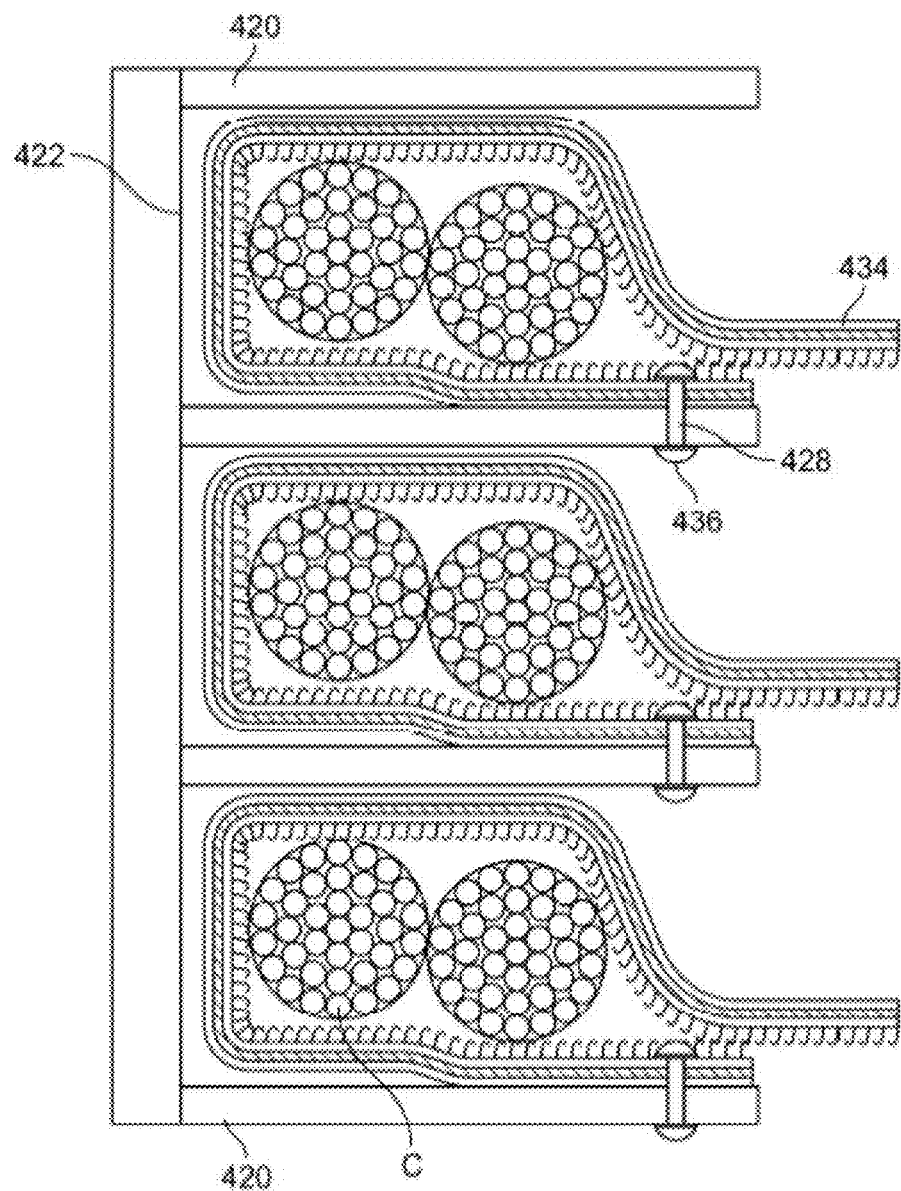
FIG. 6B is a cross-section of a portion of the cable guide of FIGS. 4A-C with alternative cable retaining features.

FIG. 6B shows a cross-section of the shelves 420 of the shelving unit of cable guide 400 with additional components to help secure cables C between adjacent shelves 420. Shelves 420 may be the same as those described above, with or without fins 430. A fastening device, such as a hook and loop strap 434, may be provided for each shelf 420 that is to support cables C. Hook and loop strap 434 may be, for example, a device provided under the trade name VELCRO, but other type of fastening straps may be suitable, for example straps having snap closures, hook closures, adhesive closures, etc. A first free end of fastener 434 may include an aperture that may align with aperture 428 in a shelf 420, with a fastener such as a rivet or bolt 436 coupling the first free end of fastener 434 to shelf 420. Cables C may be inserted between adjacent shelves 420, with free ends of fastener 434 wrapping around the cables C. With the cables C in a desired position, the second free end of fastener 434 may be coupled to the first free end, for example via a hook and loop mating system. With this configuration, rivet or bolt 436 keeps the fastener 434 in a desired position, with the fastener 434 keeping cables C secure between adjacent shelves 420. It should be noted that, in FIG. 6B, two groups of cables C are shown, each group of cables C positioned within a sleeve to help further organize the cables. Two groups of cables C may pass through a single pair of adjacent shelves when, for example, the sets of front cables C and rear cables C both are routed through the front of the housing 2.

Figure 6C:
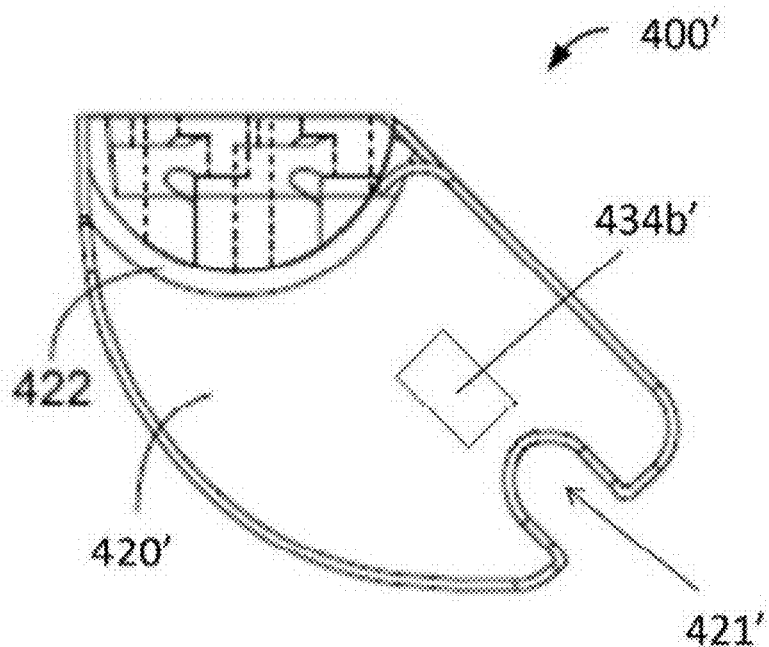
FIG. 6C-D are top and perspective views, respectively, of an alternate embodiment of the cable guide of FIGS. 5C-D.
Figure 6D:
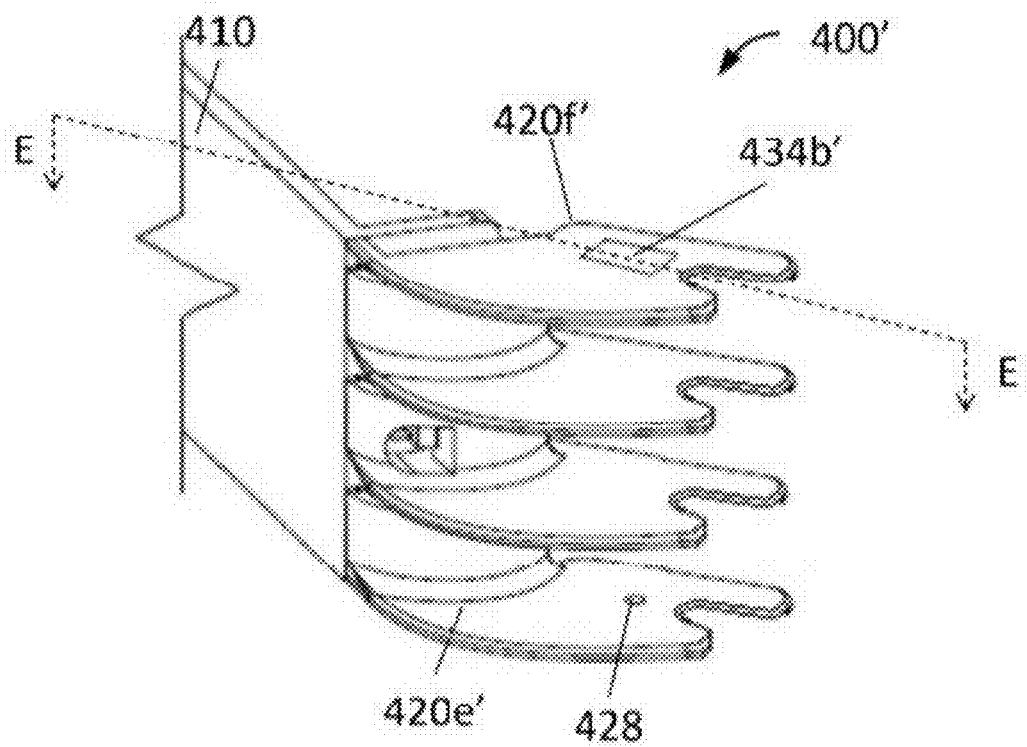

FIGS. 6C-D show views of a modified cable guide 400' that is identical to cable guide 400 with the exception of the features noted below. Cable guide 400' may include an identical mounting arm 410 for mounting to housing 2. In addition, cable guide 400' may include a shelving unit having a plurality of shelves 420' arranged in a stack configuration. Shelves 420' may include substantially flat top and bottom surfaces of a generally similar shape to shelves 420, and be connected by rounded surface 422. However, unlike shelves 420, a recess 421' may be formed in the proximal end of each shelf 420. In the illustrated embodiment, each recess 421' is generally "U"-shaped, although other shapes including rectangular may be suitable. For each unit of shelves 420', shelf 420$e'$ at one end of the stack may include an aperture 428. The aperture 428 may be configured to receive a bolt or other device to couple a first element of a fastening device to the shelf 420$e'$, and a second element of a fastening device may be coupled to the top surface of 420$f$, which is at the other end of the stack. With this configuration, as explained in greater detail below in connection with FIG. 6E, a single fastening device may be used to secure cables C between each pair of shelves 420' in the unit, rather than having a separate fastener dedicated to each pair of adjacent shelves 420'.

Figure 6E:
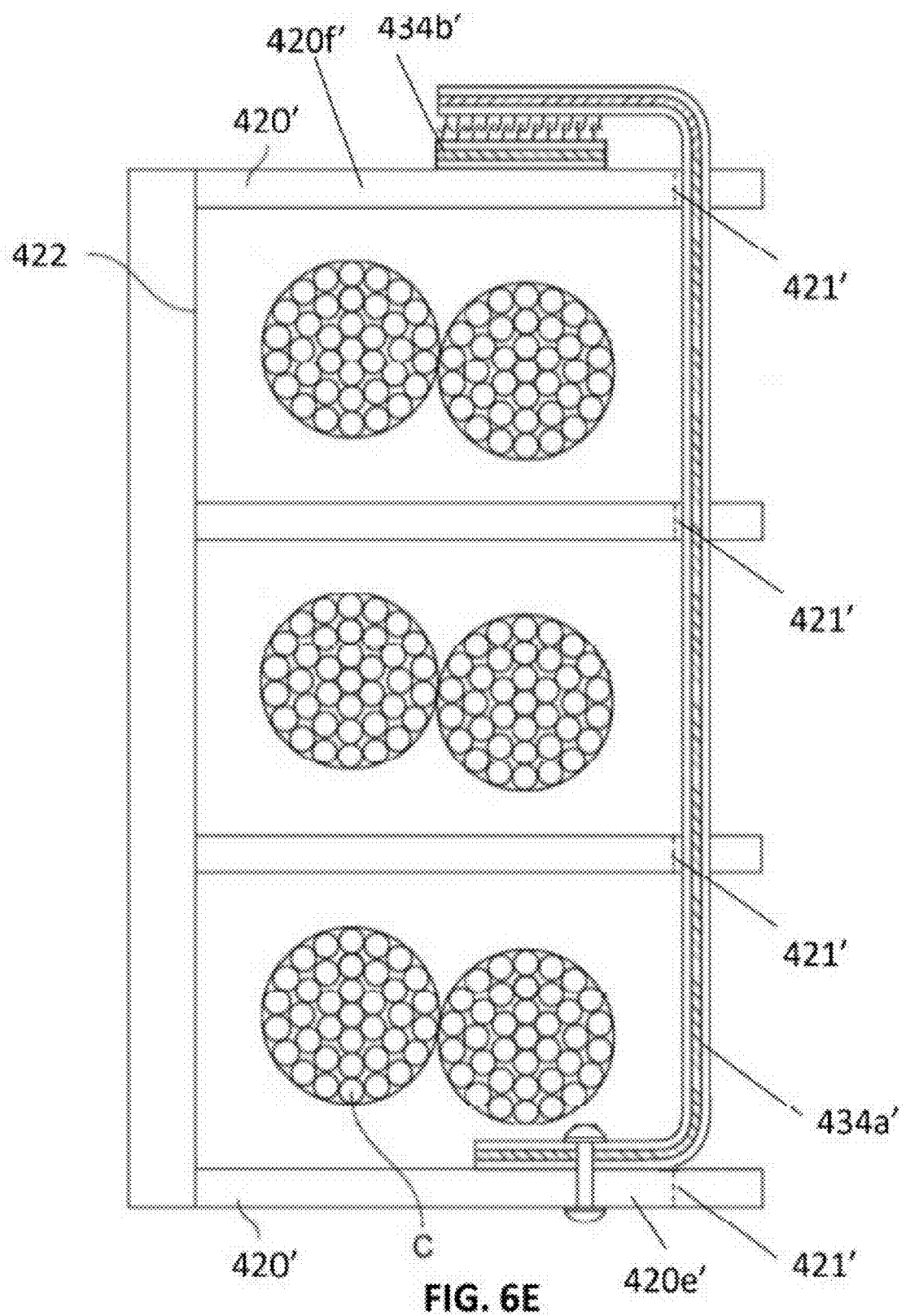
FIG. 6E is a cross-section of a portion of the cable guide of FIG. 6D at line E-E in an exemplary installed state.

FIG. 6E shows a cross-section of the unit of shelves 420'. In the illustrated embodiment, the first element of the fastening device may take the form of a first strap 434$a'$ that is bolted or otherwise fixed to a top surface of the shelf 420$f$. An end portion of the first strap 434$a'$ may include a closure mechanism, such as hooks or loops of the type provided under the trade name VELCRO. The first strap 434$a'$ may be long enough to extend at least a length of the shelving unit from the shelf 420$e'$ to the shelf 420$f$, preferably may be positioned in the space formed by the recess 421' in each shelf 420', and desirably has enough additional length so that the closure mechanism may extend at least some distance over the top surface of the shelf 420$e'$. The second element of the fastening device may take the form of a second strap 434$b'$. In the illustrated example, the second strap 434$b'$ may have a relatively short length and may be fixed to the top surface of the shelf 420$e'$ so that the second strap 434$b'$ does not have any significant freedom of movement. The second strap 434$b'$ may include a closure mechanism that corresponds to the closure mechanism at the end of the first strap 434$a'$, which may be hooks (if first strap 434$a'$ includes loops) or loops (if first strap 434$a'$ includes hooks). It should be understood that the corresponding closure mechanisms of the first strap 434$a'$ and the second strap 434$b'$ may take other forms, such as snaps, hooks, adhesives, buckles, etc. With the above-described configuration, a user is able to secure all of the cables C housed within a shelving unit with a single motion. In other words, with the cables C positioned between the desired pairs of adjacent shelves 420', the user may grasp the first strap 434$a'$ and couple the closure mechanism at the end of the first strap 434$a'$ to the second strap, making sure to guide the intermediate portion of the first strap 434$a'$ into the recess 421' of each shelf 420'. It should be noted that the number of shelves 420' within a given shelving unit may be altered as desired, with the length of the first strap 434$a'$ depending mainly on the total end to end length of the shelving unit. It should further be understood that one of the end shelves in the shelving unit does not necessarily need to include a recess 421', and may rather take a shape similar to other shelves 420' in the shelving unit without such a recess. In addition to providing a simple and fast mechanism for securing cables C within the shelving unit, the configuration described in connection with FIGS. 6C-E may maximize the amount of space available for cables C between each pair of shelves 420$a'$. One additional benefit of this configuration is that, if cables C are positioned anywhere along the length of the recess 421', first strap 434$a'$ may be able to make contact with those cables C to secure those cables C in place. So, even if a volume of cables C is positioned so that the cables C extend to a portion of recess 421', additional cables C may be added within the space between the two adjacent shelves 420' with the first strap 434$a'$ being able to secure the cables C between the shelves 420'.

Figure 7:
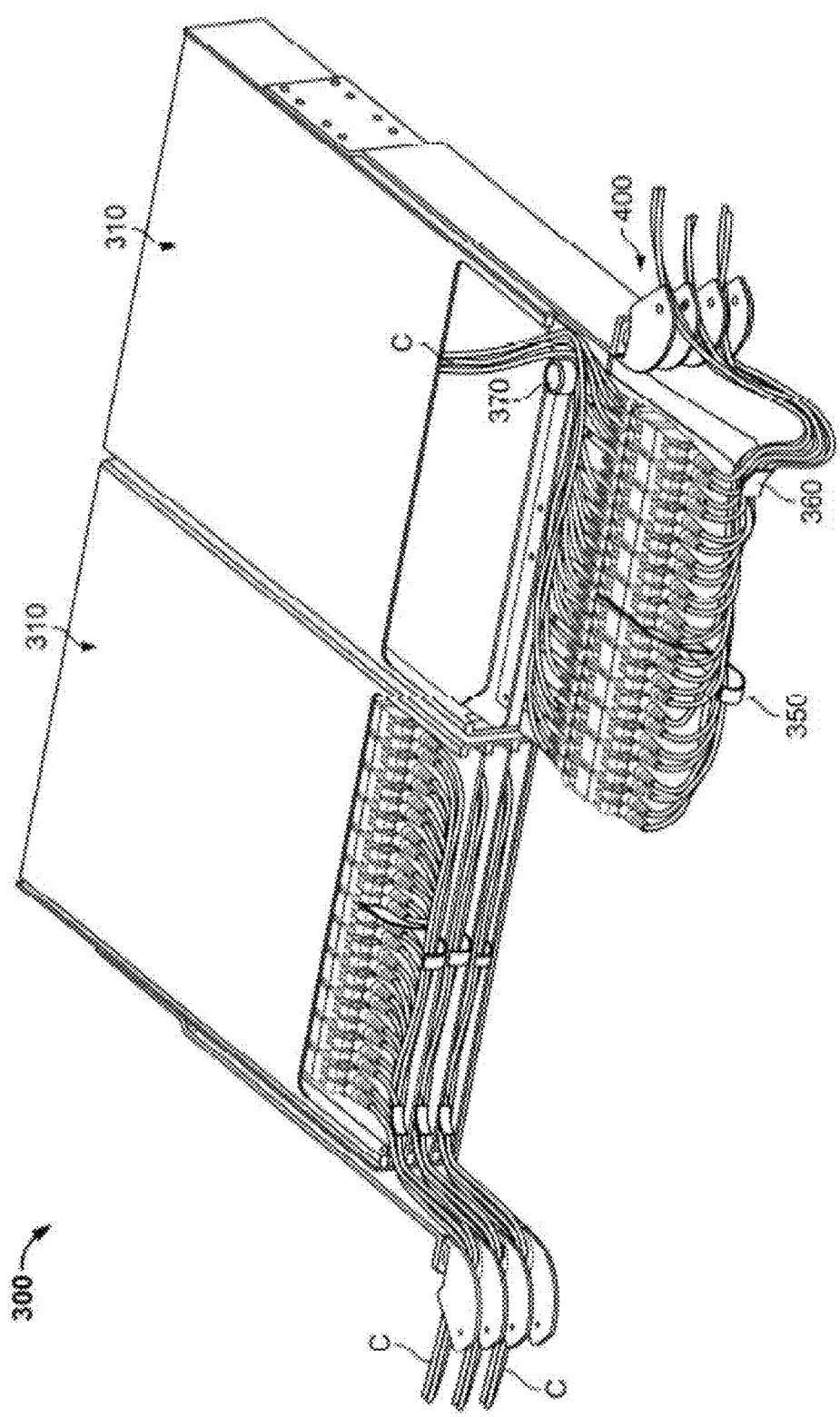
FIG. 7 is a perspective view of the cable management system of FIGS. 4A-C showing additional cable routing features.

FIG. 7 illustrates additional features which may help organize cables C of cable management system 300. In FIG. 7, one tray 331 on the right side is shown in the pulled out position, with one set of front cables C passing through cable guide 400, and a set of rear cables C passing rearward into the housing 2. Generally, it is desirable for the front cables C to pass laterally along a path prior to passing through the cable guide 400. In order to facilitate such routing, a handle member 350 may be provided on tray 331, the handle member extending proximally of the housing 2. The handle member 350 may take any suitable form that acts as a guide for cables C. For example, as illustrated, handle member 350 may include a substantially flat bottom surface which curves upward at the front end to provide surfaces against which cables C may be positioned. Additional surfaces may be provided on handle member 350, and desirably the surfaces include at least a bottom surface and front surface. Handle member 350 may provide the additional function of providing a user a convenient gripping member for pulling tray 331 out of the housing 2 or pushing tray 331 back into the housing. A lateral guide member 360 may also be provided at a lateral-most end of tray 331 to provide additional guidance to the cables C as they extend laterally away from tray 331. As illustrated, lateral guide member 360 has a convex cable contacting surface, although other shaped surfaces may be suitable. Additional guide members, such as rear guide member 370, may be provided on tray 331 to facilitate maintaining the rear cables in a desired position. The handle member 350 and/or guide members 360, 370 may also provide locking functionality. For example, when tray 331 is in the stored position, it may be desirable to maintain the tray 331 in a locked or semi-locked state so that intentional pulling force must be applied to tray 331 in order to begin transitioning the tray 331 into the pulled out position. This locking functionality may be provided, for example, by including detents or other cooperating structures in the housing 2 or adjacent trays 331 so that, when the tray 331 is in the stored position, one or more of the handle member 350 and guide members 360, 370, have a friction fit with the corresponding structure.

Figure 8A:
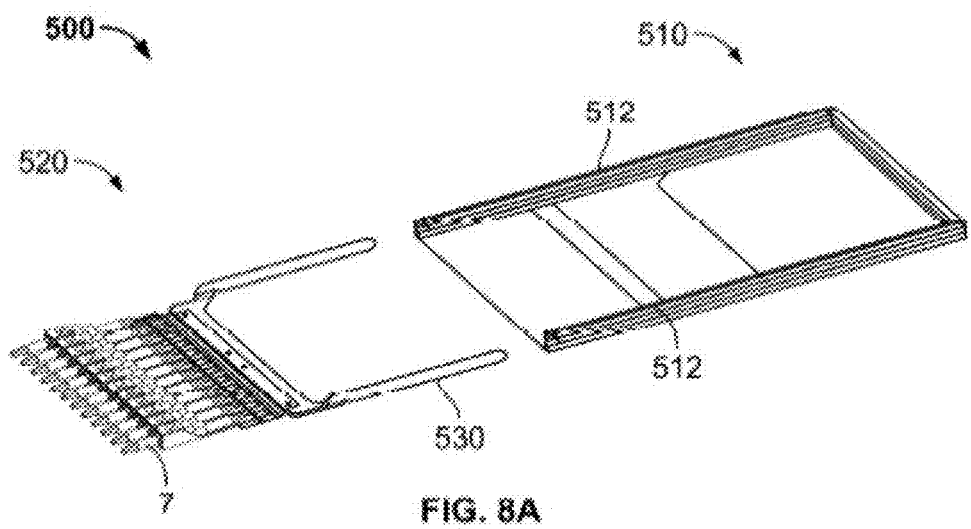
FIG. 8A is an exploded view of a cassette for use in a cable management system.

The patch panel devices 310 described above may take the form of sliding trays 331 mounted within, and slidable with respect to, a housing 2 or chassis. In other embodiments, substantially self-contained cassettes may be utilized, the cassettes being capable of being swapped into or out of a chassis, with the cassettes providing the sliding function entirely. For example, a cassette 500 is shown in an exploded view in FIG. 8A. The cassette 500 generally includes a cassette housing 510, which may be a substantially rectangular box with an open front, and a cassette head portion 520 slidable into and out of the housing 510. The sides of cassette housing 510 may include rail slots 512 to facilitate sliding of the cassette head 520, as described in greater detail below.

Figure 8B:
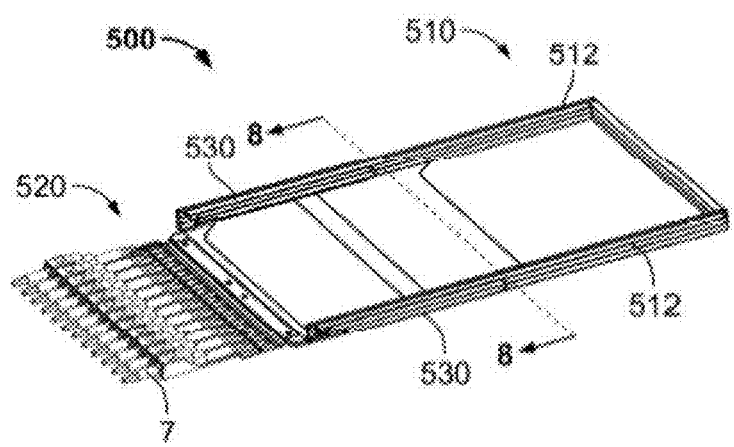
FIG. 8B is a perspective view of the cassette of FIG. 8A in a first state.
Figure 8C:
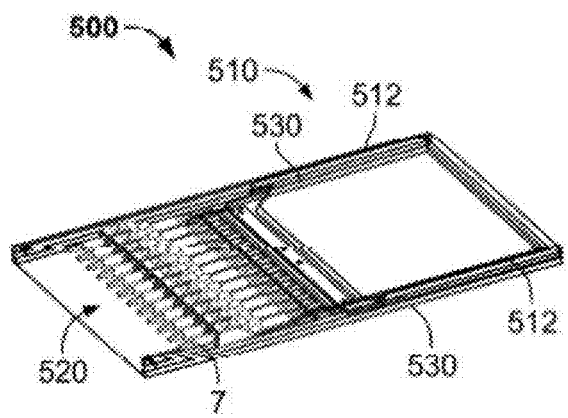
FIG. 8C is a perspective view of the cassette of FIG. 8B in a second state.

A front of cassette head 520 includes a plurality of ports 7 arranged in a similar or identical fashion as described in relation to patch panel 310, for example with laterally pivotable ports 7. Extending from each side of the rear of cassette head is a rail 530 for sliding into or out of the rail slots 512 of cassette housing 510. FIG. 8B illustrates cassette 500 with cassette head 520 in the pulled out position in which ports 7 may be easily accessed and may move in relation to one another in the same fashion as described above in connection with patch panel 310. FIG. 8C illustrates cassette 500 with cassette head 520 in the stored condition, the cassette head 520 being completely or substantially completely contained within cassette housing 510.

Figure 8D:
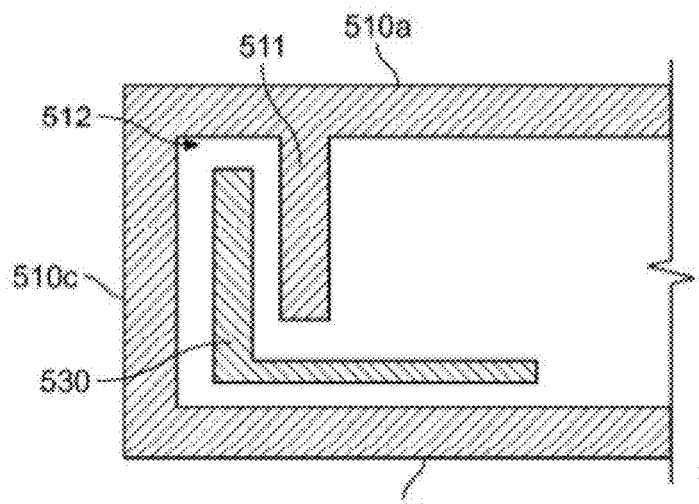
FIG. 8D is a cross-section of a portion of the cassette of FIG. 8A at line 8-8 indicated on FIG. 8B.
Figure 8E:
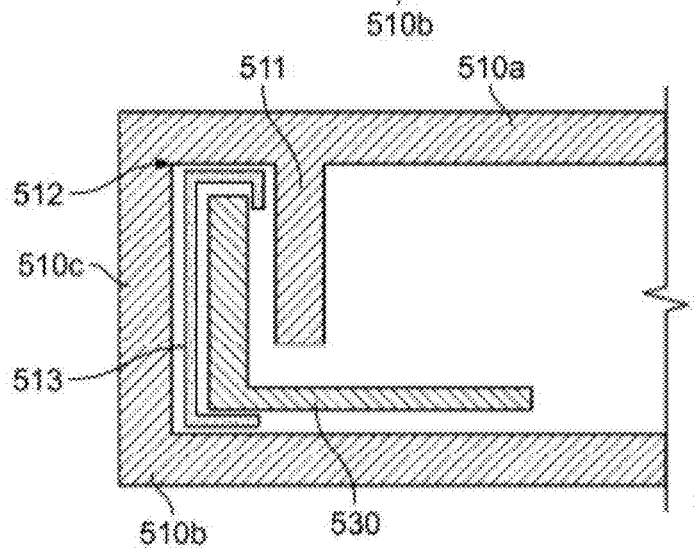
FIG. 8E is a cross-section of the portion of the cassette shown in FIG. 8D with an insert component provided therein.

FIG. 8D shows a cross section of one side of cassette housing 510 with rails 530 of cassette head 520 positioned therein, to illustrate the mechanism that provides sliding motion between cassette housing 510 and cassette head 520. In particular, a portion of top housing 510a, bottom housing 510b, and a sidewall 510c of housing 510 are shown in FIG. 8D. An extension 511 extends from top housing 510a toward bottom housing 510b, although not the entire distance therebetween. The extension 511, sidewall 510c, and portions of top housing 510a and bottom housing 510b define rail slot 512, in which a rail 530 of cassette housing is secured. As cassette head 520 is pulled out of or pushed into cassette housing 510, the interaction of the rails 530 in rail slots 512 help keep the cassette head 520 in a desired orientation and facilitate the sliding motion. Stops may be included, if desired, so that rails 530 are unable to unintentionally completely exit cassette housing 510, so that a user does not unintentionally decouple the cassette head 520 from the cassette housing 510 as it is transitioned to the pulled out position. Although on example of rails 530 and rail slots 512 are illustrated in FIG. 8D, other similar structures of rails and rail slots may be used to achieve the same result. As shown in FIG. 8E, an insert 513 may be positioned within rail slot 512. The insert 513 may be any desirable material and extend along substantially the entire length of the rail slot. The insert 513 may have a first stop to prevent the insert 513 from sliding out of the rail slot 512, and a second stop so that the rail 530 of the cassette head 520 is stopped from sliding out of the insert. With this configuration, the insert 513 may extend the length which cassette head 520 may slide with respect to cassette housing 510. In addition, the material and dimensions of insert 513 may be chosen to provide for smoother sliding between cassette head 520 and cassette housing 510. For example, if rail 530 and rail slot 512 are both metal, a plastic insert 513 may provide for smoother sliding. To provide for extending the length which cassette head 520 may slide with respect to cassette housing 510, it may be preferable for insert 513 to be formed of a hard metal.

Figure 9A:
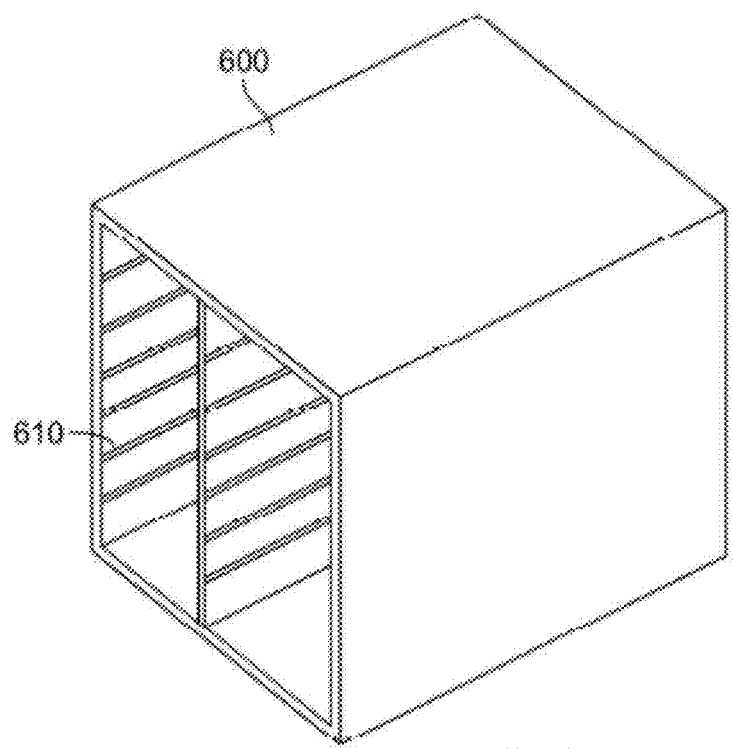
FIG. 9A is a perspective view of a chassis for use with cassettes such as that shown in FIG. 8A.
Figure 9B:
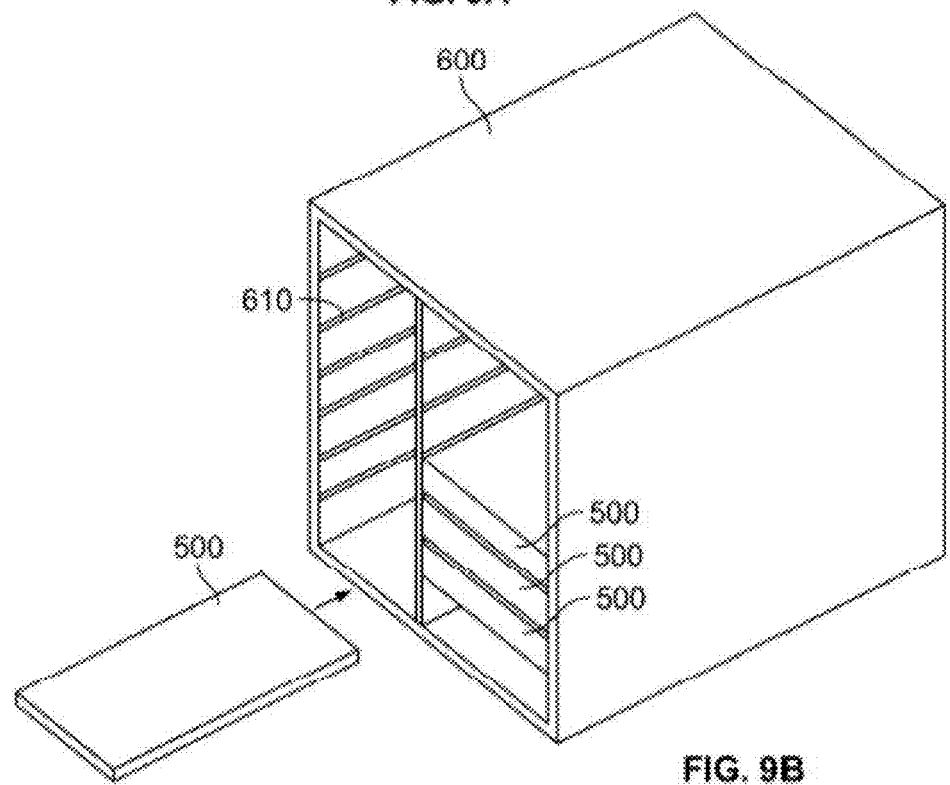
FIG. 9B is a perspective view of the chassis of FIG. 9A with cassettes positioned therein.

Cassette 500 may be modular in the sense that it may be inserted into a chassis and, if for example a cassette is damaged, it may be easily removed from the housing and replaced with another. For example, FIG. 9A shows a chassis 600 that may be used to hold a plurality of cassettes 500. In the illustrated embodiment, chassis 600 includes two vertical channels for accepting cassettes 500, each channel having a plurality of supports 610 to support cassettes 500. FIG. 9B shows chassis 600 with three cassettes 500 installed and one cassette 500 in the process of being installed. Any of the cable guides 400 described above, or modifications thereof, may provide cable slack management functionality for the cassette version of the system as the patch panel versions described above. For example, one or more mounting arms 410 of cable guides 400 may be coupled to the chassis 600 so that cables connected to ports in a cassette 500 may be managed as the cassette head 520 slides relative to the cassette housing 510. In addition, because the cassette housing 510 is stationary with respect to the chassis 600, the mounting arm 410 of a cable guide 400 may be coupled directly to the cassette housing 510. Since the cassette housing 510 remains stationary with respect to the cassette head 520, as the cassette head 520 slides into or out of the cassette housing 510, the cable guide 400 remains stationary despite being fixed to the cassette housing.

Figure 10A:
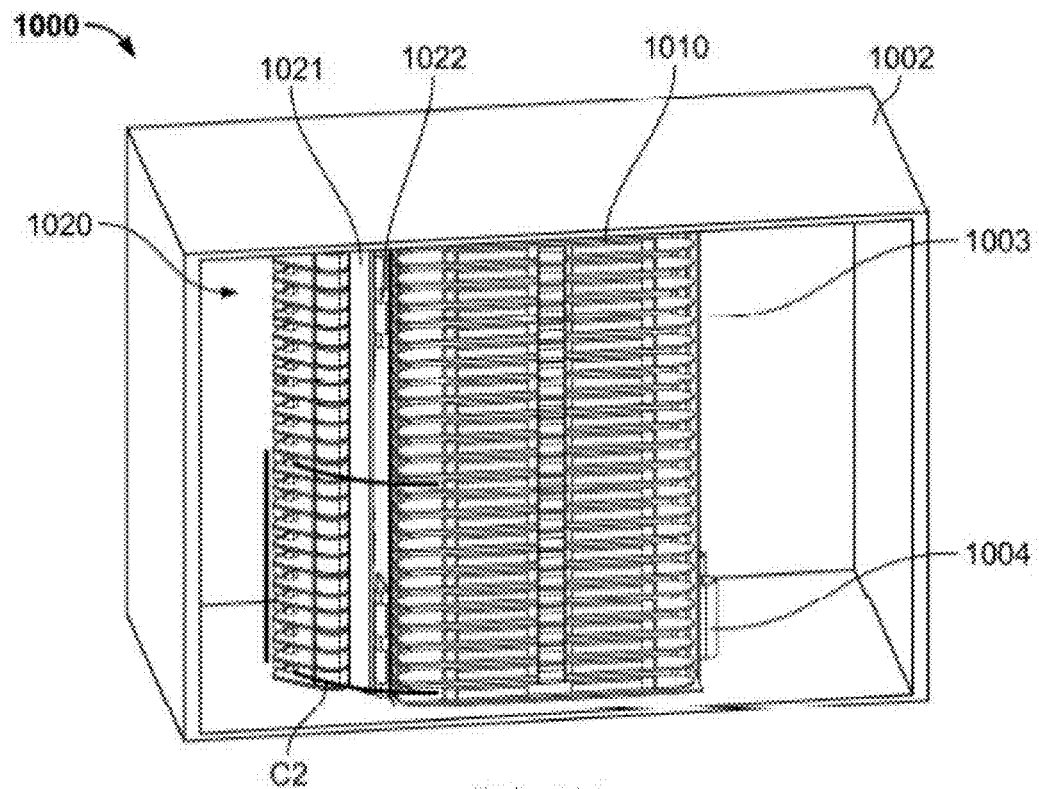
FIGS. 10A-B are perspective and top views, respectively, of a patch panel system with a hanger plate assembly in a stored condition.
Figure 10B:
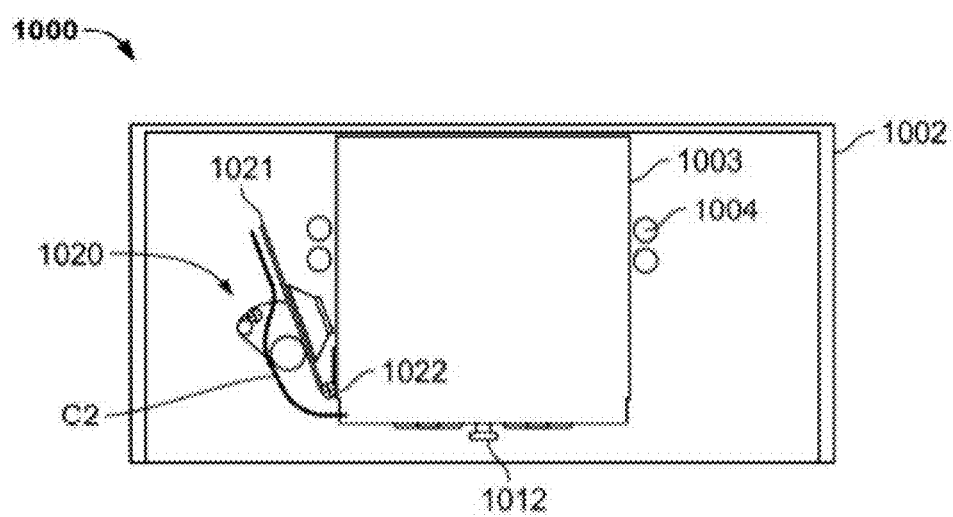

FIG. 10A shows a perspective view of a patch panel system 1000 according to another embodiment of the disclosure. Patch panel system 1000 may include an outer housing 1002 with side walls, top and bottom walls, a distal or rear wall, and an open front or proximal face. However, a proximal cover, such as a door or other cover that allows access inside the outer housing 1002, may be used in conjunction with the outer housing although such a cover is not shown in the figures. FIG. 10B shows a top view of patch panel system 1000 with the top wall of outer housing 1002 omitted for clarity of illustration. An inner housing 1003 may be positioned within outer housing 1002, preferably completely within the boundaries of the outer housing 1002. The inner housing 1003 may include side walls, and top, bottom and rear walls that may be integral with corresponding walls of the outer housing 1002, or which may be separate and distinct from the walls of the outer housing. Inner housing 1003 may include a plurality of slots stacked in a vertical arrangement, similar to the supports 610 of the chassis 600 of FIG. 9A. Each slot is adapted to hold a tray or cassette 1010 in sliding engagement with the slot, although in practice every slot may not necessarily have a cassette 1010 received therein. Each cassette 1010 may be generally similar to patch panel devices 110, 210, 310 and/or cassettes 500 described above, the cassettes 1010 including ports or other connectors to connect to cables. Each cassette 1010 may include a handle 1012 extending from a proximal end to provide a grip for a user to pull the cassette 1010 out of the inner housing 1003, for example into the position shown in FIGS. 10G-H, for easy access to the cassette(s) 1010 of interest. Outer housing 1002 may include one or more access ports 1004 to allow for cables or other items to pass between the inside and the outside of the outer housing. As shown in FIG. 10A, access ports 1004 may take the form of cylindrical members that may be integral with the bottom wall of outer housing 1002, although any opening that allows cables to pass from outside to inside the outer housing 1002 (or vice versa), may be suitable.

In one example, patch panel system 1000 may be used to patch connections from a vendor, such as a cable provider, to a customer, such as an apartment complex or individual units thereof. The outer housing 1002 may be particularly suited to be used outside, with the outer housing 1002 providing protection from the elements to the components within the outer housing 1002, including the inner housing 1003. For such a use, cables from the vendor may enter through access ports 1004 on one side of outer housing 1002, for example the right side, and connect to ports in the rear of one or more cassettes 1010. Other cables may extend from the rear of one or more cassettes 1010, through corresponding access ports 1004 for example on the left side of the outer housing 1002, to individual units within the apartment complex to provide connection between the individual customer and the vendor. Patch panel system 1000 may provide a convenient system for operating and maintaining the connections between the vendor and the individual customers, for example, with one or more cables C2 extending from and connecting a front or proximal side of one cassette 1010 in inner housing 1003 to the front of another cassette in the inner housing.

Figure 10C:
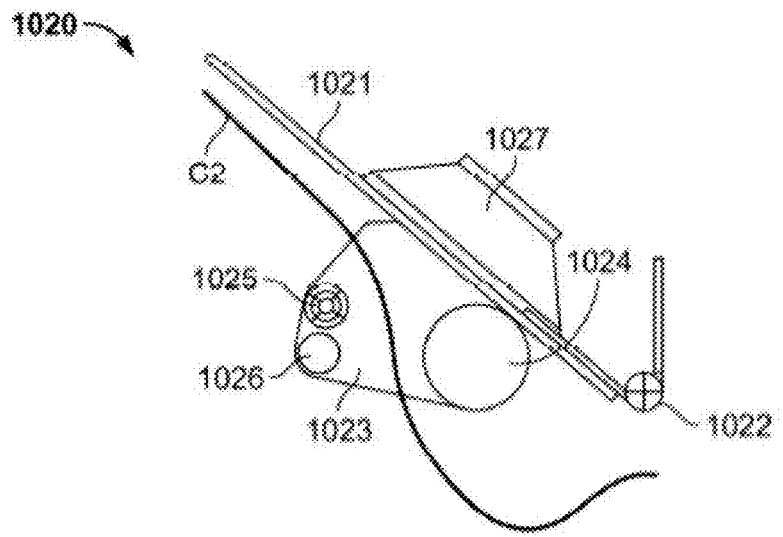
FIG. 10C is a top view of the hanger plate assembly of FIG. 10A.
Figure 10D:
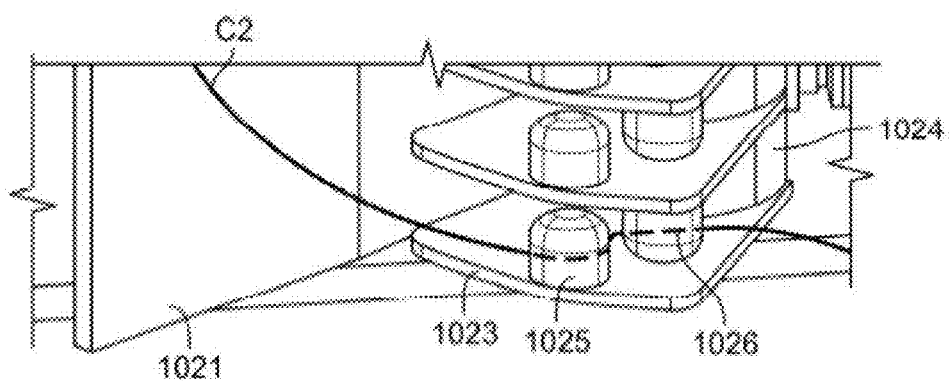
FIG. 10D is an enlarged perspective view of a portion of the hanger plate assembly of FIG. 10A.
Figure 10E:
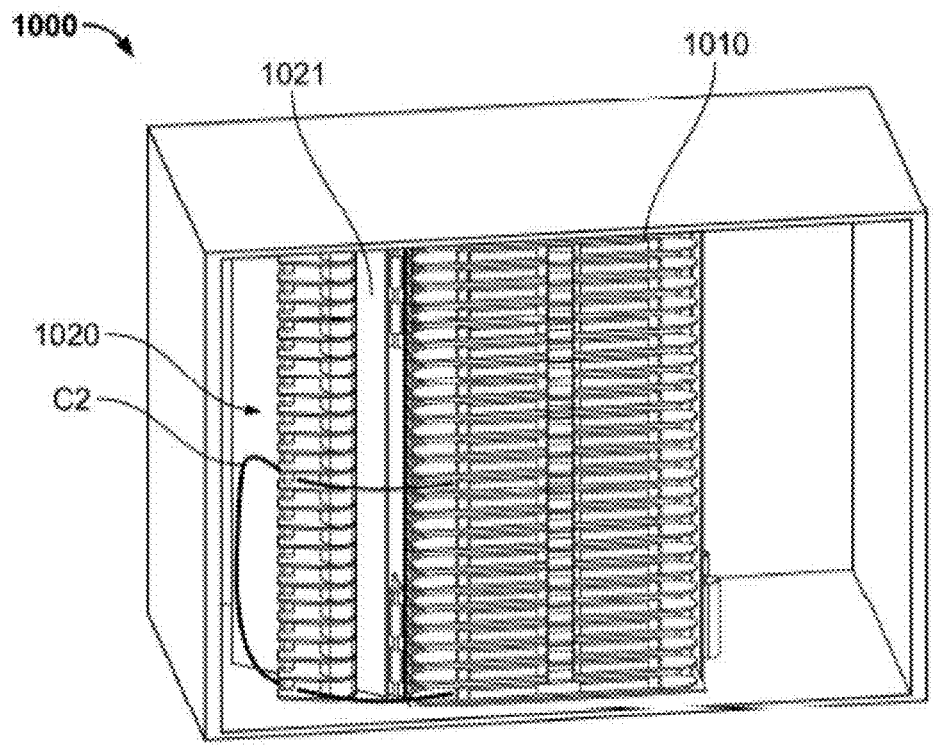
FIGS. 10E-F are perspective and top views, respectively, of the patch panel system of FIG. 10A with the hanger plate assembly in an intermediate position.
Figure 10F:
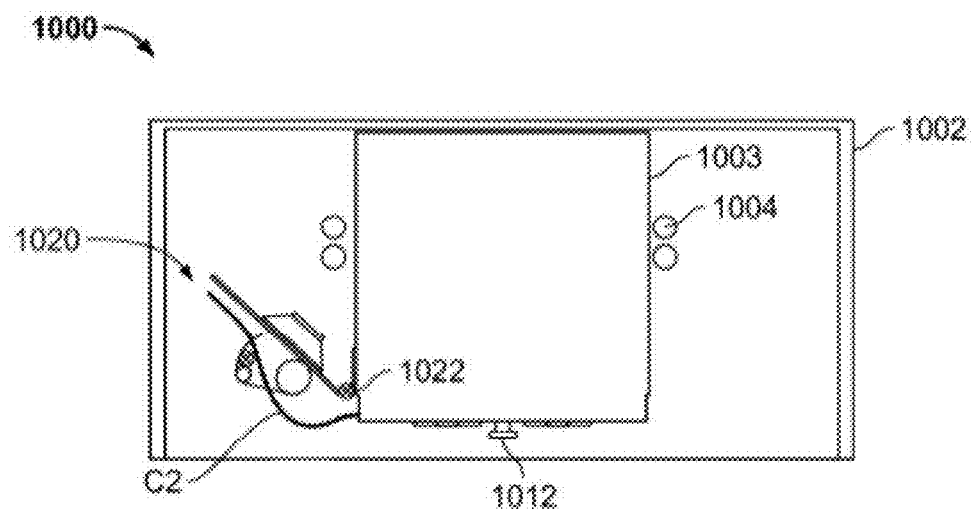
Figure 10G:
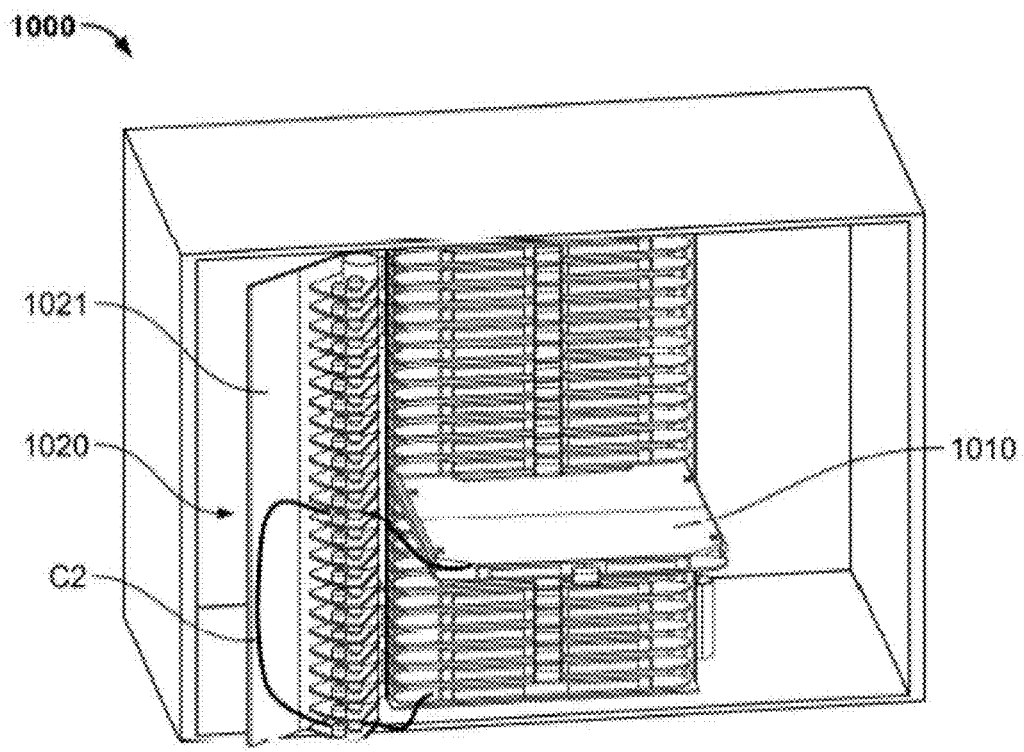
FIGS. 10G-H are perspective and top views, respectively, of the patch panel system of FIG. 10A with the hanger plate assembly in a pulled out condition.
Figure 10H:
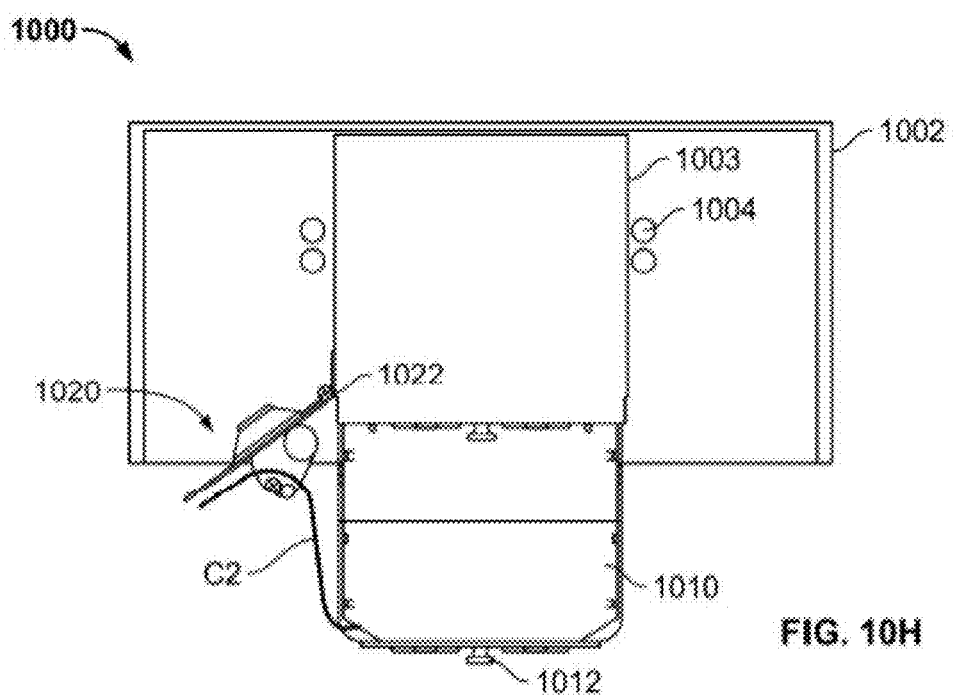

Although FIGS. 10A-H show a single cable C2 connected between the front ends of two cassettes 1010, in practice many cables C2 could be connected between the fronts of pairs of cassettes 1010. In such a situation, management of these cables C2 may become difficult, particularly when a user needs to access a particular cable or cables C2. To assist in the management of cables connected to patch panel system 1000, the patch panel system 1000 may include a pivotable hanger plate assembly 1020. Hanger plate assembly 1020 may include a hanger plate 1021 which may, for example, be a rigid rectangular plate coupled to a side wall of inner housing by one or more hinges 1022. Hanger plate 1021 preferably has a height that is less than the distance between the bottom and top walls of the outer housing 1002, and a width that is smaller than the distance between the side walls of the outer and inner housing between which the hanger plate 1021 is positioned. With this configuration, hanger plate 1021 may swing with a range of motion about hinge(s) 1022 from being positioned inside the outer housing 1002 as shown in FIGS. 10A-B, through a transition position shown in FIGS. 10E-F, to a position outside the outer housing 1002 as shown in FIGS. 10G-H.

Enlarged top and isolated perspective views of the hanger plate assembly 1020 are shown in FIGS. 10C-D. A plurality of hangers 1023 may be coupled to proximal face of hanger plate 1021. Each hanger 1023 may include a substantially flat surface on which a cable C2 may rest. A guide surface 1024 may be positioned on one end of the hanger 1023. Guide surface 1024 is illustrated as having a circular cross-section. Although guide surface 1024 does not need to have a circular cross-section, it preferably includes a curvature that provides a minimum bending radius which restricts cable C2 from bending so much that cable C2 becomes damaged. As best seen in FIG. 10G, guide surface 1024 may be a formed by a single cylindrical member extending substantially the entire height of the hanger plate 1021. However, it should be understood that a separate guide surface 1024 may be provided for each individual hanger 1023 if desired.

Each hanger 1023 may also be associated with one or more retaining members to help keep cable C2 positioned within hanger 1023. For example, each hanger 1023 may include an upwardly extending retaining member 1025 extending upwardly from the flat surface of the hanger 1023. As best seen in FIG. 10D, upwardly extending retaining member 1025 may be substantially cylindrical and extend upwards toward a vertically adjacent hanger 1023, without contacting the vertically adjacent hanger 1023. Similarly, each hanger 1023 may also include a downwardly extending retaining member 1026 extending downwardly from the flat surface of the hanger 1023. As best seen in FIG. 10D, downwardly extending retaining member 1026 may be substantially cylindrical and extend downwards toward a vertically adjacent hanger 1023, without contacting the vertically adjacent hanger 1023. With this configuration, the space between two vertically adjacent hangers 1023 includes two retaining members 1025, 1026 that may keep a cable C2 from unintentionally exiting the space between the two vertically adjacent hangers 1023. However, like the fins 430 described in connection with FIG. 6A, space is provided between the ends of the retaining members 1025, 1026 and the flat surfaces of the hangers 1023 so that a user may remove (or insert) cable C2 from the space between vertically adjacent hangers 1023 by manually removing (or inserting) the cable C2 through the space between the retaining members 1025, 1026 and the surfaces of the hangers 1023. It should be understood that in a set of vertically stacked hangers 1023, the bottom-most hanger 1023 need not include a downwardly extending retaining member, and the top-most hanger 1023 need not include an upwardly extending retaining member.

Hanger plate assembly 1020 may also include a rear hanger 1027 coupled to and extending from the rear of hanger plate 1021, extending in an opposite direction than hangers 1023. Preferably, only a single rear hanger 1027 is coupled to the rear of hanger plate 1021 at a top of the hanger near the top surface of the outer housing 1002. However, more rear hangers 1027 may be included if desired, including for example a second rear hanger 1027 at the bottom of hanger plate 1021, or in any other number and position as desired. Rear hanger 1027 may include a flat bottom surface between two upwardly extending surfaces that create a generally "U"-shaped channel. Cables that connect to the rear of the cassettes 1010 and exit through an access port 1004 may be bundled together and be partially routed along the "U"-shaped channel of rear hanger 1027 to help maintain those cables in an organized condition, reducing the likelihood those cables will interfere with cables C2 in the front portion of outer housing 1002 or with the swinging movement of hanger plate assembly 1020. It should be understood that cables entering the outer housing 1002 through an access port 1004 and coupled to the rear of one or more cassettes 1010 may also be routed along the "U"-shaped channel of rear hanger 1027 for similar reasons. One or more apertures (not illustrated) may be provided in the hanger plate 1021 between the rear hanger 1027 and a hinge 1022 so that a bundle of cables positioned within the rear hanger 1027 may pass through the hanger plate 1021 and enter the inner housing 1003 so they may connect to corresponding ports, such as those in the rear of particular cassettes 1010. In some embodiments, the rear of the cassettes 1010 may be accessible by an opening, provided by a door or other mechanism, so that cables entering through access ports 1004 may connect directly to the rear of cassettes 1010 where desired, without passing those cables through hanger plate 1021.

Operation of the patch panel system 1000 with respect to the organization of cables is described briefly. In a stored state, cables entering or exit outer housing 1002 through access ports 1004 on the left side of the outer housing and connecting to the rear of cassette may be secured within the "U"-shaped channel of rear hanger 1027. Cables C2 extending from the front of cassettes 1010 to the front of other cassettes 1010 may each extend through a first hanger 1023 positioned adjacent the corresponding cassette 1010, guided along guide surface 1024 to maintain a minimum bend, resting on the flat surface of hanger 1023, and being maintained between vertically adjacent hangers 1023 by retaining members 1025, 1026. The particular cable C2 may exit the space between vertically adjacent hangers 1023 between the retaining members 1025, 1026 and the hanger plate 1021. After exiting, the cable C2 may extend up or down generally along the hanger plate 1021, and enter the space between a different pair of vertically adjacent hangers 1023, where the cable C2 may then couple to the front of a separate cassette 1010. In the stored position, as shown in FIGS. 10A-B, the hanger assembly 1020 may be rotated about hinge 1022 so that the hanger plate 1021 extends toward the rear wall of outer housing 1002. In this position, the cables C2 may have little to no slack. If a user desires to access one or more cassettes 1010 and cables C2 to, for example, perform maintenance, the user can open a door on the front of outer housing 1002, if such a door is included. Before pulling out a cassette 1010, the slack in cables C2 may be increased. The user may begin to increase the slack in cables C2 by grasping a portion of the hanger plate assembly 1020, for example the hanger plate 1021 or any of the hangers 1023, and beginning to pull the hanger assembly proximally as shown in FIGS. 10E-F. As the hanger plate assembly 1020 continues to rotate about hinge 1022, the hanger plate 1021 and the associated hangers 1023 continue to rotate until the hanger plate 1021 exits the front of outer housing 1002, as seen in FIGS. 10G-H. With the hanger plate assembly 1020 rotated at least partially out of outer housing 1002, the slack in cables C2 is further increased. The user may then pull one or more cassettes 1010 proximally out of the outer housing 1002, which may be facilitated by use of handle(s) 1012. As the cassette 1010 is pulled out, slack in the cables C2 may begin to increase as the proximal face of the cassette 1010 is aligned with the retainer members 1025, 1026. As the cassette 1010 is pulled out further to a proximal distance from the housing 1002 greater than the retainer members 1025, 1026, the slack in the cables C2 may begin to decrease again. Preferably, when the cassette 1010 is pulled out to the maximum extent, enough slack remains so that a user can easily manipulate the cables C2 at the corresponding ports, but not there is not so much slack that the cables C2 are difficult to manage. As shown in FIGS. 10G-H, the cables C2 and cassettes 1010 are easily accessible with both cables C2, and the cables resting on rear hanger 1027, maintained in an organized state. It should be understood that the patch panel system 1000 is not shown to scale in FIGS. 10A-H.

Figure 10I:
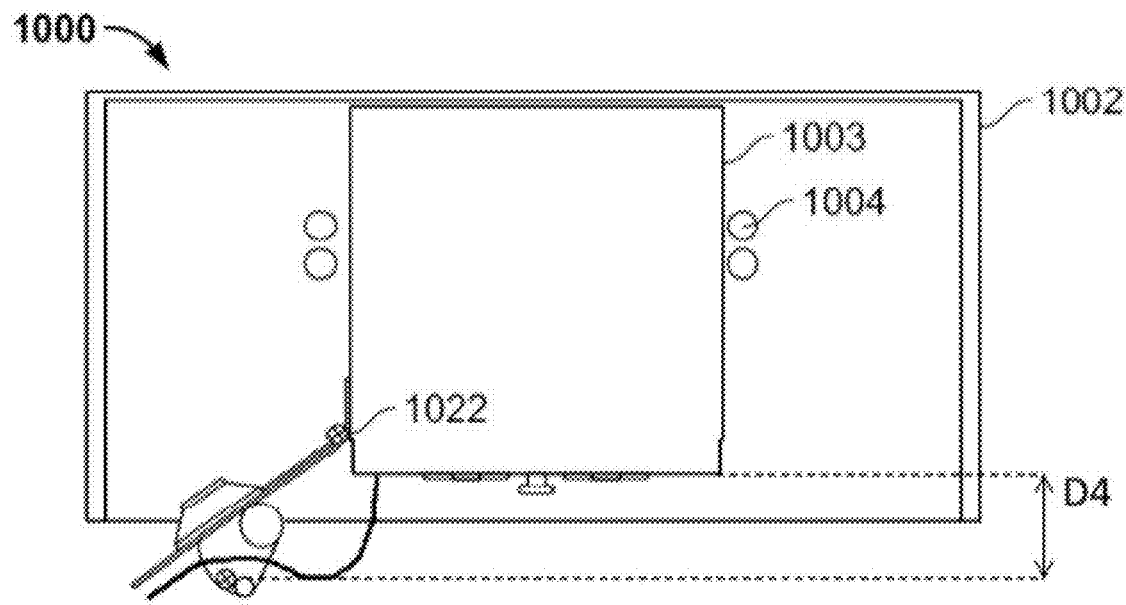
FIGS. 10I-J are top views of the patch panel system of FIG. 10A illustrating an exemplary installed configuration of components of the system.
Figure 10J:
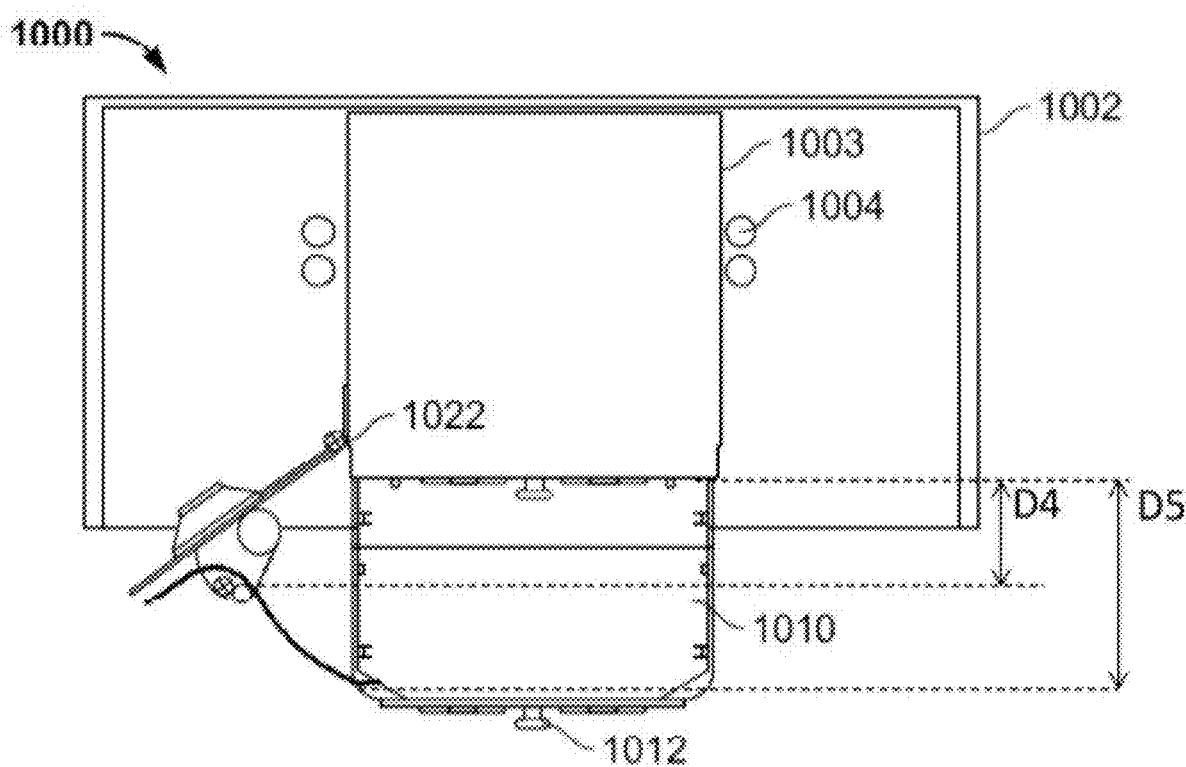

Referring now to FIGS. 10I-J, the positions of retaining members 1025, 1026 and guide surface 1024 may be selected in order to attain a desired slack management of cables C2 at all positions of hanger plate assembly 1020 and cassettes 1010. For example, referring to FIG. 10I, the retaining members 1025, 1026 may be positioned a distance D4 from the proximal face of inner housing 1003 when the hanger plate assembly 1020 is rotated out of the outer housing 1002. As the user pulls out cassette 1010, slack in the cables C2 may initially increase compared to that shown in FIG. 10I. Once the proximal face of cassette 1010 moves in the proximal direction past the position of the retaining members 1025, 1026, slack may begin to decrease again. As shown in FIG. 10J, the proximal face of each cassette 1010 has a maximum distance D5 from the proximal face of inner housing 1003 when the cassette 1010 is in the fully pulled out position. Preferably, the distance D5 is about twice the distance D4. With this configuration, when the hanger plate assembly 1020 is rotated out of the outer housing 1002 as shown in FIGS. 10I-J, cables C2 may have about the same slack when the cassette 1010 is in the stored position shown in FIG. 10I and when the cassette 1010 is in the pulled out position shown in FIG. 10J. However, in other embodiments, distance D5 may be less than twice D4, so that there is a net increase in the slack of cables C2 when the cassette 1010 is transitioned from the stored condition to the pulled out condition. Such an increase in slack may make it easier for a user to manipulate the connection of cables C2 with corresponding ports in cassette 1010. This feature is similar to the related feature described above in connection with FIG. 4B.

Although patch panel system 1000 is shown with a single hanger plate assembly 1020, it should be understood that patch panel system 1000 may include a second hanger plate assembly on the opposite side of inner housing 1003 of the first hanger plate assembly 1020. If a second hanger plate assembly is used, it may be identical to the first hanger plate assembly 1020 in structure and function, albeit the components would be in a mirrored position compared to the first hanger plate assembly 1020. Also, although the hanger plate assembly 1020 is shown with one hanger 1023 for each cassette 1010, more or fewer individual hangers 1023 may be provided. Still further, although hanger plate 1021 is shown as a single rigid member so that all of the hangers 1023 attached to the hanger plate 1021 move in unison, in other embodiments a plurality of individually rotatable hanger plates may be provided. For example, a hanger plate may be provided in two portions, so that a top group of hangers is separately rotatable with respect to a bottom group of hangers. Still further, any number of hanger plates, up to the total number of hangers so that each hanger may be individually rotatable, may be used. However, a single hanger plate 1021 may be preferable for ease of use.

As noted above, patch panel system 1000 may be suited for outdoor use. When being used outdoors, it may be important that when the patch panel system 1000 is not being actively used or maintained, the components are all capable of being situated within the bounds of the outer housing 1002, so that the components are protected from the elements. Thus, as noted above, the width of the hanger plate 1021 should be less than the distance between a side wall of the inner housing 1003 and the corresponding side wall of the outer housing 1002, so that it may swing from outside the outer housing 1002 to inside the outer housing 1002 where it is protected from the elements. However, it may be beneficial to provide a hanger plate that is wider than hanger plate 1021, so that cables C2 may be guided with fewer sharp turns, such as where a cable exits one hanger 1023 and moves down or up the hanger plate 1021 towards another hanger 1023. This may beneficial because certain cables used with patch panel system 1000 may be quite stiff, making tight turns difficult to maintain.

The patch panel system 1000' shown in FIGS. 11A-H addresses the potential limitations described immediately above. Patch panel system 1000' may be identical to patch panel system 1000 in most or all respects other than the hanger plate assembly 1020'. For example, patch panel system 1000' may include outer housing 1002, inner housing 1003, access ports 1004, and cassettes 1010 identical to those described in connection with FIGS. 10A-H. As such, these components will not be described in detail again.

Figure 11A:
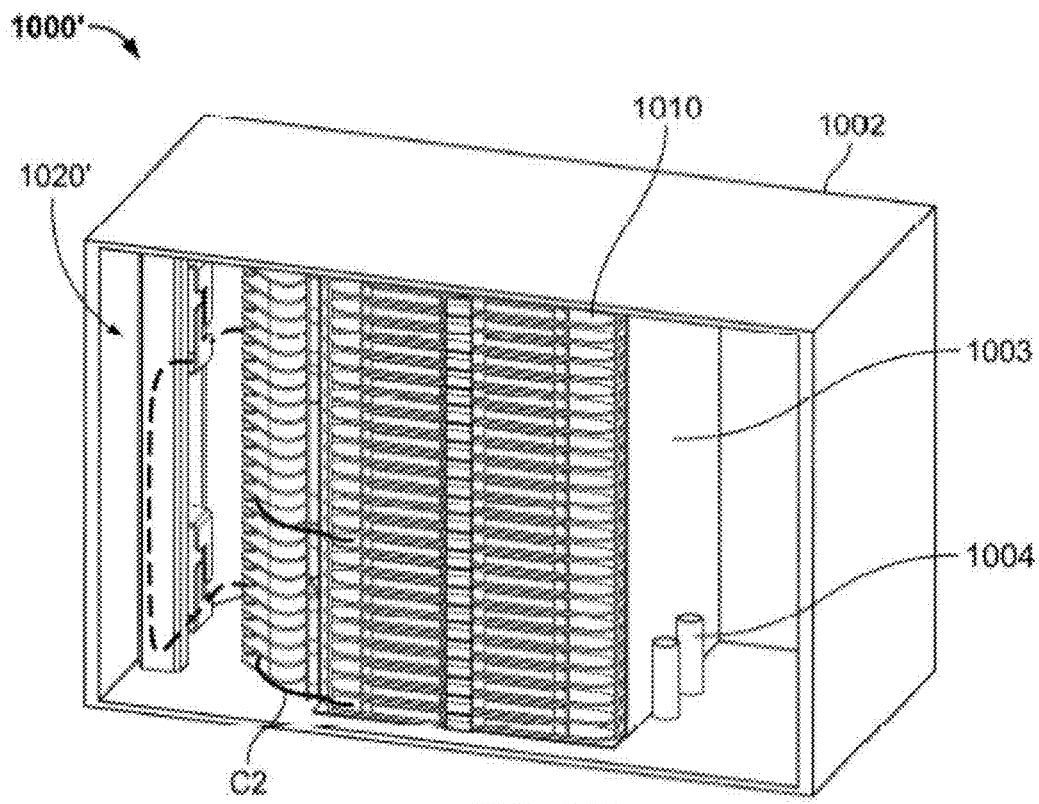
FIGS. 11A-B are perspective and top views, respectively, of a patch panel system with a hanger plate assembly in a stored condition according to an alternate embodiment.
Figure 11B:
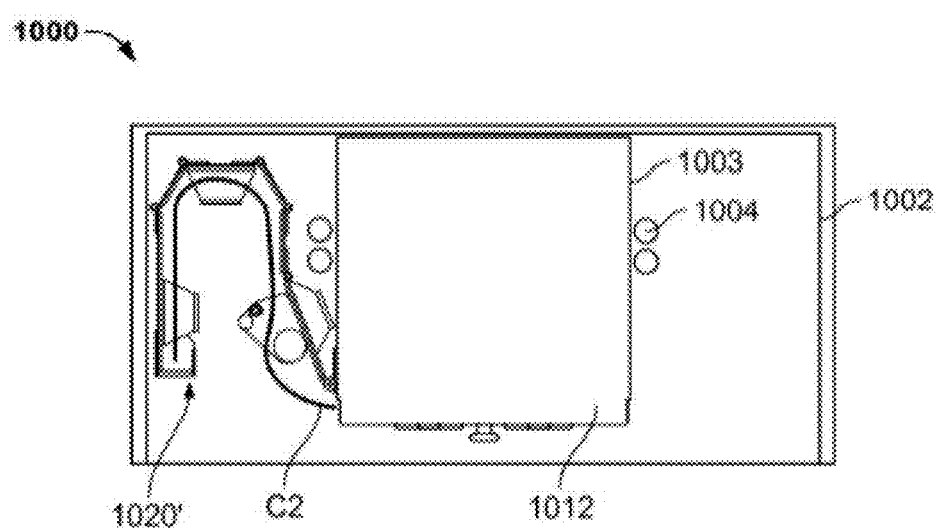
Figure 11C:
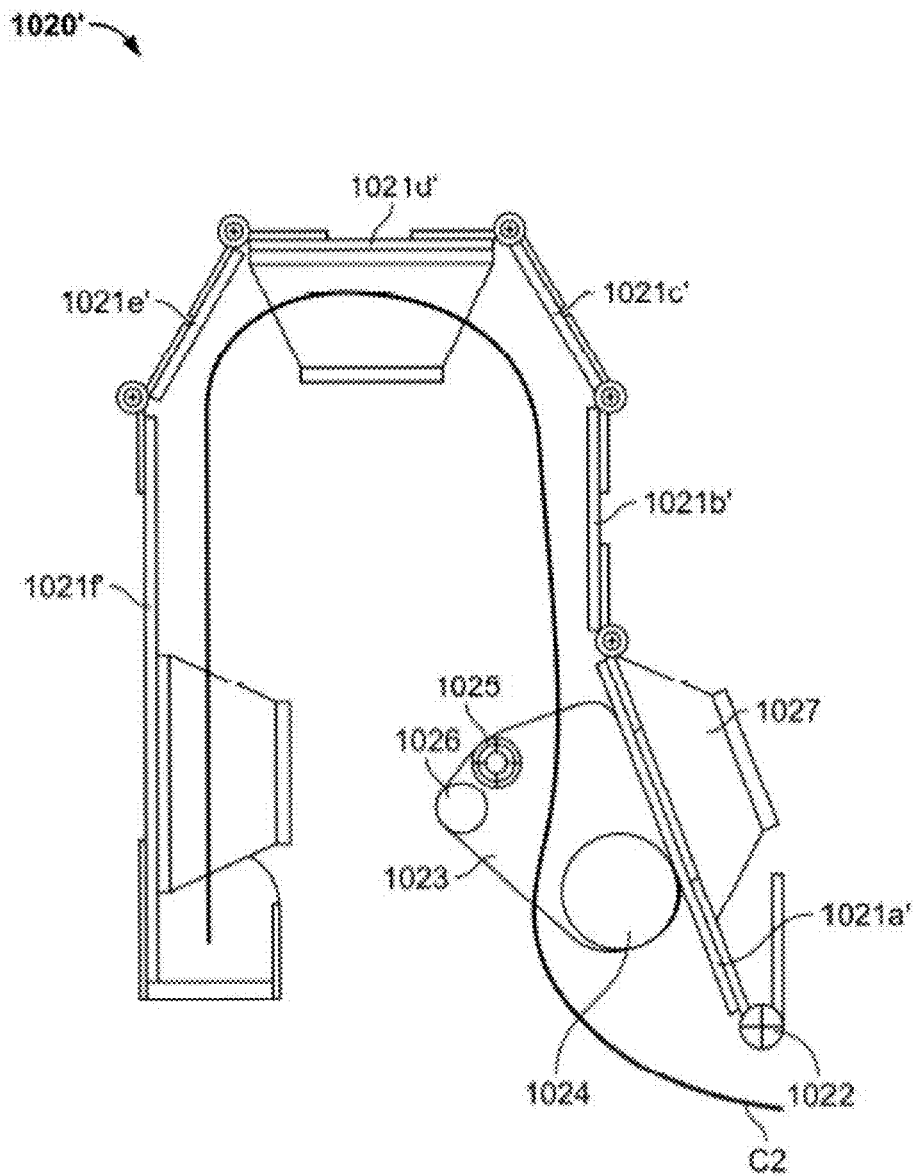
FIG. 11C is a top view of the hanger plate assembly of FIG. 11A in a stored condition.
Figure 11D:
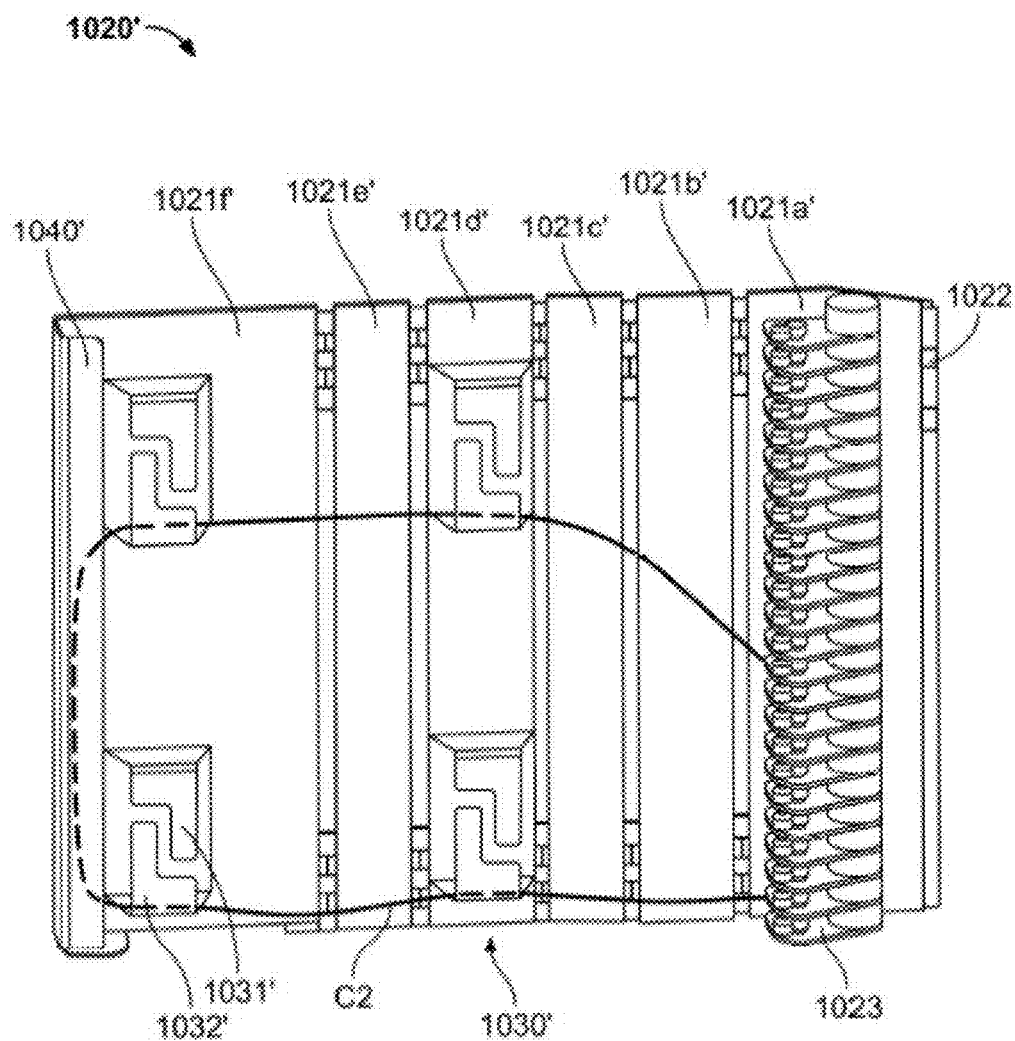
FIG. 11D is a perspective view of the hanger plate assembly of FIG. 11A in a pulled out condition.
Figure 11E:
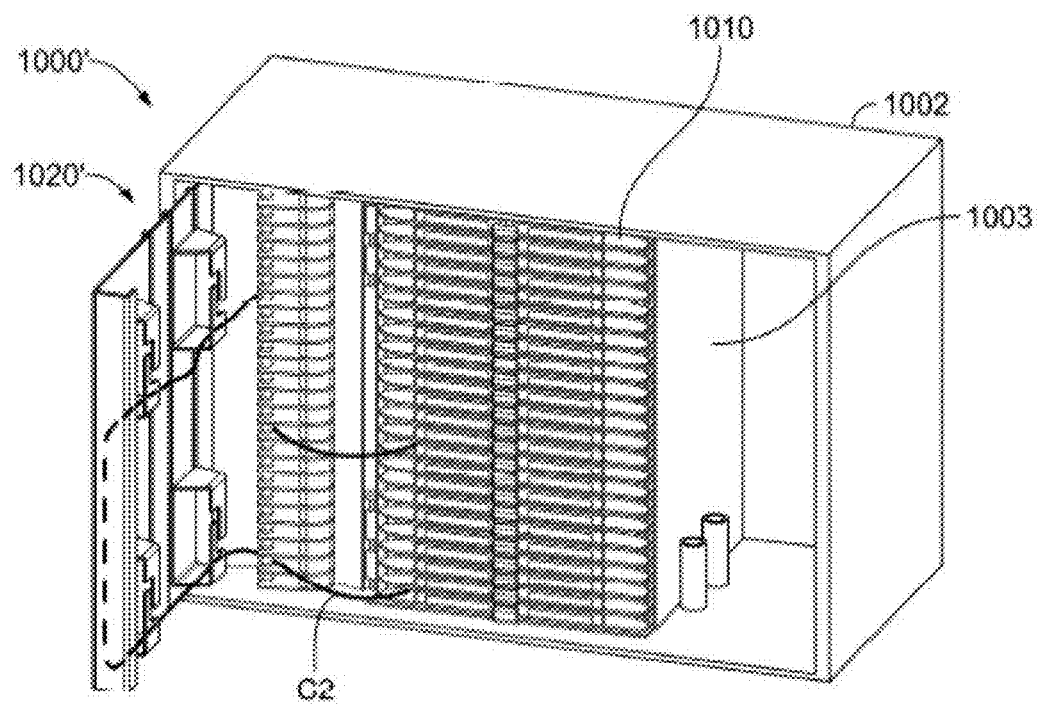
FIGS. 11E-F are top and perspective views, respectively, of the patch panel system of FIG. 11A with the hanger plate assembly in a transition position.
Figure 11F:
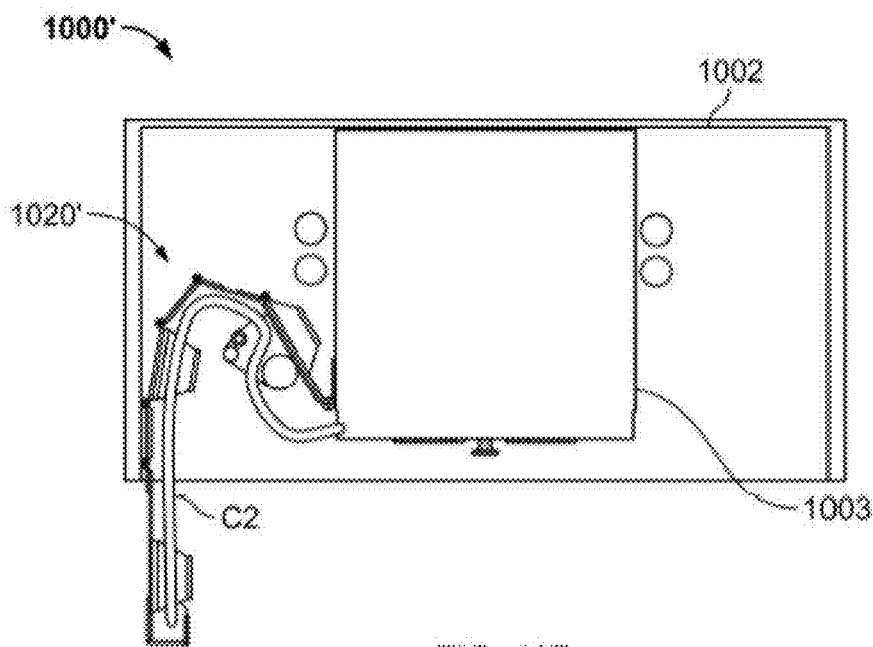
Figure 11G:
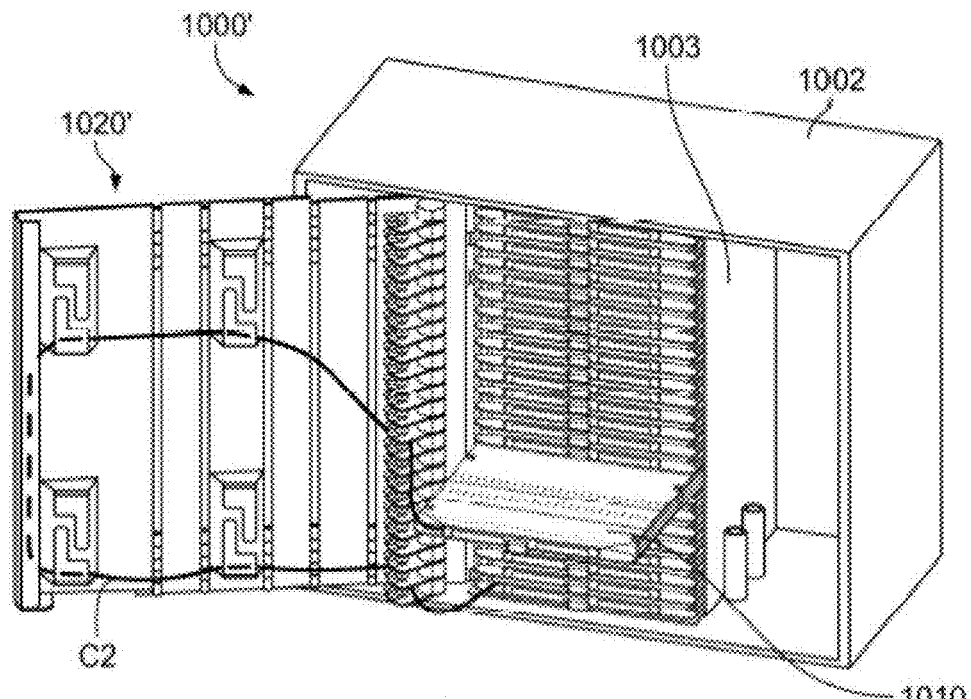
FIGS. 11G-H are top and perspective views, respectively, of the patch panel system of FIG. 11A with the hanger plate assembly in a pulled out condition.
Figure 11H:
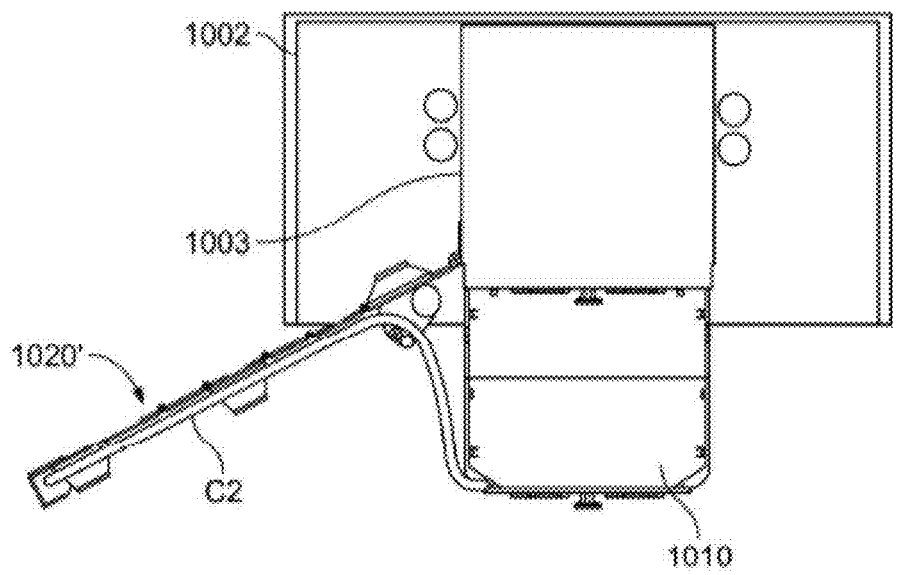

Similar to the hanger plate assembly 1020 of patch panel system 1000, the hanger plate assembly 1020' of patch panel system 1000' has a stored condition, shown in FIGS. 11A-B, a pulled out condition for access as shown in FIGS. 11G-H, with an intermediate position shown in FIGS. 11E-F. A top view of the hanger plate assembly 1020' in the stored condition is shown in FIG. 11C, with inner and outer housings 1002, 1003 omitted for clarity of illustration. Similar to hanger plater assembly 1020, hanger plate assembly 1020' may include a substantially rigid rectangular first hanger plate 1021a' coupled to inner housing 1003 by one or more hinges 1022. A plurality of hangers 1023, identical to those described above, may be coupled to the first hanger plate 1021a' in a vertically stacked configuration. First hanger plate 1021a' may include one or more rear hanger plates 1027 similar or identical to those described above.

First hanger plate 1021a' may have a height similar to the height of hanger plate 1021, but may be narrower. In addition to first hanger plate 1021a', hanger plate assembly 1020' may include a plurality of additional hanger plates hingedly coupled to one another and to first hanger plate 1021a'. In the particular embodiment of hanger plate assembly 1020' shown, five additional hanger plates 1021b'-1021f are hingedly coupled to one another in series, with hanger plate 1021b' hingedly coupled to first hanger plate 1021a'. Each hanger plate 1021a'-1021f may have a substantially similar height, and the widths of the plates may be similar or different from one another. Although hanger plates 1021a'-f are shown as separate members that are coupled to one another by hinges, one or more of the hanger plates 1021a'-'f may be integrally formed with a living hinge between adjacent plates to provide similar functionality.

Hanger plate assembly 1020' is shown in FIG. 11D in an extended or pulled out condition with outer housing 1002 and inner housing 1003 omitted for clarity of illustration. Select ones of the hanger plates 1021a'-1021f may include cable retainers 1030'. Each cable retainer 1030' may include two extensions, such as a top extension 1031' and a bottom extension 1032'. Top extension 1031' may include a first portion extending away from and substantially orthogonally to the corresponding hanger plate, and a second "L"-shaped portion extending down from and orthogonal to the first portion and parallel to the corresponding hanger plate. The bottom extension 1032' may include a first portion extending away from and substantially orthogonally to the corresponding hanger plate, and a second "L"-shaped portion extending up from and orthogonal to the first portion and parallel to the corresponding hanger plate. With this configuration, each extension may form a generally "U"-shaped channel. The two "L"-shaped portions of the top extension 1031' and the bottom extension 1032' may be positioned with respect to one another so that they form a rectangular shape with a gap between the "L"-shaped portions adapted to receive cable C2 therethrough and into one or both of the "U"-shaped channels. As shown in FIG. 11D, two cable retainers 1030' may be positioned toward the top of an intermediate hanger plate 1021d' and an end hanger plate 1021f, with two cable retainers 1030' positioned toward the bottom of hanger plates 1021d' and 1021f. It should be understood that more or fewer cable retainers 1030' than shown may be used with hanger plate assembly 1020'.

Cables C2 coupled to the front of a cassette 1010 may first pass through a corresponding hanger 1023 in the same fashion as described in connection with FIGS. 10A-H. Cables C2 may then extend along the sequence of hanger plates and into one or both of the "U"-shaped channels formed by a cable retainer 1030' on one of the intermediate hanger plates, such as hanger plate 1021d'. The cables C2 may continue to extend to the cable retainer 1030' on the end hanger plate 1021f, at which point the cables C2 may extend up or down to the cable retainers 1030' on the opposite end of the hanger plates. The end hanger plate 1021f may include an end portion 1040' that forms a "U"-shape channel along substantially the entire height of the hanger plate 1021f. End portion 1040' may receive cables C2 that pass from the top cable retainer 1030' on hanger plate 1021f and to the bottom cable retainer 1030' on hanger plate 1021f. End portion 1040' may ensure that cables C2 stay in place as they switch directions and provide additional protection. End portion 1040' may also be used as a handle for a user to grasp to pull the hanger plate assembly 1020' out of outer housing 1002.

In the completely stored position, as shown in FIGS. 11A-B, the hanger plates 1021a'-1021f may collapse with respect to one another to form a "U"-shape that fits completely within outer housing 1002 between one side wall of inner housing 1003 and the corresponding side wall of outer housing 1002. If a user needs to access cassettes 1010 and cables C2 for maintenance, the user may pull hanger plate assembly 1020' out of outer housing 1002. As the user pulls hanger plate assembly 1020' proximally, the hinges between adjacent hanger plates 1021a'-1021f allow the hanger plate assembly 1020' to begin to straighten and extend out of the outer housing 1002. As the user continues to pull hanger plate assembly 1020', it transitions into a fully extended configuration as shown in FIGS. 11G-H, where all of the hanger plates 1021a'-1021f are substantially straight with respect to one another. In this configuration, the user may then pull out one or more cassettes 1010 as desired to perform maintenance on cables C2 as desired. The position of the retaining members 1025, 1026 and the guide surface 1024 with respect to the maximum distance that the cassettes 1010 may slide may be based on the same or similar considerations as described above in connection with FIGS. 10I-J.

Compared to hanger plate assembly 1020, hanger plate assembly 1020' may provide an increased effective length along which cable C2 may extend, despite the same amount of space being available between the walls of inner housing 1003 and outer housing 1002. As noted above, if cables C2 are stiff, the additional length provided by hanger plate assembly 1020' may make the cables C2 more easily and safely stored and maintained. Although cable retainers 1030' are shown as having particular structure, number, and relative positioning, it should be understood that other forms of cable retainers may be suitable. For example, any structure that provides support for the cables C2 as they run along the hanger plates 1021a'-1021f, particularly those that allow for the cables C2 to be inserted into or removed from the retainers with intentional effort, but to keep the cables from exiting unintentionally, may be suitable alternates to the disclosed embodiment.

Figure 12:
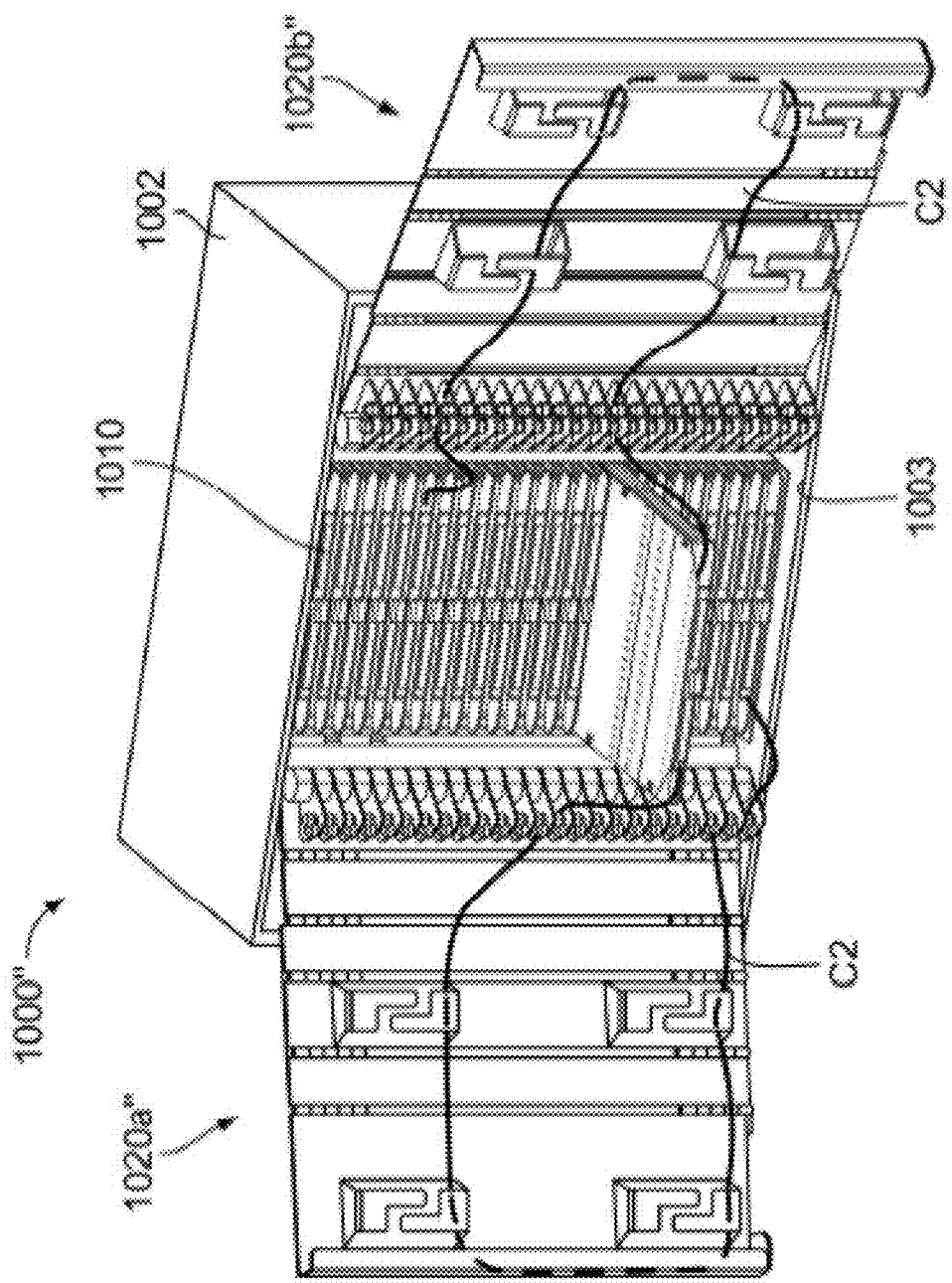
FIG. 12 is perspective view of an alternate patch panel system with two hanger plate assemblies in a pulled out condition.

Although patch panel system 1000' is shown with a single hanger plate assembly 1020', it should be understood that two hanger plate assemblies may be used. An example of this is shown in FIG. 12, where patch panel system 1000" is identical to patch panel system 1000' in all respects with the exception of the number of hanger plate assemblies. Hanger plate assembly 1020a" may be identical to hanger plate assembly 1020' in structure and function. A second hanger plate assembly 1020b", which may be an identical but mirror configuration of hanger plate assembly 1020a", may be coupled to right wall of inner housing 1003. The additional hanger plate assembly 1020b" may provide for additional management of cables C2, particularly those coupled to near the right side of the front of cassettes 1010.

Some of the systems and concepts described above are also described in U.S. Patent Publication No. 2017/0082815, the disclosure of which is hereby incorporated by reference herein. However, certain modifications and/or additions to the above-described systems may be desirable.

One example of a modified patch panel system 1100 is illustrated in FIGS. 13A-F. Patch panel system 1100 may be similar to patch panel system 1000", with one difference being the position of the hangar plate assembly in the stored condition. Patch panel system 1100 may include outer housing 1102 (with or without door 1102D), inner housing 1103, and cassettes 1110 similar to those described in connection with FIGS. 10-12

Figure 13A:
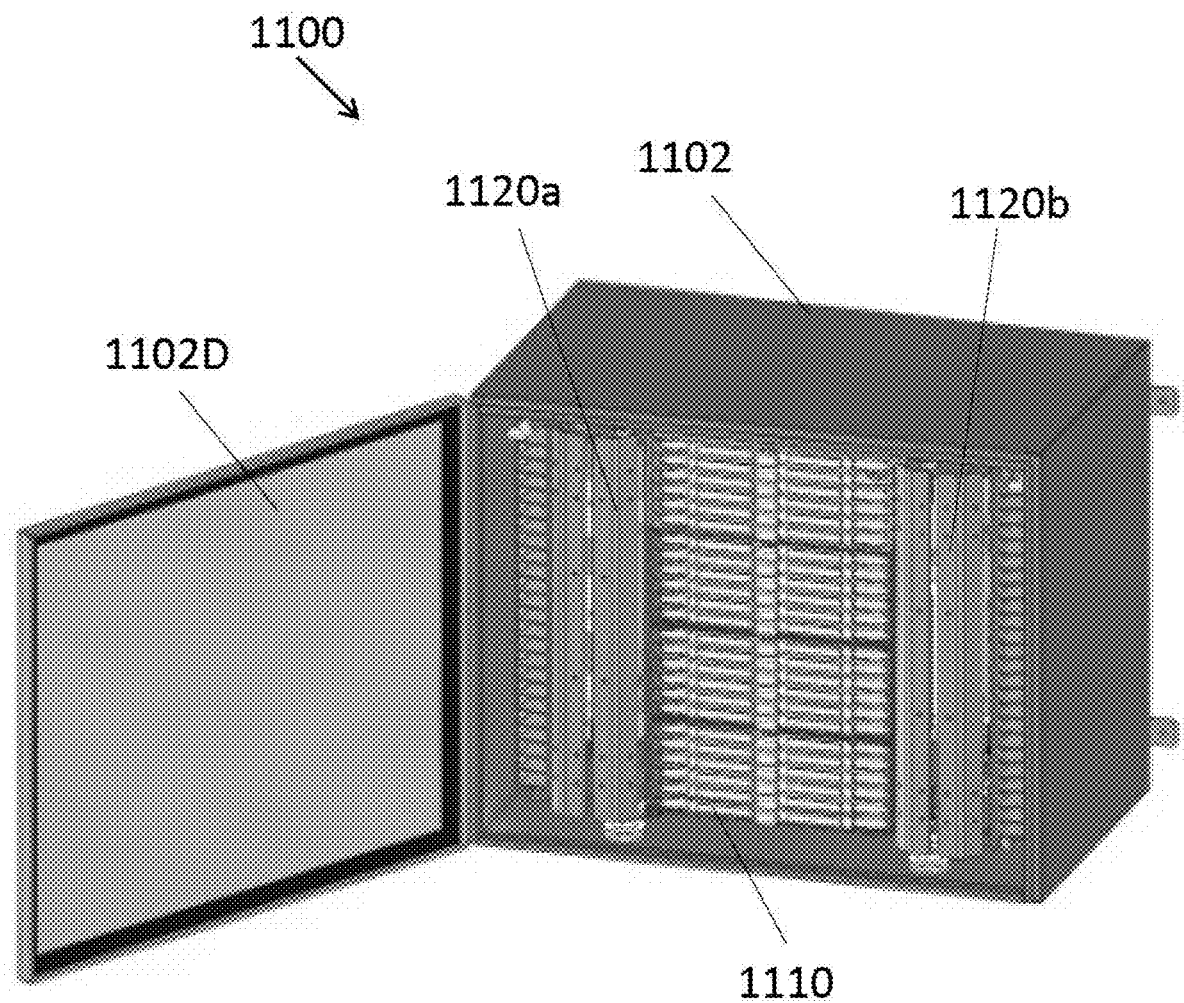
FIG. 13A is a perspective view of another patch panel system with two hanger plate assemblies in a stored condition.

Patch panel system 1100 is illustrated in a stored condition in FIG. 13A, with an access door 1102D opened. Similar access doors 1102D may be provided for other embodiments described herein if desired. A plurality of cassettes 1110 are arranged in a vertically stacked configuration within inner housing 1103, with first and second hanger plate assemblies 1120*a*, 1120*b* in a stored condition substantially between the side walls of inner housing 1103 and the side walls of outer housing 1102. It should be understood that, although two hanger plate assemblies 1120*a*, 1120*b* are shown in FIGS. 13A-F, patch panel system 1100 may be provided with only one of the hanger plate assemblies.

Figure 13B:
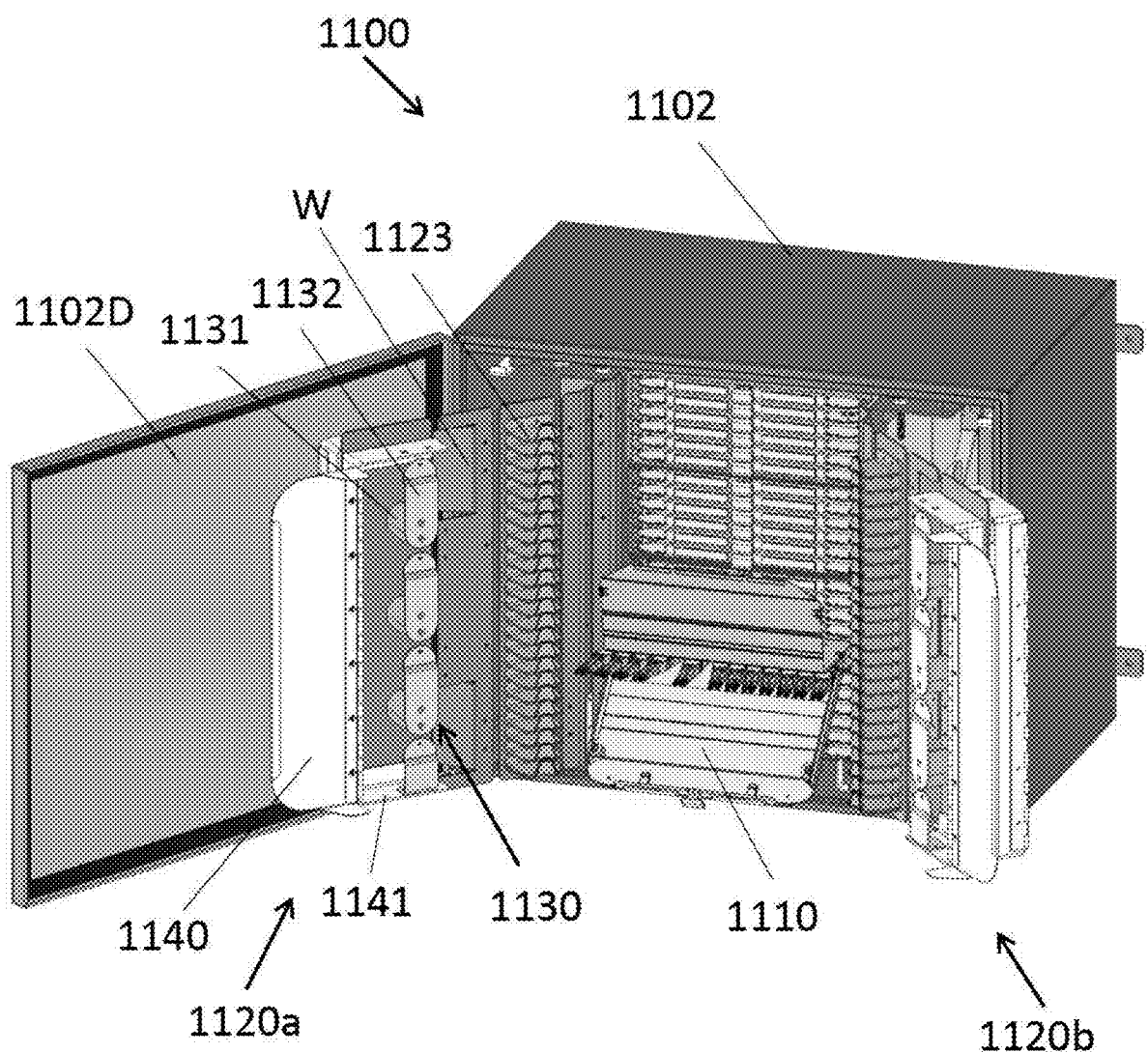
FIG. 13B is a perspective view of the patch panel system of FIG. 13A in a pulled out condition.
Figure 13C:
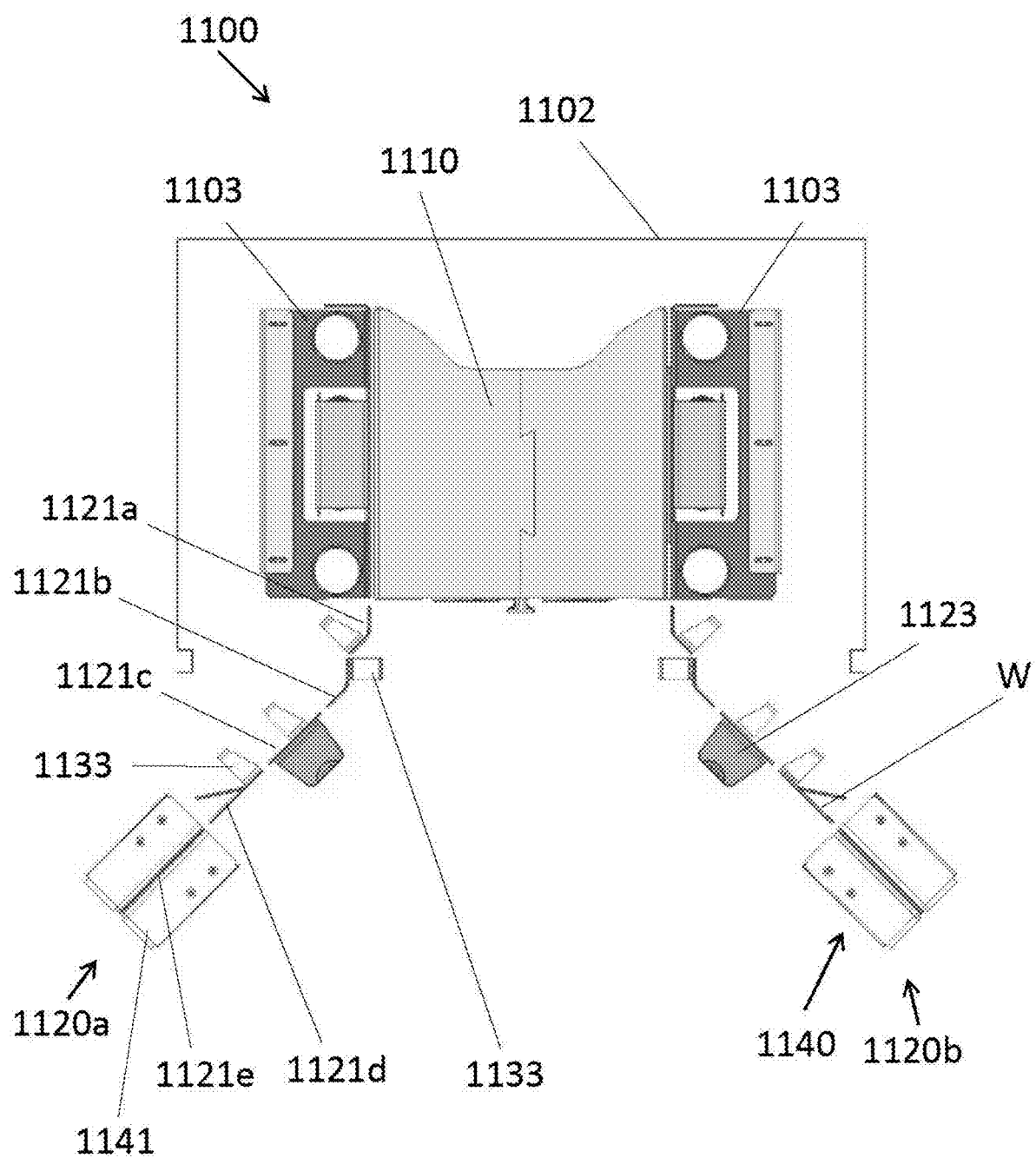
FIG. 13C is a top view of the patch panel system of FIG. 13A in a pulled out condition with portions of the housing of the patch panel system omitted.

FIG. 13B is a perspective view of patch panel system 1100 with hanger plate assemblies 1120*a*, 1120*b* in the pulled out condition, which may also be referred to as the installation or maintenance condition. FIG. 13C is a top view of patch panel system 1100 with hanger plate assemblies 1120*a*, 1120*b* in the pulled out condition, with outer housing 1102 illustrated in an outline only and door 1102D fully omitted. Similar to hanger plater assembly 1020', hanger plate assemblies 1120*a*, 1120*b* may include a substantially rectangular first hanger plate 1121*a* coupled to inner housing 1103 by one or more hinges. A plurality of additional hanger plates 1121*b-e* may be hingedly coupled to one another in succession, in a manner generally similar to that described above in connection with hanger plate assembly 1020'. However, it should be understood that the particular number and relative size of the hanger plates that make up hanger plate assemblies 1120*a*, 1120*b* may be varied depending on the particular desired dimensions. Further, although the individual hanger plates 1121*a-e* of hanger plate assemblies 1120*a*, 1120*b* are shown as individual members coupled by hinges, one or more of the hanger plates may be integral with adjacent plates, with the hinging motion provided by a living hinge mechanism.

A plurality of hangers 1123 may be coupled to hanger plate 1121*c* of each hanger plate assembly 1120*a*, 1120*b*. Hangers 1123 may be substantially similar or identical to hangers 1023 described above in connection with hanger plate 1020. However, hangers 1123 may take alternate forms, which may be similar to rear hanger plates 1027. Preferably, whatever form the hangers 1123 take, one hanger is positioned substantially aligned with each cassette 1110 that may have cables (not shown) extending therefrom, such that each hanger is capable of supporting and/or securing cables extending into or out of a cassette. Further, although hangers 1123 are shown as being attached to hanger plate 1121*c*, the hangers may be attached to other hanger plates of hanger plate assemblies 1120*a*, 1120*b*. Because hangers 1123 may be the first point of support of cables extending into or out of a cassette 1110, the hangers are preferably positioned on a hanger plate 1121*a-e* close to the proximal face of the cassette so that the cables do not extend a significant distance without support from a corresponding hanger.

Referring to FIG. 13B, cables (not shown) may extend out of the proximal end of a first cassette 1110 and to the corresponding hanger 1123 for support. Those cables may continue to extend to an additional cable retainer 1130. A plurality of additional cable retainers 1130 may be positioned on hanger plate 1121*e* of each hanger plate assembly 1120*a*, 1120*b*. In the illustrated embodiment, each cable retainer 1130 may include a rounded portion 1131 extending substantially orthogonally to the hanger plate to which it is attached. The cables may wrap around the rounded portion 1131 and extend back toward another hanger 1123 at a different vertical height corresponding to a different cassette. Alternately, the cables may wrap around the rounded portion 1131 of one cable retainer 1130 and extend to the rounded portion of another cable retainer, at which point the cables may extend back toward another hanger 1123 corresponding to a different cassette 1110. The size of the rounded portions 1131 may be chosen to provide a minimum bending radius for cables wrapping around the rounded portion so as to minimize damage to the cables. Each cable retainer 1130 may also include a flat portion 1132 which may extend substantially parallel to the hanger plate 1121*e* to which the cable retainer is attached. Flat portions 1132 may help maintain organization of the cables and avoid them from falling off the rounded portion 1131. In the illustrated embodiment, each hanger plate 1121*e* includes three cable retainers 1131, with an additional flat portion 1132 near the bottom of the hanger plate. However, it should be understood that more or fewer cable retainers 1130 (or portions thereof) may be coupled to hanger plate 1121*e* or another hanger plate. In some embodiments, flat portions 1132 may be rotatable. In the condition shown in FIG. 13B, cables positioned between the flat portion 1132 of a cable retainer 1130 and the corresponding hanger plate 1121*e* may be difficult to remove from the cable retainer without disconnecting an end of the cable from a cassette 1110. Thus, flat portions 1132 may be rotated such that, if desired, a user may be able to relatively easily slide cables off of the rounded portion 1131 without disconnecting an end of the cable from the cassette 1110 to perform maintenance.

Figure 13D:
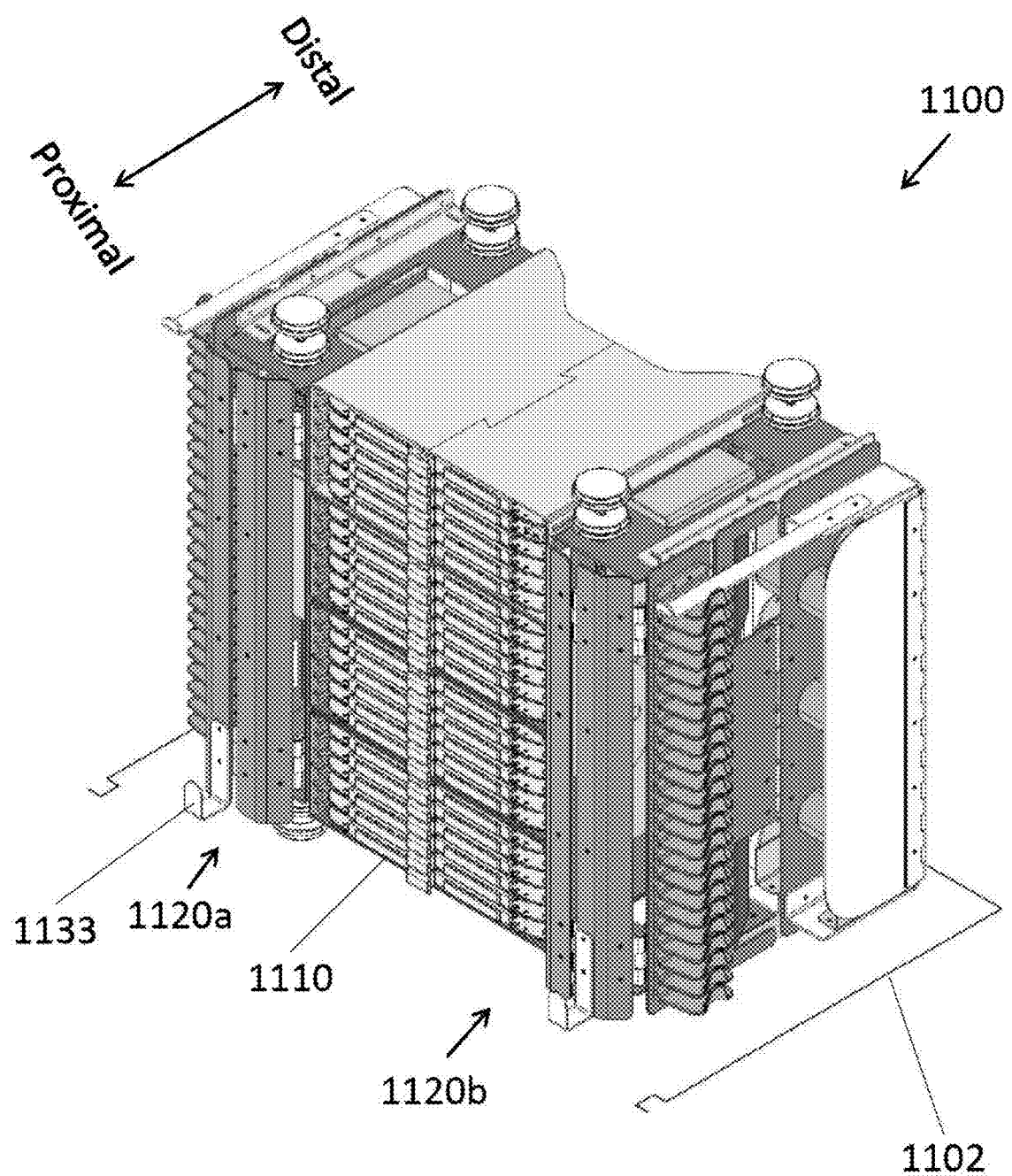
FIG. 13D is a perspective front view of the patch panel system of FIG. 13A in a stored condition with portions of the housing of the patch panel system omitted.

Still referring to FIG. 13B, a cover 1140 may be coupled to hanger plate 1121*e*. The cover 1140 may be hingedly coupled to a bracket 1141. Bracket 1141 may include portions near the top, bottom, and free lateral edge of hanger plate 1121*e*, with the cover 1140 hingedly coupled to the portion of the bracket near the free lateral edge. With this configuration, the cover 1140 may be opened to the condition shown in FIG. 13B in order to access cables that are supported by cable retainers 1130. When maintenance is complete, the cover 1140 may be closed so as to overlie the cable retainers 1130, which may further help maintain the cables in the desired positions when the hanger plate assemblies 1120*a*, 1120*b* are in the stored condition, described in greater detail below. It should be understood that one or more hangers may be provided on the rear of the hanger plates 1121*a-e* in order to help maintain additional cables. For example, hanger plate 1121*e* may include another set of cable retainers and a corresponding bracket and cover, which may be in a similar or identical configuration as that described above, on the rear side of that plate. Further, one or more windows W may be provided in one or more of the hanger plates. For example, as best shown in FIG. 13B, hanger plate 1121*d* may include two portions forming windows W such that a cable may pass from one side of the hanger plate to the opposite side of the hanger plate through the window, if desired. Still further, a number of additional hangers 1133 may be positioned on the hanger plate assemblies 1120*a*, 1120*b*. For example, individual hangers 1133 may be placed on the bottom-most portions of the front and/or back of desired panels so that the cables do not drag on the floor of outer housing 1102 or any other surface. An example of an individual hanger 1133 is best illustrated in FIG. 13D.

Figure 13E:
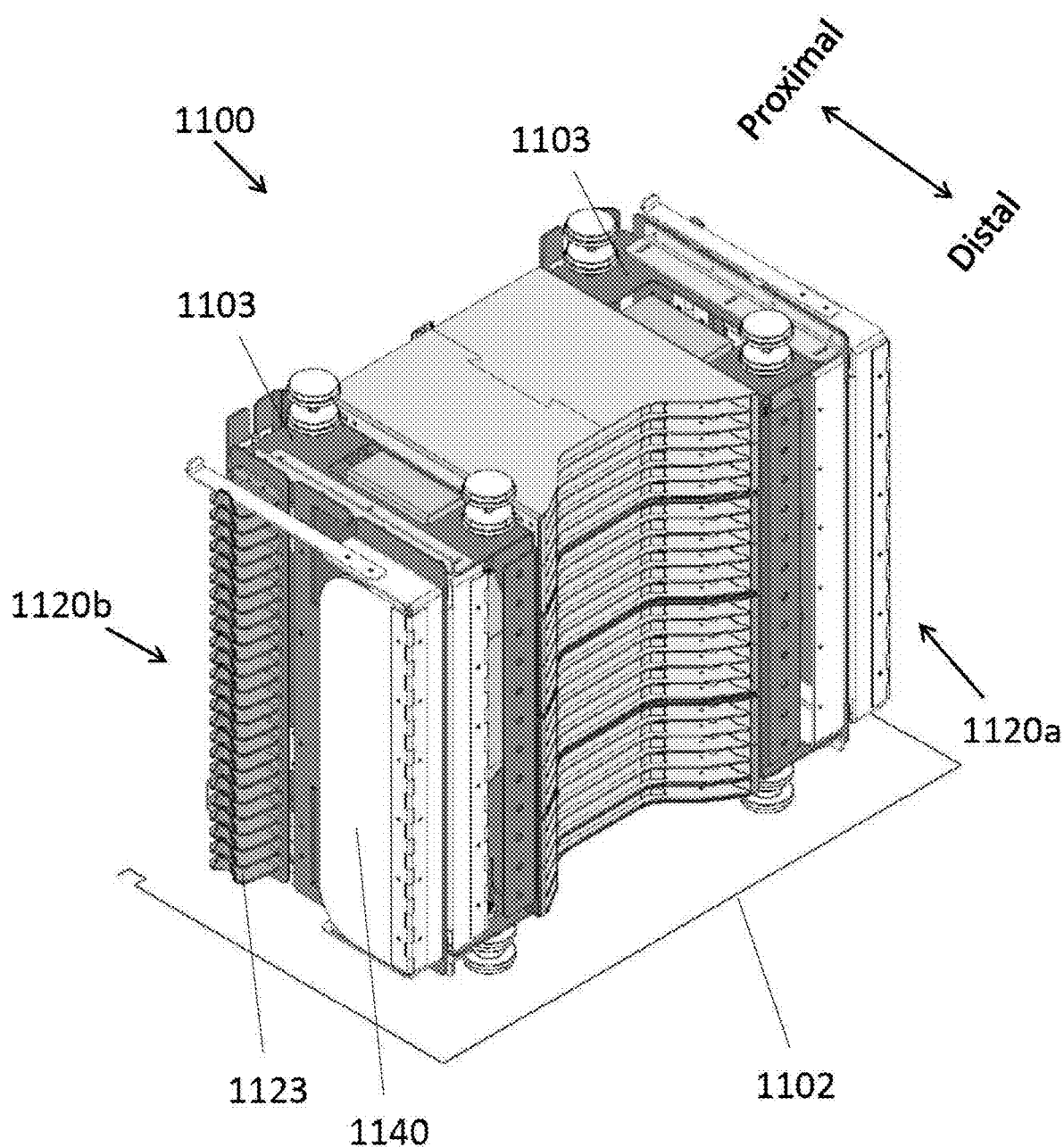
FIG. 13E is a perspective rear view of the patch panel system of FIG. 13A in a stored condition with portions of the housing of the patch panel system omitted.
Figure 13F:
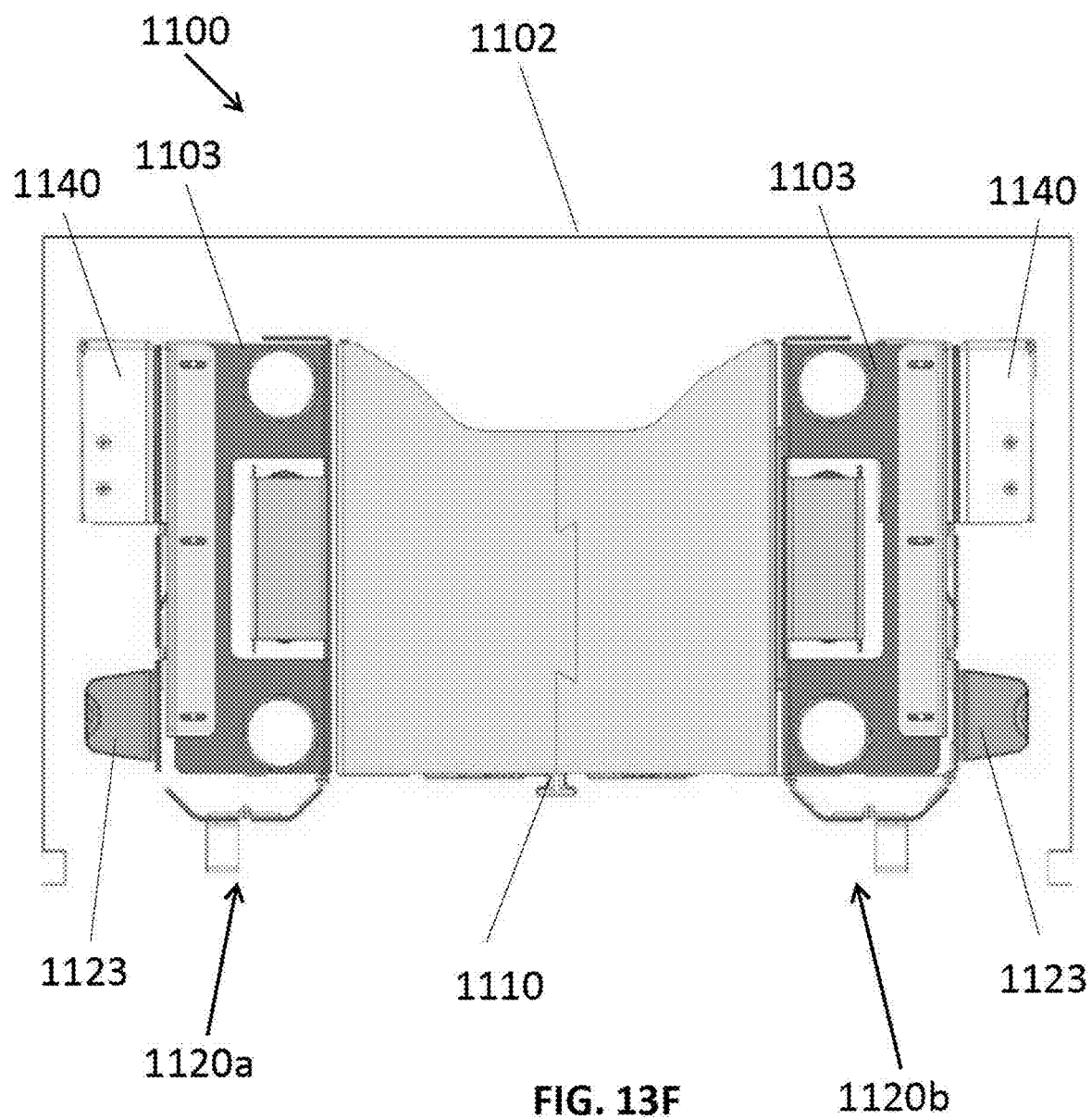
FIG. 13F is a top view of the patch panel system of FIG. 13A in a stored condition with portions of the housing of the patch panel system omitted.

Once maintenance of the cables is complete, the cassettes 1110 may all be pushed distally into the inner housing 1103, the flat portions 1132 of the cable retainers 1130 may be rotated to the condition shown in FIG. 13B, and the covers 1140 may be rotated closed, as shown in FIG. 13C. The user may then rotate the hanger plate assemblies 1120a, 1120b so that the hanger plate assemblies wrap around the outside of inner housing 1103, with the terminal hanger plate 1121e positioned between the side walls the inner housing 1103 and outer housing 1102, as shown in FIGS. 13D-F. It should be understood that the outer housing 1102 is substantially omitted from FIGS. 13D-E to better illustrate the stored condition of the hanger assemblies 1120a, 1120b. As should be clear from FIGS. 13D-F, in the stored condition of the hanger plate assemblies 1120a, 1120b, the cables are neatly and securely organized, with the many portions of the cables being protected by elements of the system, including for example outer housing 1102 and covers 1140.

Figure 13G:
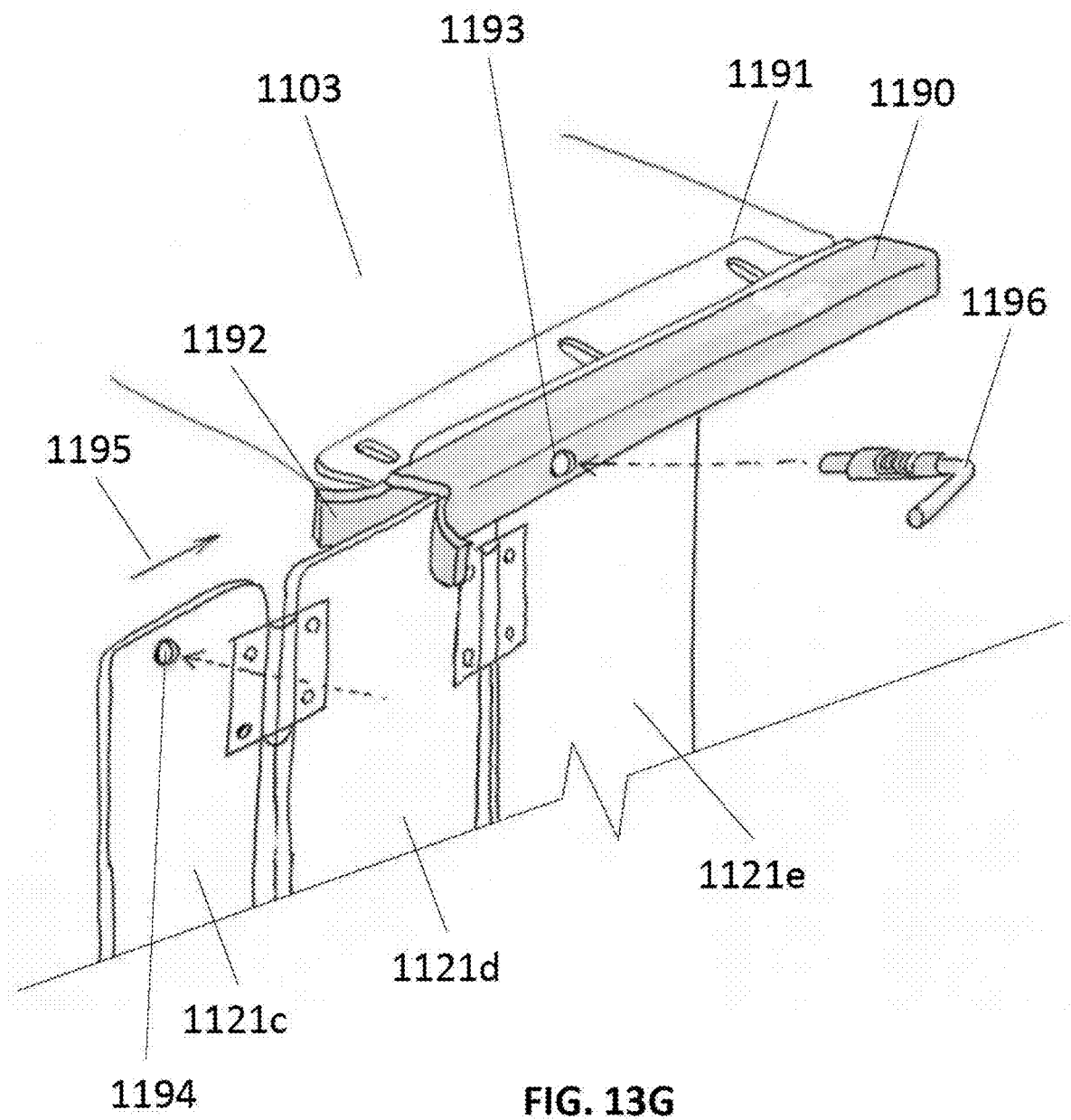
FIG. 13G is an isolated perspective view of a plate guide and locking element for guiding and locking the hanger plate assembly to the stored condition.

FIG. 13G illustrates a plate guide 1190 that may be used to guide and lock hanger plate assembly 1120a into the stored condition. Plate guide 1190 may extend along a length of inner housing 1103 and be connected to the inner housing by a bracket 1191 or any other suitable connector. Plate guide 1190 may be substantially "U"-shaped in transverse cross section, with the sides of the "U"-shape helping to guide hanger plates 1121e, 1121d, and 1121c into the stored condition. A proximal end of plate guide 1190 may include rounded portions 1192 extending away from the proximal opening of the guide plate 1190. As the terminal hanger plate 1121e is initially guided into the open end of plate guide 1190, the rounded portions 1192 may help guide the terminal hanger plate toward the center of the proximal opening in the plate guide. In addition, plate guide 1190 may include an aperture 1193 that aligns with a corresponding aperture 1194 in one of the hanger plates, here illustrated in hanger plate 1121c, when the hanger plate assembly is in the stored condition. As a user continues to slide hanger plate assembly 1120a in the direction indicated by arrow 1195 toward the stored condition, eventually apertures 1193 and 1194 will align. When apertures 1193 and 1194 are in alignment, a locking element 1196 may be inserted through both of the apertures to lock the hanger plate assembly 1120a in the stored condition. Locking element 1196 may be a simple cylindrical structure that physically restricts motion of hanger plate 1121c relative to plate guide 1190 when the locking element is inserted through both apertures 1193, 1194. The locking element 1196 and/or apertures 1193, 1194 may include additional structures, such as mating threads or the like, to further lock the hanger plate assembly 1120a to plate guide 1190 in the stored condition. It should be understood that, although many of the embodiments described above involve hanger plates or hanger plate assemblies, such as hanger plate assemblies 1120a, 1120b, that hinge "backwards" so that, in a stored condition, the fronts of the cassettes are exposed, in other embodiments the hanger plates or hanger plate assemblies may hinge "forwards" so that, in the stored condition, the hanger plates or hanger plate assemblies cover the fronts of the cassettes. This configuration, which is described in other embodiments below in connection with certain systems with dome closures, such as in FIGS. 15A-D and 18-20D, may be applied for systems with the types of housings described, for example, in connection with FIGS. 10A-14H. It should also be understood that, for embodiments described above as having an inner housing and an outer housing, such as inner housing 1103 and outer housing 1102, bolts, connectors, or other support members may be provided to securely fix the bottom of the inner housing to the bottom of outer housing and/or to fix the top of the inner housing to the top of the outer housing.

Figure 14A:
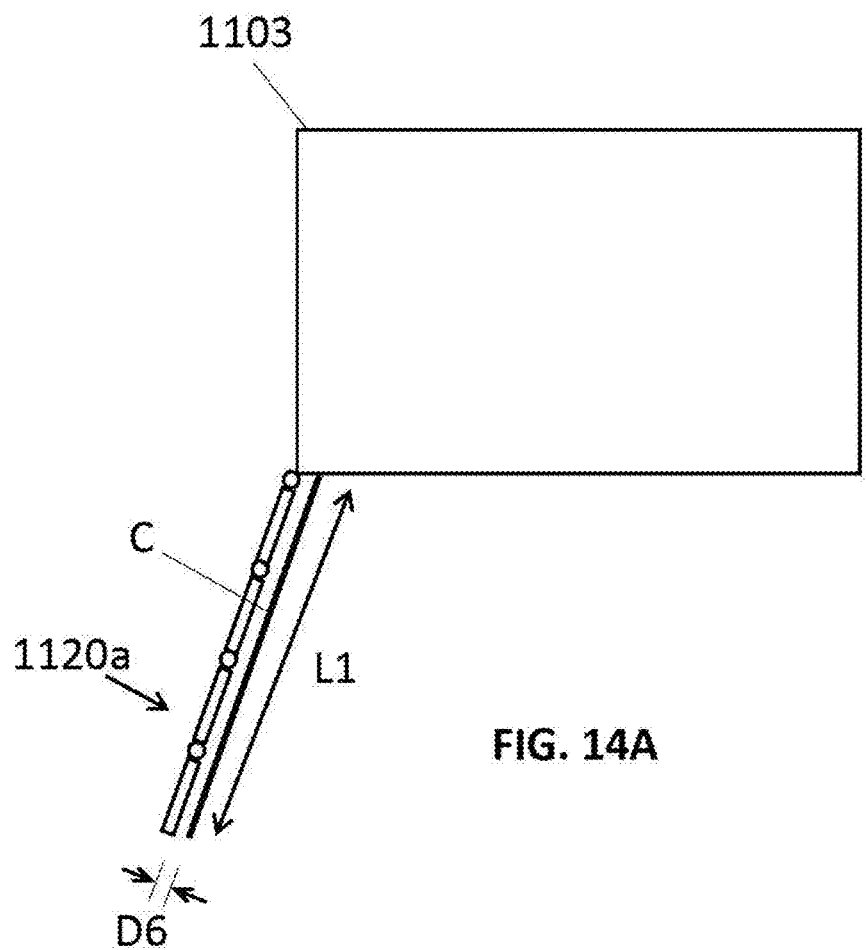
FIGS. 14A-B are schematic views of a portion of the patch panel system of FIG. 13A with a hanger plate assembly in the pulled out condition and the stored condition, respectively.
Figure 14B:
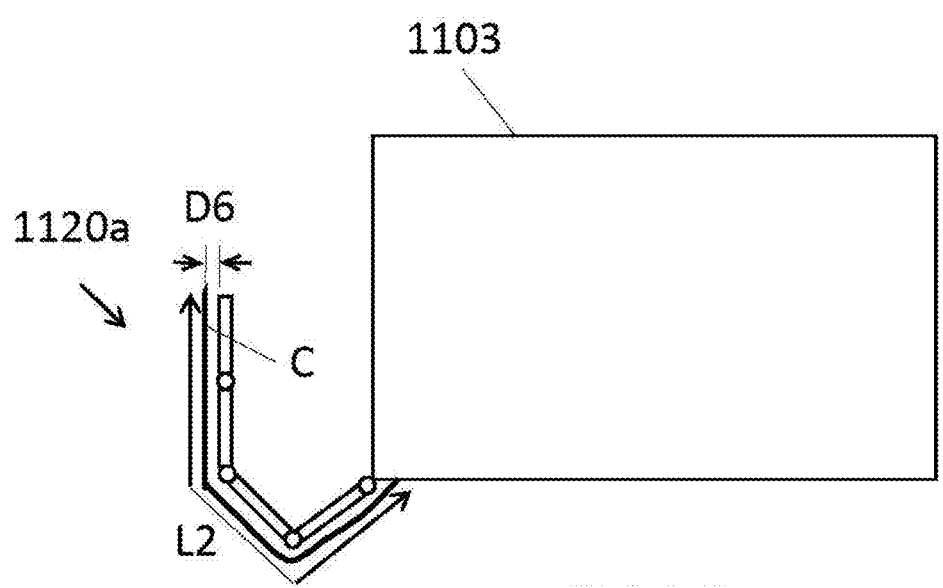

FIGS. 14A-B are schematic illustrations of hanger plate assembly 1120a in the pulled out condition and stored condition, respectively, with other components of the system omitted. When hanger plate assembly 1120a is in the pulled out condition with the individual hanger plates being aligned in a substantially straight manner, cables C extend along a path having a first length L1 from a cassette to the farthest position along the hanger plate assembly. When the hanger plate assembly 1120a is transitioned to the stored condition of FIG. 14B, with the hanger plate assembly being curved with the cables C on the outside of the curve, the cables may extend along a path having a second length L2 from the cassette to the farthest position along the hanger plate assembly. The extent of the difference between path lengths L1 and L2 may be dependent upon the distance D6 which the cables C are positioned from the surface of the plates of the hanger plate assembly 1120a. In a theoretical construction in which the cables C had an infinitely small thickness and were effectively positioned directly on the surface of the plates of hanger plate assembly 1120a, the difference between first and second path lengths L1, L2 may be zero or negligible. However, in practice, cables C have thicknesses, particularly when a plurality of cables C are bundled together, such that the distance D6 is non-negligible. As such, as hanger plate assembly 1120a is transitioned from the pulled out condition of FIG. 14A to the stored condition of FIG. 14B, depending on a slack length of the cables C extending distally from the hangar plate assembly 1120a, the cables C may become stressed because second path length L2 is greater than first path length L1, which may result in tension on the cables increasing.

FIGS. 14C-H illustrate various modifications that may be made to hanger plate assembly 1120a to help reduce or eliminate possible tension on the cables C as the hanger plate assembly transitions from the pulled out condition to the stored condition.

Figure 14C:
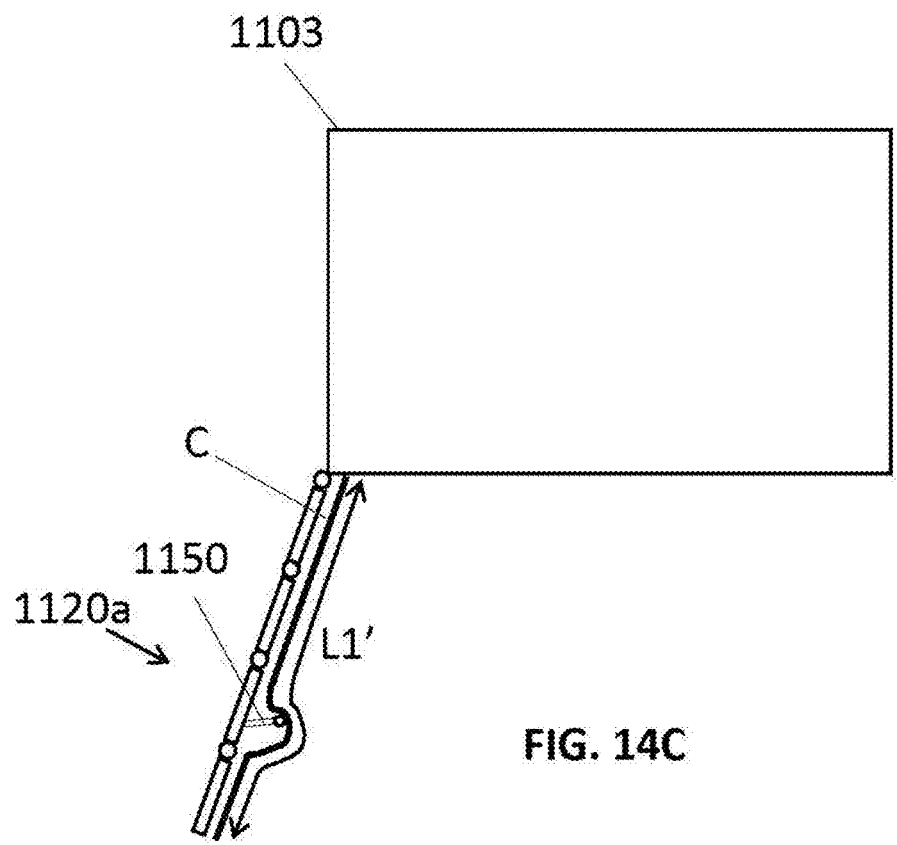
FIGS. 14C-D are schematic views of the hanger plate assembly of FIGS. 14A-B in the pulled out and stored condition, respectively, with a first modification.
Figure 14D:
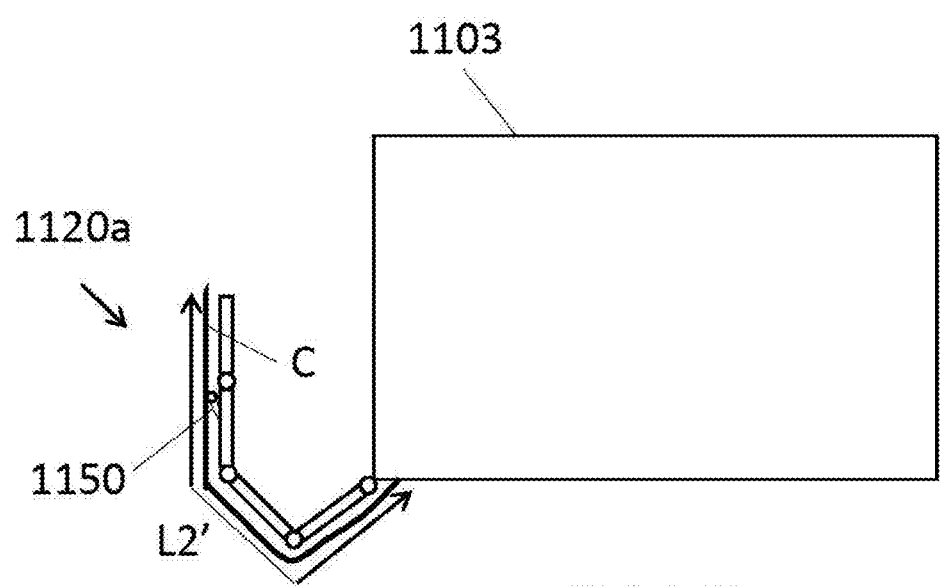

FIGS. 14C-D illustrate a highly schematic view of hanger plate assembly 1120a in the pulled out and stored condition, respectively, with a cable support 1150 coupled to one of the plates of the hanger plate assembly. Support 1150 may have a first end coupled to one of the hanger plates and a second free end, and the free end may include a blunt tip that may provide support for the cables C. In the pulled out condition of FIG. 14C, the free end of support 1150 may extend a first distance away from the surface of the hanger plate to which it is attached, so that cables C extend along a path having a length L1' that may be greater than path length L1 of FIG. 14A. As hanger plate assembly 1120a is transitioned to the stored condition shown in FIG. 14D, the free end of support 1150 may move closer to the surface of the hanger plate to which the support is attached. For example, the first end of support 1150 may be rotatably coupled to the hanger plate such that the free end rotates toward the hanger plate and the support moves closer to parallel to the hanger plate to which it is attached. In another example, support 1150 may have a telescopic or other translatable configuration such that the free end of the support slides toward the end of the support attached to the hanger plate. Regardless of the mechanism, the length of path L2' is preferably equal or about equal to the length of path L1', such that the cables C do not experience an increase in stress or tension during transition from the pulled out condition to the stored condition.

Figure 14E:
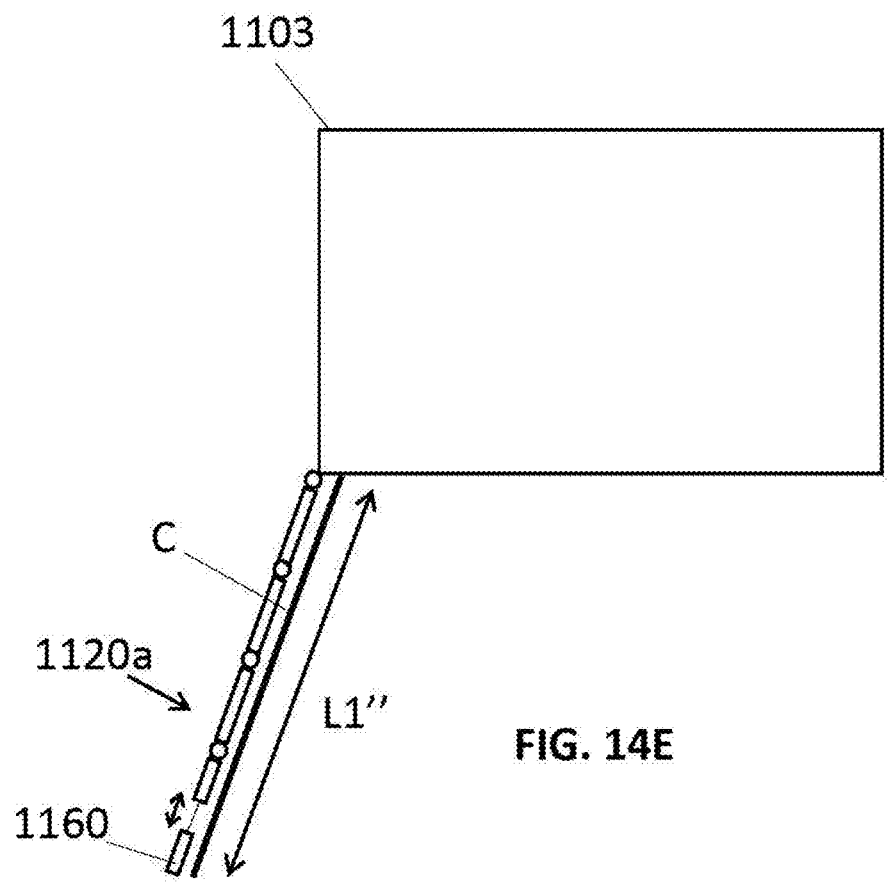
FIGS. 14E-F are schematic views of the hanger plate assembly of FIGS. 14A-B in the pulled out and stored condition, respectively, with a second modification.
Figure 14F:
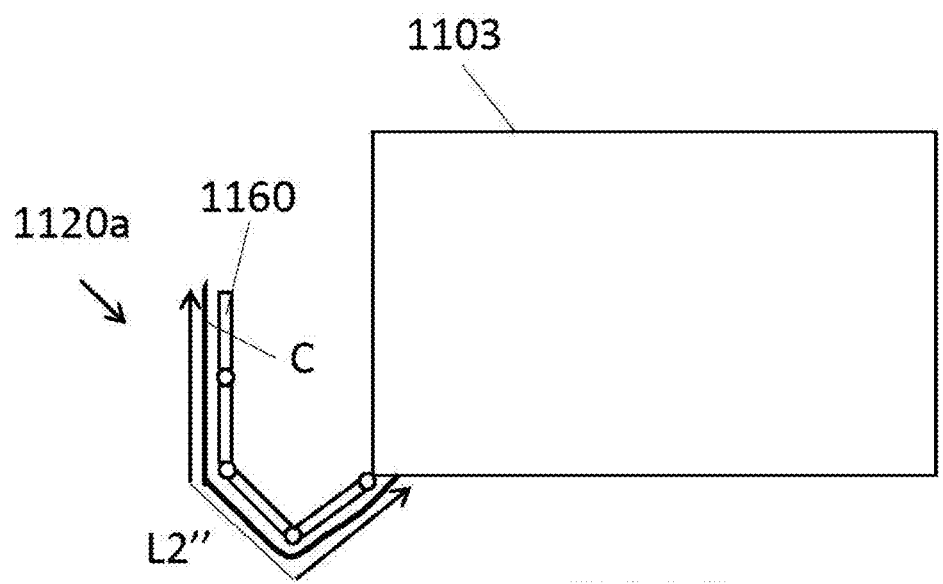

FIGS. 14E-F illustrate a highly schematic view of hanger plate assembly 1120a in the pulled out and stored condition, respectively, with an extendable hanger plate 1160 included within the hanger plate assembly. Extendable hanger plate 1160 may have an extended condition, shown in FIG. 14E, and a retracted condition, shown in FIG. 14F. The extendable hanger plate 1160 may include two end portions that are coupled together by a third center portion, with the two end portions slideable toward and away from one another over the center portion. However, other mechanisms may be suitable. For example, extendable hanger plate 1160 may be stretchable so that it can be stretched to the extended condition, and upon release, contract to the retracted condition. Regardless of the mechanism, the length of path L2" is preferably equal or about equal to the length of path L1", such that the cables C do not experience an increase in stress or tension during transition from the pulled out condition to the stored condition.

Figure 14G:
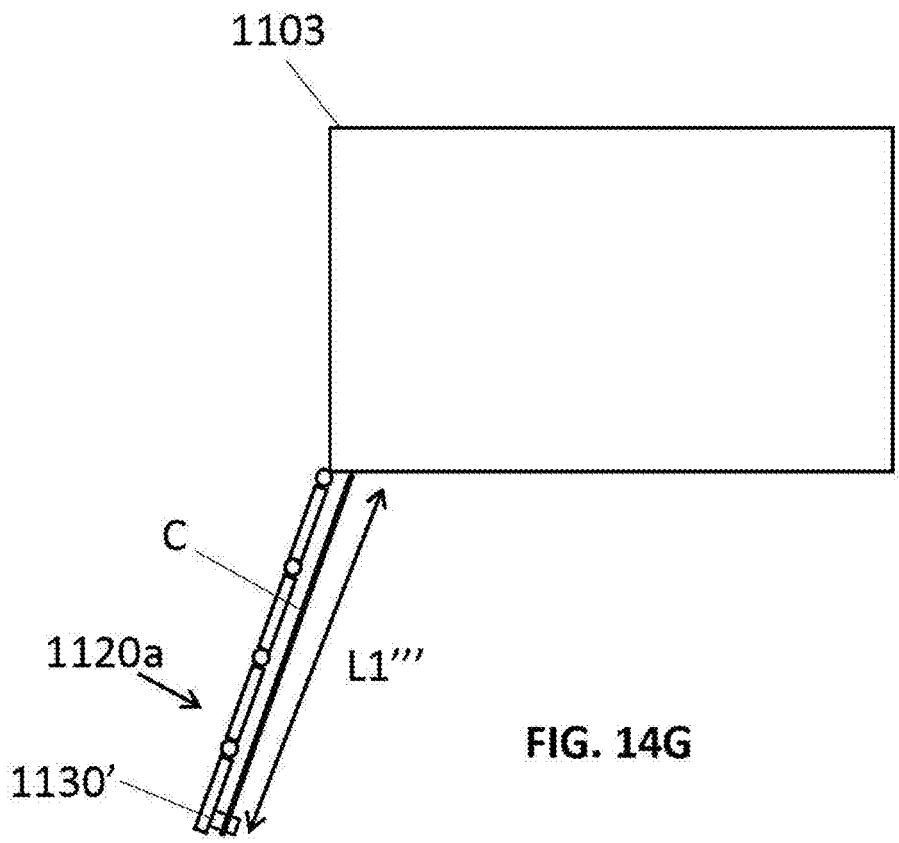
FIGS. 14G-H are schematic views of the hanger plate assembly of FIGS. 14A-B in the pulled out and stored condition, respectively, with a third modification.
Figure 14H:
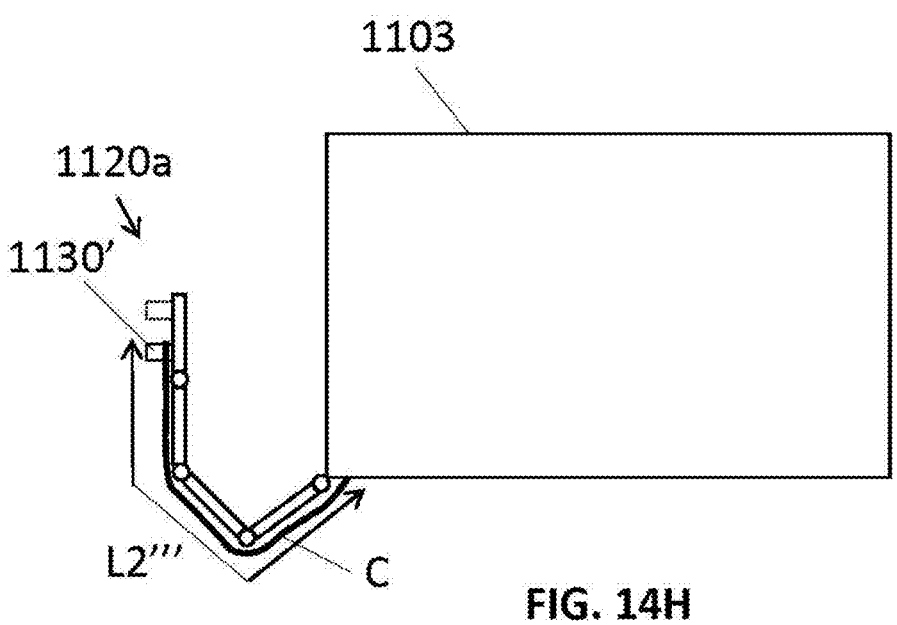

FIGS. 14G-H illustrate a highly schematic view of hanger plate assembly 1120a in the pulled out and stored condition, respectively, with a repositionable cable retainer 1130' provided on the terminal hanger plate of the hanger plate assembly. Repositionable cable retainer 1130' may be similar in structure to cable retainers 1130 or any other cable retainer or hanger described herein, with the exception that repositionable cable retainer 1130' may move laterally along the surface of the hanger plate to which it is attached. For example, a slot may be provided within the hanger plate to which repositionable cable retainer 1130' is attached, with a portion of the repositionable cable retainer positioned within the slot so that it may slide along the slot. In the pulled out condition shown in FIG. 14G, repositionable cable retainer 1130' may be positioned relatively close to the free edge of hanger plater assembly 1120a, such that cable C extends along a path having a length L1'''. As hanger plate assembly 1120a is transitioned to the stored condition, any increased tension on cables C may cause repositionable cable retainer 1130' to slide away from the free edge of the hanger plate assembly, as shown in FIG. 14H. It should be understood that, in FIG. 14H, the prior position of the repositionable cable retainer 1130' is illustrated with a dashed line. It should be understood that other particular mechanisms may be suitable to allow for repositionable cable retainer 1130' to translate or otherwise move toward or away from the free edge of the hanger plate assembly 1120a. Regardless of the mechanism, the length of path L2''' is preferably equal or about equal to the length of path L1''', such that the cables C do not experience an increase in stress or tension during transition from the pulled out condition to the stored condition.

For the modifications described above in connection with FIGS. 14C-14H, it may be possible that, during use, actual path lengths L1', L1", and L1''' may be greater than the corresponding intended path lengths L2', L2", and L2'''. Although these modifications are intended to result in substantially equal path lengths, path lengths L1'. L1", and L1''' could potentially be greater than corresponding path lengths L2', L2", and L2''', for example due to user error. In one example, during an installation step, a user might unintentionally introduce extra length in the cable path in the pulled out condition, such that the actual path lengths are L1'+X, L1"+X, or L1'''+X, wherein X is the additional length resulting from the user error. In this situation, upon transition to the stored condition, the cables could have unwanted slack due the extra length X introduced into the system by the user. As a result, the actual path lengths L1', L1", and L1''' may be greater than the corresponding intended path lengths L2', L2", and L2''' by a length equal to X. This extra slack of the cables C in the stored condition could result in the cables slipping off cable retainers 1130. In order to protect against this possibility, support 1150, extendable hanger plater 1160, and cable retainer 1130' may be provided with a tension or biasing element so that the support element 1150 is biased (for example spring-biased) to the position shown in FIG. 14C, the extendable hanger plate 1160 is biased (for example spring-biased) to the position shown in FIG. 14E, and the cable retainer 1130' is biased (for example spring-biased) to the position shown in FIG. 14G. With this configuration, in the corresponding pulled-out conditions shown in FIGS. 14C, 14E, and 14G, cables C may be supported by the hanger plate assembly 1120a with little or no tension. As the user moves the hanger plate assembly 1120a to the corresponding stored conditions shown in FIGS. 14D, 14F, and 14H, the bias provided to the support 1150, extendable hanger plate 1160, or cable retainer 1130' may place a small tension force on the cables to help ensure that the cables remain secured and positioned close to the hanger plate assembly. In other words, any slack in the cables C that may otherwise have been created by the user initially when the hanger plate assembly is in the pulled out condition may be partially or fully eliminated in the stored condition by the biasing force of the support element 1150, extendable hanger plate 1160, or cable retainer 1130'. It should be understood that this biasing force is preferably small so that, although any slack may be removed, the cables are not damaged by the biasing forces.

In addition to tension potentially resulting in mechanical stresses or breakages in the cables, bending of the cables may separately result in optical signal loss. FIGS. 15A-D show a patch panel system 1200 according to still another aspect of the disclosure. Among other advantages described in greater detail below, patch panel system 1200 may simultaneously avoid stressing or tensioning cables during cable storage, as well as limit the amount of cable bending that could otherwise result in optical signal loss.

Figure 15A:
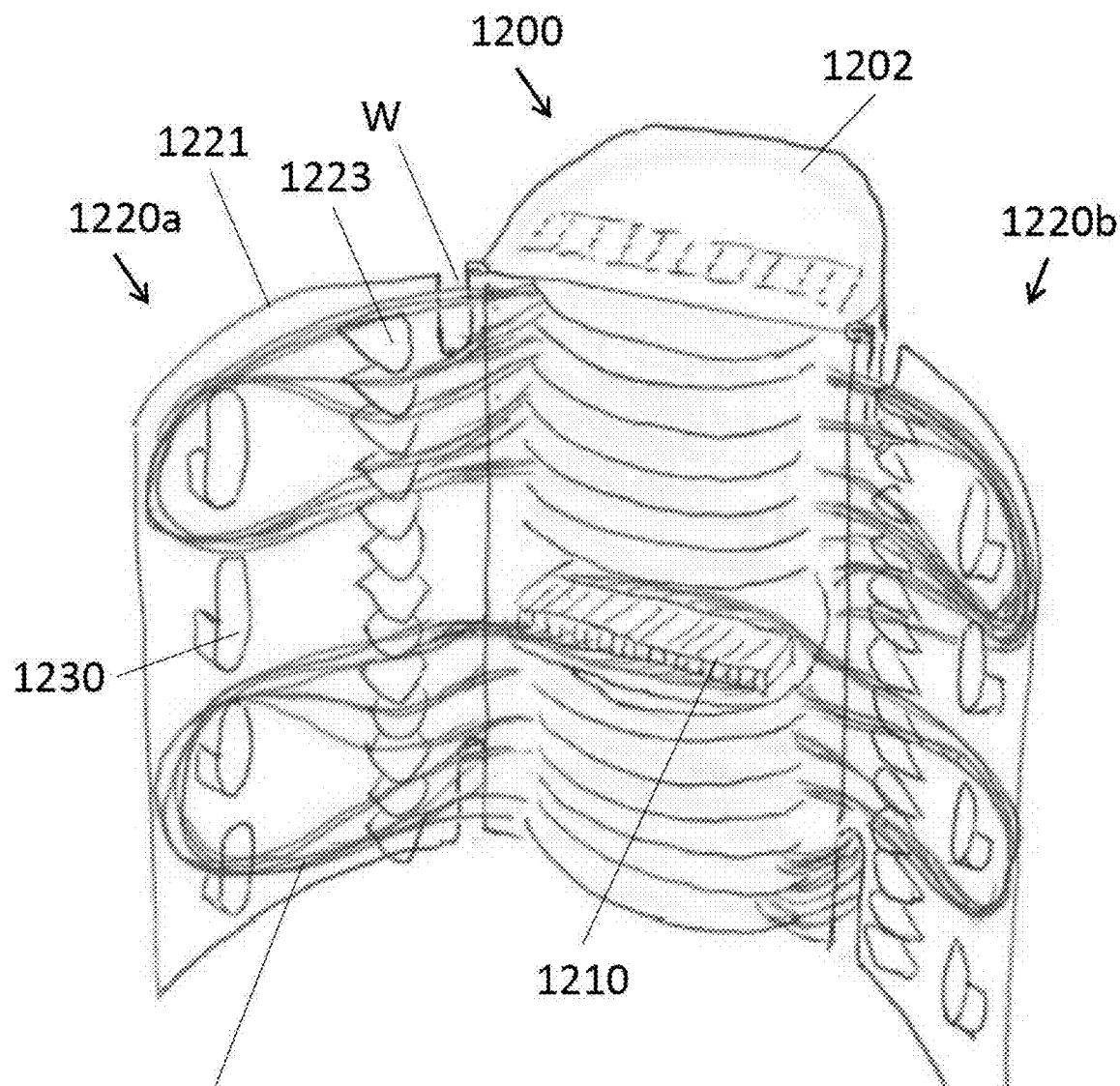
FIG. 15A is a perspective view of another embodiment of a patch panel system with hanger plate assemblies in an open condition.

FIG. 15A shows a perspective view of patch panel system 1200 with hanger plate assemblies 1220a, 1220b in a maintenance condition. Patch panel system 1200 may include a housing 1202. In the illustrated embodiment, housing 1202 may have a substantially cylindrical shape. As shown, housing 1202 does not form a fully enclosed cylinder, but rather includes a closed portion that has the shape of a portion of a cylinder, with an open proximal face to allow access to cassettes 1210 and cables C stored therein. Housing 1202 may include a plurality of slots stacked in a vertical arrangement, with each slot adapted to hold a tray or cassette 1210 in sliding engagement with the slot, although in practice every slot may not necessarily have a cassette 1210 received therein. Cassettes 1210 may be substantially similar to the cassettes 1010 described above, with the cassettes being in a vertically stacked configuration, although only one cassette is illustrated in FIG. 15A. Cassettes 1210 may be modified compared to other cassettes described herein in order to better fit within the cylindrically shaped housing 1202, whereas other cassettes such as cassettes 1010 are configured to be received within a rectangular housing. However, other than the particular shape of cassettes 1210, the cassettes may otherwise be similar or identical to the cassettes described above.

Figure 15B:
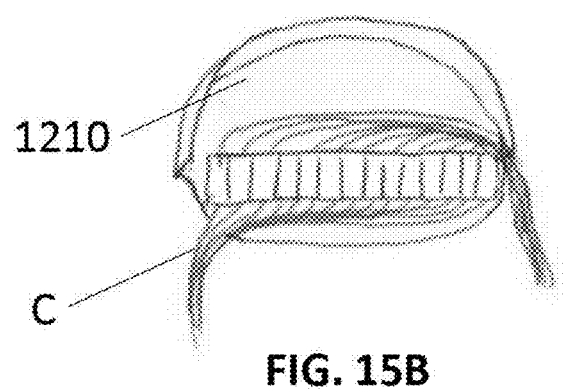
FIG. 15B is a top view of a cassette of the patch panel system of FIG. 15A.
Figure 18:
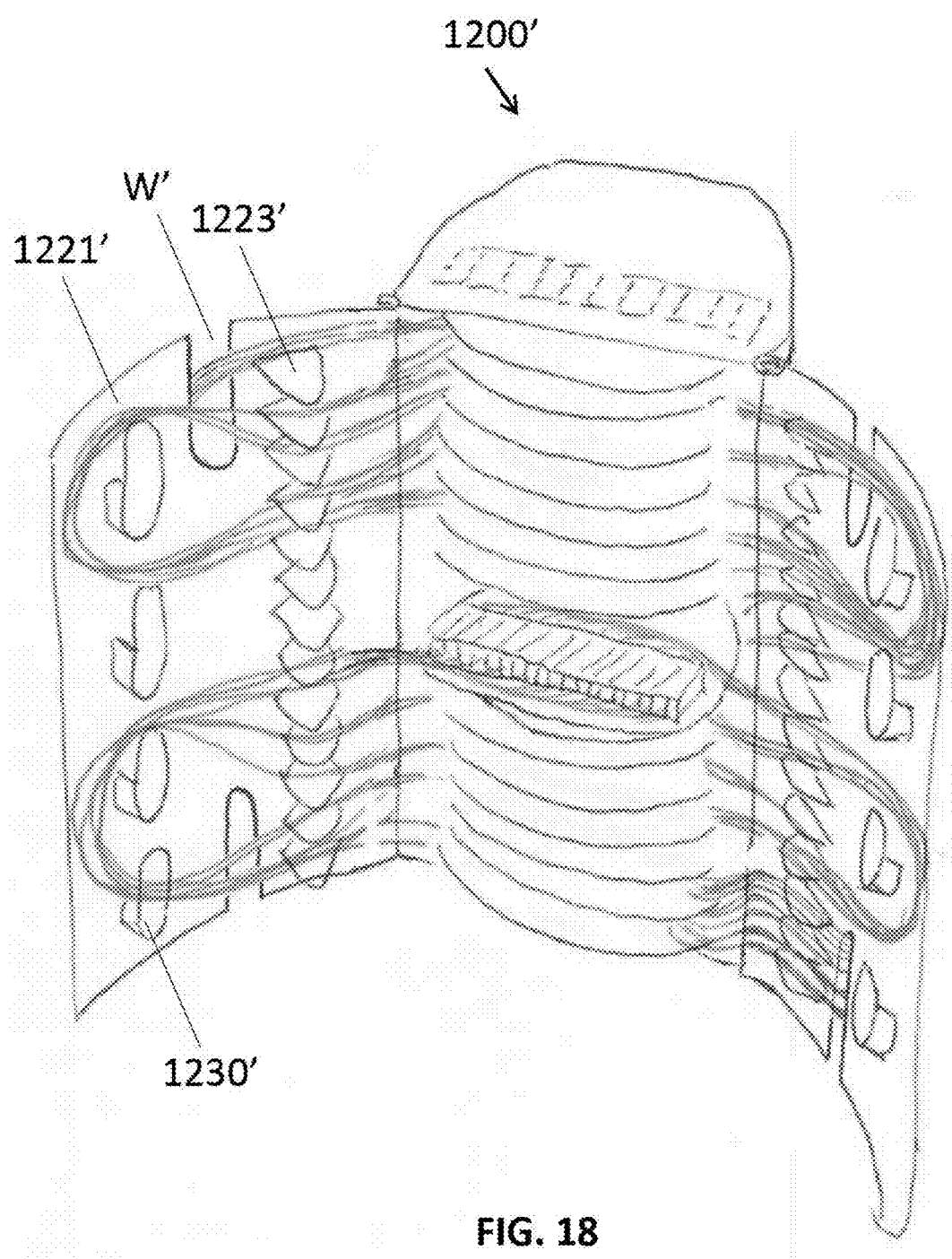
FIG. 18 is a perspective view of a modified version of the patch panel system of FIG. 15A.

To assist in the management of cables C connected to patch panel system 1200, the patch panel system includes pivotable hanger plate assemblies 1220a, 1220b. Hanger plate assembly 1220a may be substantially a mirror image of hanger plate assembly 1220b, but otherwise identical or nearly identical. Thus, only hanger plate assembly 1220a is described in detail. Hanger plate assembly 1220a may include a hanger plate 1221, which may be a single, curved plate having a first edge pivotably coupled to housing 1202 and a second free edge opposite the first edge. Although shown as a single curved plate, hanger plate 1221 may otherwise be formed of a plurality of plates that are coupled together, similar to other hanger plate assemblies described above. A plurality of hangers 1223 may be positioned on the inner face of hanger plate 1221, near the first edge of the hanger plate coupled to housing 1202. Hangers 1223 may be similar in structure to any of the hangers described above, including having at least one substantially flat surface on which cables C may rest. Preferably, each hanger 1223 is associated with a cassette 1210 (or otherwise a corresponding slot within housing 1202). An exemplary cassette 1210 is illustrated in FIG. 15B. In addition to hangers 1223, a plurality of cable retainers 1230 may be positioned on the interior face of hanger plate 1221, preferably in a vertically aligned configuration. Cable retainers 1230 may be substantially similar or identical to cable retainers 1130, and are preferably positioned near the second edge of hanger plate 1221. Hanger plate 1221 may also include a plurality of windows W to allow cables C to pass across hanger plate assembly 1220a and exit patch panel system 1200. In the illustrated embodiment, each window W is formed as a vertical slot in a top or bottom edge of the hanger plate 1221 between the hangers 1223 and the first edge of the hanger plate pivotably coupled to the housing 1202. However, it should be understood that windows W could take other shapes, positions, and more or fewer windows could be provided. For example, FIG. 18 illustrates a patch panel system 1200' that is identical to patch panel system 1200 in all respects, with the exception that windows W' are formed in the top and bottom edges of hanger plate 1221' between the hangers 1223' and the cable retainers 1230'.

Figure 15C:
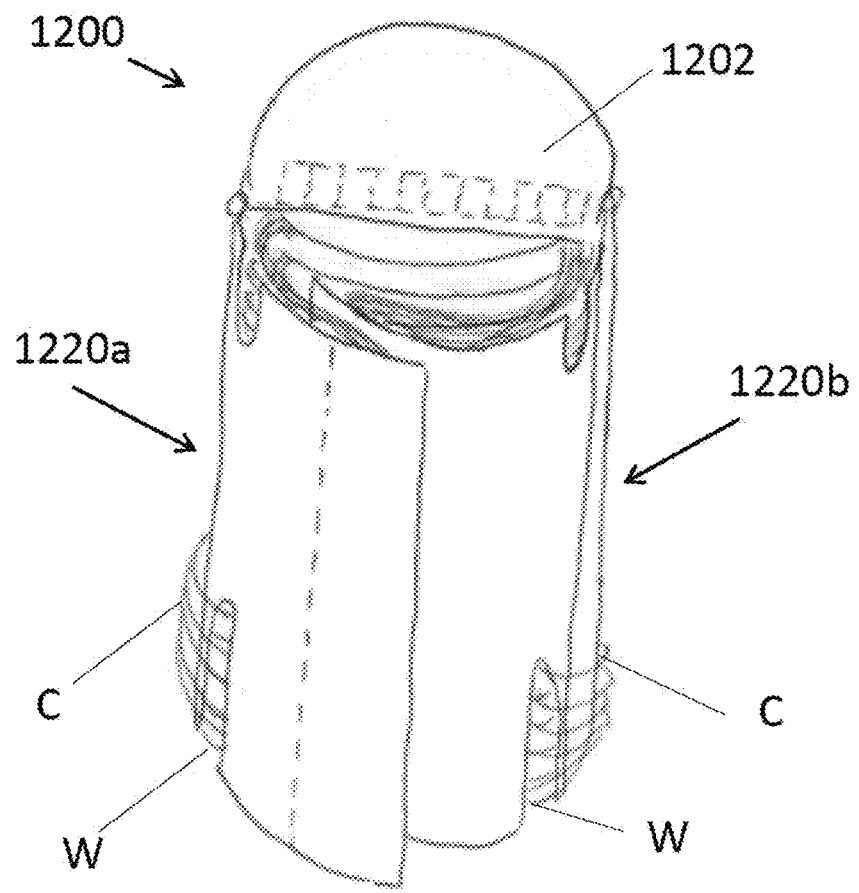
FIGS. 15C-D are perspective and top views, respectively, of the patch panel system of FIG. 15A with hanger plate assemblies in a stored condition.
Figure 15D:
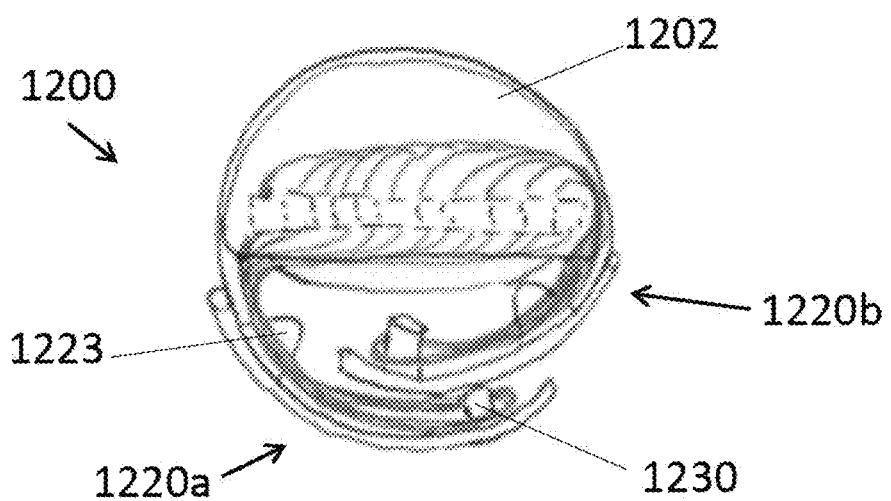

As shown in FIG. 15A, cables C may pass from the front or rear of connectors on a cassette 1210, pass over and rest upon a corresponding hanger 1223, wrap around one or more cable retainers 1230, pass over and rest upon another hanger, and connect to connectors at the front or rear of a cassette on a different vertical level within housing 1202. Alternately, some cables C may pass through one of the windows W and connect to a separate component outside of patch panel system 1200. A user may perform maintenance on cables C of patch panel system 1200 when the hanger plate assemblies 1220a, 1220b are in an open or maintenance condition shown in FIG. 15A. When maintenance is complete, the user may rotate the hanger plate assemblies 1220a, 1220b toward the open face of housing 1200, which may be referred to as a stored or installed condition and is shown in FIGS. 15C-D. In the stored condition, one of the hanger plate assemblies 1220a, 1220b may at least partially overlie the other hanger plate assembly. This may result in housing 1202 and the hanger plate assemblies 1220a, 1220b together having a substantially cylindrical shape, with the majority of cables C being hidden and protected behind one or both of the hanger plate assemblies. It should be understood that although two hanger plate assemblies 1220a, 1220b are shown, a single hanger plate assembly may be sufficient, with the single hanger plate assembly preferably being dimensioned to cover most or all of the open face of the housing 1202 when the hanger plate assembly is in the stored condition.

Figure 16A:
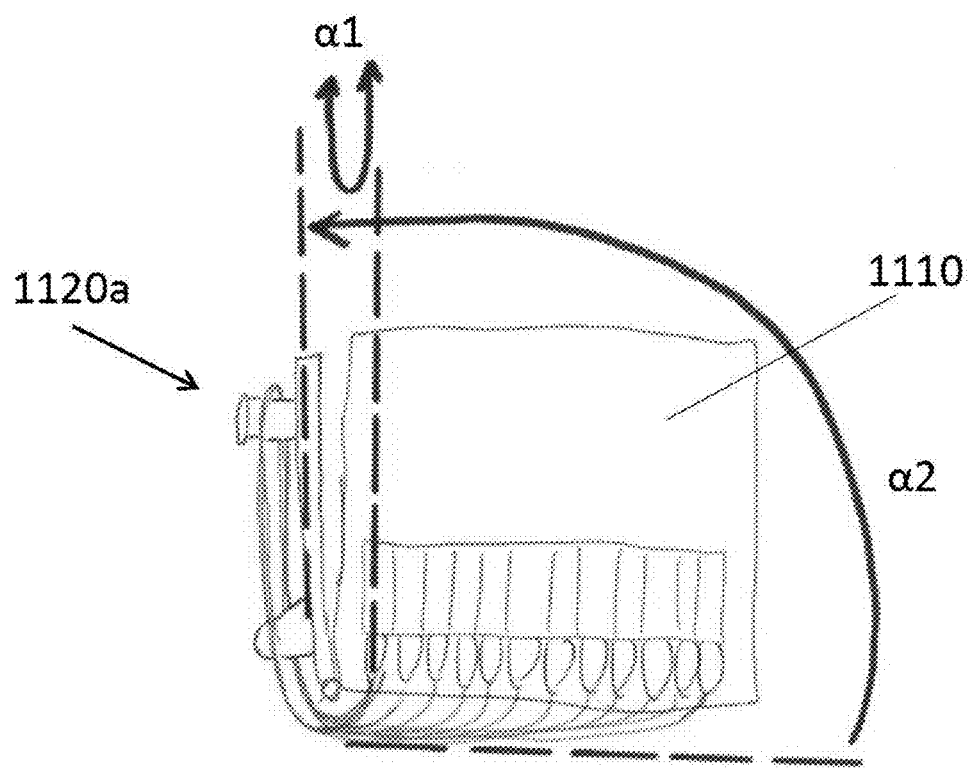
FIGS. 16A-B are schematic illustrations comparing cable bend angles of the patch panel systems of FIGS. 13A and 15A in the stored condition of the hanger plate assemblies, respectively.
Figure 16B:
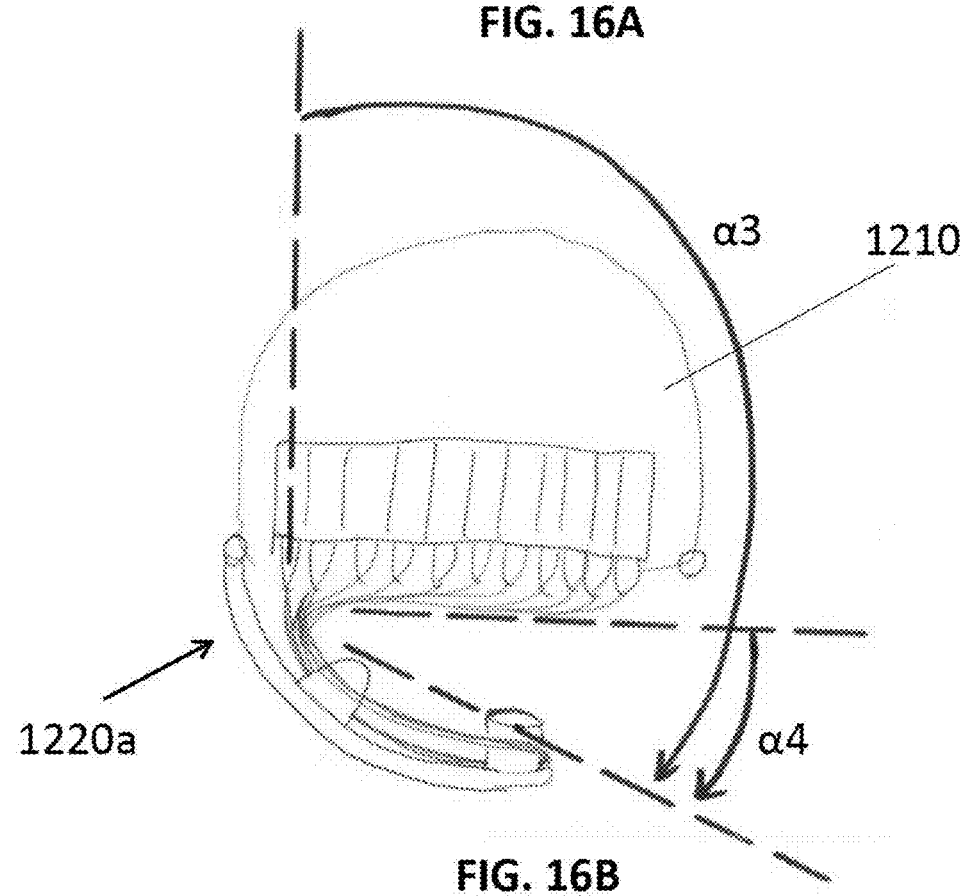

When the hanger plate assemblies 1220a, 1220b of patch panel system 1200 are in the maintenance or open condition as shown in FIG. 15A, cables C may be subjected to a maximum level of stress or tension. When the hanger plate assemblies 1220a, 1220b of patch panel system 1200 are in the installed or stored condition as shown in FIGS. 15C-D, the cables C may be subjected to a minimal level of stress or tension. Advantageously, patch panel system 1200 may avoid producing tension on, and limit an extent and degree of turns or bends in, the cables C when the hanger plate assemblies 1220a, 1220b patch panel system 1200 are in the stored condition. FIGS. 16A-B illustrate top cut-away views of patch panel systems 1100 and 1200 when the hanger plates are in the stored/installed condition, respectively, to illustrate the point. In particular, when hanger plate 1120a of patch panel system 1110 is in the stored condition, the cables connected closest to the hinge of the hanger plate assembly 1120a may bend to an angle $\alpha 1$, which may approach 0 degrees. The cables connected farthest away from the hinge of the hanger plate assembly 1120a may bend to an angle $\alpha 2$, which may approach 90 degrees. In comparison, in the stored condition of the hanger plate 1220a of patch panel system 1200, the cables connected closest to the hinge may experience a bend to an angle $\alpha 4$ of not less than about 45 degrees, with the cables connected farthest from the hinge experiencing bending to an angle 3, which may approach 135 degrees. By providing for reduced tension and a minimum bend angle of the cables in the stored condition of patch panel system 1200, advantageously optical signal loss and mechanical stress on the cables C may be avoided.

It should be understood that other patch panel systems described herein, such as patch panel system 1000 and 1100, may be modified so that the hanger plate assemblies rotate similar to hanger plate assemblies 1220a, 1220b of patch panel system 1200. In other words, patch panel systems 1000 and 1100 may be modified so that the hanger plates rotate in the opposite directions as shown so that, in the stored condition, the hanger plate assemblies at least partially cover the open face of the respective housings, which may result in reduced stress and/or bending in the cables. An additional benefit of this type of modification, is that in the stored or installed condition of the hanger plate(s), the majority of the cables C are not visible to a user. Such a situation may be more intuitive and make it easier for a user to identify when the respective patch panel system is in a condition for maintenance (e.g. because the cables are exposed) and when the patch panel system is in a condition for storage (e.g. because the cables are hidden).

Figure 17:
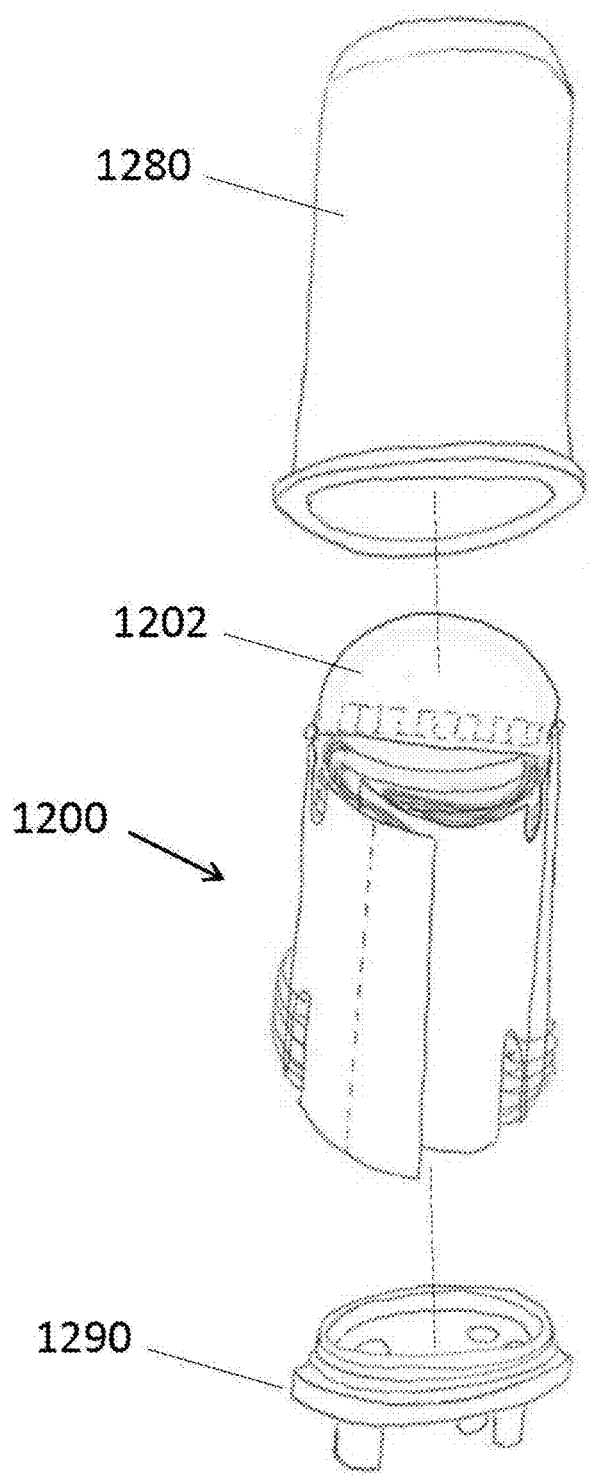
FIG. 17 is a perspective view of a cover for use with the patch panel system of FIG. 15A.

Providing patch panel system 1200 with a substantially cylindrical shape when in the stored condition may provide additional benefits. For example, although patch panel system 1200 could be used in any suitable environment, it may be particularly suited for use in underground environments. For example, for various regulatory or environmental reasons, it may not be possible or allowable for a patch panel system to be positioned above ground or mounted to an above-ground structure. In such a situation, it may be permissible to house the patch panel system underground. If a patch panel system is housed underground, it may be particularly important to seal the interior of the patch panel system from moisture or other environmental conditions that could damage the system. The cylindrical shape of patch panel system 1200 may be suited for use with additional structures to facilitate such a protective environment. For example, as shown in FIG. 17, patch panel system 1200 may be part of a larger system that includes a main cover 1280 and a cover cap 1290. As illustrated, main cover 1280 may be a substantially solid cylindrical member with a hollow interior which may be slid over housing 1202 of patch panel system 1200. Cover cap 1290 may be cylindrical and include mating features, such as external threads, to couple to main cover 1280, for example with a water tight seal. The covering system may provide a high level of protection of patch panel system 1200 when the hanger plates are in the installed condition, and the housing is covered by main cover 1280 and with cap 1290 secured to the main cover.

FIGS. 19A-D show various perspective exploded views of a patch panel system 1300, unassembled, with hanger plates in an open or maintenance condition. FIGS. 20A-D show views corresponding to FIGS. 19A-D in an assembled state, again with hanger plates in the maintenance condition. The patch panel system of FIG. 19A may be generally similar to patch panel system 1200 and may include a support frame 1302 that may have a cross-sectional thickness of between about 2 mm and about 7 mm and include metal such as aluminum. The thickness of support frame 1302 may depend upon the particular metal used, and may be between about 3 mm and about 5 mm, including about 4 mm, if the support frame is formed of aluminum. Frame 1302 may be formed of a single integral piece or multiple pieces joined together, and may include one or more side walls 1304, a top portion 1306, and/or a bottom portion 1308. Frame 1302 may form a housing or may overlie a housing or inner chassis that includes a plurality of slots stacked in a vertical arrangement, with each slot adapted to hold a tray or cassette 1310 in sliding engagement with the slot, although in practice every slot may not necessarily have a cassette 1310 received therein. Cassettes 1310 may be substantially similar to cassettes 1210 or any of the other cassettes described herein. In one embodiment, all components within patch panel system 1300 may be mounted and/or coupled to the frame 1302, and the frame 1302 may be electrically coupled to grounding elements of one or more of the components within the patch panel system 1300 such that the frame 1302 may serve as a common grounding element for the entire patch panel system 1300. The frame may include a top portion that may act as a handle and help guide a protective cap similar to cover 1280 over the frame.

To assist in the management of cables C connected to patch panel system 1300, the patch panel system may include pivotable hanger plate assembles 1320a and 1320b, which may be similar in many respects to hanger plate assemblies 1220a and 1220b. In some embodiments, hanger plate assemblies 1320a and 1320b may be substantial mirror images of one another. However, in the illustrated embodiment, hanger plate assemblies 1320a and 1320b may have at least some differences.

Hanger plate assembly 1320a may include a hanger plate 1321a, which may be a single, curved plate having a first edge pivotably coupled to a first side wall 1304 of frame 1302 and a second free edge opposite the first edge. Although shown as a single curved plate, hanger plate 1321a may otherwise be formed of a plurality of plates that are coupled together, similar to other hanger plate assemblies described above. A plurality of hangers 1323a may be positioned on the inner face of hanger plate 1321a, near the first edge of the hanger plate coupled to frame 1302. Hangers 1323a may be similar in structure to any of the hangers described above, including having at least one substantially flat surface on which cables C may rest. Preferably, each hanger 1323a is associated with a cassette 1310 (or otherwise a corresponding slot within patch panel system 1300). In addition to hangers 1323a, a plurality of cable retainers 1330a may be positioned on the interior face of hanger plate 1321a, preferably in a vertically aligned configuration. Cable retainers 1330a may be substantially similar or identical to cable retainers 1130, and may include a first group extending vertically and a second group extending horizontally, for example where the first group extends about 90 degrees relative to the second group. Hanger plate 1321a may also include one or more recesses or windows W to allow cables C to pass across hanger plate assembly 1320a and exit patch panel system 1300, for example as shown in FIG. 20B. In the illustrated embodiment, windows W are formed as horizontal recesses in the top and bottom edges of the hanger plate 1321a near the first edge of the hanger plate pivotably coupled to the frame 1302. However, it should be understood that windows W could take other shapes, positions, and more or fewer windows could be provided. For example, recesses are also provided in the illustrated embodiment at the top and bottom of the second edge of hanger plate 1321a, and those recesses may be capable of performing the same or a similar function as window W.

Although in some embodiments, hanger plate assembly 1320b may be a mirror image of hanger plate assembly 1320a, in the illustrated embodiment, hanger plate assembly 1320b may have some differences. Hanger plate assembly 1320b may include a hanger plate 1321b, which may be a single plate having a first edge pivotably coupled to a second side wall 1304 of frame 1302 and a second free edge opposite the first edge. Although shown as a single plate, hanger plate 1321b may otherwise be formed of a plurality of plates that are coupled together, similar to other hanger plate assemblies described above. While hanger plate 1321a is shown as curved (with a convex exterior surface and a concave interior surface), hanger plate 1321b may be substantially planar. With the illustrated configuration, in operation it is preferable that, in an installed condition of the hanger plate assemblies 1320a, 1320b, hanger plate 1321b is positioned between cassettes 1310 and hanger plate 1321a. In other words, when transitioning the hanger plate assemblies 1320a, 1320b of patch panel system 1300 from a maintenance condition to an installed condition, hanger plate 1321b is closed first, and hanger plate 1321a is closed second. A plurality of hangers 1323b may be positioned on the inner face of hanger plate 1321b, near the first edge of the hanger plate coupled to frame 1302. Hangers 1323b may be similar in structure to any of the hangers described above, including having at least one substantially flat surface on which cables C may rest. Preferably, each hanger 1323b is associated with a cassette 1310 (or otherwise a corresponding slot within patch panel system 1300). In addition to hangers 1323b, a plurality of cable retainers 1330b may be positioned on the interior face of hanger plate 1321b, preferably in a vertically aligned configuration. Cable retainers 1330b may be substantially similar or identical to cable retainers 1130, and may extend vertically. Hanger plate 1321b may also include one or more recesses or windows W to allow cables C to pass across hanger plate assembly 1320b and exit patch panel system 1300. In the illustrated embodiment, windows W are formed as slots at the top and bottom of the edge of the hanger plate 1321b that is coupled to side wall 1304. However, it should be understood that windows W could take other shapes, positions, and more or fewer windows could be provided. The top and/or bottom of hanger plate 1321b may also include horizontal slots that may function as handles H to facilitate a user gripping positioning hanger plate 1321b.

Figure 20C:
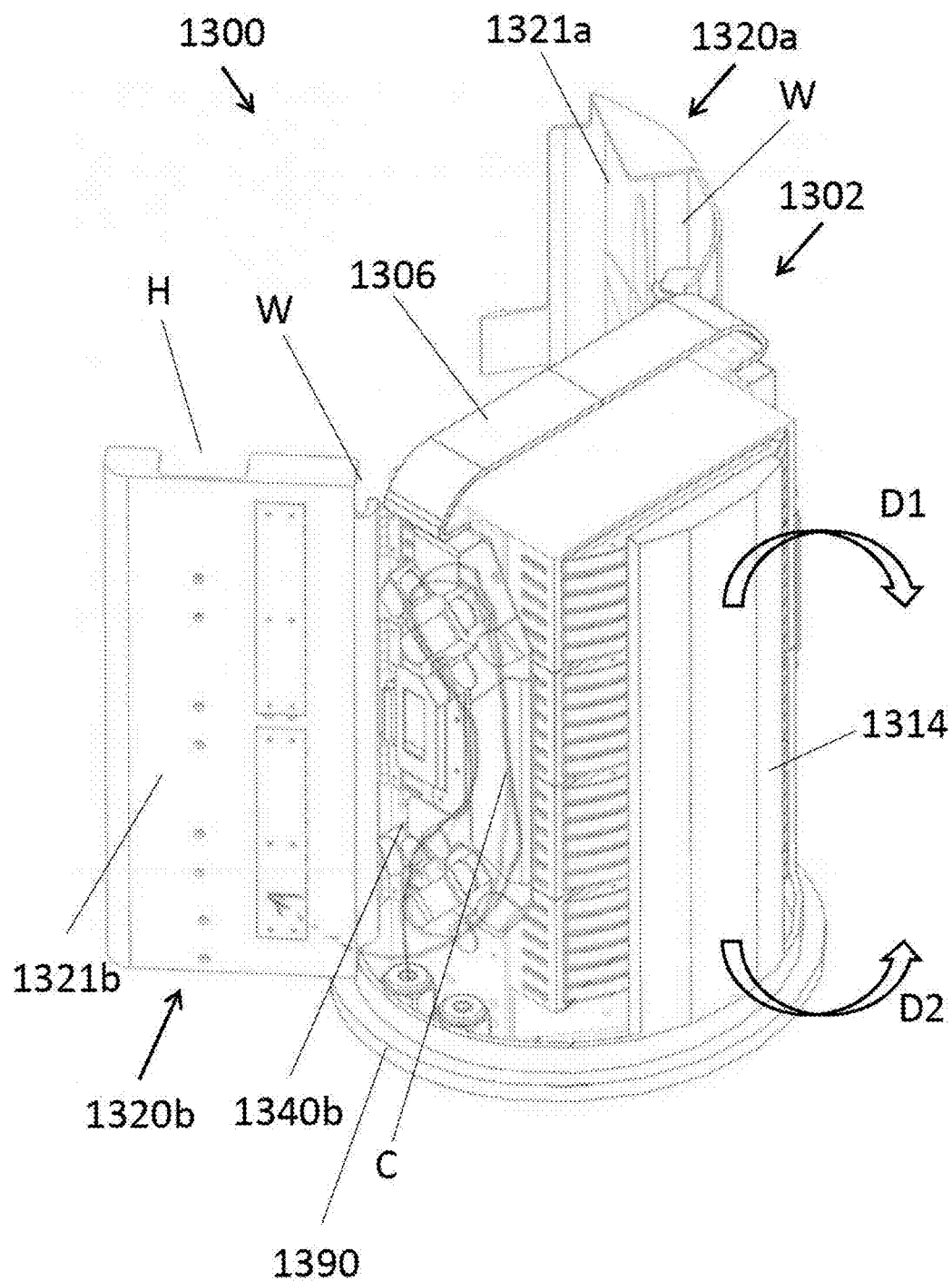
Figure 20D:
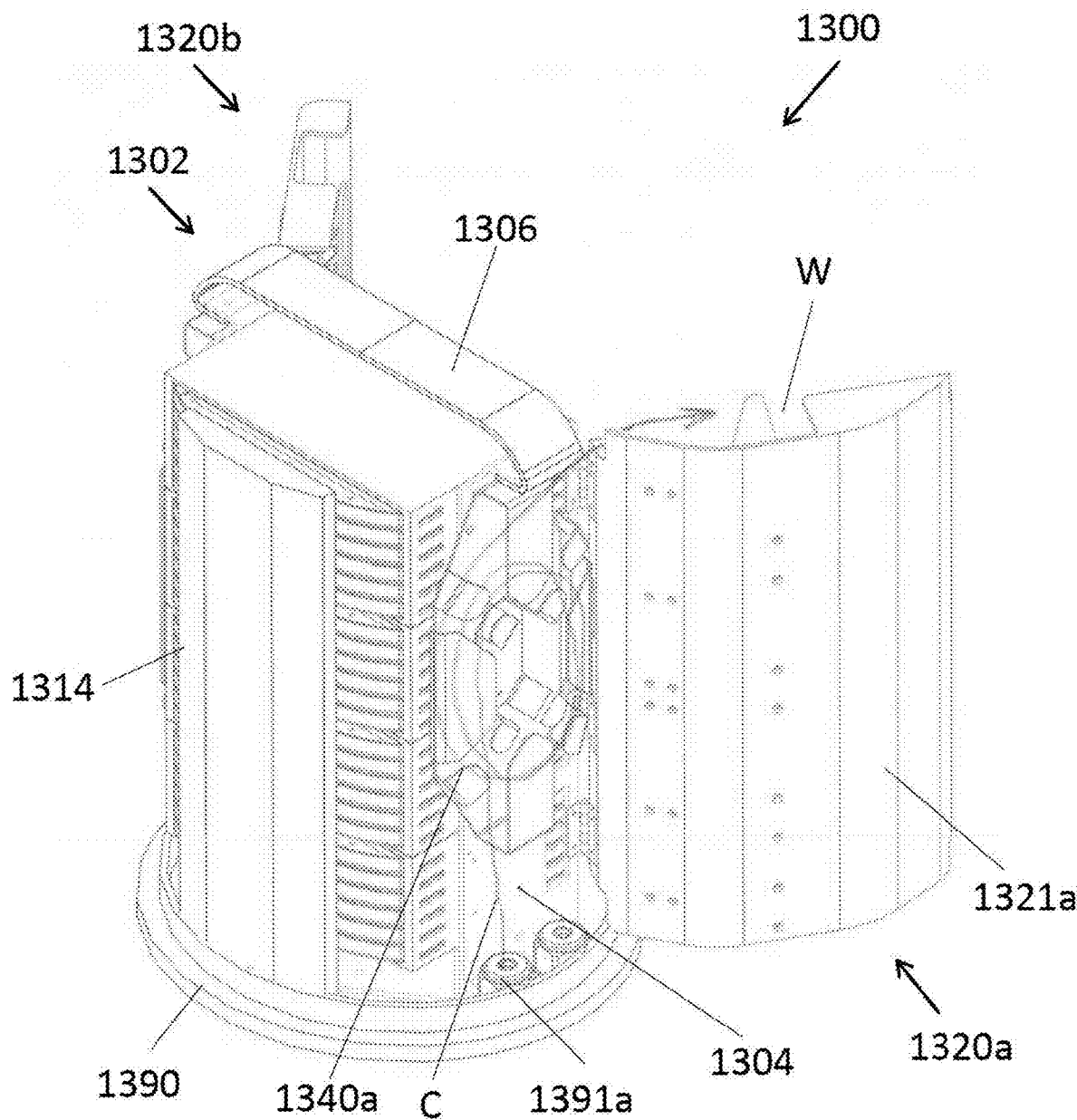
Figure 21A:
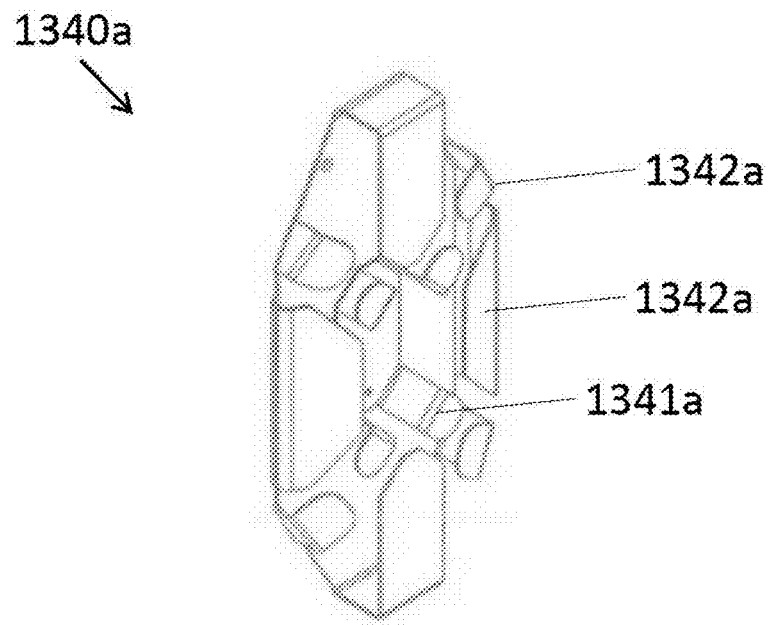
FIGS. 21A-B are perspective views of side hangers of the patch panel system of FIGS. 19A-D.
Figure 21B:
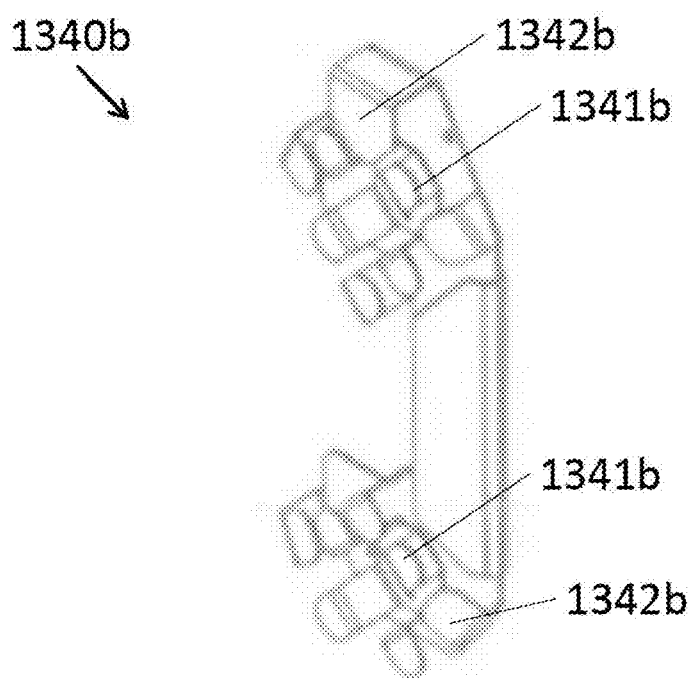

Patch panel system 1300 may further include one or more side hangers 1340a-b. Side hangers 1340a-b are preferably formed of metal, although other materials may be suitable. In the illustrated embodiment, one side hanger 1340a is mounted on the first side wall 1304 adjacent hanger assembly 1320a, and another side hanger 1340b is mounted on the second side wall 1304 adjacent hanger assembly 1320b. Side hangers 1340a-b are illustrated in isolation in FIGS. 21A-B. Both side hangers 1340a-b may include may include a plurality of first extension members 1341a-b that extend substantially orthogonally away from the corresponding side walls 1304 and include tips that extend substantially parallel to the corresponding side walls. The first extension members 1341a-b may be grouped in clusters, with the tips of the extension members extending away from a center of the cluster. In the illustrated embodiment, side hanger 1340a includes one cluster of four extension members 1341a, and side hanger 1340b includes two clusters of four extension members 1341b, although it should be understood that the number and position of the extension members may be different in other embodiments. Both side hangers 1340a-b may also include a plurality of second extension members 1342a-b that extend substantially orthogonally away from the corresponding side walls 1304 and include tips that extend substantially parallel to the corresponding side walls, but in opposite direction to the tips of extension members 1341a-b. With this configuration, cables C entering or exiting patch panel system 1300 may be routed around and through a cluster of first extension members 1341a-b and may be at least partially surrounded by corresponding second extension members 1342a-b, helping to keep the cables C in place, for example as shown in FIGS. 20C-D.

Patch panel system 1300 may include a base 1390 onto which the bottom side 1308 of frame 1302 is mounted. Base 1390 may be substantially circular and include one or more ports 1391a positioned to be adjacent to the side wall 1304 of frame 1302 adjacent hanger plate assembly 1320a when the system is assembled, and one or more ports 1391b positioned to be adjacent to the side wall 1304 of frame 1302 adjacent hanger plate assembly 1320b when the system is assembled. In the illustrated embodiment, base 1390 may include two ports 1391a and two ports 1391b for cables respectively entering and exiting patch panel system 1300 on each side of the frame, although other numbers and positions of ports may be suitable. In some embodiments, base 1390 may be formed of a metal.

Figure 21C:
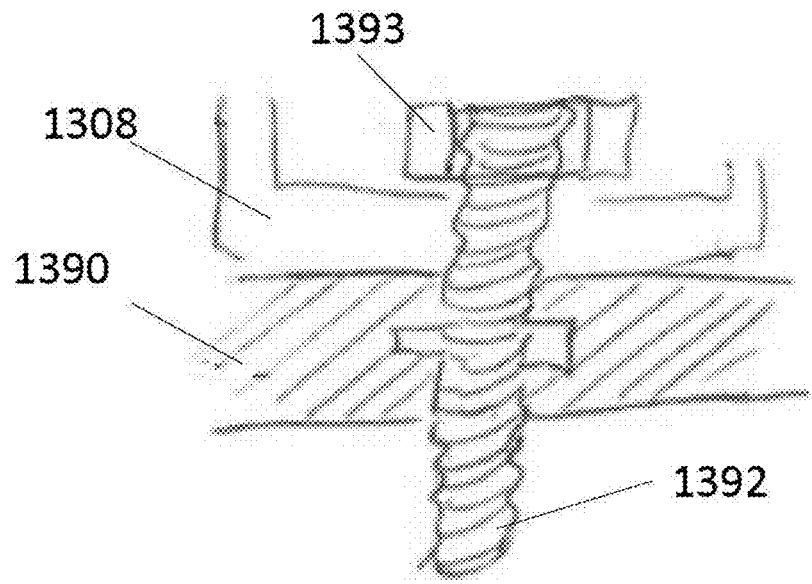
FIGS. 21C-E are cross-sections of different options of coupling a frame to a base of the patch panel system of FIGS. 19A-D.
Figure 21D:
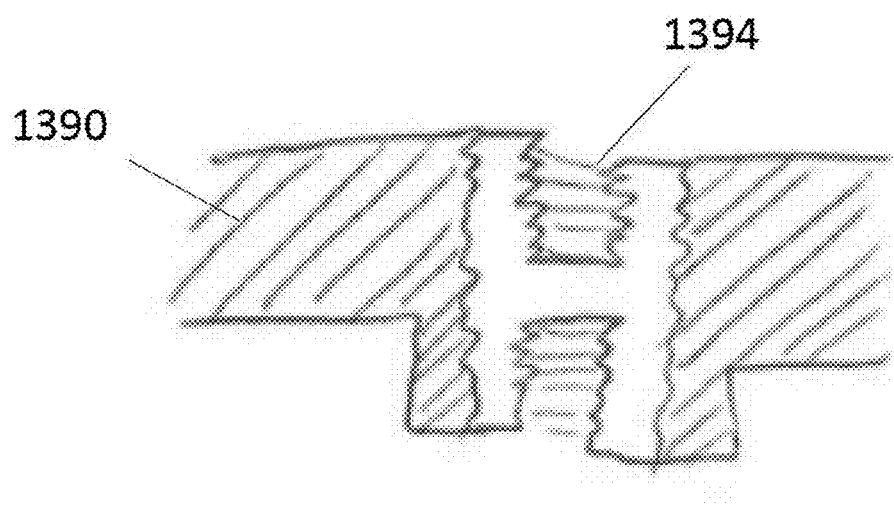
Figure 21E:
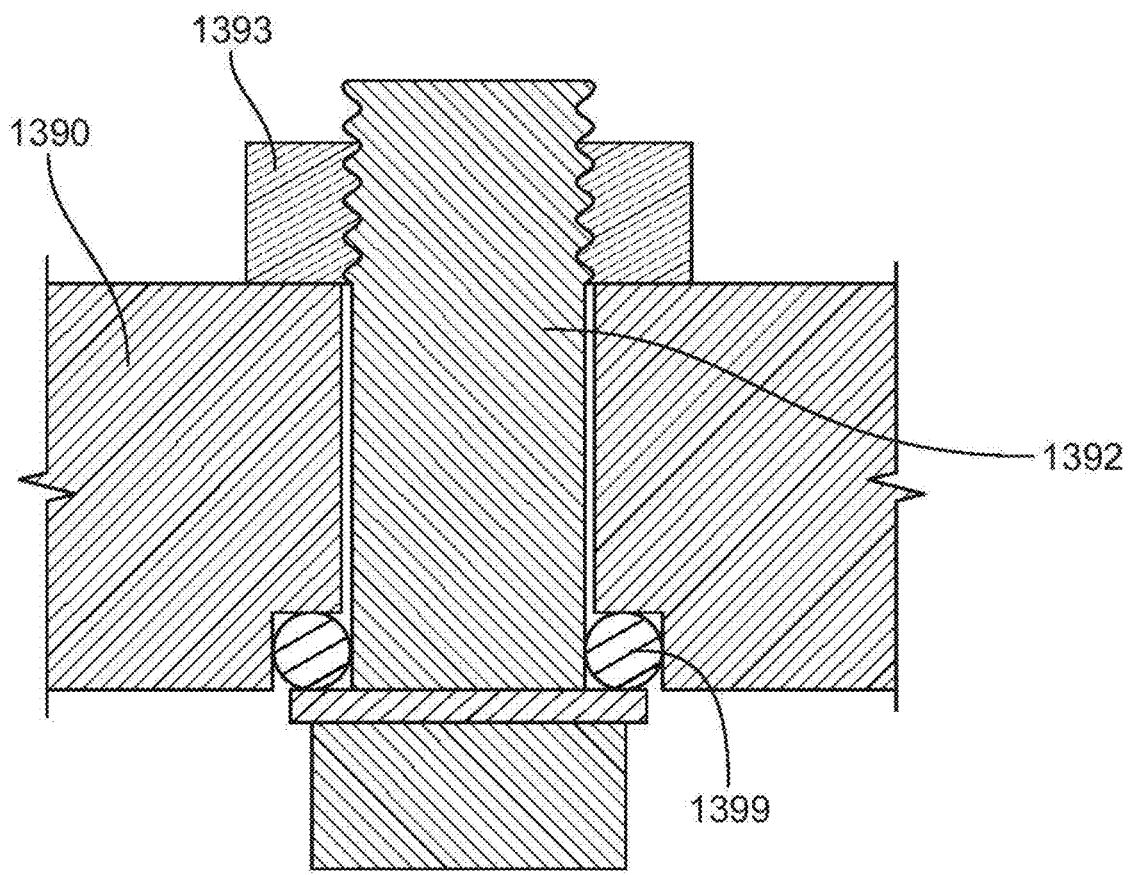

In other embodiments, it may be preferable that base 1390 is formed of a plastic and mounted to frame 1302 via metal bolts to assist in grounding patch panel system 1300. For example, as shown in FIG. 21C, base 1390 may include a plurality of male-to-male connectors in the form of bolts 1392 that can be secured through corresponding holes in the bottom 1308 of frame 1302 via nuts 1393 or other anchoring members. In other embodiments, as shown in FIG. 21D, base 1390 may include one or more female-to-female connectors 1394 that may be utilized to secure the bottom 1308 of frame 1302 to base 1390. It should be understood that other suitable mechanisms may be used to couple the frame 1302 to the base 1390. For example, as shown in FIG. 21E, a bolt 1392 may have a first threaded end over which a nut 1393 may be threaded. A second end of bolt 1392 may include a head, as shown, or may otherwise include threading with another nut similar to the first end of the bolt. One or more gaskets, such as O-ring 1399, may interface between the bolt 1392 and the base 1390. In the illustrated example, O-ring 1399 is positioned within a recess in base 1390 and around a shaft of bolt 1392. O-ring 1399 or other gaskets may facilitate sealing between the base 1390, bolt 1392, and/or frame 1302, particularly if the bolt and base have different coefficients of thermal expansion. In such cases, O-ring 1399 may help maintain a seal if bolt 1392 expands at a different rate than base 1390 as temperatures change. The use of metal bolts may provide an externally accessible grounding element for the entire patch panel system 1300 based on the bolt being electrically conductively coupled to the frame 1302.

Figure 21F:
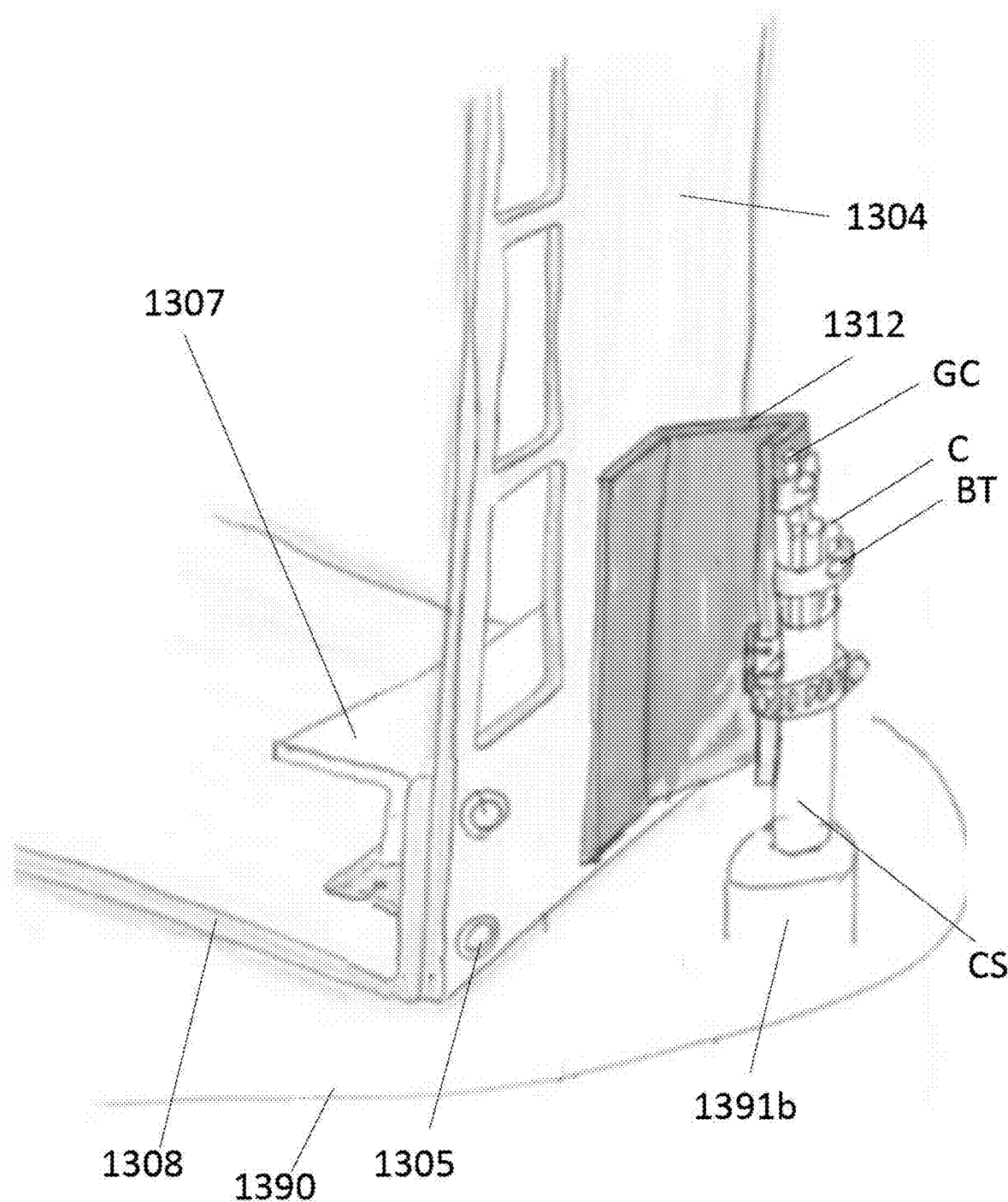
FIG. 21F is a perspective view of a bracket for use with the patch panel system of FIGS. 19A-D.

FIG. 21F shows an enlarged view of portions of frame 1302 coupled to base 1390, with other components omitted for clarity of illustration. In some embodiments, the bottom 1308 of frame 1302 may be integral with the side walls 1304 of the frame. In the illustrated embodiment, however, the bottom 1308 and side walls 1304 of frame 1302 are formed as separate pieces and coupled together with fasteners 1305, which may be metal bolts with lock washers, although other fasteners may be appropriate. One or more shelves or ribs 1307 may be provided on an interior of frame 1302, including attached to side wall 1304, which may support cassettes 1310 thereon. One or more brackets 1312 may also be coupled to frame 1302, for example one at each side wall 1304, to assist in securing incoming and/or outgoing cables C or groups of cables and to provide a grounding element extending from the frame 1302. Bracket(s) 1312 may be integral with or separately attached to frame 1302. An outer cable sheath CS passing through a port 1391b may be crimped or otherwise fixed to the bracket 1312. A buffer tube BT interior to the outer cable sheath CS may be crimped or otherwise fixed to the bracket 1312, and also inner cables C within the outer cable sheath CS may be separately fixed together for example by crimping. If a ground conductor GC is included in the bundle of cables C, the ground conductor GC may be separately fixed to the bracket 1312 for example by crimping. The ground conductor GC, if used, may function to ground the patch panel system 1300, including a cover 1380 if the cover is electrically conductive. If a ground conductor GC is used, the bracket 1312 is preferably formed of metal or another conductive material. The connections of the cable(s) C to the bracket 1312 may help resist pulling forces experienced by the cables C passing through the port 1391b in the base 1390.

Figure 21G:
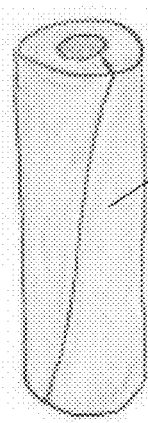
FIG. 21G illustrates an exemplary gasket for use in providing at a port of the patch panel system of FIGS. 19A-D through which a cable may pass.

FIG. 21G illustrates an exemplary gasket 6000 that may be used to create a seal extending from a cable sheath, such a cable sheath CS of a cable as shown in FIG. 21F, to the base 1390 and/or other portions of port 1391b, although it should be understood that gasket 6000 may be used for creating a seal extending from cables to any other structures through which the cables may pass as described herein. In the illustrated example, gasket 6000 may be substantially cylindrical with an opening passing therethrough for receiving cables, including cables in a cable sheath CS. The gasket may include one or more side openings, such as a slit extending along a longitudinal length of the gasket 6000, to more easily pass cables from a position outside the gasket to a position within the gasket. Preferably, gasket 6000 is formed of a soft rubber tubing, although other materials, and in particular elastomeric materials, may be suitable for use. Further, although gasket 6000 is illustrated as a cylinder with a central opening and a slit extending along the longitudinal length of the gasket, other shapes may be suitable depending on the shape of the volume in which the gasket is intended to be positioned.

Figure 21H:
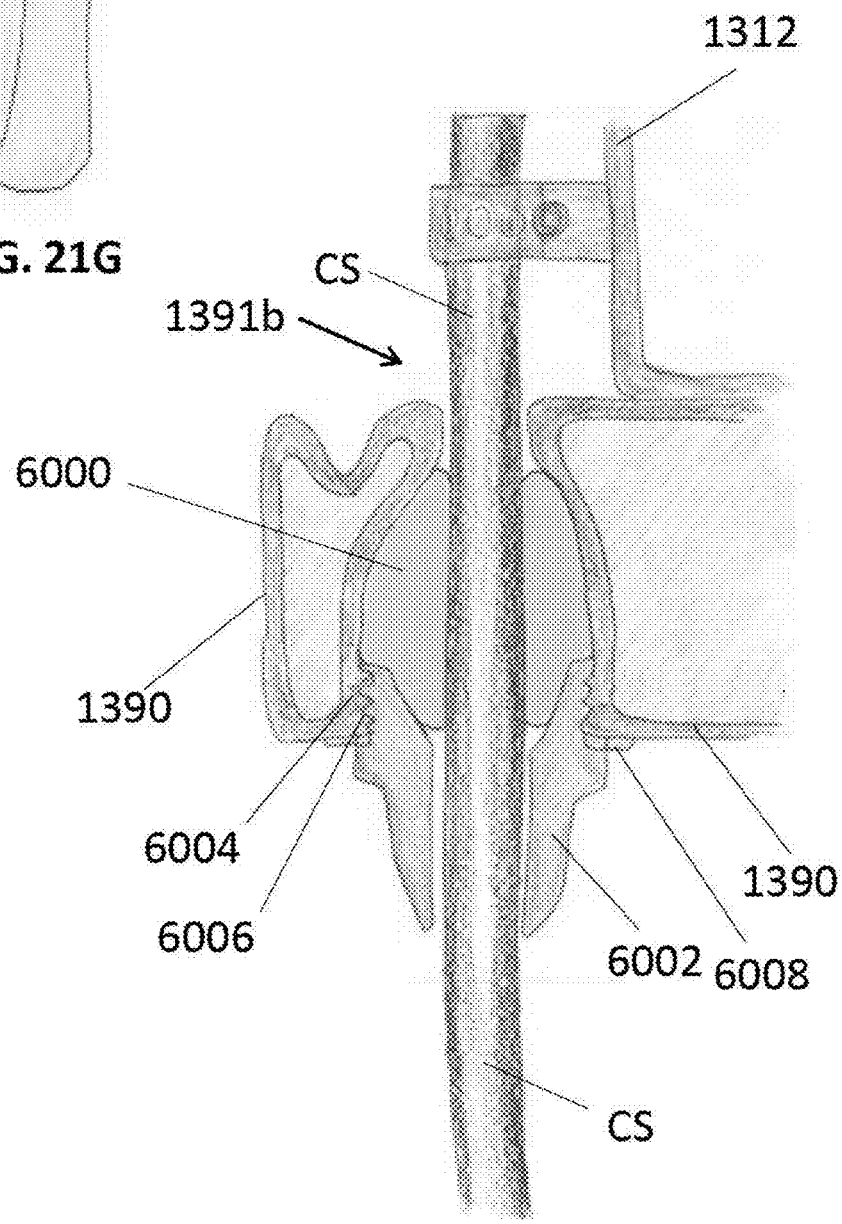
FIG. 21H illustrates the gasket of FIG. 21G in an installed state.

FIG. 21H illustrates a cross-sectional view of gasket 6000 in use within base 1390 with a cable sheath CS passing through port 1391b. It should be understood that although gasket 6000 may have a substantially cylindrical shape, when in position within port 1391b the gasket may be compressed and change shape to substantially fill the volume in which it is positioned. FIG. 21H also illustrates a strain relief member 6002, which may be generally cylindrical, conical, or frustoconical, include a central opening to allow for cable sheath CS to pass therethrough, and may include external threads 6006 or other mating features to engage with internal threads 6004 or other corresponding internal mating features of port 1391b. Strain relief member 6002 may help prevent or reduce strain on cables within cable sheath CS if the cable sheath is pulled sideways or bent at a position adjacent or spaced from the strain relief member. One or more rotation stoppers or lockers 6008 may be positioned on a bottom surface of base 1390 adjacent port 1391*b* to help reduce the likelihood of the strain relief member 6002 unintentionally being rotated to loosen or disconnect the strain relief member 6002 from the base 1390. One potential benefit of gasket 6000 is that the seal provided by gasket 6000 may be less sensitive to differences in the coefficient of thermal expansion between the base 1390 and the gasket 6000 compared to other seals described herein. For example, as temperature of the environment changes, a change in temperature of the base 1390 and the gasket 6000 may not result in any significant reduction in the effectiveness of the seal provided by the gasket.

Figure 21I:
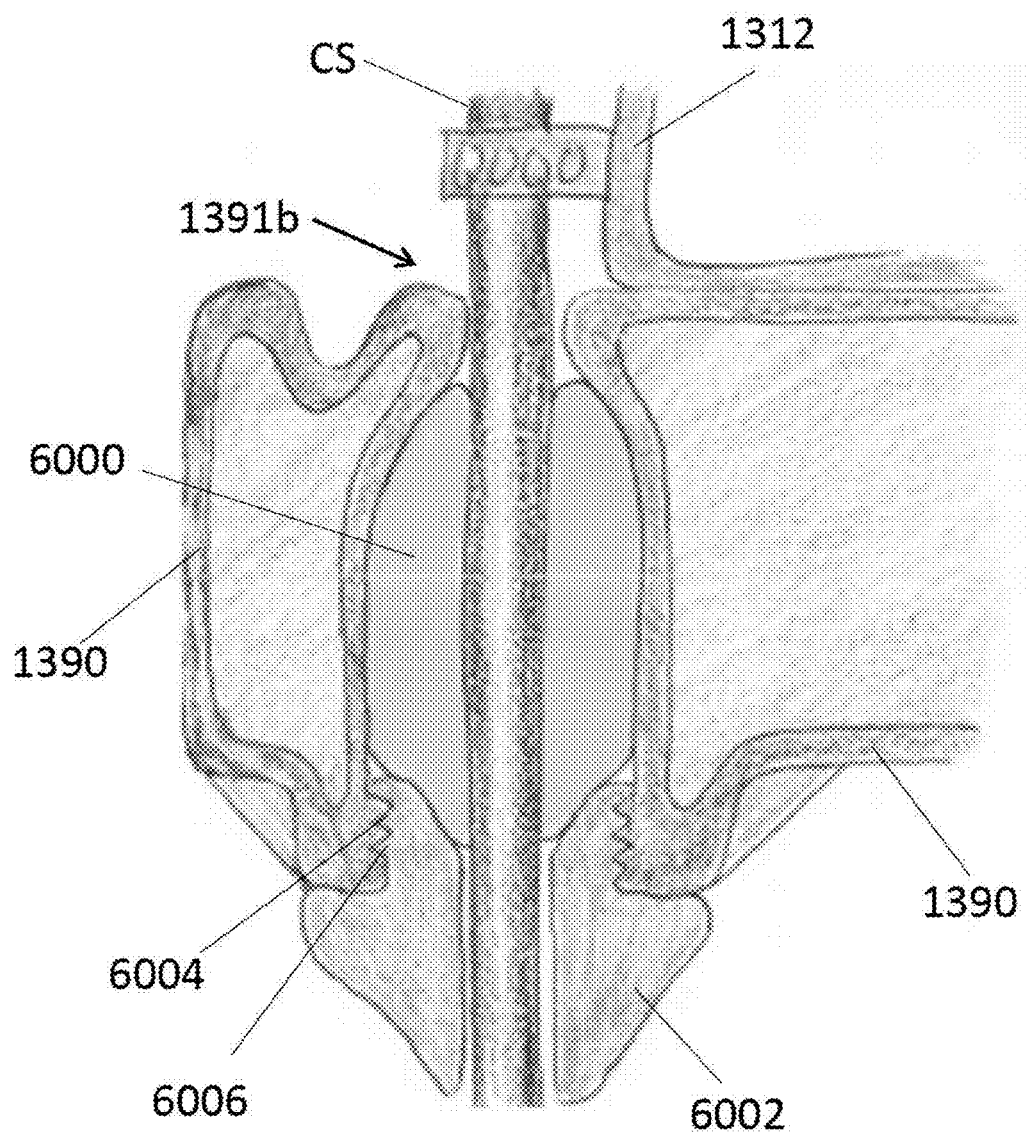
FIG. 21I illustrates an alternate gasket for use in an alternate port similar to that shown in FIG. 21H.

FIG. 21I illustrates gasket 6000 in a port 1391*b* that is an alternate to that shown in FIG. 21H. In particular, it may be preferable to provide a gasket 6000 that has a length extending substantially the longitudinal length of the port 1391*b* in order to help ensure a good seal between the cable sheath CS and the interior of base 1390. The internal threads 6004 on base 1390 may be provided on an extension member that extends below the remainder of the bottom surface of base 1390, which may allow for a longer longitudinal length gasket 6000 to be used compared to that shown in FIG. 21H, which may provide for a better seal.

Figure 21J:
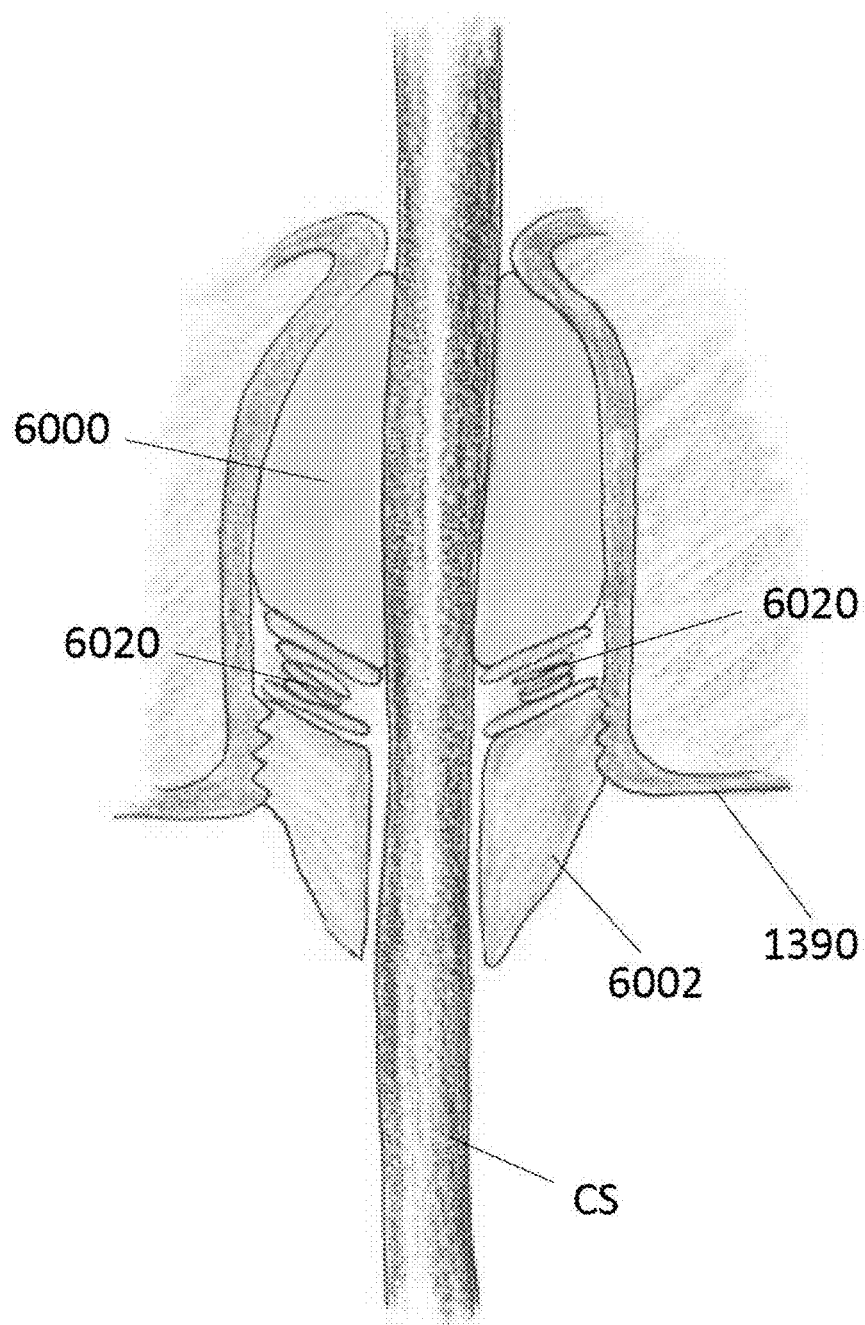
FIGS. 21J-M illustrate the use of biasing members with gaskets similar to that of FIG. 21G arranged to maintain a seal over time.
Figure 21K:
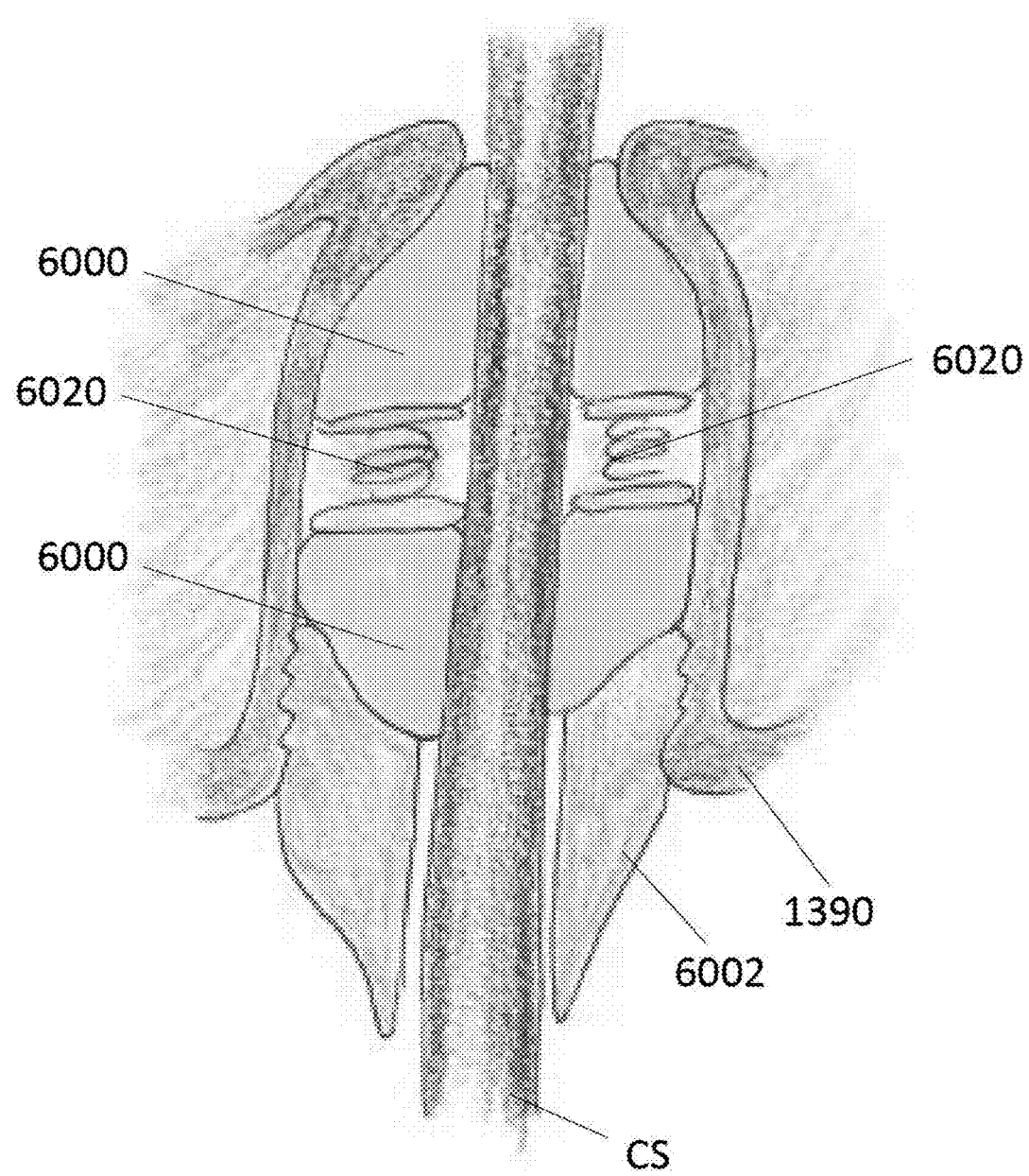
Figure 21L:
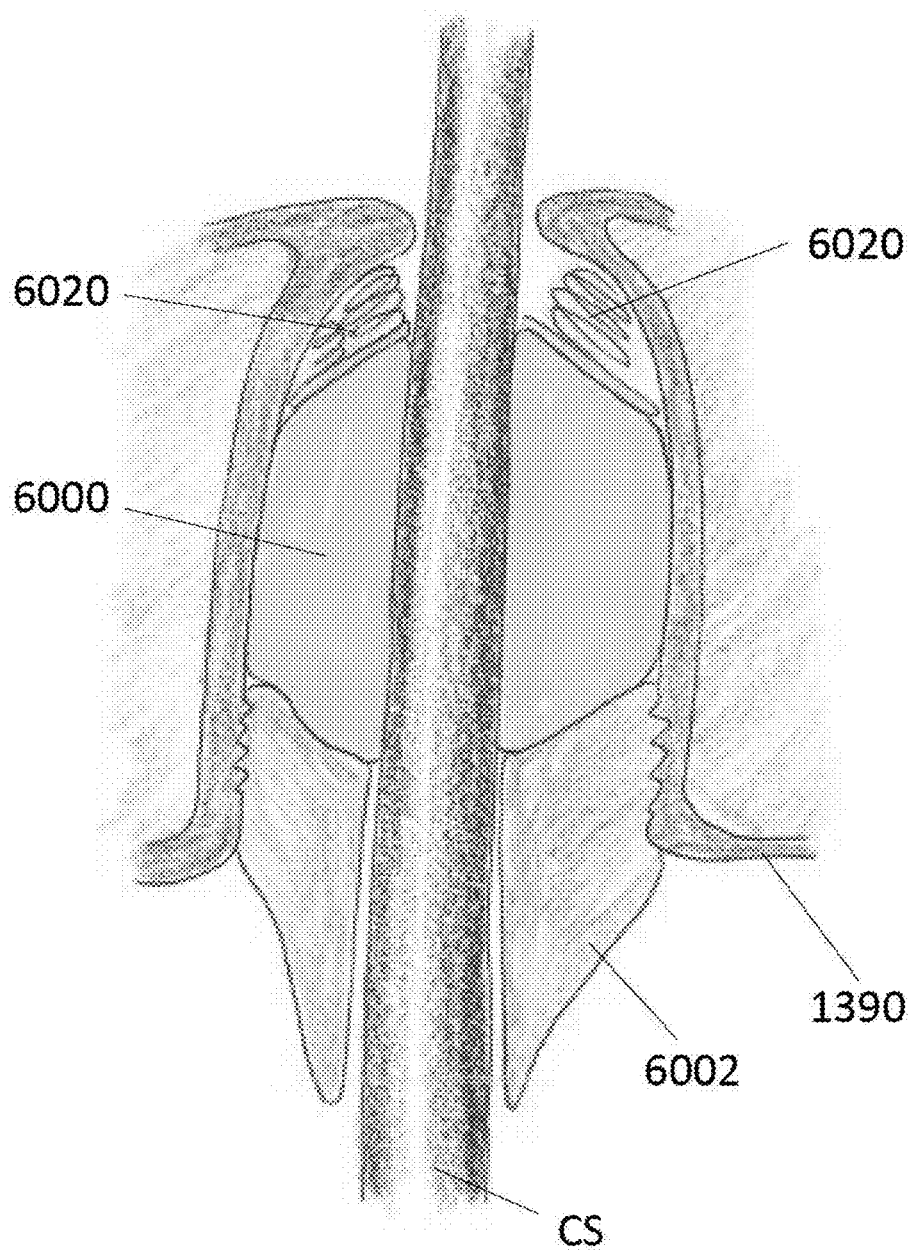
Figure 21M:
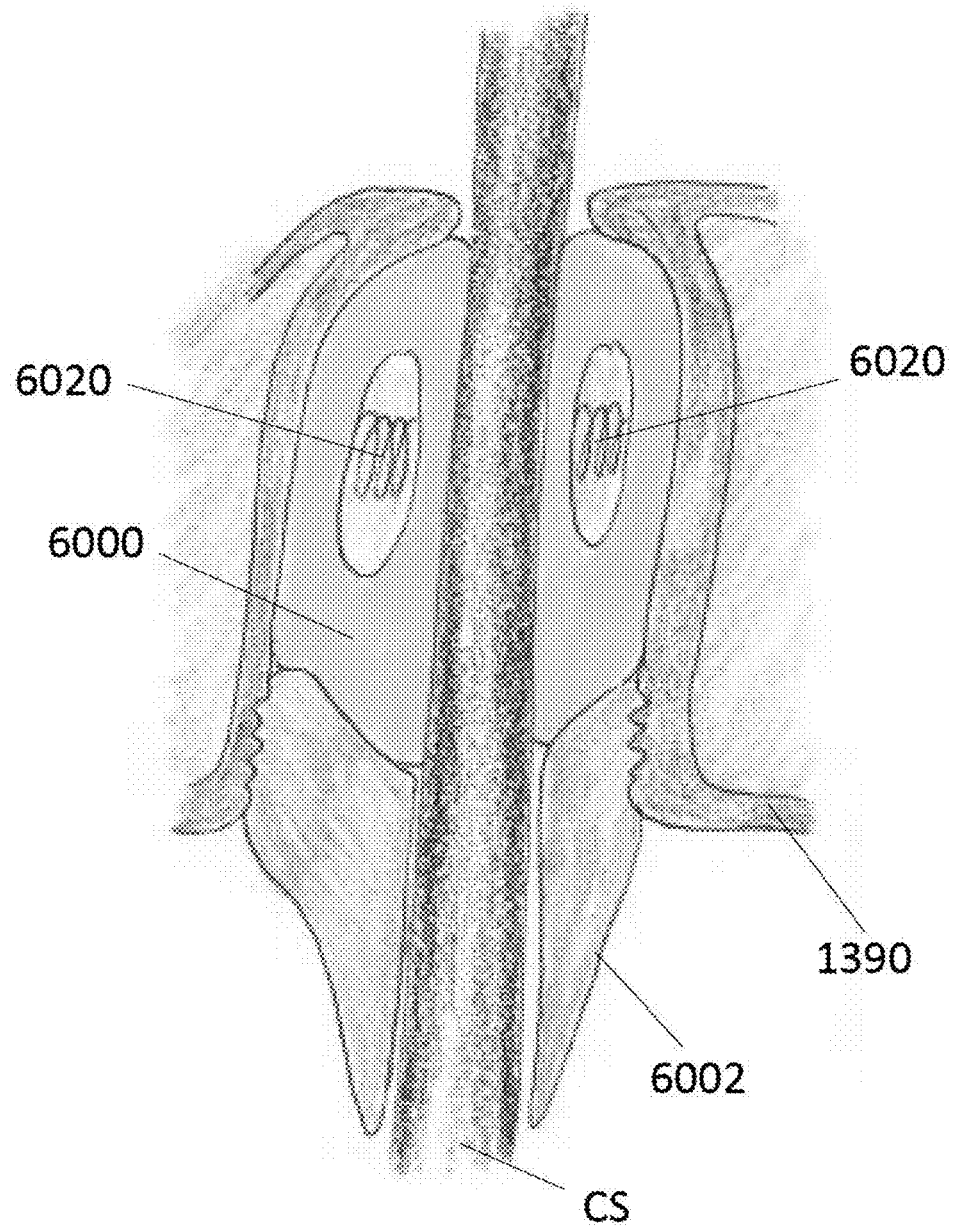

In some circumstances, gaskets such as gasket 6000 may lose elasticity over time, which may result in a reduction in the effectiveness of the gasket as a seal means over time. In order to compensate for such a loss in elasticity, gasket 6000 may be used in conjunction with one or more biasing elements 6010. For example, as shown in FIG. 21J, two biasing members 6020 may be positioned between a bottom surface of gasket 6000 and a top surface of strain relief member. Upon initial placement, biasing members 6020 may be largely compressed. Over time, if gasket 6000 begins to lose elasticity, the biasing members 6020 may begin to extend to maintain pressure on gasket 6000 to help maintain the seal, even as the gasket 6000 loses elasticity. It should be understood that although two biasing members 6020 are illustrate in FIG. 21J, more or fewer biasing members may be used. Further, although biasing members 6020 are illustrated as helical springs, the biasing members 6020 may take any other suitable form, and may be provided in other positions. For example, as shown in FIG. 21K, gasket 6000 is illustrated as being split into two pieces, with two biasing members 6020 positioned between the two pieces of gasket 6000 to help maintain the seal if the pieces of gasket 6000 lose elasticity over time. FIG. 21L, on the other hand, illustrates two biasing members 6020 positioned to contact the top of gasket 6000 and an interior of the top surface of port 1391*b*. The function of the biasing members 6020 of FIG. 21L is identical to those described above. In another embodiment, as shown in FIG. 21M, one or more biasing members 6020 may be positioned inside of gasket 6000, in any desired orientation, so that if gasket 6000 begins to lose elasticity over time, biasing members 6020 may help compensate for the loss and maintain the seal provided by gasket 6000.

Figure 19A:
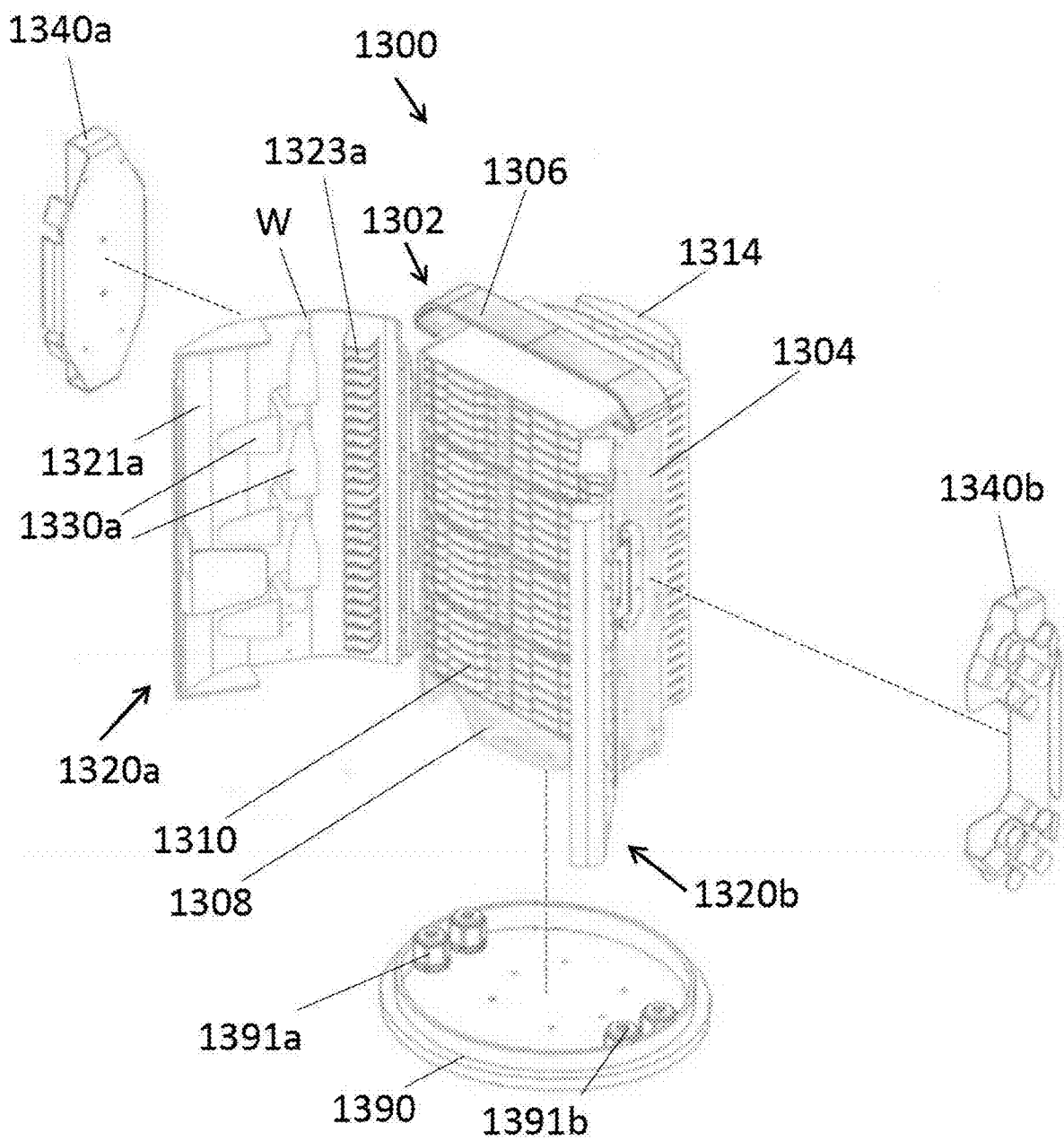
FIGS. 19A-D are exploded perspective views of a patch panel system with hanger plate assemblies in a maintenance condition according to another aspect of the disclosure.
Figure 19B:
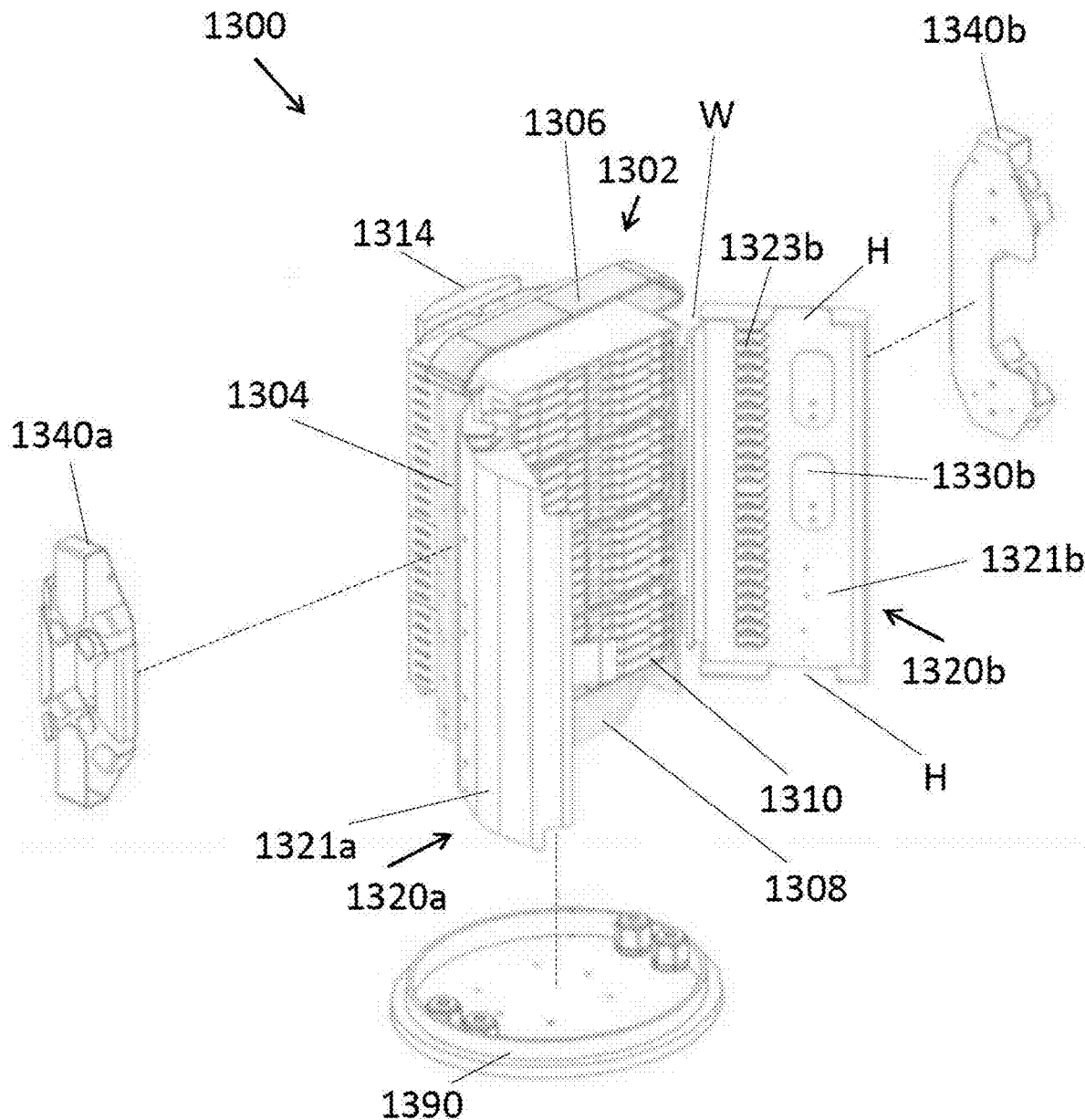
Figure 19C:
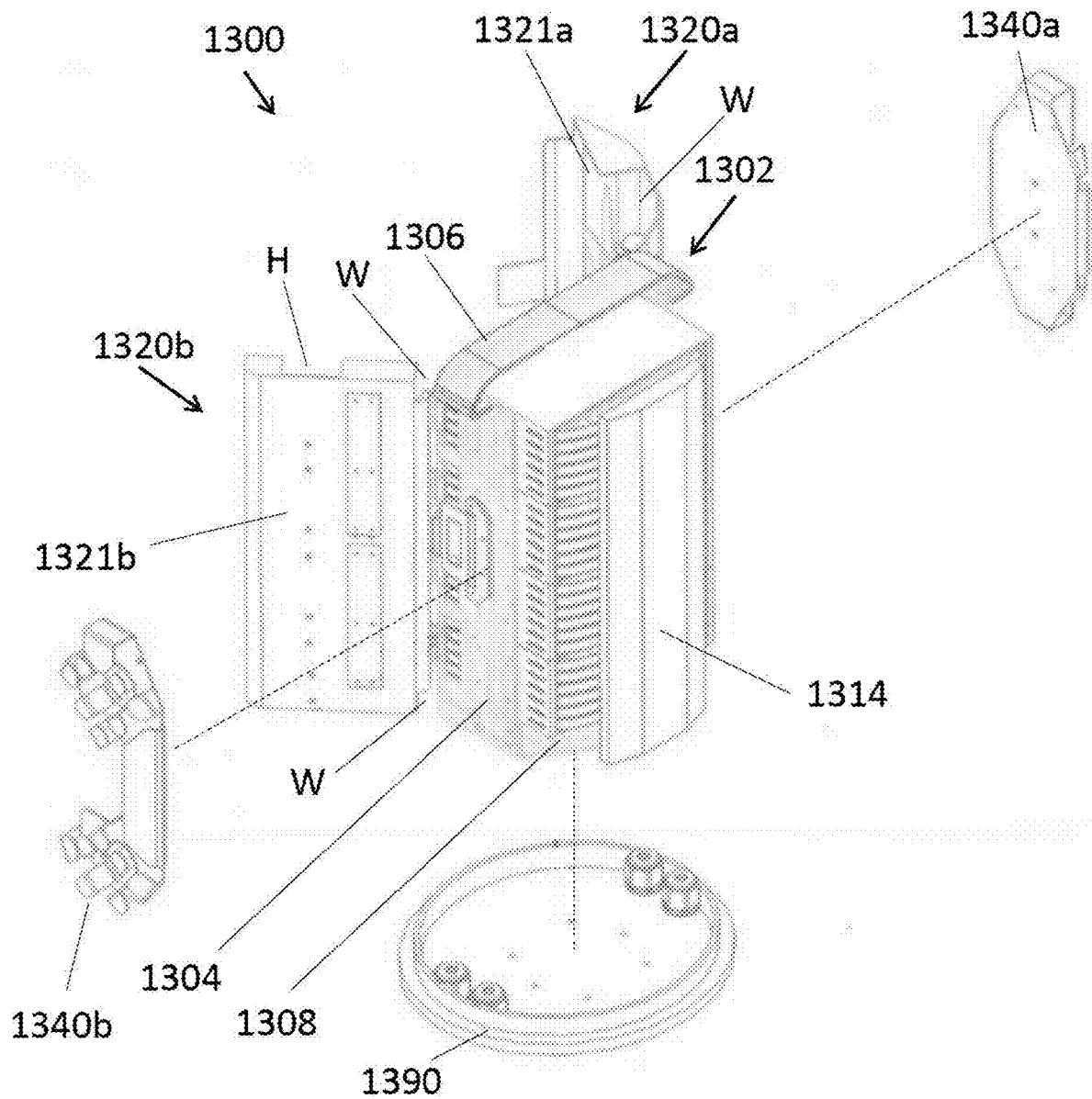
Figure 19D:
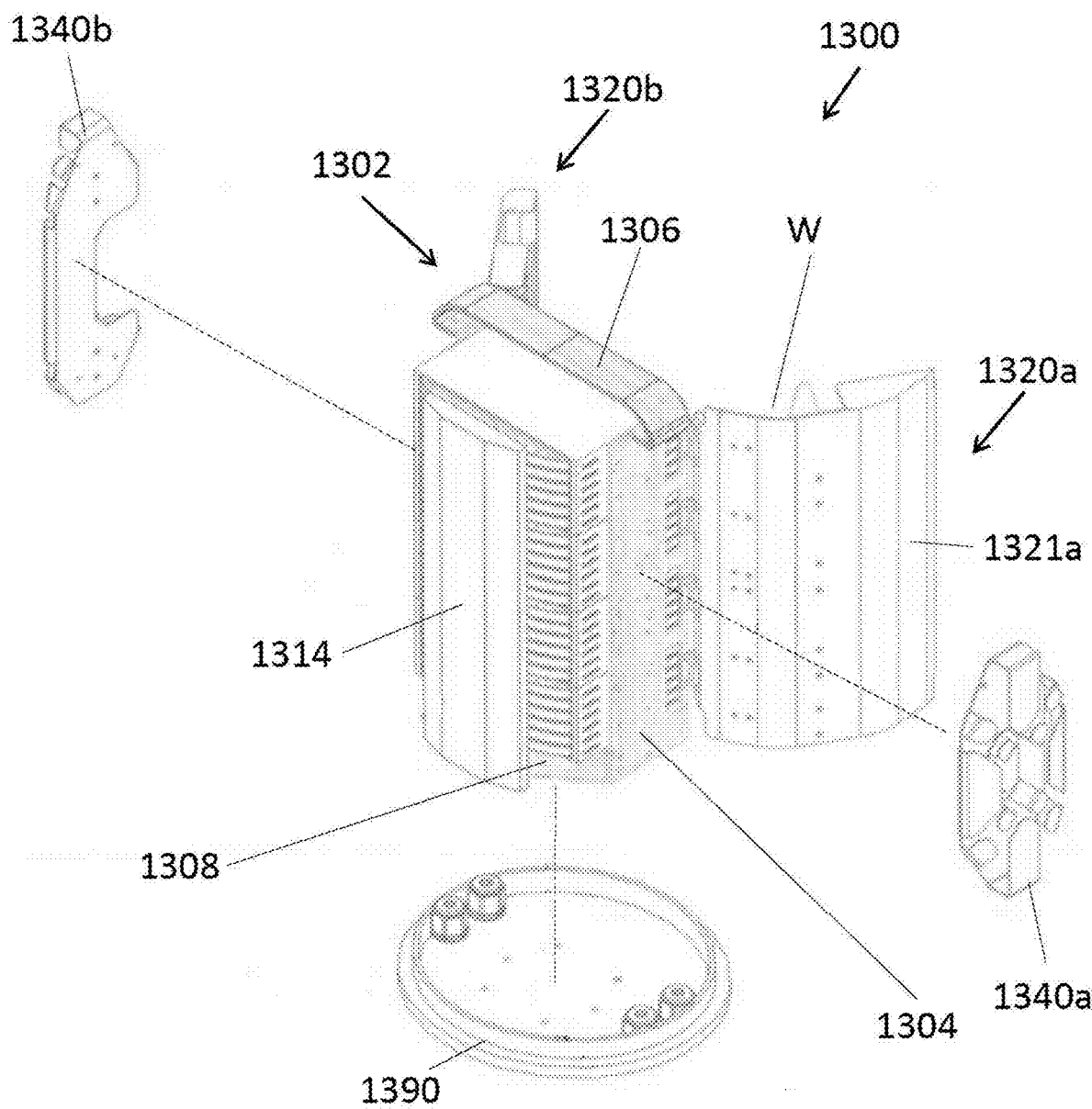

Referring again to FIGS. 19A-20D, and in particular FIGS. 19C-D and 20C-D, patch panel system 1300 may include a rear enclosure or cartridge 1314 which may be used to store electronics, sensors, and/or additional cable connector components. FIG. 20C illustrates that the rear cartridge 1314 may be hingedly mounted to the frame 1302 so that rear cartridge can be accessed by rotating the cartridge 1314 with respect to the frame 1302. For example, rear cartridge 1314 may be hinged near a bottom end so that the top end rotates in a direction D1 away from the rear of the frame 1302, or the cartridge 1314 may be hinged near its top end so that the bottom end rotates in a direction D2 away from the rear of the frame 1302. Referring to FIG. 20C, the cartridge 1314 may be in a stored condition confronting a rear portion of the housing, such that a substantially closed interior space is defined at the rear portion of the housing. In addition, when the cartridge 1314 is rotated with respect to the frame to obtain a condition in which an interior of the cartridge 1314 may be accessed, the cartridge and the rear portion of the housing may define a substantially open interior space at the rear portion of the housing. It should be understood that other mechanisms may provide for cartridge 1314 be moved so that the interior of the cartridge may be accessed. For example, the top and/or bottom of rear cartridge 1314 may be slidingly connected to components of patch panel system 1300 so that the cartridge can slide in either lateral direction, with the cartridge moving in a single plane. In other embodiments, the cartridge 1314 may be coupled to the frame 1302, for example by a corner hinge, so that the cartridge may rotated to the left or right while remaining in a single plane. Movement or rotation of cartridge 1314 in a single plane (for example via the sliding mechanism or corner hinges mentioned above) may be particular suitable for double patch panel systems, described in greater detail below.

Figure 22A:
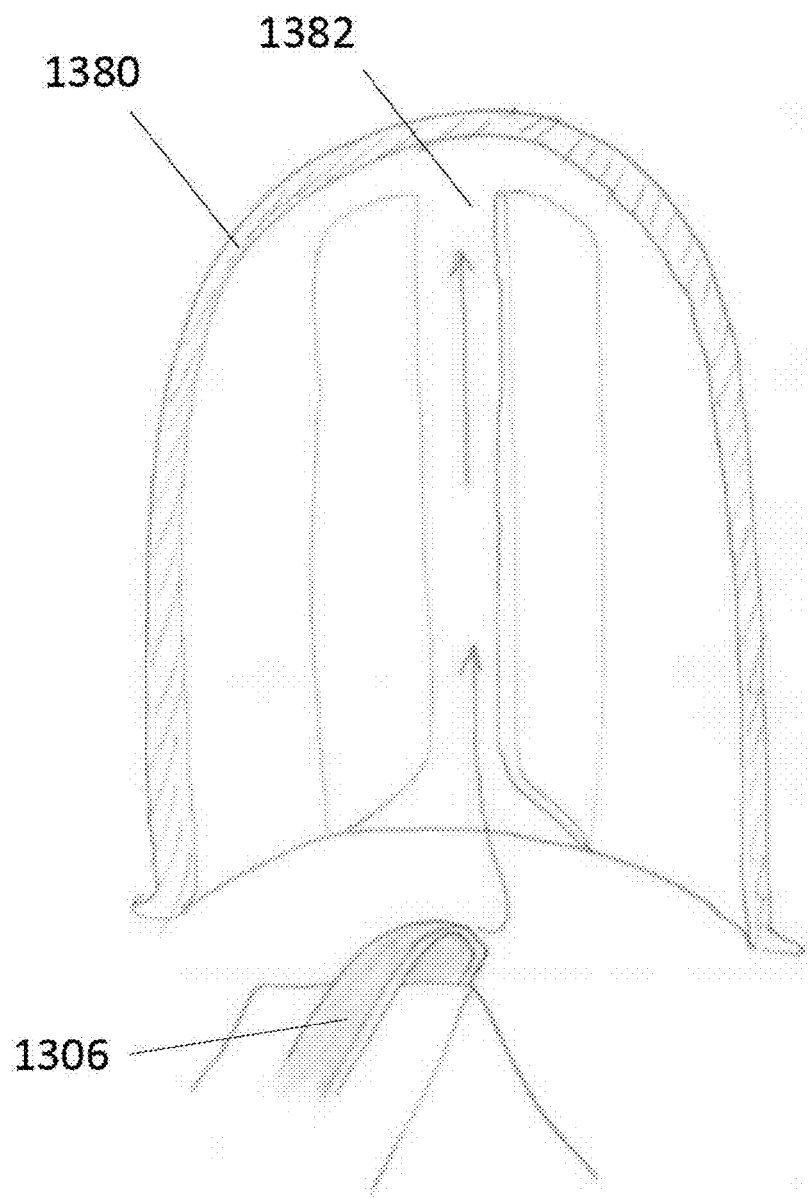
FIG. 22A is a cross-section of a cover for use with the patch panel system of FIGS. 19A-D.
Figure 22B:
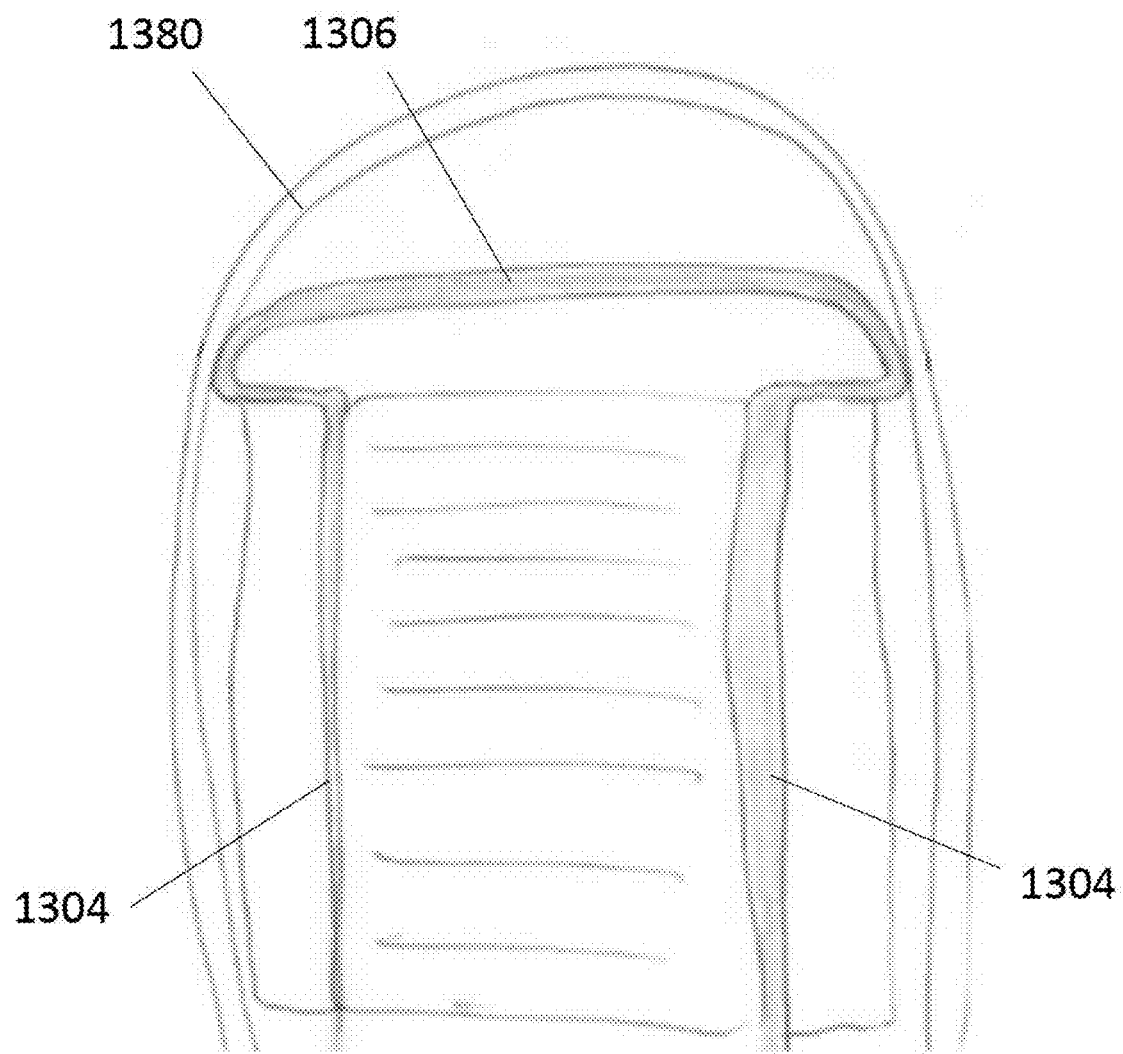
FIG. 22B is a cross-section of the cover of FIG. 22A taken along a different plane.

Patch panel system 1300 may also include a cover 1380 similar to cover 1280 of patch panel system 1200, although the covers may differ in certain aspects. Cover 1380 may be substantially dome-shaped, and a transverse cross-section of the cover is shown in FIG. 22A. As shown in FIG. 22A, cover 1380 may include a guide slot 1382 extending vertically from a bottom of the interior of the cover 1380 toward a top of the cover. Although only one guide slot 1382 is shown, it should be understood that two guide slots 1382 are preferably included on diametrically opposed portions of the interior of the cover. Further, the guide slot 1382 may take the form of a local recessed portion with a relatively wide recess near the bottom edge of the cover which tapers to a narrow portion which extends a distance toward the top of the interior of the cover. Guide slots 1382 may help restrict the cover 1380 to fit over frame 1302 in a single orientation or one of a limited number of orientations. For example, the top portion 1306 of frame 1302 may include a relatively straight or flat portion at a spaced distance from a top surface of the internal housing or chassis, and two end portions that extend beyond the side walls 1304 of frame 1302. As shown in FIG. 22A, each guide slot 1382 may be sized to accept one of the end portions of the top portion 1306 of frame 1302, so that the cover 1380 is unable to rotate with respect to the frame 1302 when the ends of the top portion 1306 of the frame 1302 are within the guide slots 1382. The relatively wide portion of the guide slot 1382 near the bottom edge of the cover 1380 may assist in properly orienting the guide slots 1382 with respect to the ends of the top portion 1306 of the frame 1302. As noted above, the end portions of the top portion 1306 of the frame 1302 may extend beyond side walls 1304 of the frame 1302. With this configuration, when cover 1380 encloses frame 1302, a gap space will remain between the side walls 1304 of the frame 1302 and the interior wall of the cover 1380, as shown in FIG. 22B. Thus, if an item unintentionally strikes the outside of the cover 1380, this gap space may provide extra protection to components covered by the cover 1380. In addition, the straight portion of the top portion 1306 of frame 1302 may be spaced above the top of the internal housing or chassis to provide a convenient grip region so that a user may use the top portion 1306 of the frame 1302 as a handle. As with cover 1280 and base 1290, cover 1380 and base 1390 may provide a water-tight seal to patch panel system 1300, which may be facilitated by latch mechanisms described in greater detail below. It should be understood that, particularly when external environmental conditions are not likely to cause damage to interior components of the system 1300, the cover 1280 may be omitted, with the hanger plate assemblies 1320a, 1320b serving to protect the interior components when in a stored condition. It should be understood that if the cover 1380 is omitted, other structures may be provided to protect the side and rear portions of system 1300, with the front of the system 1300 being protected by hanger plate assemblies 1320a, 1320b.

Figure 23A:
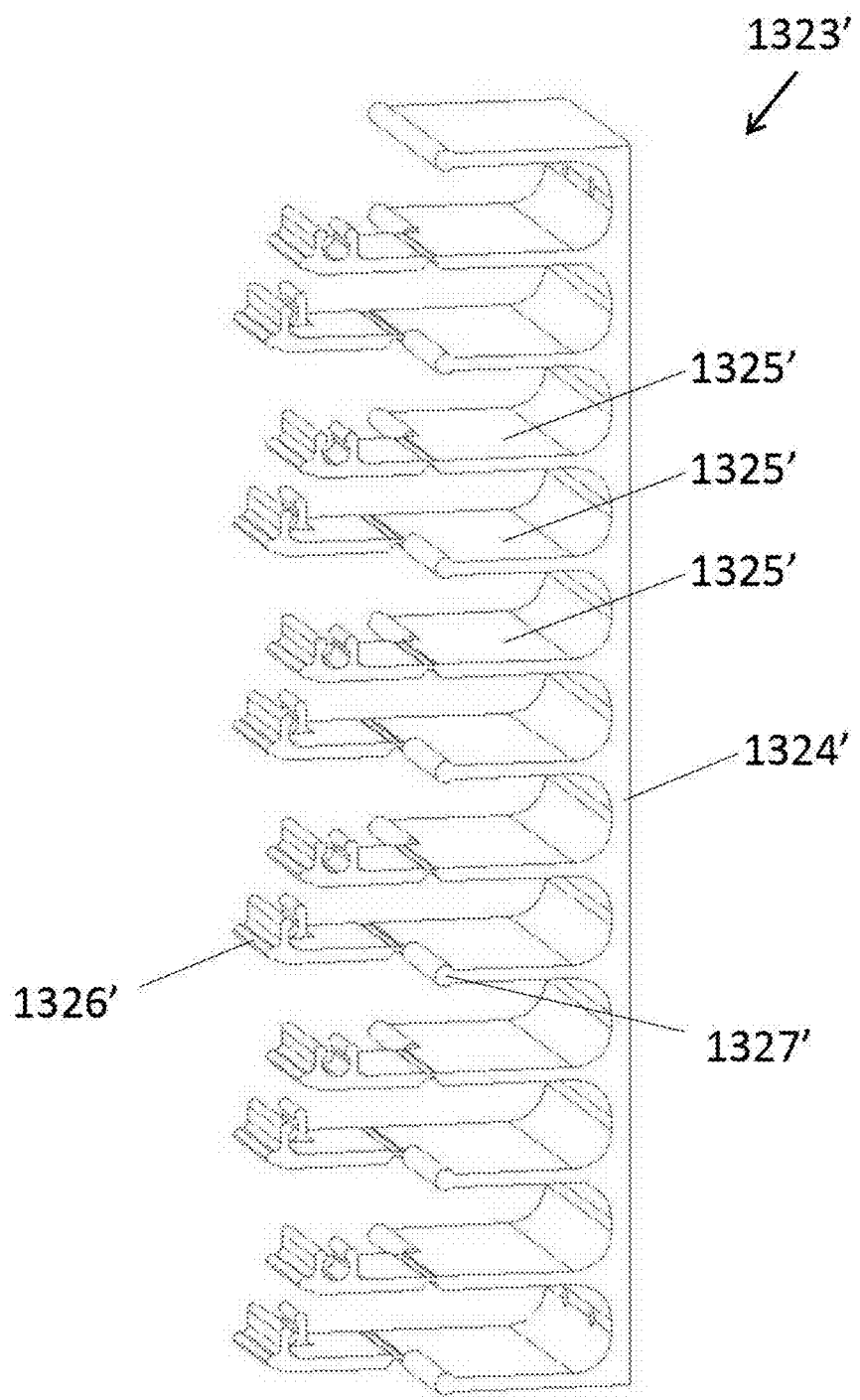
FIG. 23A is a perspective view of a hanger unit in an open or unlocked condition for use with the patch panel system of FIGS. 19A-D.
Figure 23B:
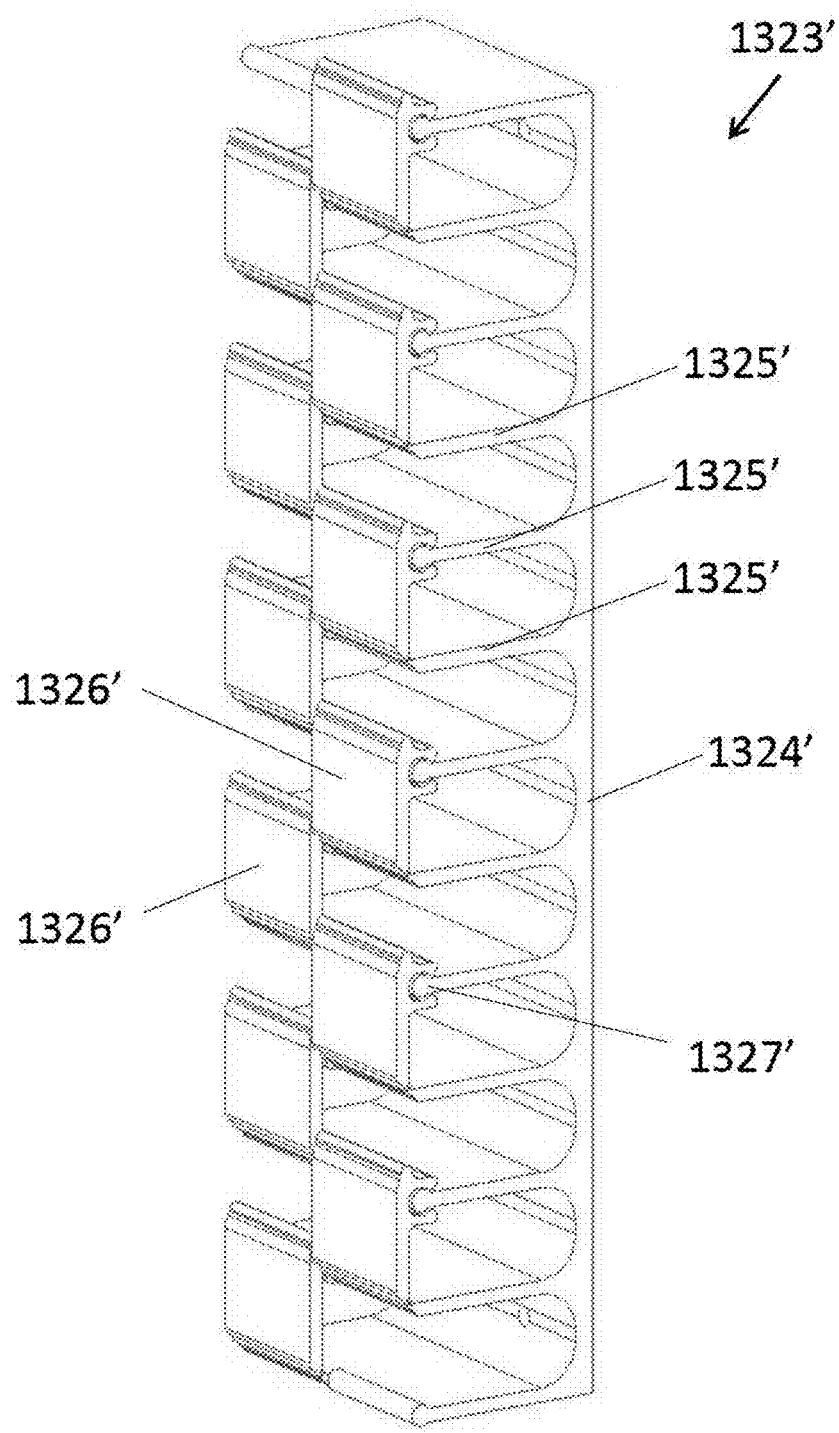
FIGS. 23B-C are perspective views of the hanger unit of FIG. 23A in a closed or locked condition.
Figure 23C:
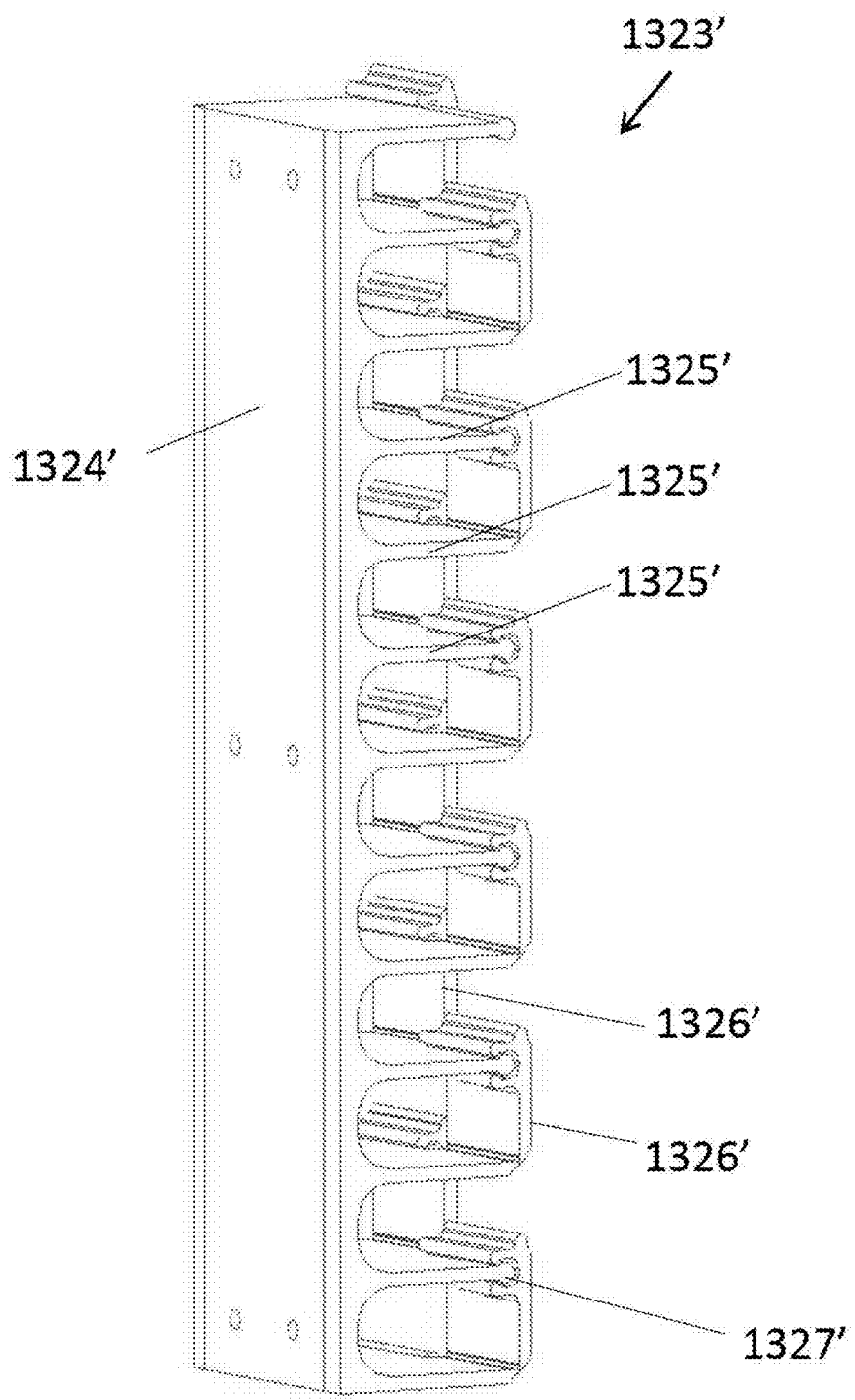

While the patch panel system 1300 is shown including hanger 1323a, 1323b on the inside of the respective hanger plates 1321a, 1321b that are similar to hangers 1223, other types of hangers may be used in addition or as an alternative. For example, FIG. 23A shows a hanger unit 1323' that may be used in addition to or as a replacement for hangers 1323a and/or 1323b. Hanger unit 1323' may include a support 1324' and a plurality of individual hangers 1325' extending from the support 1324'. The support 1324' may be formed integral with the corresponding hanger plate 1321a or 1321b, or may be a separate member attached to the hanger plate. The free end of each hanger 1325' may include a latch member 1326' that is hingedly coupled to the free end, for example by a living hinge mechanism. The free end of each hanger 1325' may also include a lip 1327'. In the illustrated example, half of the free end of each hanger 1325' includes a latch member 1326' and the other half of the free end includes the lip 1327'. The latch member of each hanger unit is shaped to receive and engage with the lip of another hanger unit in a latched configuration, as described below. Preferably, the position of the latch member 1326' and the lip 1327' on the free end of each hanger 1325' is reversed between vertically adjacent hangers 1325'. With this configuration, the latch member 1326' of a first hanger 1325' may be pivoted toward the lip 1327' of a second hanger 1325' positioned immediately above the first hanger. Thus, each latch member 1326' may be pivoted from an open condition, as shown in FIG. 23A, to a latched condition, as shown in FIGS. 23B-C, to create a closed space or continuous boundary between two vertically adjacent hangers 1325'. In the illustrated configuration, the lips 1327' may be substantially cylindrical, and each latch member 1326' may include two prongs or flanges that form a cylindrical recess that clips over the cylindrical portions of the lips 1327'. It should be understood that the top-most hanger 1325' in hanger unit 1323' need not include a latch member if the latches are to be pivoted upward. In other embodiments, the latch members 1326' may pivot downward, in which case the top-most hanger 1325' preferably includes a latch member 1326' and the bottom-most hanger 1325' need not include a latch member 1326'. Further, it should be understood that the lip portion 1327' may include geometries other than cylindrical, and the latch members 1326' may include any complementary geometry to the lips 1327'. Further, if support 1324' is not integral with the corresponding hanger 1321a or 1321b, the support 1324' may include features such as holes to assist in coupling the hanger unit 1323' to the hanger, for example by screws or bolts.

Figure 24A:
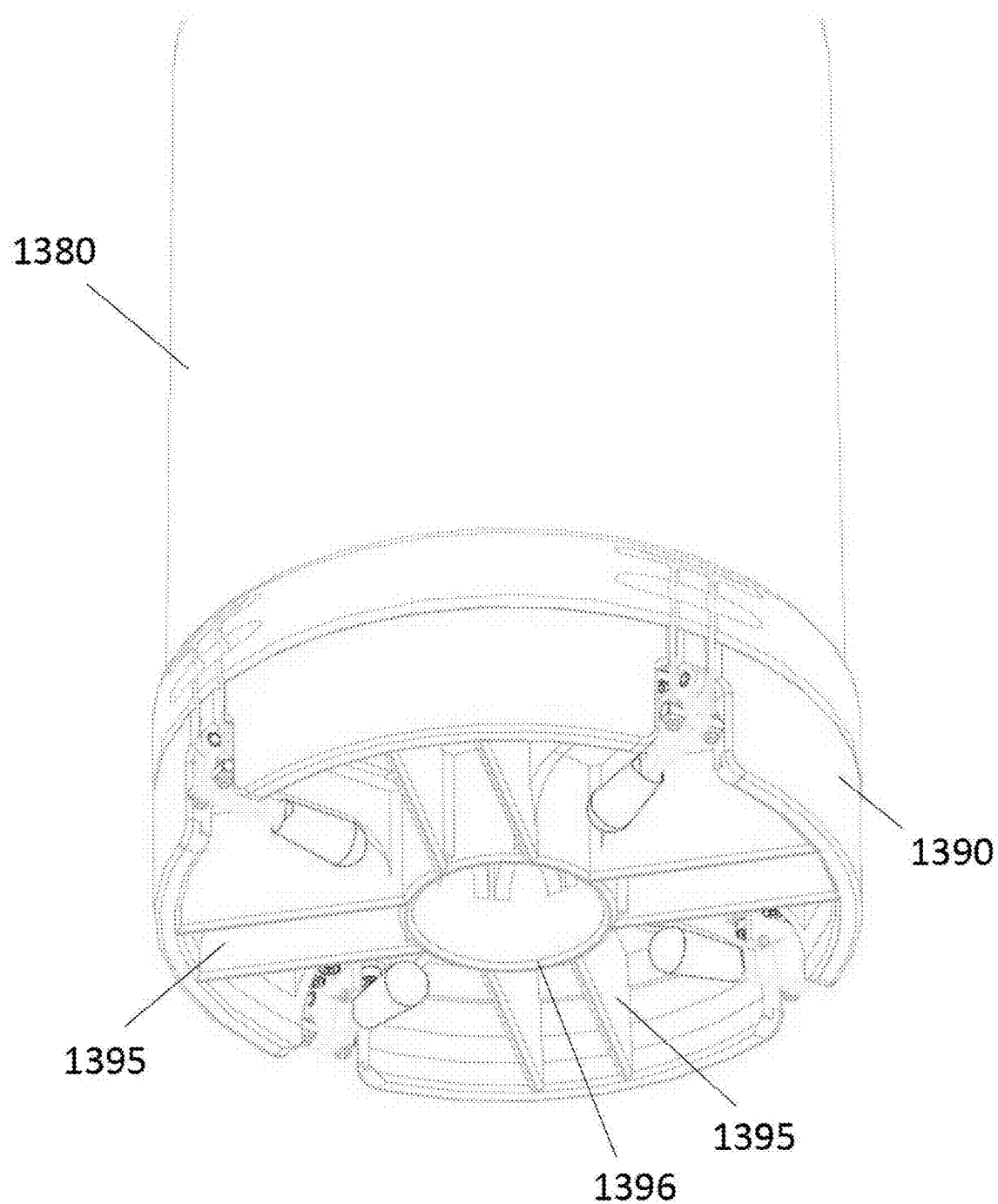
FIGS. 24A-B are bottom perspective views of a cover latched to a base of the patch panel system of FIGS. 19A-D.
Figure 24B:
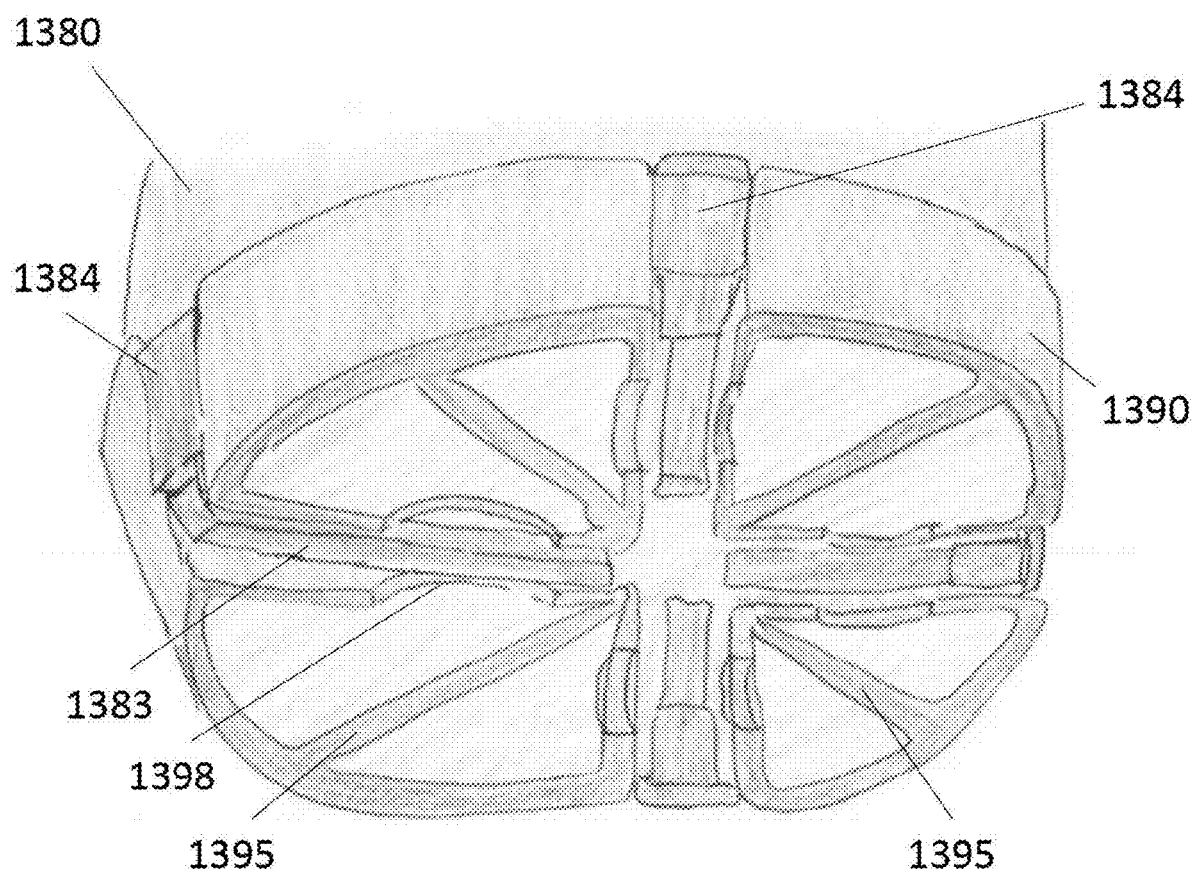

Cover 1380 and/or base 1390 may include lock or latch mechanisms to assist in drawing cover 1380 into a locked condition, and maintaining the locked condition, with respect to base 1390. FIGS. 24A-B show bottom perspective views of cover 1380 covering the patch panel system 1300 with latch mechanisms engaged, drawing the cover 1380 securely to the base 1390. In the illustrated embodiment four separate latches are illustrated. FIGS. 24A-B illustrate that base 1390 may include a plurality of ribs 1395. In the embodiment of FIG. 24A, four pairs of ribs 1395 each extend from an inner circumference of the underside of base 1390 toward a center circular extension 1396. In the embodiment of FIG. 24B, four groups of ribs 1395 extend from an inner circumference of the underside of base 1390 toward a center, with each group of ribs having the shape of a quarter circle with a first and second rib forming substantially a 90 degree angle with respect to one another, and a third rib forming substantially a 45 degree angle with respect to the first and second ribs. In both embodiments, each latch extends between ribs so that, at least in the latched condition, the latches do not protrude beyond the bottom of the base 1390. However, in other embodiments, one or more latches need not extend between ribs and may protrude beyond the bottom of the base 1390. The ribs 1395 may help strengthen the base 1390 so that, when the base 1390 experiences forces from the latch mechanisms drawing the cover 1380 onto the base 1390, the base 1390 resists any significant deflection, at least in part due to the strength of the ribs 1395. It should be understood that ribs 1395 may be provided in different numbers and configurations than shown in FIG. 24A-B to provide the intended strength to resist deflection upon latching.

Figure 24C:
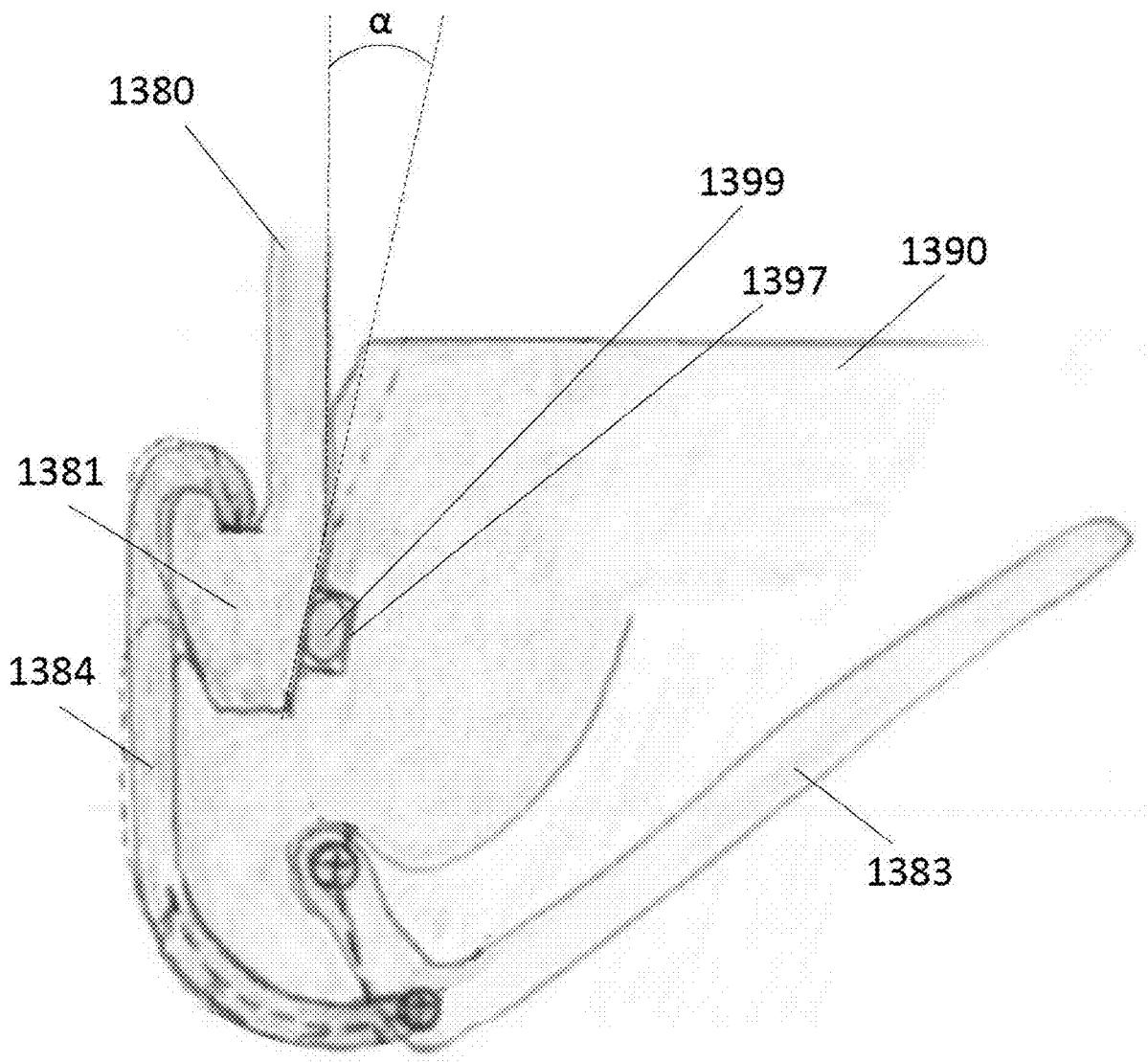
FIG. 24C is a cross-section of one example of a latch shown in FIGS. 24A-B.

FIG. 24C shows a cross-section of a first embodiment of the latch mechanism of FIGS. 24A-B in a latched condition in which cover 1380 is latched to base 1390. In the illustrated embodiment, base 1390 may include a recessed portion 1397 extending around an outer circumference of the base 1390, with an O-ring 1399 (or a gasket or other similar seal) seated within the recessed portion 1397. A bottom edge of cover 1380 may include an upward facing hook 1381 that contacts the outer surface of base 1390 adjacent the recessed portion 1397, including O-ring 1399. In the illustrated embodiment, the latch takes the form of an over-center draw latch with lever 1383 rotatably coupled to the base 1390 at a recess in the base 1390, and a downward facing hook portion 1384 having a first end coupled to the lever 1383 and a second end configured to hook over the upward facing hook 1381 of the cover 1380. Rotating the lever 1383 of the latch mechanism in the counter-clockwise ("CCW") direction in the view of FIG. 24C tensions and/or pulls the downward facing hook 1384, and thus the upward facing hook portion 1381 of the cover 1380, into close contact with the base 1390. Rotating the lever 1383 in the opposite clockwise ("CW") direction releases tension on downward facing hook 1384 and thus also releases tension on upward facing hook 1381 of cover 1380. An inner surface of the upward facing hook 1381 that contacts the O-ring 1399 may be provided at an angle α to vertical, between about 0 degrees (vertical) and about 45 degrees. Preferably, the angle α is between about 15 degrees and about 30 degrees. The O-ring 1399 being in the recessed portion 1397 of base 1390 advantageously provides that reduced force is needed to achieve a desired compression seal between the cover 1380 and base 1390, and also permits for ease of detachment of the cover 1380 from the base 1390. This functionality may be provided, at least in part, by the angle α of the inner surface of the hook portion 1381 of cover 1380 and the correspondingly angled outer surface of base 1390 adjacent recess 1397. It should be understood that multiple latch mechanisms may be provided with the base 1390, although only one is shown in FIG. 24C.

Figure 24D:
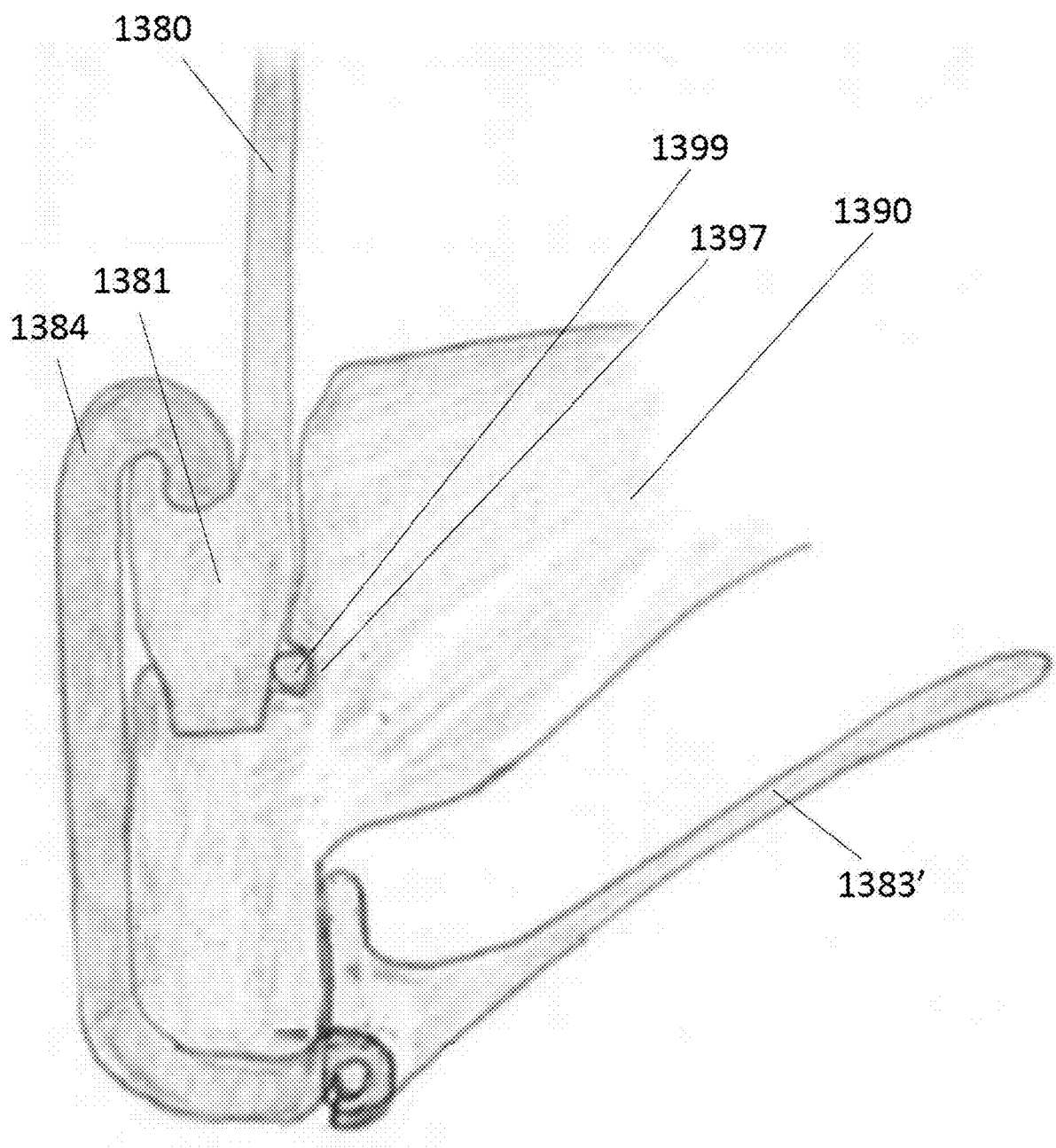
FIG. 24D is a cross-section of another example of a latch shown in FIGS. 24A-B.

Other latch mechanisms may also be suitable in place of that shown in FIG. 24C. For example, FIG. 24D shows a cross-section of an alternative option for a latch mechanism similar that shown in FIG. 24C. In the embodiment of FIG. 24D, cover 1380 includes the same hook portion 1381 as described above, and base 1390 includes the same recessed portion 1397 and O-ring 1399. The lever 1383' of this latch mechanism may function as a handle and be slightly differently structured than lever 1383, the lever 1383' having a substantially flat end that interacts with base 1390 and to which downward facing hook 1384 is coupled. Instead of rotating lever 1383', it may be gripped as a handle and pulled to tension downward facing hook 1384. While tension is applied to downward facing hook 1384, lever 1383' may be moved to the position shown in FIG. 24D, with contact between the flat surface of the lever 1383' and a correspondingly flat inner surface of base 1390 maintaining the lever 1383' in the position shown. In the illustrated position, tension on downward facing hook 1348 results in tension being applied to the upward facing hook 1381, drawing the cover 1380 into close contact with the base 1390. To release the latch, a user may simply grasp lever 1383', move the flat surface of the lever out of contact with the correspondingly flat inner surface of the base 1390, and position the lever to release tension on the downward facing hook 1384.

Figure 24E:
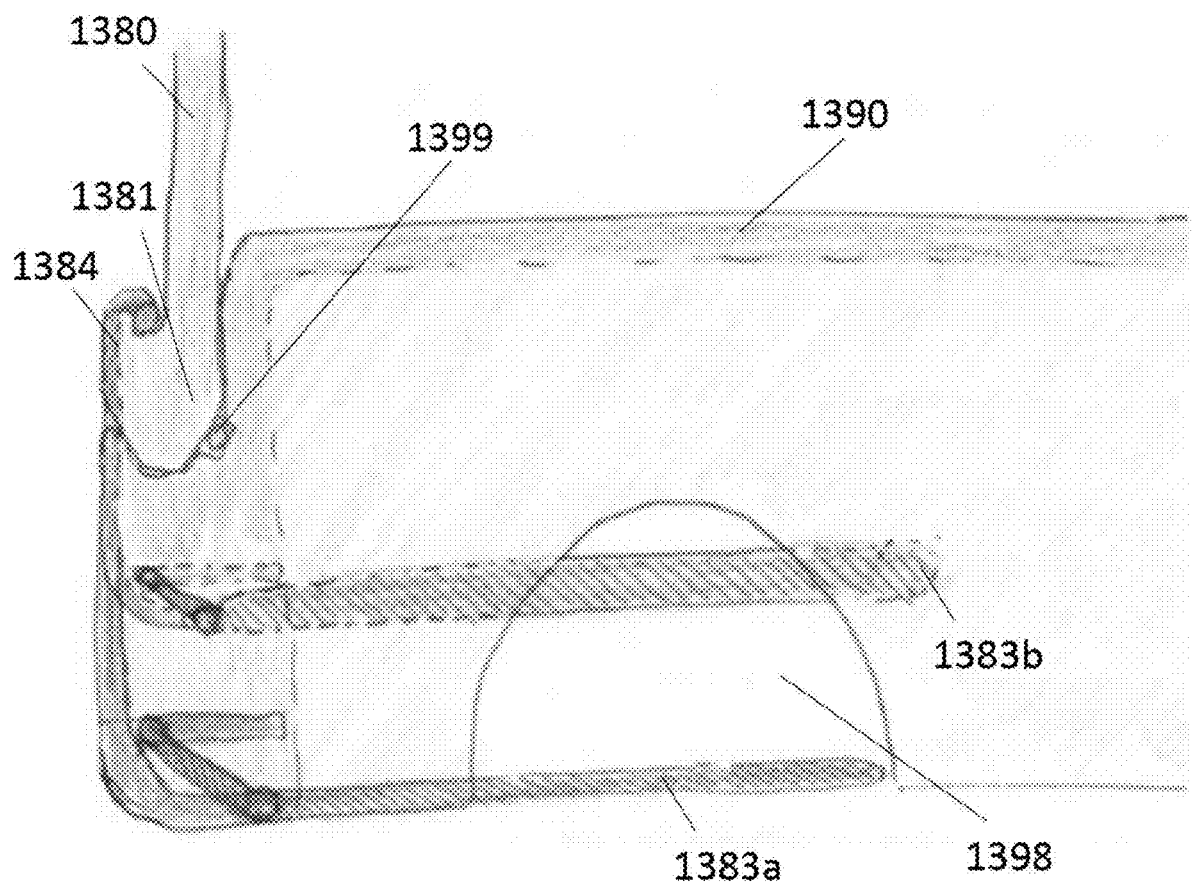
FIG. 24E is a cross-section of a latch of FIGS. 24A-B showing two different positioning options of the latch.

FIG. 24E shows a cross-section of the latch mechanism of FIG. 24C latching the cover 1380 to the base 1390 in two optional positions. In particular, FIG. 24E shows that the lever 1383 of the latch mechanism can be positioned near the bottom of the base 1390 in a first position 1383a, or within a recess in the base 1390 in a second position 1383b so that the base 1390 extends below the lever 1383b. If lever 1383 is provided in a recessed position 1383b, an opening 1398 may be provided in the base 1390 for easy access to the recessed lever. It should be understood that FIG. 24E illustrates two levers 1383a, 1383b to show how a first lever position option 1383a would compare to a second lever position option 1383b, and both levers would not be included for a single latch mechanism. One potential benefit of positioning the lever of a latch mechanism a farther distance from the point of contact with the cover 1380, for example in position 1383a compared to position 1383b, is that additional material may be provided for base 1390, resulting in a generally thicker and/or stronger base. With a stronger base, portions of the base 1390, and particularly portions of the base adjacent the latch mechanism, may be less likely to buckle or otherwise deform when forces due to latching the latch mechanism are applied to base 1390.

Figure 24F:
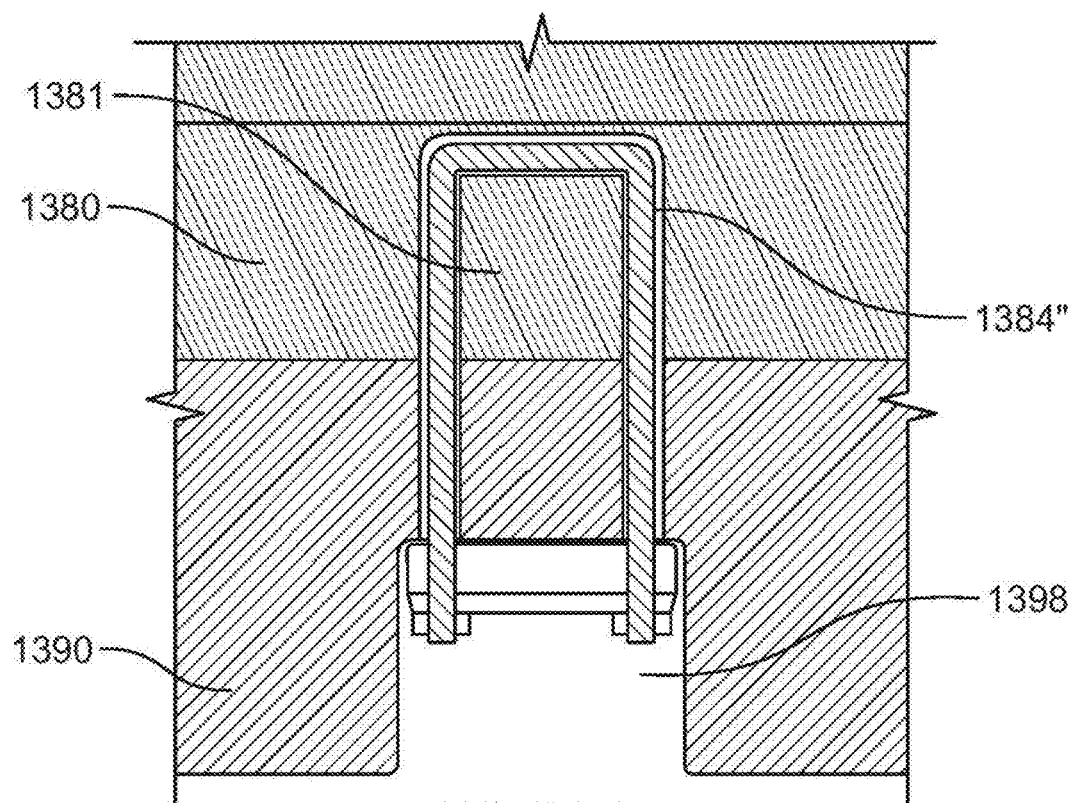
FIGS. 24F-G are side and cross-sectional views, respectively, of another example of a latch for use in latching the cover to the base.
Figure 24G:
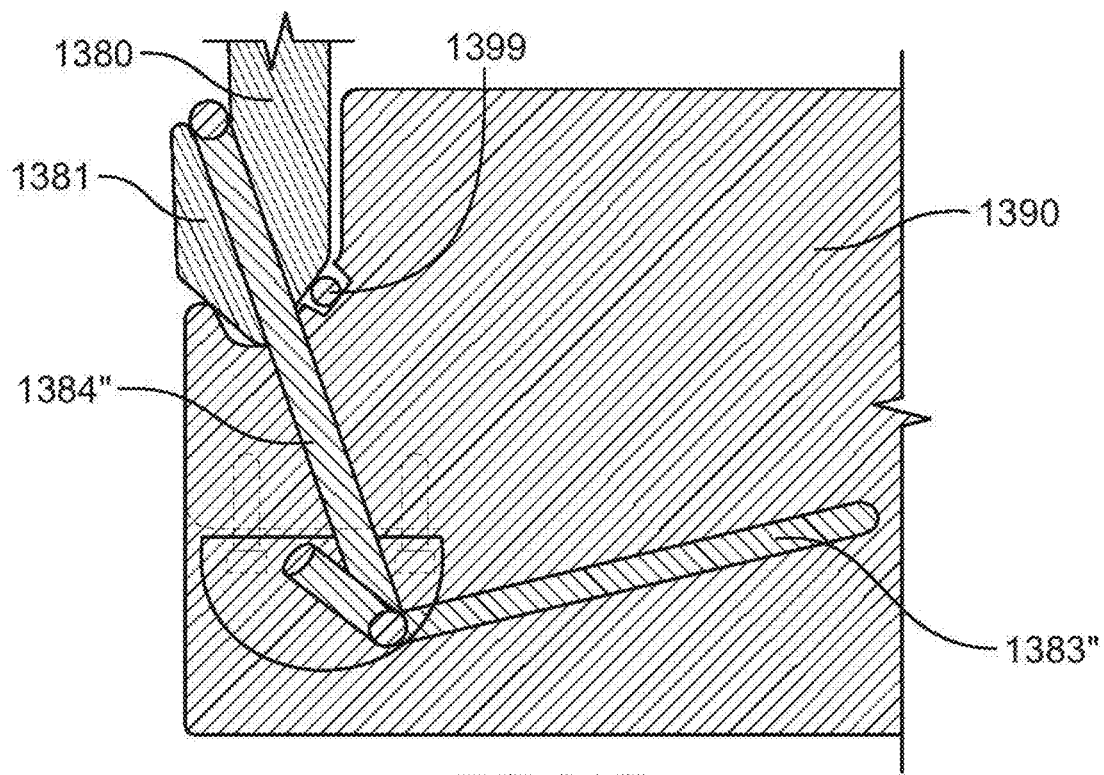

FIGS. 24F and 24G show side and cross-sectional views, respectively, of a latch mechanism that may be used as an alternate to or in addition to any of the latch mechanisms described above. The latch mechanism of FIGS. 24F-G may be generally similar to that of FIG. 24C, with the main exception being that the latch mechanism includes a substantially "U"-shaped engagement arm 1384" instead of a downward facing hook 1384. As shown in FIG. 24G, lever 1383" may be rotated in the CCW direction of FIG. 24G to draw cover 1380 into close contact with base 1390 when the engagement arm 1384" engages the upward facing hook 1381 of the cover. In order to release the tension on the cover, the lever 1383" may be rotated in the CW direction of FIG. 24G. As shown in FIG. 24F, base 1390 may include an opening 1398 through which portions of the latch mechanism are positioned, similar to that shown in FIG. 24E. It should be understood that opening 1398 is not visible in FIG. 24G and is represented with broken lines. The latch mechanism may be coupled to the base 1390 by one or more fasteners, such as the bolts shown in dashed lines in FIG. 24G.

Figures 24H, 24I:
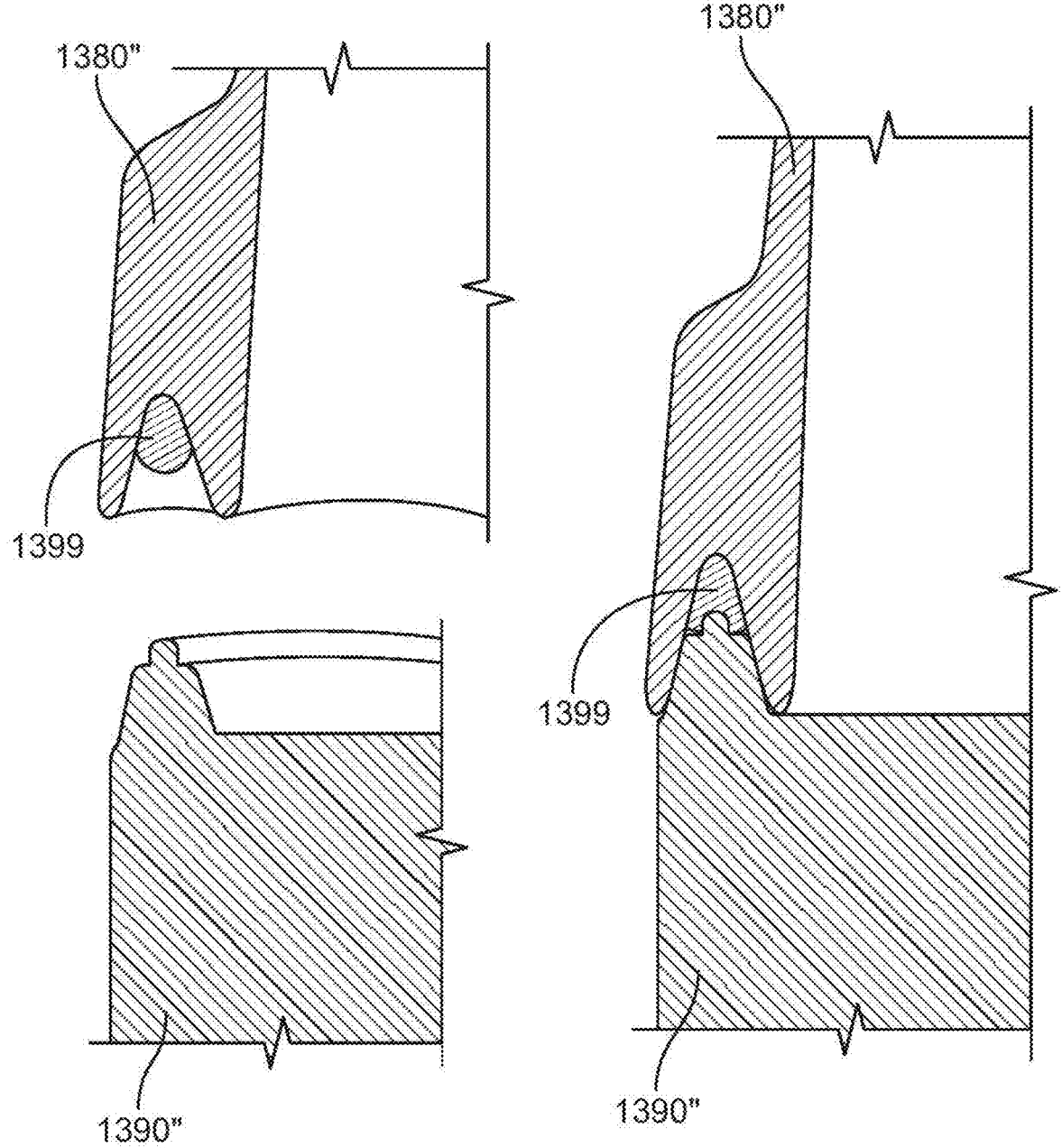
FIGS. 24H-I are cross-sections of another example of a cover and a base in an unlatched and latched condition, respectively.

FIGS. 24H-I are cross-sections of a cover 1380" and a base 1390" that may be similar to any of the other covers and bases described herein, with an exception being the points of contact between the cover 1380" and the base 1390". In this embodiment, a bottom portion of the cover 1380" may include a substantially triangular recess shaped to house a gasket such as an O-ring 1399 therein, with the larger portion of the triangular recess being positioned closer to the base 1390" in the closed or latched condition. Base 1390", on the other hand, may include a substantially triangular or substantially trapezoidal protrusion extending from the base toward the cover 1380". The top of the triangular or trapezoidal protrusion may include a tip, which may be rounded, extending therefrom. As is best shown in FIG. 24I, when the cover 1380" is connected to the base 1390", for example in a latched condition, the triangular or trapezoidal protrusion of the base 1390" is received within the triangular recess of the cover 1380", with the tip of the protrusion contracting O-ring 1399. The tip of the protrusion of the base 1390" may act as a force concentrator on the O-ring 1399, facilitating a better seal between the cover 1380" and the base 1390". It should be understood that both the triangular-shaped recess of the cover 1380" and the triangular shaped protrusion and tip of the base 1390" may extend across an entire circumference of the cover 1380" and base 1390", or less than the entire circumference. Further, the configuration of the cover 1380" and base 1390" shown in FIGS. 24H-I may be incorporated into any of the covers and bases described herein as being capable of latching to one another, and any of the latch mechanisms described herein may be used with the cover 1380" and base 1390" of FIGS. 24H-I.

Figure 24J:
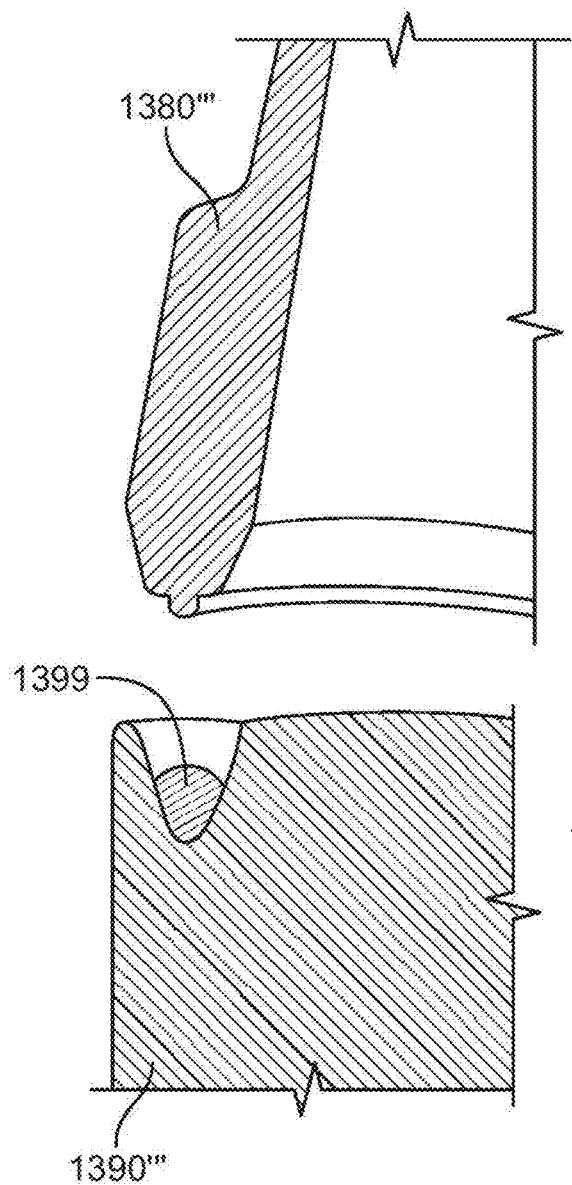
FIGS. 24J-K are cross-sections of a further example of a cover and a base in an unlatched and latched condition, respectively.
Figure 24K:
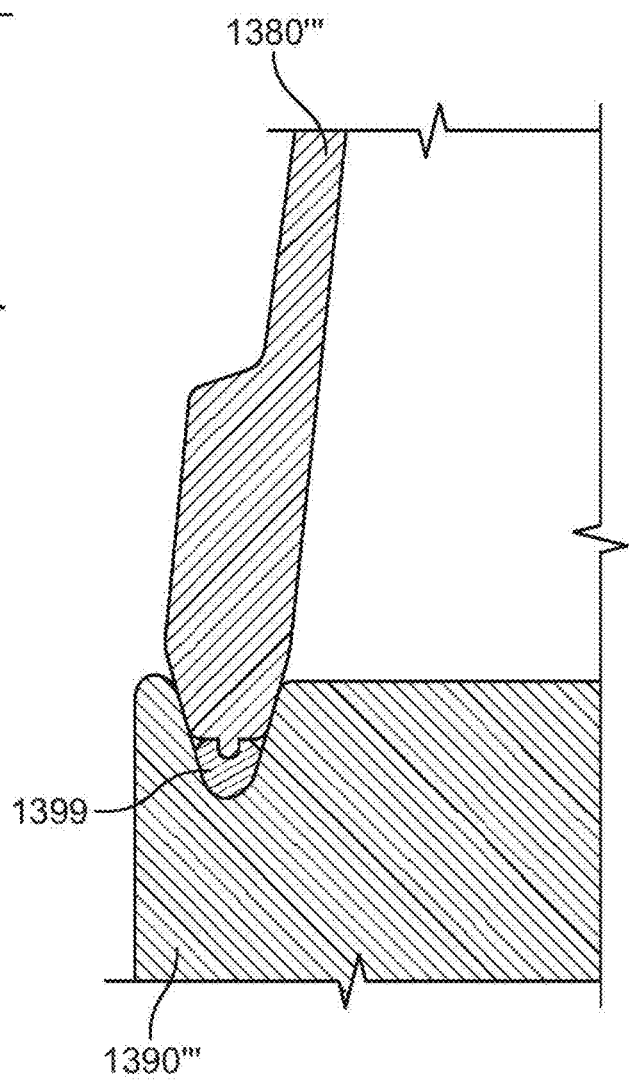

FIGS. 24J-K are cross-sections of a cover 1380''' and a base 1390''' that have connection features that are generally reversed compared to cover 1380" and base 1390" of FIGS. 24H-I. In other words, base 1390''' may include a substantially triangular recess for receiving a gasket or O-ring 1399 and a protrusion and tip of cover 1380'''. Cover 1380''' may include a substantially triangular or substantially trapezoidal protrusion with a tip that acts as a force concentrator on O-ring 1399 when the cover 1380''' is latched or otherwise coupled to base 1390'''. It should be understood that, other than the reversal of these interacting structures, the description of cover 1380" and base 1390" above fully applies to cover 1380''' and base 1390''' of FIGS. 24J-K.

Figure 24L:
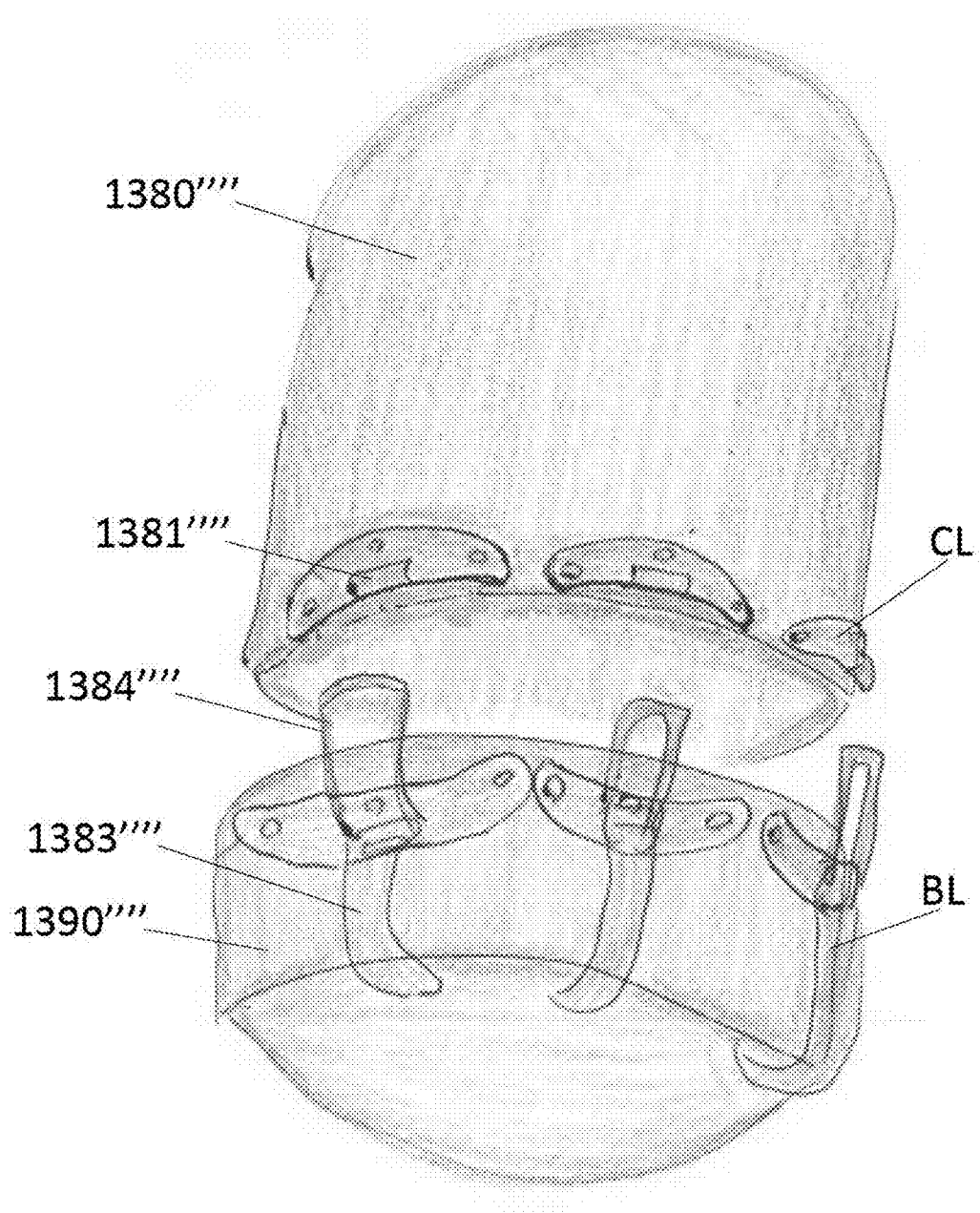
FIG. 24L is a perspective view of another example of a latch for use in latching a cover to a base.
Figure 24M:
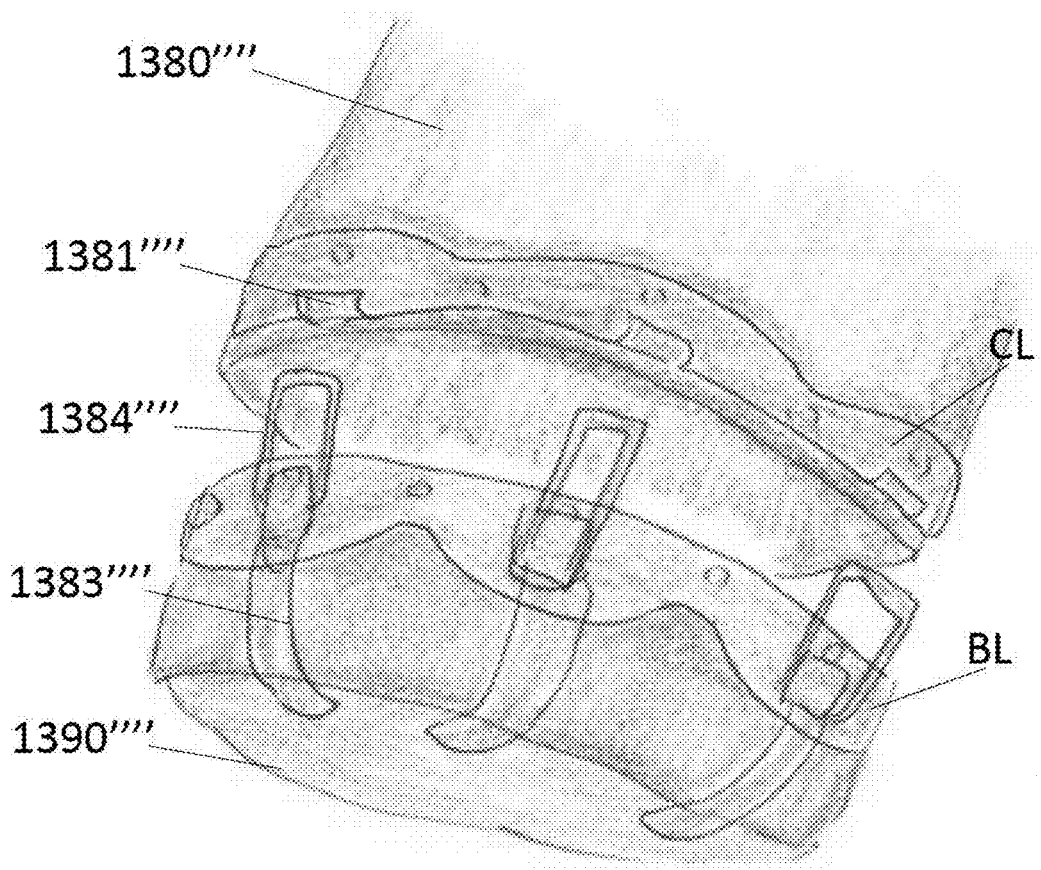
FIG. 24M is a perspective view of a further example of a latch for use in latching a the cover to a base.

FIG. 24L is a perspective view of a cover 1380"" and base 1390"" that are similar to those described above, with latch mechanisms that are separately applied to the cover and base. For example, whereas cover 1380 of FIGS. 24F-G is shown as including an integral upward facing hook 1381 for engagement with a latching mechanism, cover 1380"" includes a plurality of cover latch portions CL coupled to the cover, each cover latch portion CL including an upward facing hook 1381"" that may be similar in shape and purpose to upward facing hook 1381 of FIGS. 24F-G. In the illustrated embodiment, a plurality of individual cover latch portions CL are coupled near the bottom of cover 1380"" at spaced locations around the circumference of the cover 1380"". Similarly, base 1390"" may include a plurality of base latch portions BL coupled to the base 1390"" at spaced locations around the circumference thereof. Each base latch portion BL may be similar in structure and function to the latches on the base of 1390 described in connection with FIGS. 24F-G. For example, each base latch portion BL may include a U-shaped engagement arm 1384"" operatively coupled to a lever 1383"", where the lever 1383"" is rotated to engage and/or lock the U-shaped engagement arm 1384"" to a corresponding upward facing hook 1381"" to draw the cover 1380"" toward and into sealing engagement with the base 1390"". As noted above, it should be understood that the functional aspects of the latching mechanism illustrated in FIG. 24L may be identical or substantially similar to the latching mechanism described in connection with FIGS. 24F-G, and the base and cover of FIG. 24L may include any of the O-ring and/or gaskets described in connection with FIGS. 24C, 24H, and/or 24 I. A main difference of the latching mechanisms of FIG. 24L is that the cover latch portions CL and base latch portions BL are separately attached to the cover 1380"" and the base 1390"", respectively, for example by screws, bolts, adhesives, or any other suitable mechanism. With this variation, it is possible to form the cover latch portions CL and base latch portions BL of any desired material, regardless of the materials forming cover 1380"" and base 1390"". For example, base 1390"" and cover 1380"" may be formed of a plastic, such as a hard plastic such as polyethylene, or even a soft plastic or a metal. In one embodiment, cover latch portions CL and base latch portions BL are formed of a rigid material such as a metal. In certain configurations above, the act of operating one or more latch mechanisms to draw the cover to the base may result in some amount of deflection in the portions of the cover and/or base at or adjacent the latch. However, in the example of FIG. 24L in which the cover latch portions CL and base latch portions BL are formed of a metal, the cover 1380"" and/or base 1390"" are less likely to deform, such that deformation is less or effectively eliminated, because of the metallic or otherwise rigid structure of the cover latch portions CL and base latch portions BL. In one embodiment, in order to minimize the amount of deflection, cover latch portions CL and base latch portions BL may have a predetermined width, so that in the aggregate, the plurality of cover latches CL extends along a substantial percentage of a circumferential portion of the cover 1380"" near its bottom, while the plurality of base latches BL extends along a substantial percentage of a circumferential portion of base 1390"" near its top. In some examples, cover latch portions CL and base latch portions BL extend, respectively, along at least 80%, or at least 90% of the circumferential portions of the cover 1380"" and base 1390"". FIG. 24M shows an embodiment in which a cover latch portion CL and a base latch portion BL extend respectively along 100% of circumferential portions of the cover 1380"" and base 1390"", with the cover, base, and latching mechanisms otherwise being identical to that shown in FIG. 24L. In other words, cover latch portion CL of FIG. 24M is a continuous structure that extends around the entire circumference of cover 1380"" while base latch portion BL is a continuous structure that extends around the entire circumference of base 1390"". This configuration, compared to the configuration of FIG. 24L, may be more simple from a manufacturing and attachment standpoint, and may also further reduce the likelihood of extent of any deflection of the cover 1390"" and/or base 1390"" when using the latch mechanism to draw the cover toward the base.

Figure 24N:
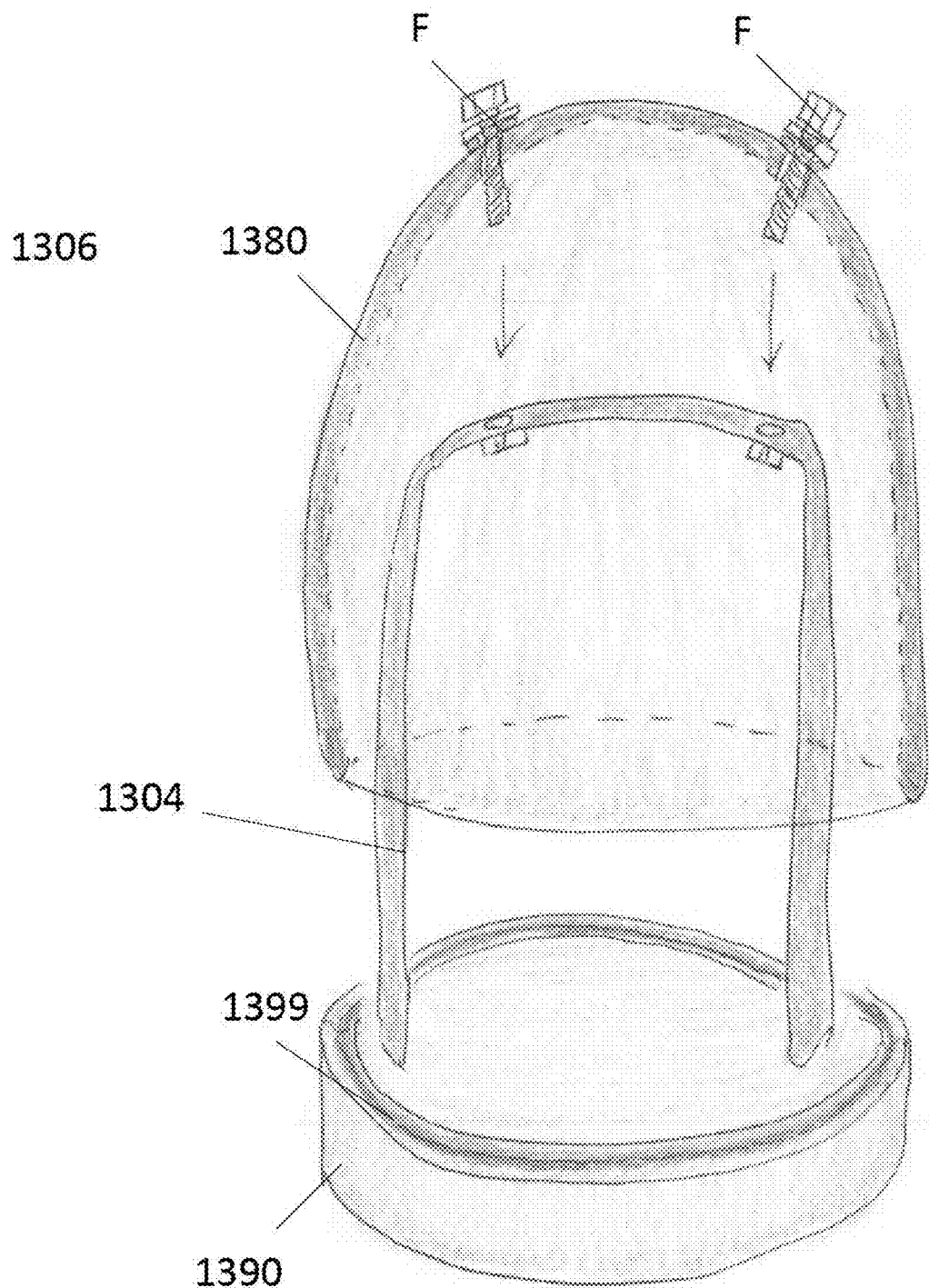
FIG. 24N is a perspective view of an example of a fastener system that may be used to seal a cover to a base in an unfastened condition.
Figure 24O:
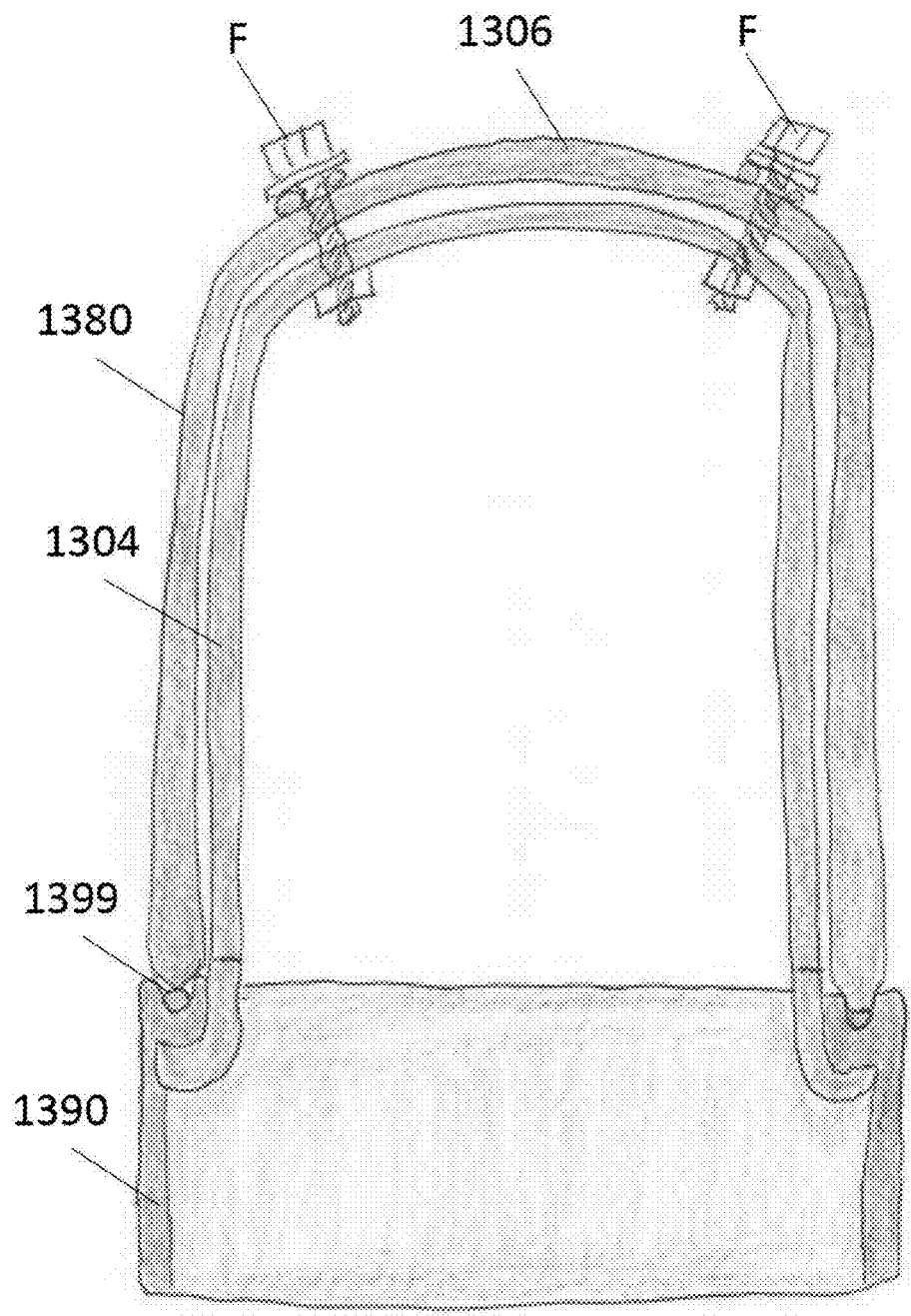
FIG. 24O is a perspective view of the fastener system of FIG. 24N in a fastened condition.

In some embodiments, the draw latches described above may be eliminated entirely and separate mechanisms for sealing and/or locking cover 1380 to base 1390 may be provided. For example, FIG. 24N illustrates an embodiment in which there are no draw latches, but rather fasteners F are provided coupled to cover 1380 to securely attach the cover 1380 to the base 1390. As shown in FIGS. 24N-0, a top portion 1306 of frame 1302 may include one or more apertures that align with apertures in cover 1380 when cover 1380 is coupled to base 1390. In the illustrated embodiment, two fasteners F are included with cover 1380. When cover 1380 is slid over frame 1302, the top portion 1306 of frame 1302 may guide the cover 1380 similar to the description in connection with FIGS. 22A-B. As the top of the cover 1380 nears the top portion 1306 of the frame 1302, as shown in FIG. 24O, apertures in the cover 1380 align with corresponding apertures in the top portion 1306 of frame 1301. At this point, fasteners F (which may be passed partially through cover 1380 as it is placed over the frame 1302) may be rotated to draw the cover 1380 into base 1390. In the illustrated example, fasteners F are bolts that may thread directly into the top portion 1306 of frame 1302, or into nuts or other receiving structures coupled to the top portion 1306 of frame 1302. However, it should be understood that the fasteners F may have suitable forms other than bolts, and although two fasteners F are shown, a single fastener may be used, or more than two fasteners may be used. Further, although FIG. 24O illustrates a gasket 1399 having a configuration similar to that of FIGS. 24J-K, it should be understood that other configurations may be suitable, such as that shown in FIG. 24H-I or that shown in FIG. 24C. In any event, using fasteners F to draw the cover 1390 toward base 1380 preferably results in a tight seal between the cover and the base, without the need for any of the types of latch mechanisms described above in connection with FIGS. 24A-M. It should further be understood that other components of the system, including portions of the communication system that would reside within frame 1302, are omitted from the view of FIGS. 24N-O to better and more clearly illustrate the mechanism for securing the cover 1380 to the base 1390 in a sealed condition.

Figure 20A:
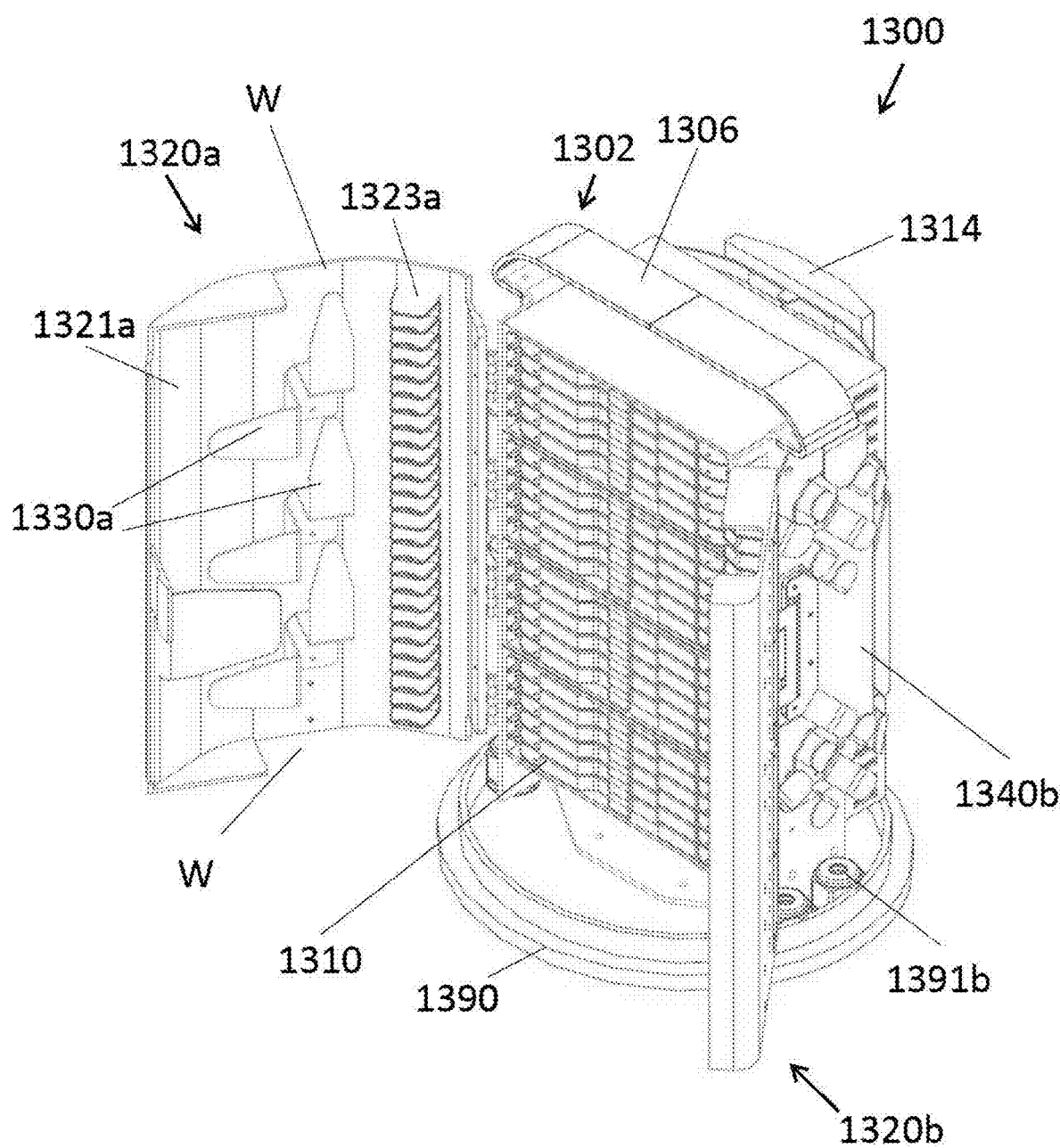
FIGS. 20A-D are perspective views of the patch panel system of FIGS. 19A-D with hanger plate assemblies in the maintenance condition.
Figure 20B:
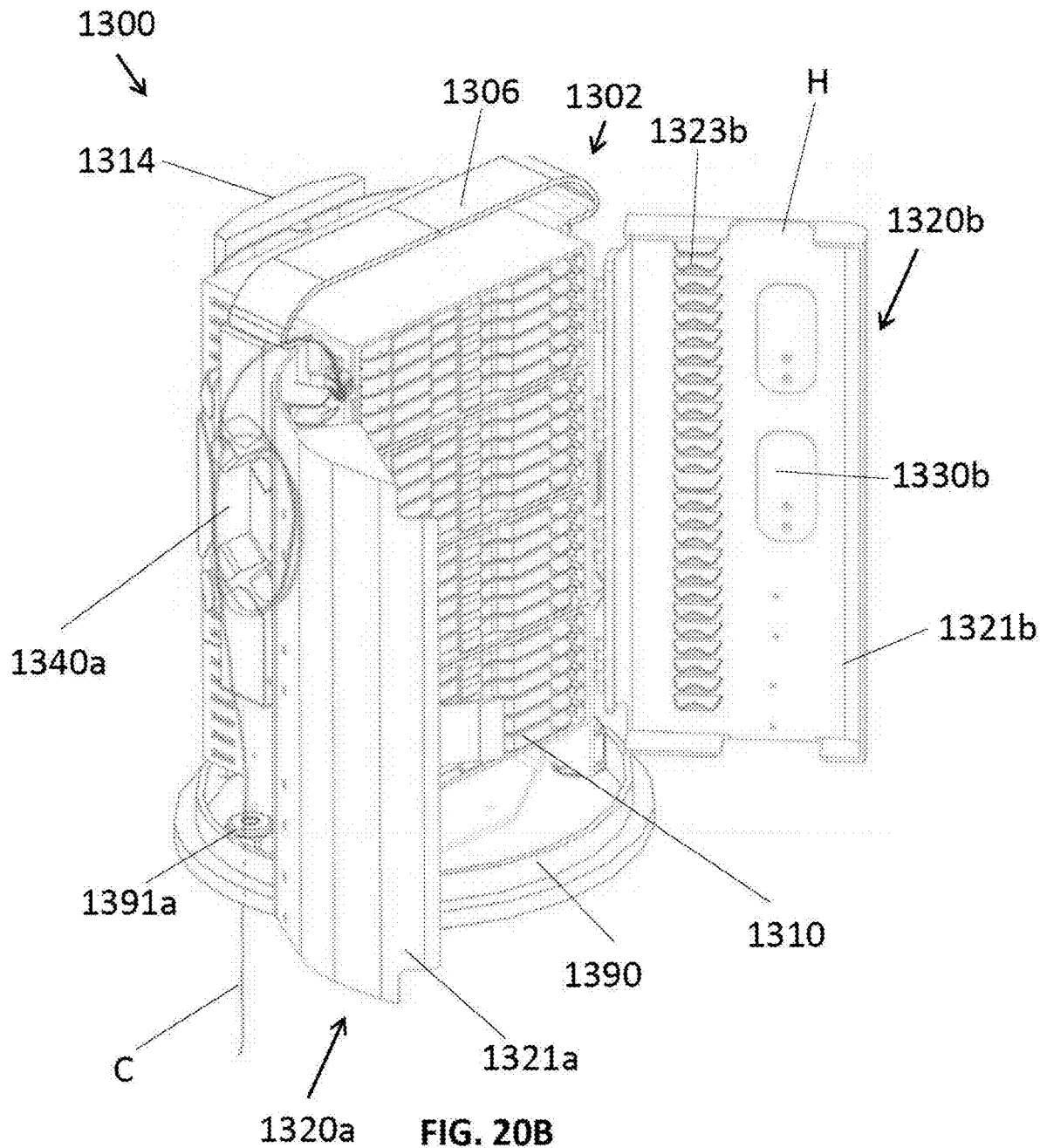
Figure 25A:
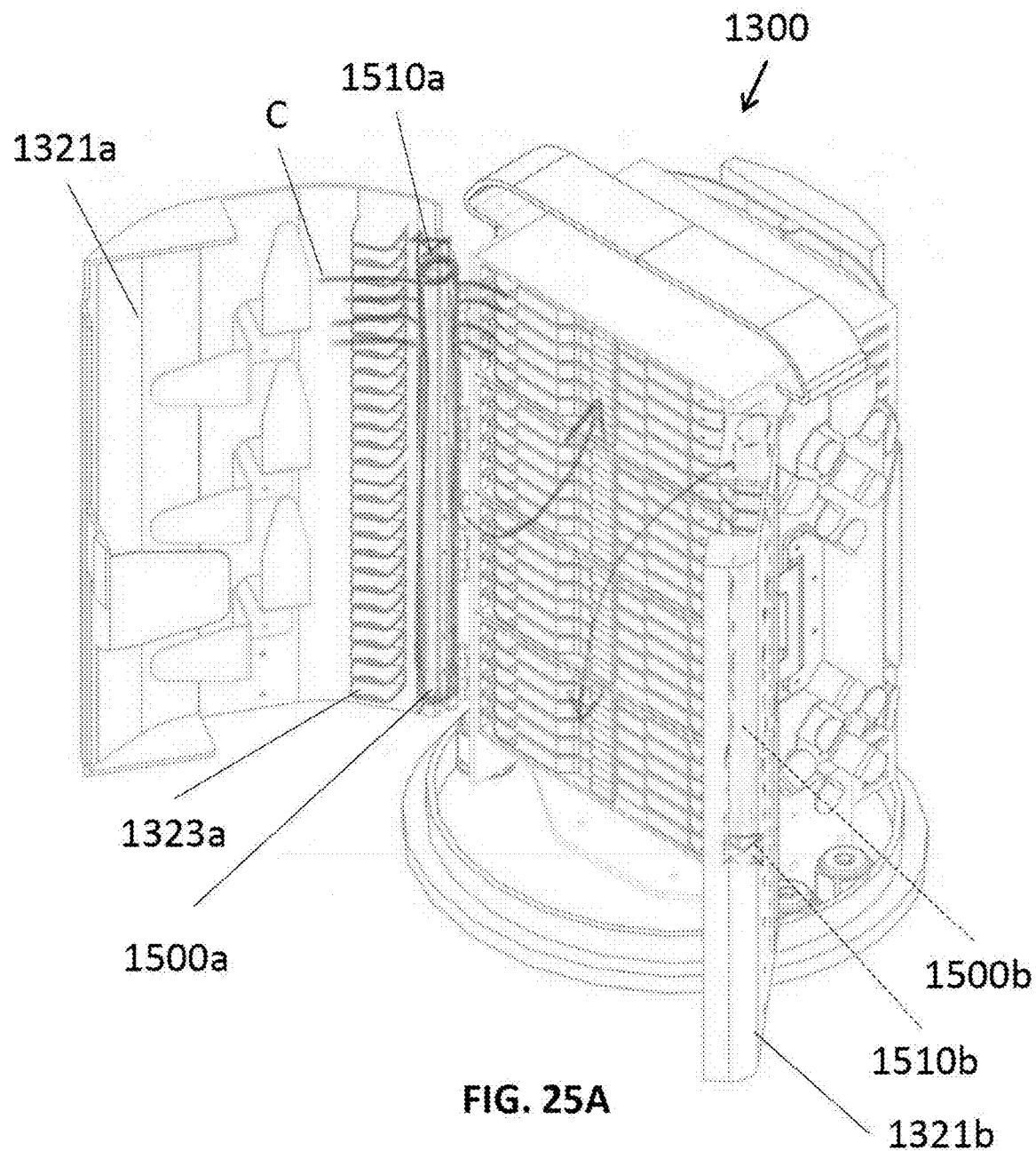
FIG. 25A is a perspective view of a bar accessory for use with the patch panel system of FIGS. 19A-D, the bar accessory positioned in a stored or installed condition.
Figure 25B:
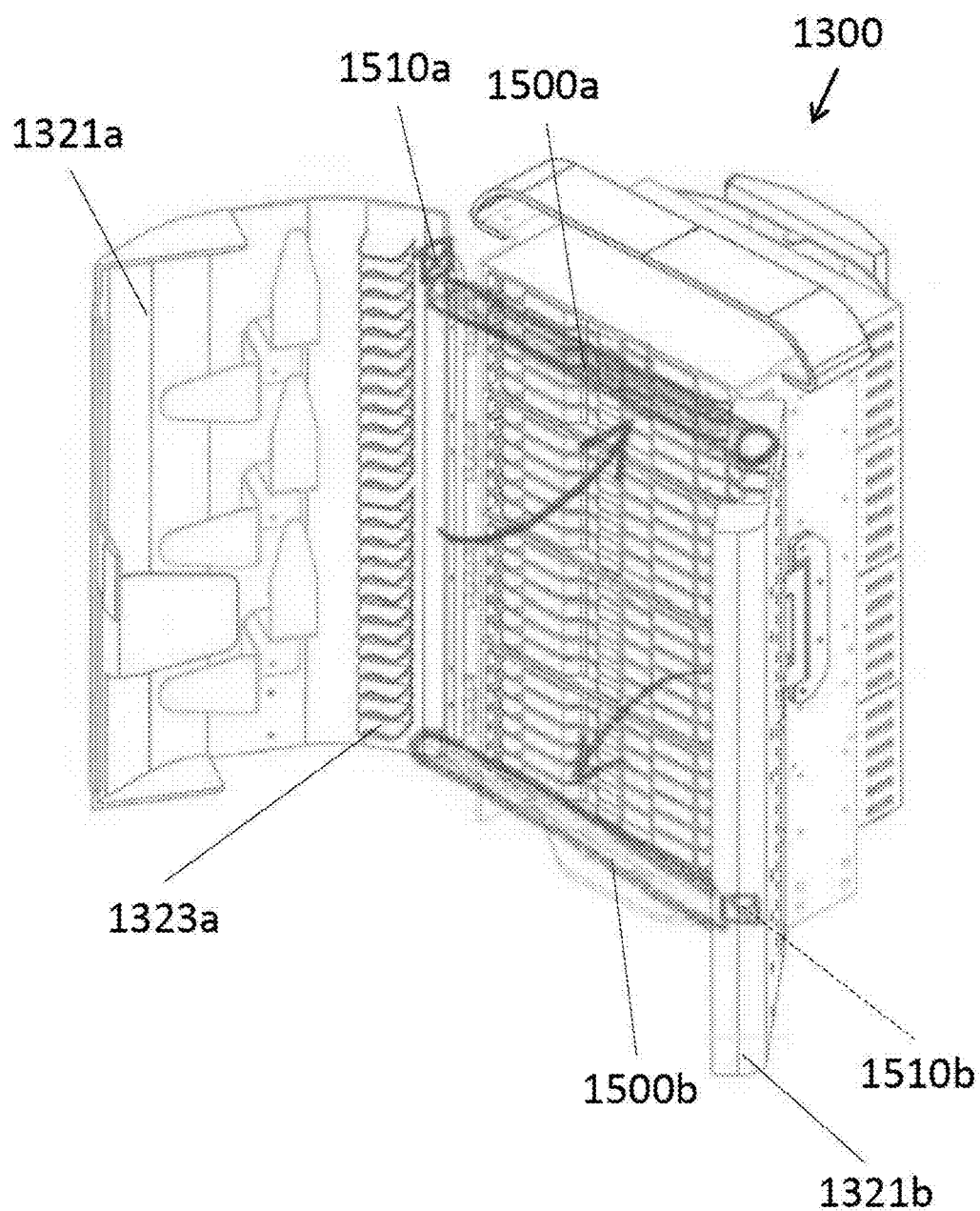
FIG. 25B is a perspective view of the bar accessory of FIG. 25A in an open or maintenance condition.

FIG. 25A shows patch panel system 1300 in the same view as FIG. 20A with an additional accessory member for maintaining the hanger plates 1321a, 1321b in the maintenance condition during maintenance of cables C. The accessory member may include a first bar 1500a attached to an inner surface of hanger plate 1321a near the hinge on the side wall 1304 of the frame 1302, and a second bar 1500b attached to an inner surface of hanger plate 1321b near the hinge with the other side wall 1304 of the frame 1302. It should be understood that, in the view of FIG. 25A, second bar 1500b is mostly blocked from view by hanger plate 1321b and is thus shown in dashed lines. In a stored condition of the bars 1500a, 1500b, each bar may extend from a bottom to a top of the corresponding hanger plate 1321a, 1321b, the bars in the stored condition allowing the hanger plates to freely open or close. The first bar 1500a may be connected to the hanger plate 1321a by a hinge 1510a at one of the top and bottom of the bar 1500a, and the second bar 1500b may be connected to hanger plate 1321b by a hinge 1510b at the other of the top and the bottom of the bar 1500b, such that the two bars 1500a, 1500b are hinged at opposite ends of the respective bars. When the hanger plates 1321a, 1321b are opened, the user may swing both bars 1500a, 1500b about their hinges 1510a, 1510b, as shown in FIG. 25B. With the bars 1500a, 1500b rotated about their respective hinges 1510a, 1510b to a maintenance condition, the bars 1500a, 1500b may prevent the hanger plates 1321a, 1321b from closing unintentionally. Preferably, bars 1500a, 1500b remain in a given position (i.e. stored position, maintenance position) in the absence of applied force, so that the bars do not move, i.e., swing, due to gravity in the absence of an intentional force applied by a user.

Figure 25C:
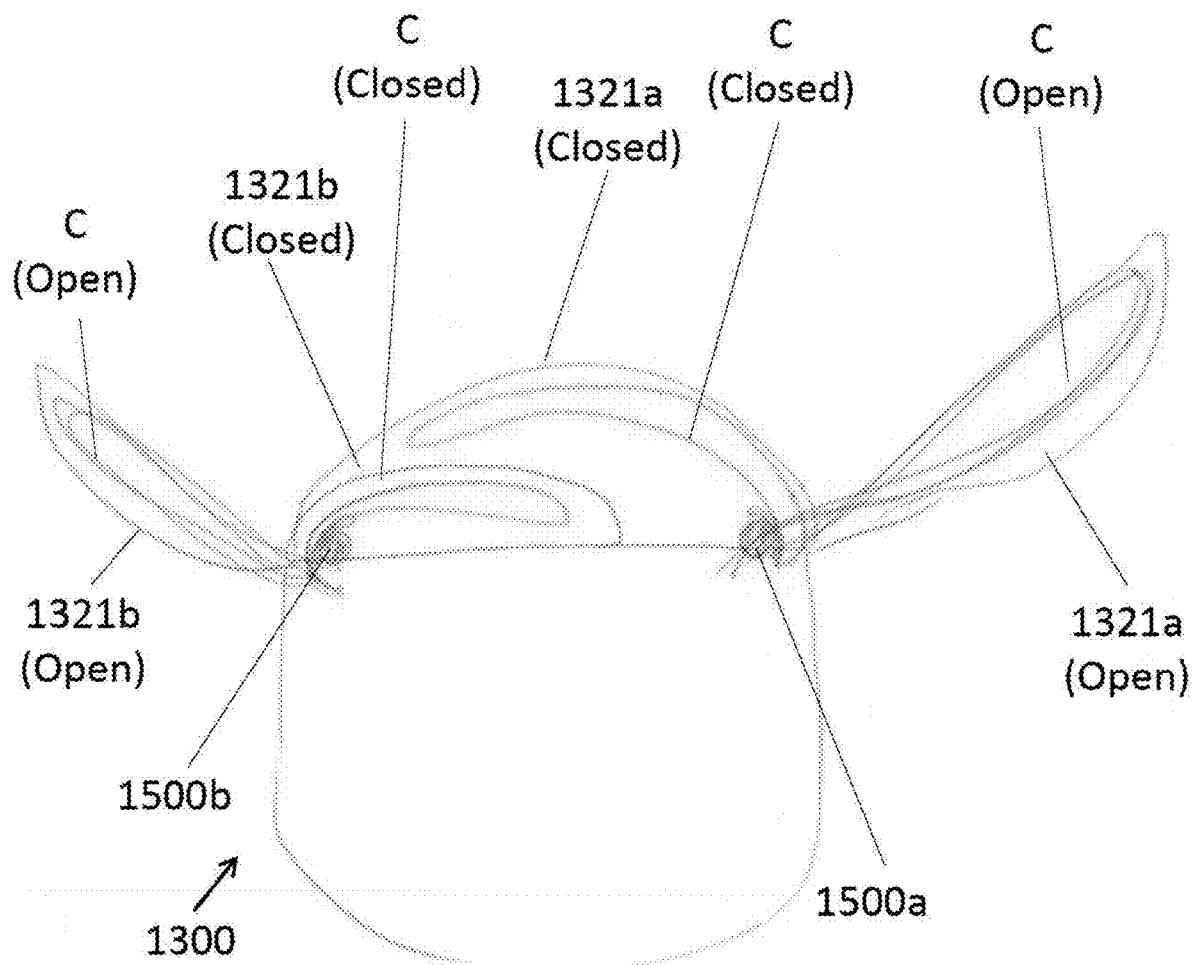
FIG. 25C is a top view of the bar accessory of FIG. 25A in the stored condition, with corresponding hanger plates shown in open and closed conditions.
Figure 25D:
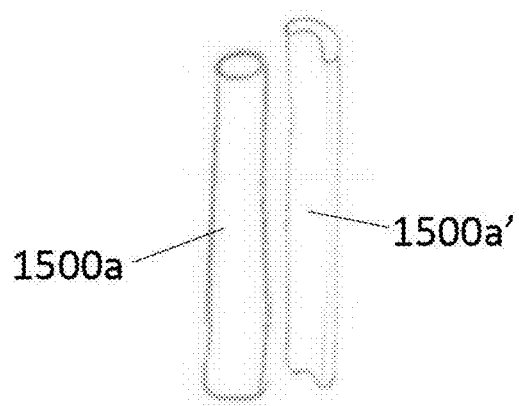
FIG. 25D is an isolated perspective view of one of the bar accessories of FIG. 25A.

In the stored condition of the bars 1500*a*, 1500*b*, the bars may overlie one or more cables C such that a user may be required to swing the bars to the maintenance condition in order to perform maintenance. This may provide a safety condition that the user is forced to initiate prior to being able to perform maintenance. Cables C passing behind bar 1500*a* are shown in FIG. 25A. FIG. 25C shows a top view of patch panel system 1300 with the bars 1500*a*, 1500*b* in the stored condition and the hanger plates 1321*a*, 1321*b* in both the installed (closed) and maintenance (open) conditions for comparison. The fact that the bars 1500*a*, 1500*b* may overlie cables C when the bars are in the stored position is also illustrated in FIG. 25C. The bars 1500*a*, 1500*b* may have various shapes and preferably are rigid enough to prevent the hanger plates 1321*a*, 1321*b* from unintentionally closing when the bars 1500*a*, 1500*b* are rotated about their hinges 1510*a*, 1510*b* and the hanger plates of the patch panel system 1300 is in the maintenance condition. The bars 1500*a*, 1500*b* may be substantially cylindrical, which may provide that a minimum bending radius is maintained for the cables C when the bars 1500*a*, 1500*b* overlie the cables C and the patch panel system 1300 is in the stored condition. A cylindrical shape of bar 1500*a* is illustrated in FIG. 25D. However, as noted above, other shapes may be suitable, particularly ones that provide for a minimum bending radius to be maintained for cables C. For example, FIG. 25D illustrates an alternate shape for a bar 1500*a*' that may be used as an alternative to the cylindrical shape of bar 1500*a*. As illustrated, bar 1500*a*' includes an outer arcuate surface, the outer arcuate surface intended to contact cables C to maintain a minimum bending radius of the cables. It should be understood that a bar having an arcuate shape, such as bar 1500*a*', may be used in place of bar 1500*b* as well. Still further, it should be understood that the bars 1500*a*, 1500*b* may be attached to the frame 1302 instead of the hanger plates 1321*a*, 1321*b*. For example, a bracket with a hinge may be mounted on each side wall 1304 of frame 1302 near opposite corners of the front open face of the frame 1302, one bar attached to each bracket. However, other attachment methods are within the scope of this disclosure.

Figure 26A:
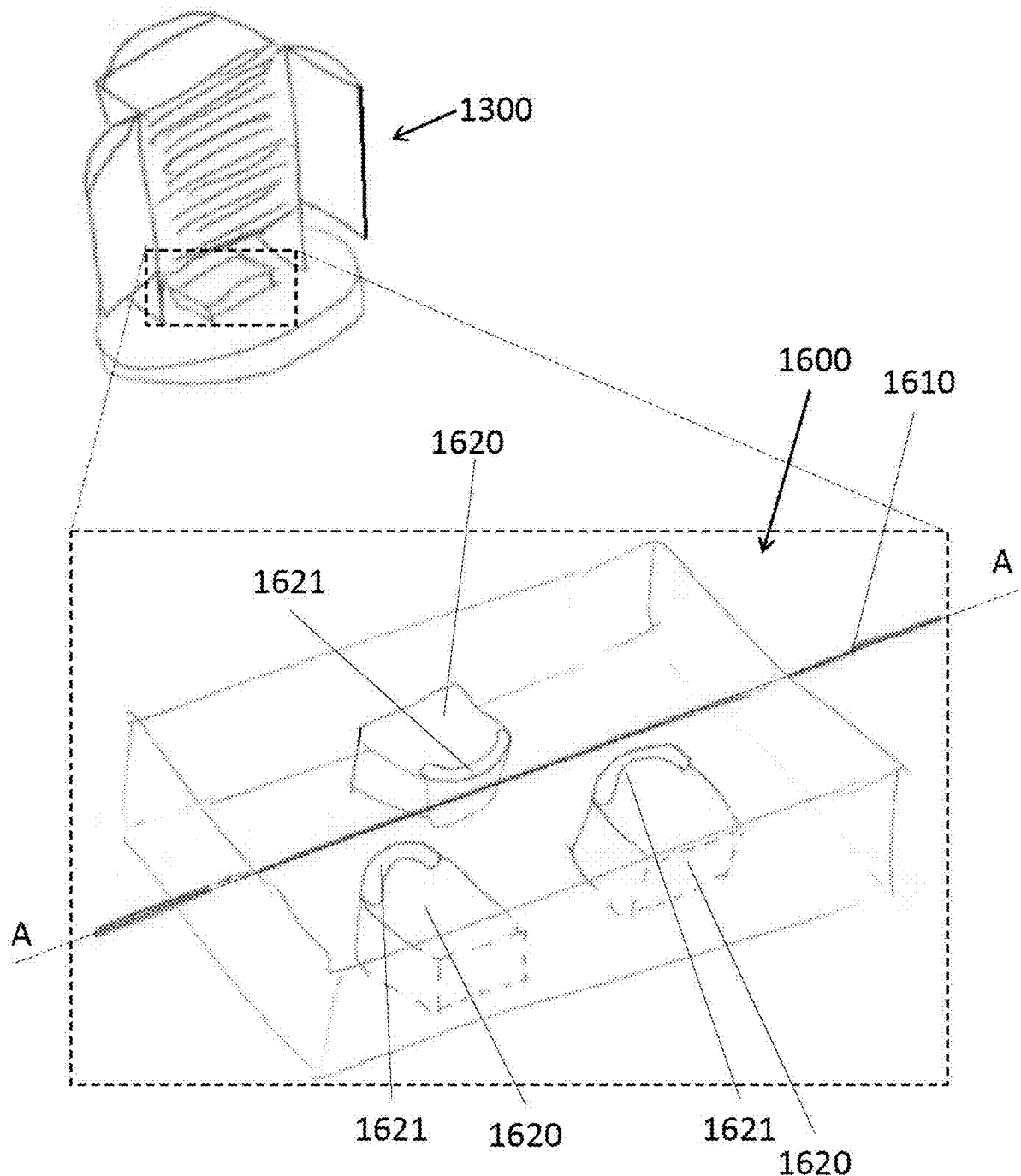
FIG. 26A is a perspective view of a water sensor for use with the patch panel system of FIGS. 19A-D.
Figure 26B:
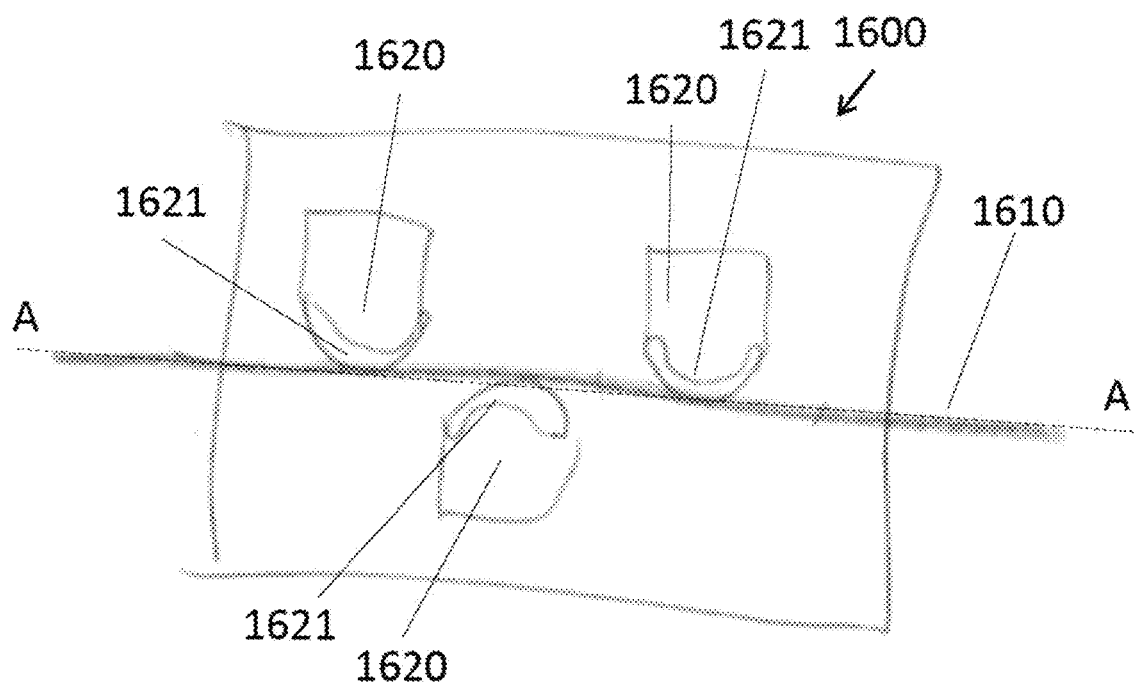
FIG. 26B is a top view of the water sensor of FIG. 26A in a dry condition.
Figure 26C:
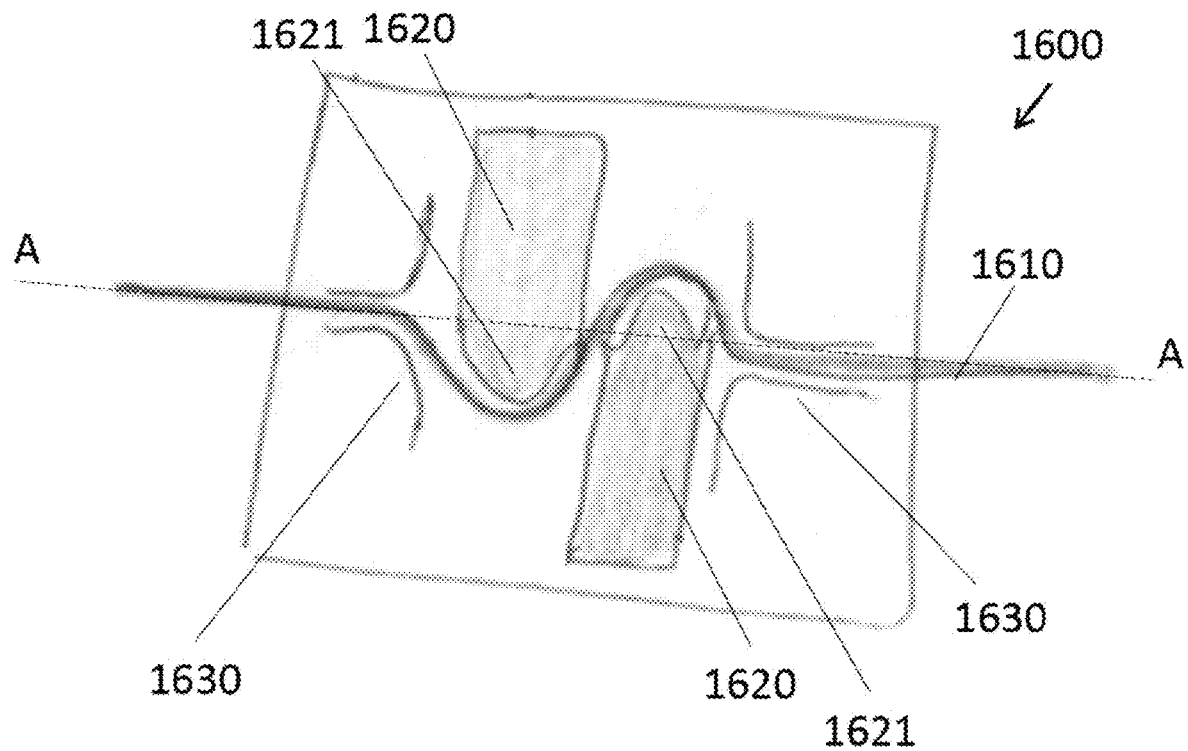
FIG. 26C is a top view of the water sensor of FIG. 26A in a wet condition.

FIG. 26A shows patch panel system 1300 with an accessory in the form of a water sensor system 1600. When used with water sensor system 1600, the side walls 1304 of frame 1302 may extend a farther distance below bottom portion 1308 of frame 1302 in order to create a recessed space between the bottom portion 1308 of the frame 1302 and the base 1390 and in which the water sensor system 1600 is disposed. Water sensor system 1600 may be part of an optical time domain reflectometer ("ODTR") system, and configured to include an optical fiber cable 1610 extending along a nominal axis A between at least one pair of sponges 1620 or other water-absorbing structures. The cable 1610 may be part of the system 1600 and configured for coupling to another cable supplied from external the system 1300, or be an optical fiber cable supplied from external the system 1300. It should be understood that only a portion of cable 1610 is shown in FIGS. 26A-C, and cable 1610 may connect to other portions of an OTDR system as known in the art. In the illustrated embodiment, each sponge 1620 includes a rear portion facing away from cable 1610 and a front portion facing cable 1610, where the front portion includes a rounded forward-most portion 1621.

In a dry state of the water sensor system 1600, as shown in FIGS. 26A-26B, the cable 1610 may extend along the nominal axis A between the dry sponges 1620, where the forward-most portions 1621 of the sponges face the nominal axis, and are in contact with or directly adjacent the cable 1610, such that cable 1610 extends substantially straight along the nominal axis. If water enters into the patch panel system 1300, for example during a flooding event, the sponges 1620 may absorb water and expand in size, as shown in FIG. 26C. It should be understood that for simplicity of illustration, only two sponges 1620 are shown in FIG. 26C. As shown in FIG. 26C, the expansion in size of the sponges 1620 may cause the forward-most portions 1621 of the sponges 1620 to extend beyond the nominal axis A, so as to contact and push cable 1610 away from the nominal axis, with adjacent sponges pushing the cable 1610 in opposite directions, causing the cable 1610 to bend at the sponges 1620, such that an optical signal passing through the cable 1610 may be partially attenuated or completely interrupted at the bent cable portions. As should be understood, two, three, or more sponges may be used in such a sensor system, preferably with at least two adjacent sponges 1620 positioned on opposite sides of cable 1610. The partial attenuation or complete interruption of an optical signal carried by cable 1610 may be detected by the OTDR system which may indicate to a user that damage has occurred in a particular patch panel system 1300 at a particular location. Thus, water sensor system 1600 may help diagnose problems in patch panel systems, and may assist in identifying the particular patch panel system 1300 from a group of patch panel systems that has encountered a flooding event or other water event. FIG. 26C illustrates that one or more guides 1630 may also be included in water sensor system 1600. Cable 1610 may extend along one or more guides 1630 such that, upon expansion of one or more sponges 1620, the cable 1610 is more likely to bend in a desired manner to cause signal disruption or interruption.

Figure 27A:
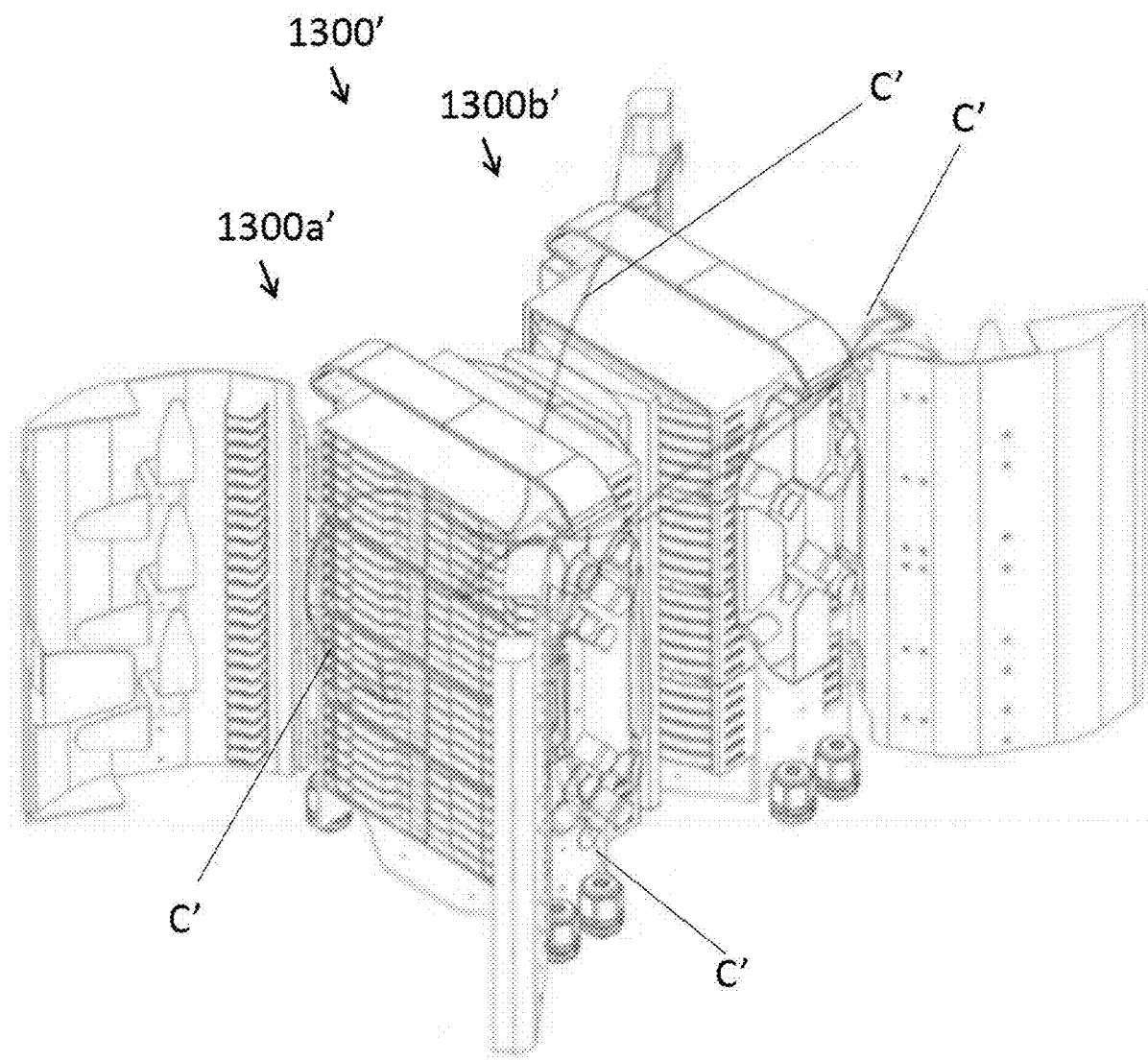
FIG. 27A is a perspective view of a double patch panel system with hanger plates in an open or maintenance condition, the system including two patch panel systems similar to those shown in FIGS. 19A-D.
Figure 27B:
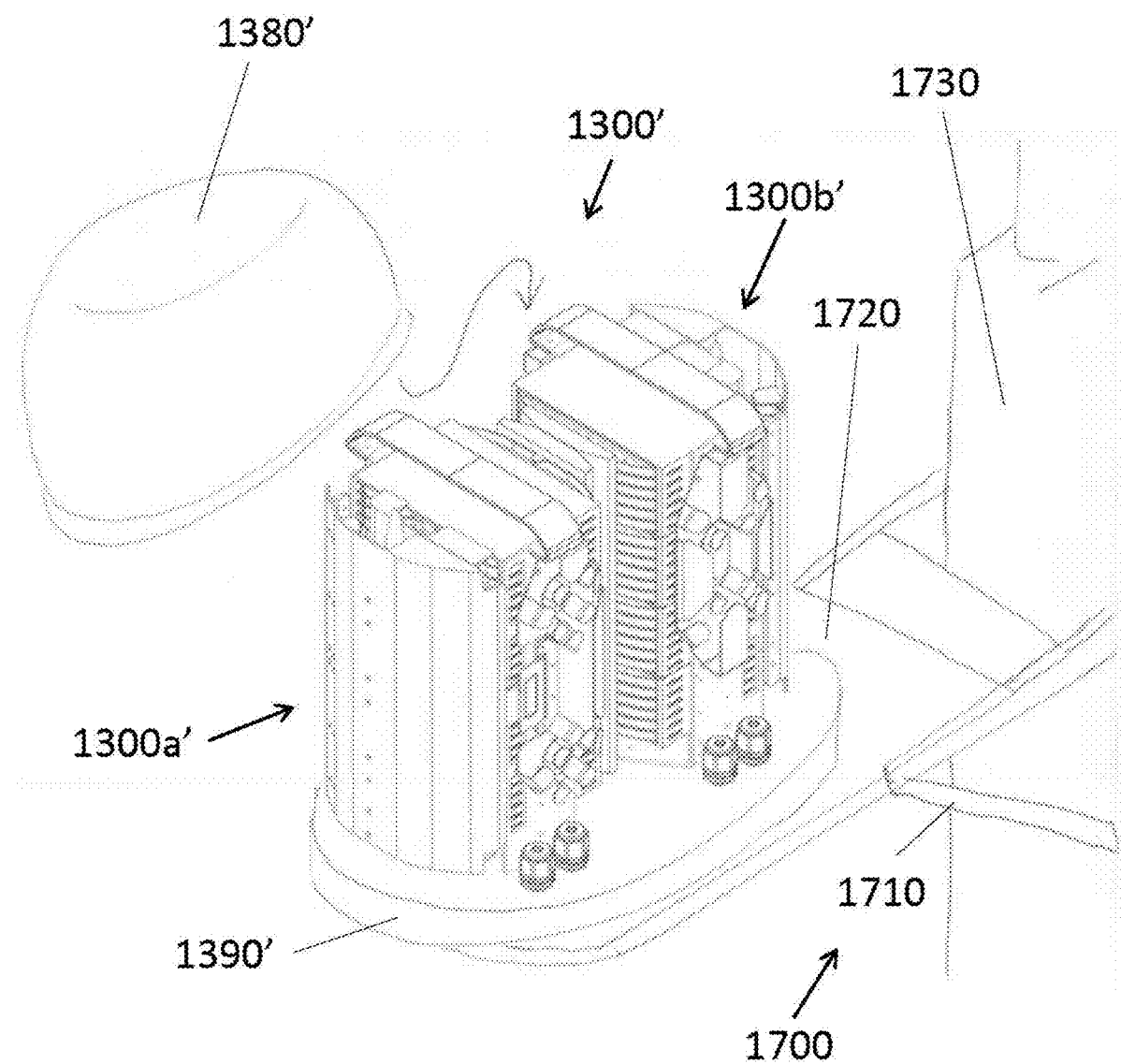
FIG. 27B is a perspective view of the double patch panel system of FIG. 27A with hanger plate assemblies in a closed or installed condition and supported on a sliding shelf.

FIG. 27A shows a patch panel system 1300' according to another aspect of the disclosure. Patch panel system 1300' may include a first patch panel system 1300*a*', and a second patch panel system 1300*b*', which may each be similar or identical to one another and similar or identical to patch panel system 1300 described above. Similar or identical components of patch panel systems 1300*a*' and 1300*b*' are not described in additional detail here, as they have been described above in connection with patch panel system 1300. Patch panel systems 1300*a*' and 1300*b*' may be positioned back to back with a rear face of the rear cartridge of each patch panel system 1300*a*' and 1300*b*' facing one another. Cables C' from one of the patch panel systems 1300*a*' may be connected to the other patch panel system 1300*b*' (and vice versa) to effectively double the capacity of the combined patch panel system 1300' compared to a single patch panel system 1300. In one example, as shown in FIG. 27A, cables C' at first patch panel system 1300*a*' may extend through a side path between a hanger plate and the frame, along a side hanger and then to the adjacent second patch panel system 1300*b*'. In another embodiment, the cable(s) C' may extend over the frame of one patch panel system 1300*a*' to the adjacent second patch panel system 1300*b*'. FIG. 27B shows the hanger assemblies of patch panel system 1300' of FIG. 27A in an installed condition. As shown, both patch panel systems 1300*a*', 1300*b*' may be attached to a single base 1390', which may be similar to base 1390 in most respects other than the size and the shape of the base 1390' which may be configured to receive two patch panel systems 1300*a*', 1300*b*' compared to base 1390 which may be configured to receive a single patch panel system 1300. Similarly, patch panel system 1300' may be covered by a single cover 1380', which may be used to cover both patch panel systems 1300*a*' and 1300*b*' simultaneously. Cover 1380' may be similar or identical to cover 1380 in all respects other than the size and shape, as cover 1380' is configured to overlie two patch panel systems 1300a', 1300b' while cover 1380 is configured to overlie a single patch panel system 1300. For example, cover 1380' may include two pairs of internal guide slots instead of a single pair of guide slots 1382 as may be provided with cover 1380. In the embodiment of patch panel system 1300' illustrated in FIG. 27B, the patch panel system 1300' is supported on a shelf 1700 that may slide relative to a structure to which the shelf is attached. The shelf 1700 may take the form of a mount bracket 1710 that includes a sliding shelf member 1720 that slides with respect to the mount bracket 1710. In some embodiments, base 1390' may be rotatably mounted on shelf member 1720 so that base 1390' may rotated with respect to shelf member 1720. As illustrated, both base member 1390' and shelf member 1720 include substantially flat surfaces that remain parallel to one another during rotation. The rotation may have any desired range, for example up to 90 degrees in one direction, or up to 90 degrees in two directions for a total of 180 degrees of rotation, although more or less rotation may be provided as desired. Mount bracket 1710 may be mounted or otherwise fixed to any suitable support structure, such as a pole 1730. As noted above in connection with FIGS. 19C-D and 20C-D, the rear cartridges of patch panel systems 1300a' and 1300b' may rotate or slide in a single plane to the left or the right so that the cartridge generally remains parallel to the rear face of the respective patch panel system 1300a' or 1300b'. Other types of rotation of the rear cartridges of patch panel systems 1300a' and 1300b' may otherwise be precluded since the rear cartridges might not have clearance to rotate away from the rear face of the particular patch panel system.

Figure 28A:
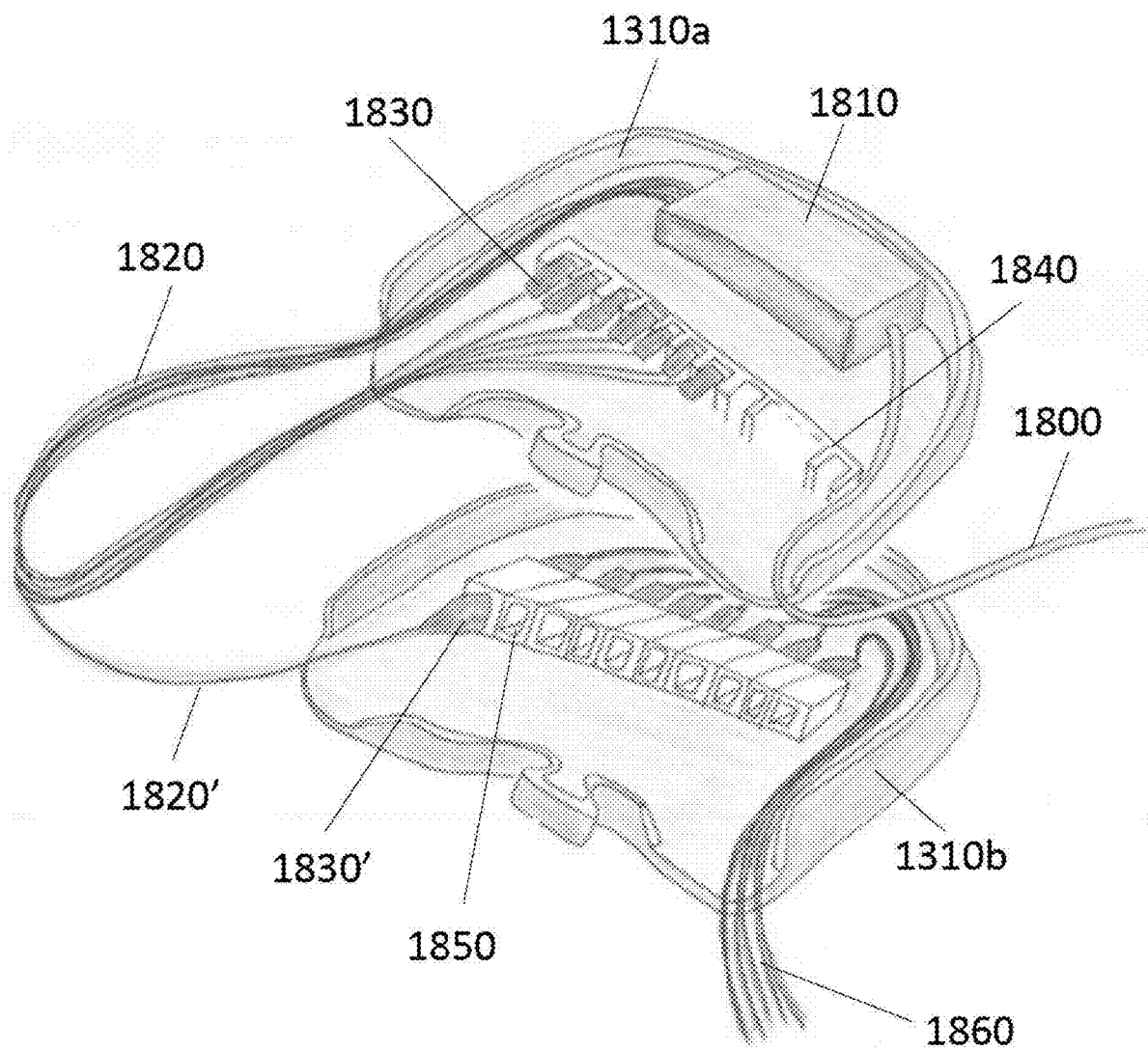
FIG. 28A is a perspective view of two individual cassettes of the patch panel system of FIGS. 19A-D.
Figure 28B:
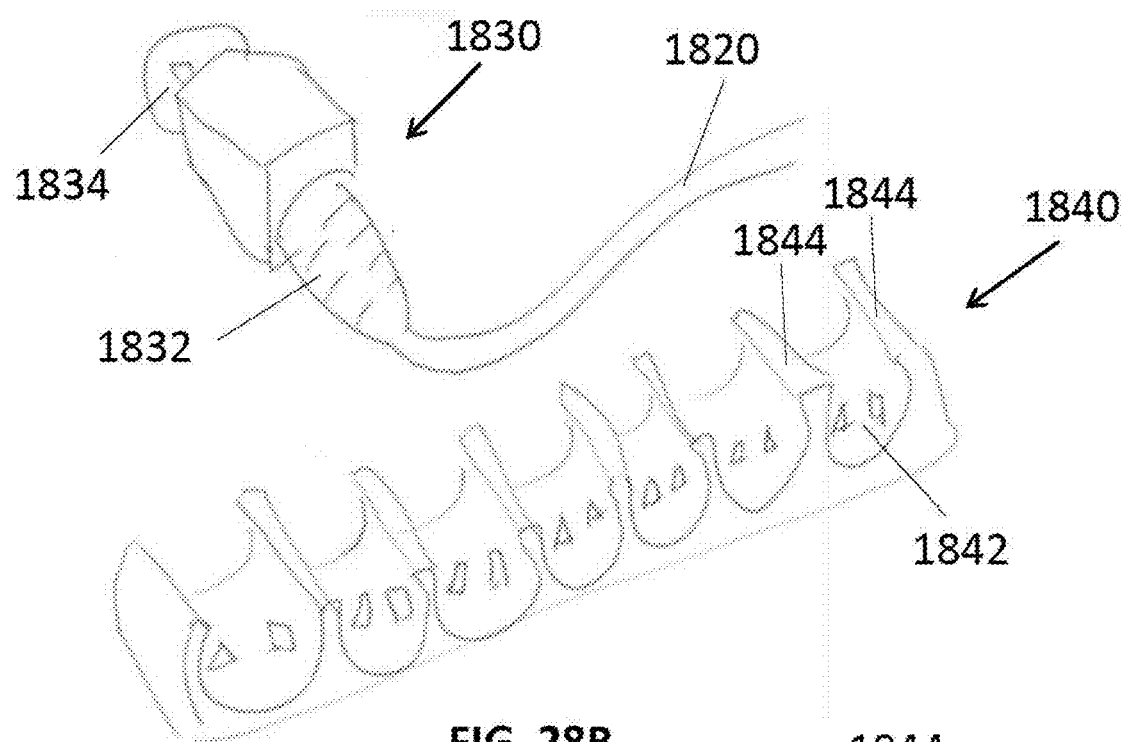
FIG. 28B is an isolated perspective view of a cable disconnected from a storage rack.
Figure 28C:
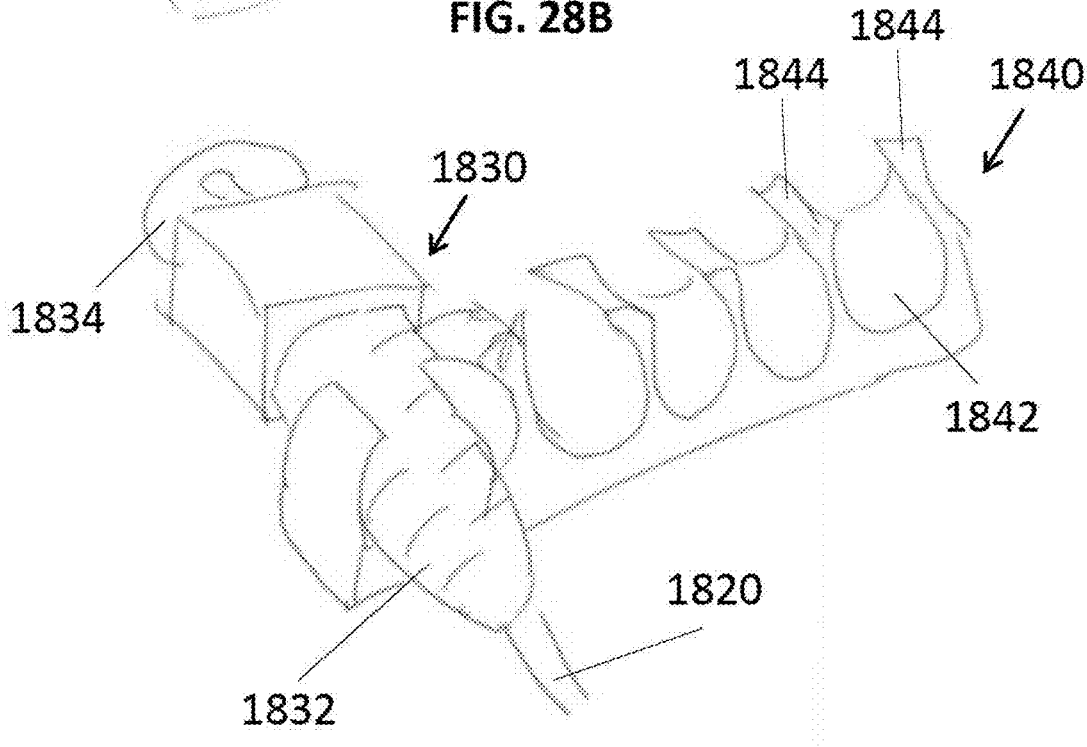
FIG. 28C is an isolated perspective view of a cable connected to the storage rack of FIG. 28B.
Figure 28D:
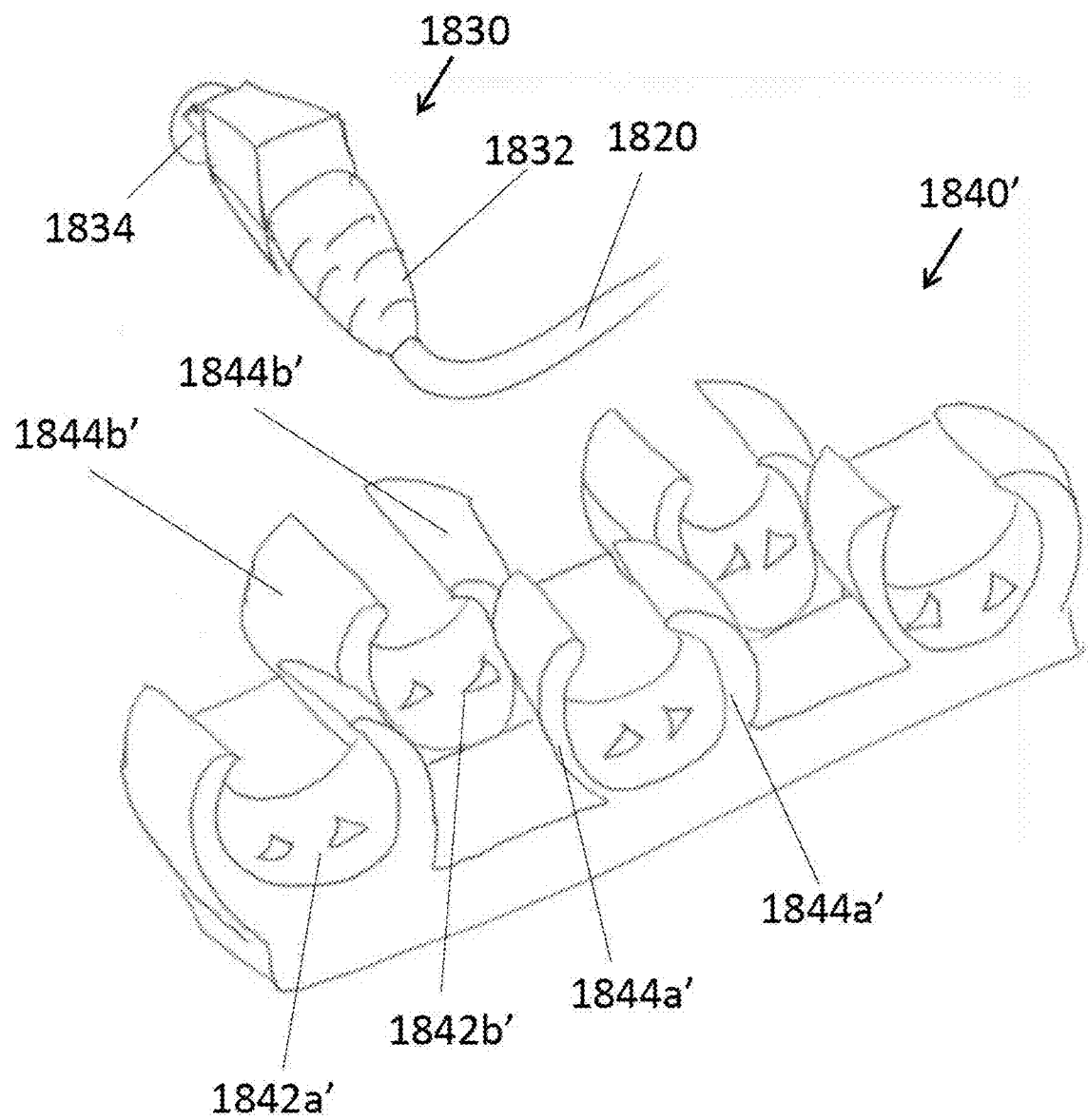
FIG. 28D is an isolated perspective view of a cable disconnected from an alternate version of a storage rack.

FIG. 28A illustrates two cassettes 1310a, 1310b of patch panel system 1300 of FIGS. 19A-20D, although similar concepts may be applied to other patch panel systems described herein. The first cassette 1310a may receive an input cable 1800, for example from a service provider, which is coupled to a splitter module 1810. The splitter 1810 may split the signal(s) supplied from the input cable 1800 among a plurality of cables 1820. The cables 1820 may exit the splitter module 1810 and be routed to terminate at connectors 1830, each individual connector 1830 being positioned in a storage rack 1840. The storage rack 1840 may function to organize the cables 1820 exiting the splitter module 1810 which are routed to the individual cassette. In one embodiment, when an operator desires to connect one of the cables 1820 exiting the splitter module 1810 to a service subscriber, the connector 1830' of a cable 1820' may be removed from the storage rack 1840 and coupled to a connector 1850 within a separate cassette 1310b of the patch panel system 1300', resulting in the service subscriber being connected to the service provider via a cable 1860 and a corresponding cable 1820'. It should be understood that, in FIG. 28A, cables 1820 and cable 1820' (as well as connectors 1830 and connector 1830') may be identical in structure and function, with the different designation referring only to the fact that the cable is in a stored condition (1820, 1830) or in a connected service providing condition (1820', 1830'). The cable storage rack 1840 may be removable from cassette 1310a such that, after all of the cables 1820' exiting the splitter module 1810 are coupled to connectors 1850 within patch panel cassette 1310b (or another similar cassette) to connect service subscribers to the service provider, the cable storage rack 1840 may be physically removed from the cassette 1310a since no more cables 1820 are stored on the cable storage rack 1840. FIGS. 28B and 28C illustrate an exemplary embodiment of the cable storage rack 1840. In particular, FIG. 28B illustrates an isolated view of the connector 1830 of a cable 1820, which may include a strain relief such as a "boot" 1832 and a connector cap 1834, positioned adjacent the cable storage rack 1840, and FIG. 28C illustrates the boot 1832 of the cable 1820 stored within the cable storage rack 1840. The cable storage rack 1840 may include a plurality of resting spaces 1842 bounded by pairs of adjacent walls 1844 that can deflect to allow the boot 1832 of the connector 1830 to be securely stored within the cable storage rack 1840. If a cable boot 1832 is stored within one slot 1842 in the cable storage rack 1844, deflection of one or both adjacent walls 1844 may be restricted when a cable boot 1832 is snapped into an adjacent slot 1842. FIG. 28D illustrates another embodiment of a cable storage rack 1840' that staggers positioning of adjacent individual slots 1842a' and 1842b' alternating in two rows, where each slot 1842a' and 1842b' has respective slot walls 1844a' and 1844b', the slots 1842a', 1842b' of each row being spaced apart from adjacent slots 1842a', 1842b' in the same row so that the walls 1844a', 1844b' are able to freely deflect, regardless of whether a cable boot 1832 is stored within an adjacent cable slot 1842a', 1842b' in the same row. It should be understood that a plurality of splitter cassettes 1310a and a plurality of fiber distribution cassettes 1310b may be included in patch panel system 1300. For example, the top or bottom half of patch panel system 1300 may include splitter cassettes 1310a, and the other of the top or bottom half of patch panel system 1300 may include fiber distribution cassettes 1310b. This configuration may help better organize the cables entering and exiting the patch panel system 1300, as well as cables connecting splitter cassettes 1310a to fiber distribution cassettes 1310b. However, it should be understood that the cassettes 1310 need to be exactly arranged this way, and modifications may be suitable.

Figure 28E:
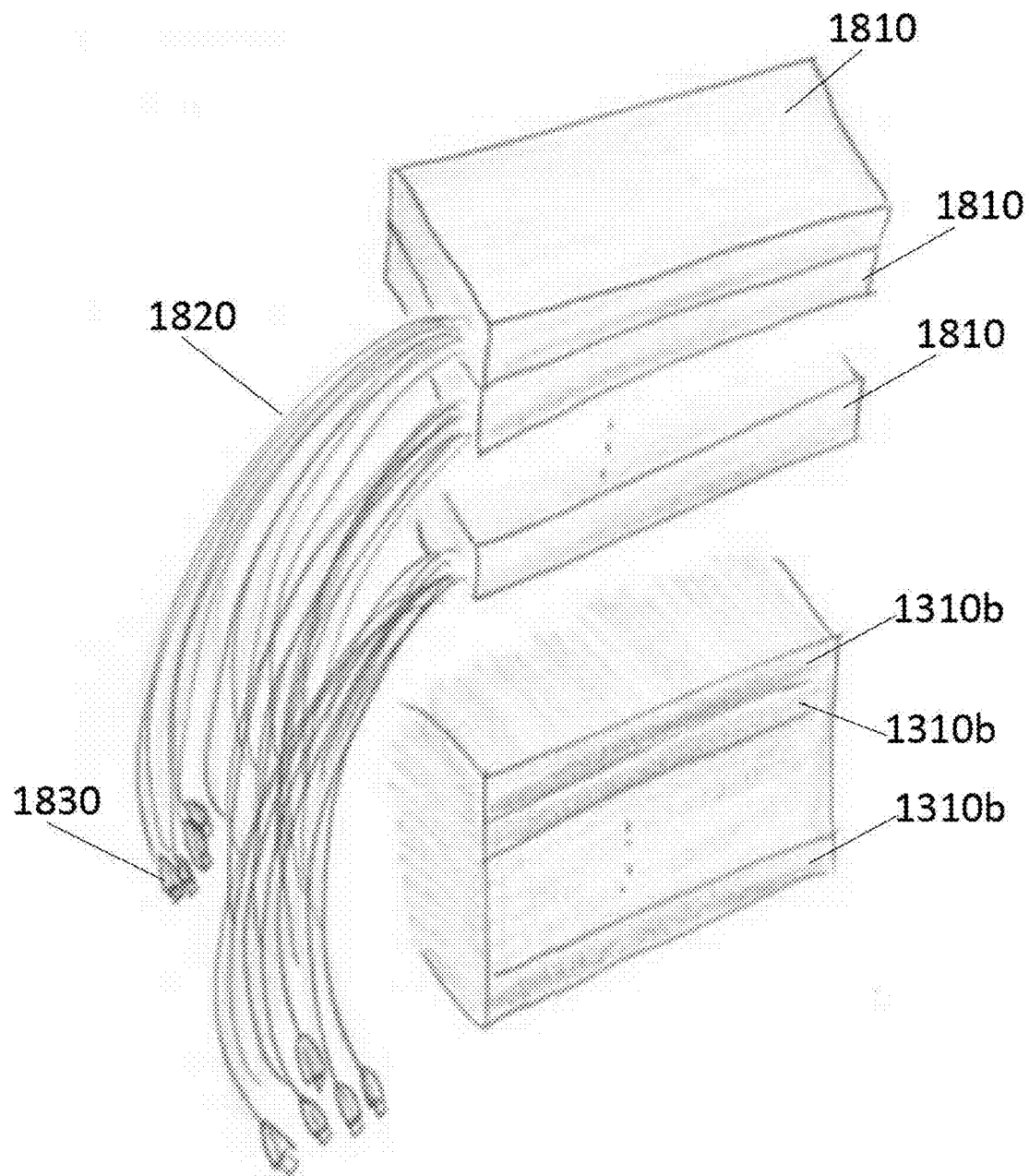
FIG. 28E is a schematic view of a plurality of splitter modules having cables extending therefrom.

FIG. 28E illustrates a plurality of splitter modules 1810 in a stacked configuration, in accordance with an aspect of the present disclosure. Although the stacked configuration of the splitter modules 1810 is described below with reference to an exemplary embodiment of being provided on a splitter cassette 1310a similar to that shown in FIG. 28A, it should be understood that the construction and features of the stacked configuration of modules 1810 may be used in another implementation associated with optical fiber routing and management. Referring to FIG. 28E, each splitter module 1810 may include a plurality of individually sheathed cables 1820 that each terminate in a connector 1830, similar to that shown in FIG. 28A. FIG. 28E illustrates that, when an optical fiber distribution and routing implantation includes a plurality of stacked splitter modules 1810 that each include a plurality of individually sheathed cables 1820 that may be connected to any one of a plurality of connectors (such as connectors 1850 of any one of a group of stacked fiber distribution cassettes 1310b shown in FIG. 28A), congestion and/or tangling of cables 1820 may become a problem. In the example of FIG. 28E, each cable 1820 may have a cable jacket or sheath forming an exterior of the cable and housing an individual fiber, where an outer diameter of the cable at the exterior surface of the jacket or sheath is between about 0.9 mm and about 1.6 mm.

Figure 28F:
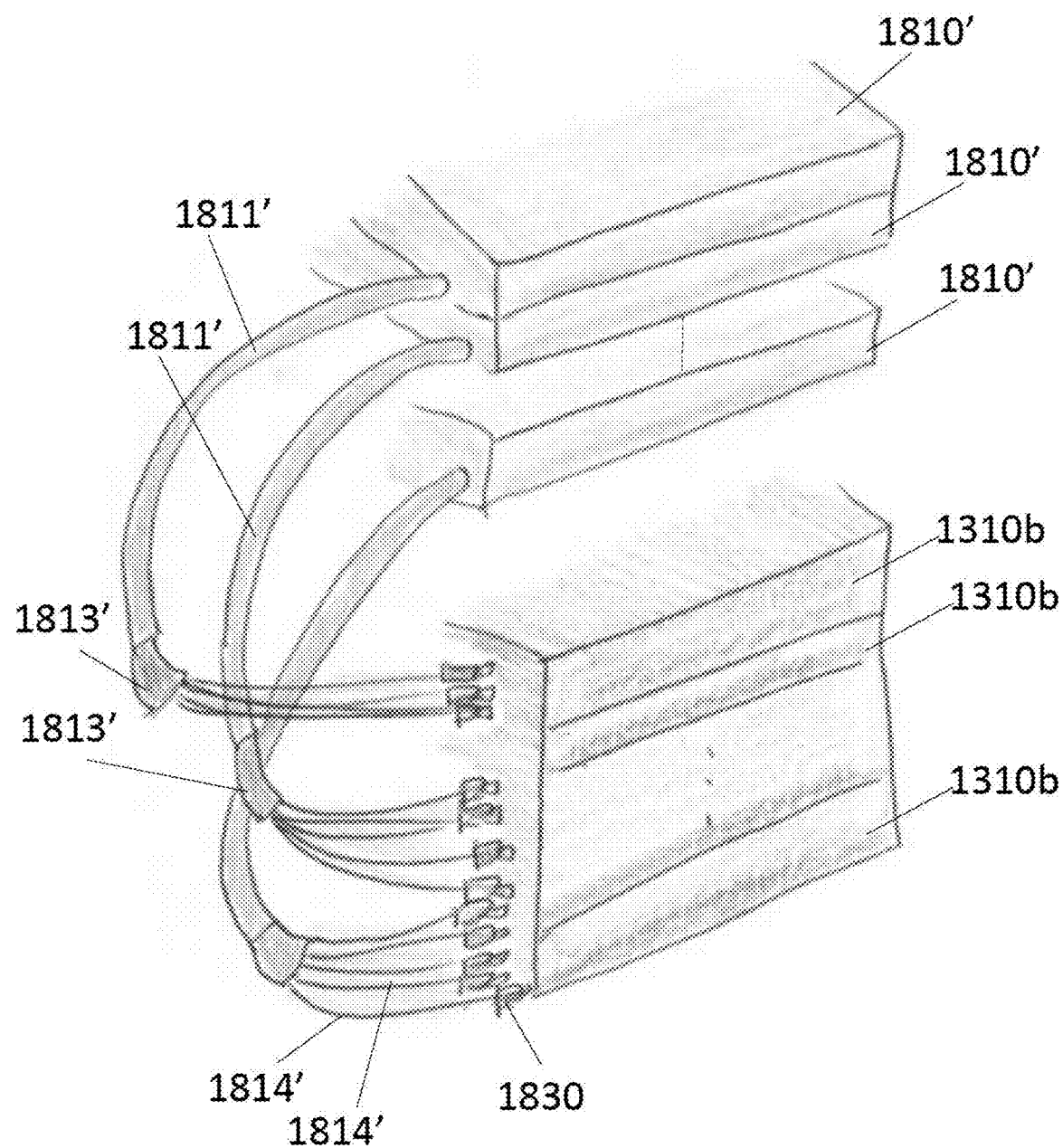
FIG. 28F is a schematic view of a plurality of splitter modules similar to FIG. 28E with an output cable extending from each of the splitter modules.
Figure 28G:
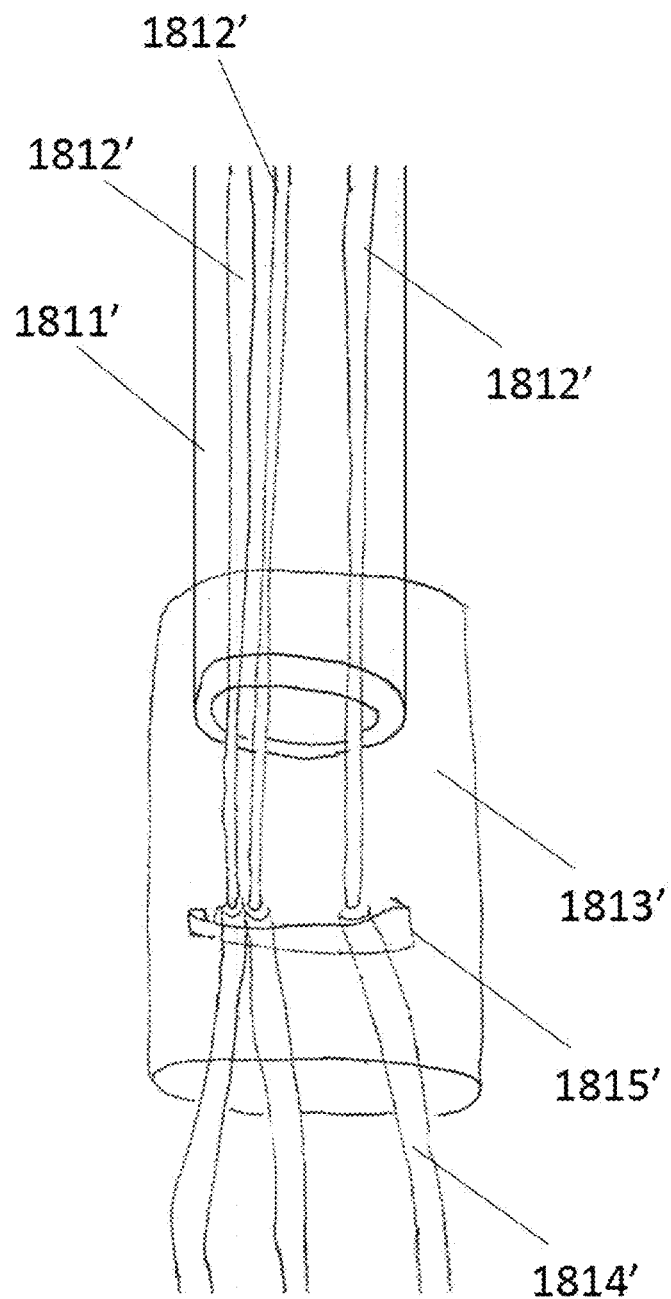
FIG. 28G is a schematic view of a coupling between one of the output cable of FIG. 28F and a plurality of individual cables exiting the coupling.

FIG. 28F illustrates a plurality of splitter modules 1810' in a stacked configuration similar to FIG. 28E with at least one distinction. In particular, whereas splitter module 1810 includes a plurality of individual cables 1820 each containing therein, within the sheath or outer jacket of the cable, an individual fiber extending out of the splitter module 1810, each splitter module 1810' may include an output cable 1811' extending therefrom, where the output cable 1811' houses within its sheath or outer jacket a plurality of individual fibers 1812' (see FIG. 28G). For example, if each splitter module 1810 includes thirty-two individual cables 1820 extending therefrom, with each cable housing a single fiber, each splitter module 1810' may include an output cable 1811' exiting the splitter module 1810', the output cable 1811' housing thirty-two fibers 1812'. Referring now to FIGS. 28F and 28G, the output cable 1811' may terminate in a coupling 1813'. Each individual fiber 1812' may exit cable 1811' and enter an individual cable 1814' that begins at or within coupling 1813'. In other words, in one example, thirty-two individual fibers 1812' may extend out of a splitter module 1810', with the thirty-two individual fibers being housed within a single output cable 1811'. At the coupling 1813', each individual fiber 1812' may exit the output cable 1811', and may each enter a corresponding individual cable 1814', the individual fibers 1812' being continuous through the coupling 1813'. Each individual fiber 1812' and corresponding individual cable 1814' may terminate in a connector 1830, which may be similar to other connectors described herein.

It should be understood that coupling 1813' may have any suitable configuration. For example, although FIG. 28G illustrates coupling 1813' as being substantially cylindrical with a first end overlying a terminal end of output cable 1811', coupling 1813" may have other shapes and the terminal end of output cable 1811' may overlie one end of coupling 1813'. In one example, the terminal end of output cable 1811' may overlie a first end of coupling 1813', and the coupling 1813' may extend to a second end that is the same size as or larger in size than its first end. Still further, although FIG. 28G shows three fibers 1812' entering terminal ends of three corresponding individual cables 1814' within coupling 1813', it should be understood that any suitable number of fibers 1812' and respectively corresponding individual cables 1814' may be connected through coupling 1813', such as, for example thirty-two fibers 1812' that enter respectively thirty-two individual cables 1814' in coupling 1813'. Further, while FIG. 28G illustrates a retainer 1815' retaining terminal ends of individual cables 1814' within coupling 1813', other mechanisms may be suitable to secure the terminal ends of individual cables 1814' within coupling 1813'. For example, one or more retainers 1815' in the form of crimping members may secure the terminal end of output cable 1811' in coupling 1813' and/or the terminal ends of individual cables 1814' within coupling 1813'.

Figure 28H:
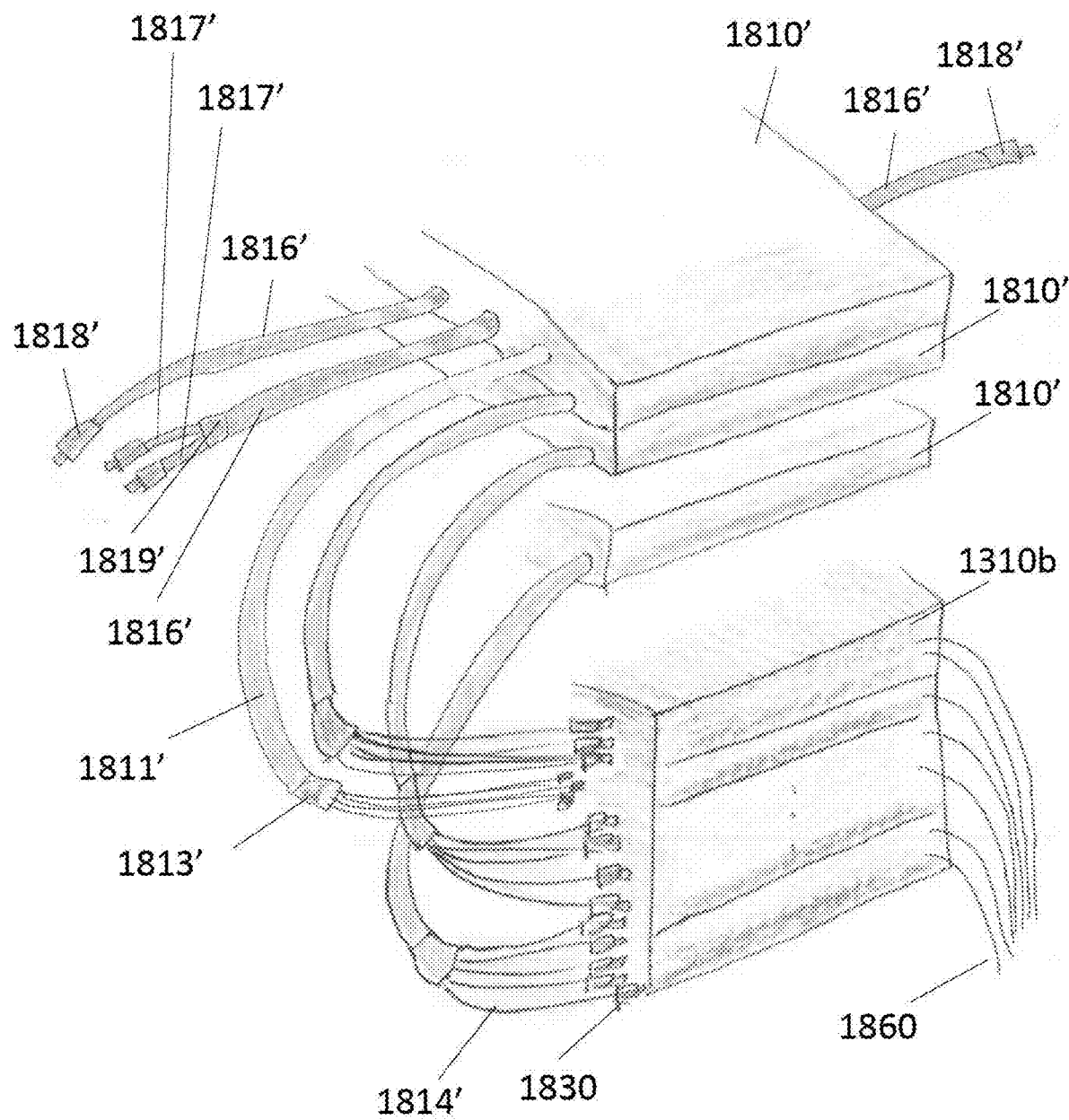
FIG. 28H is a schematic view of splitter modules similar to those shown in FIG. 28F illustrating additional input cables to the splitter modules.

FIG. 28H is similar to FIG. 28F, and additionally shows inputs to the splitter modules 1810' and outputs of a patch panel. For example, a plurality of cables 1860 may exit each patch panel cassette 1310b, in substantially the same manner as shown and described in connection with FIG. 28A, the cables 1860 connecting to respective subscribers, for example. One or more individual input cables 1816', each containing at least one optical fiber within a sheath or outer jacket, may be coupled to each splitter module 1810' and route an incoming signal(s), such as from a service provider, into splitter module 1810'. FIG. 28H illustrates three examples of input cables into splitter module 1810'. Two of the input cables 1816' are substantially identical and illustrate that input cables may enter on different faces of splitter module 1810'. The two substantially identical input cables 1816' extend to a connector 1818', such that the entirety of the input cable between connector 1818' and splitter module 1810' is an individual cable, in other words, a cable having a sheath or outer jacket housing an optical fiber or fibers therein. However, in other embodiments, the input cable may be configured to fan out similar to the output cables of splitter module 1810'. For example, FIG. 28H illustrates an individual input cable 1816' extending from splitter module 1810' to a coupling 1819', from which the input cable 1816' branches or fans out into two additional input cables 1817', each attached to a connector 1818'. This similarly allows for minimizing congestion of cables entering splitter module 1810', so that each point of entry into splitter module 1810' is an individual cable 1816'.

Referring still to FIG. 28H, it should be understood that the total number of individual cables 1811' preferably is always smaller than the total number of individual cables 1814' extending therefrom. Further, a transverse cross-sectional area (CA) of an individual cable 1811' as defined by an outer perimeter surface of the cable preferably is always smaller than the sum (CA-sum) of the transverse cross-sectional areas as respectively defined by an outer perimeter surface of each of the individual cables 1814' extending therefrom. The difference between the CA and the CA-sum distinguishes the present disclosure from a conventional implementation in which, for example, a given number of cables extends between two ports or connectors, and a portion of those cables is covered with a jacket or other covering, where the covered portion would necessarily have a cross-sectional area as defined by an outer perimeter surface of the cable at the covered portion greater than the sum of the cross-sectional area as defined by an outer perimeter surface of the individual cables. In some embodiments, each individual cable 1811' may be substantially circular and have a diameter of between about 2 mm and about 5 mm, but it should be understood that other shapes and sizes may be suitable for the cables 1811'. For example, the individual cable 1811' may be a ribbon cable or substantially flat shape. The individual cables 1814' may each be substantially circular and may each have a diameter of between about 0.9 mm and about 1.6 mm, although other shapes and sizes may be suitable for the individual cables 1814'. Regarding the input cables, it should be understood that the total number of individual input cables 1816' is preferably always less than or equal to the number of corresponding connectors 1818'. In other words, the number of input cables 1816' may be equal to the number of connectors 1818' when there are no branches 1817' present. Otherwise, if branches 1817' are present, the number of total branches 1817' (as well as the number of total connectors 1818') must be greater than the number of individual input cables 1816'. It should be understood that, using this terminology, a single input cable 1816' that extends to a connector 1818' without branching would be classified as having a single "branch." Further, in a system similar to that shown in FIG. 28H, the total number of branches 1817' (as well as the total number of connectors 1818') preferably is always less than the total number of individual cables 1814'.

Although FIGS. 28F-H illustrate specific embodiments incorporating certain features to help manage cable congestion in a system in which one or more splitter module 1810' are provided to couple to ports of patch panel cassettes 1310b of a fiber distribution hub, it should be understood that other configurations are possible. For example, the splitter modules 1810' need not be used to connect cables to ports of patch panel cassettes 1310b in a fiber distribution hub, but rather may be used to connect cables from one or more splitter modules 1810' to any desired device while reducing cable congestion. Similarly, the output cables 1811' may be provided without the particular input cables 1816' of FIG. 28H, and the input cables 1816' may be provided without the particular output cables 1811' of FIG. 28H. Further, while FIG. 28F illustrates that an output cable 1811' may be coupled to each individual splitter module 1810', more than one output cable 1811' may be coupled to each individual module 1810, for example the two output cables 1811' coupled to the top-most splitter module 1810' in the stack as shown in FIG. 28H. Still further, while all of the fibers 1812' output from an individual splitter module 1810' may pass through one output cable 1811', in other embodiments one group of fibers 1812' may pass through a first output cable 1811' while a second group of fibers 1812' may pass through a second output cable 1811'. For example, if a splitter module 1810' includes thirty-two output fibers 1812', all thirty-two output fibers 1812' may be routed through a single output cable 1811', or in the alternative two groups of sixteen fibers 1812' may each be routed through two different output cables 1811'. It is preferable that in all cases, including the alternative examples described above, the relationships described above still apply. For example, in the case where two groups of sixteen fibers 1812' extend through two output cables 1811', and then each group extends through a corresponding coupling 1813' to two corresponding groups of sixteen individual cables 1814', each group of sixteen individual cables 1814' has a cumulative transverse cross-sectional area that is greater than the transverse cross-sectional area of the corresponding output cable 1811'. Still further, while FIG. 28A shows that a splitter cassette 1310*a* may include a single splitter module 1810, it should be understood that additional splitter modules 1810 may be provided on a single splitter cassette 1310*a*. One or more splitter modules 1810' described in connection with FIGS. 28F-H may similarly be provided on splitter cassettes, including one or more splitter modules 1810' per splitter cassette.

Figure 29A:
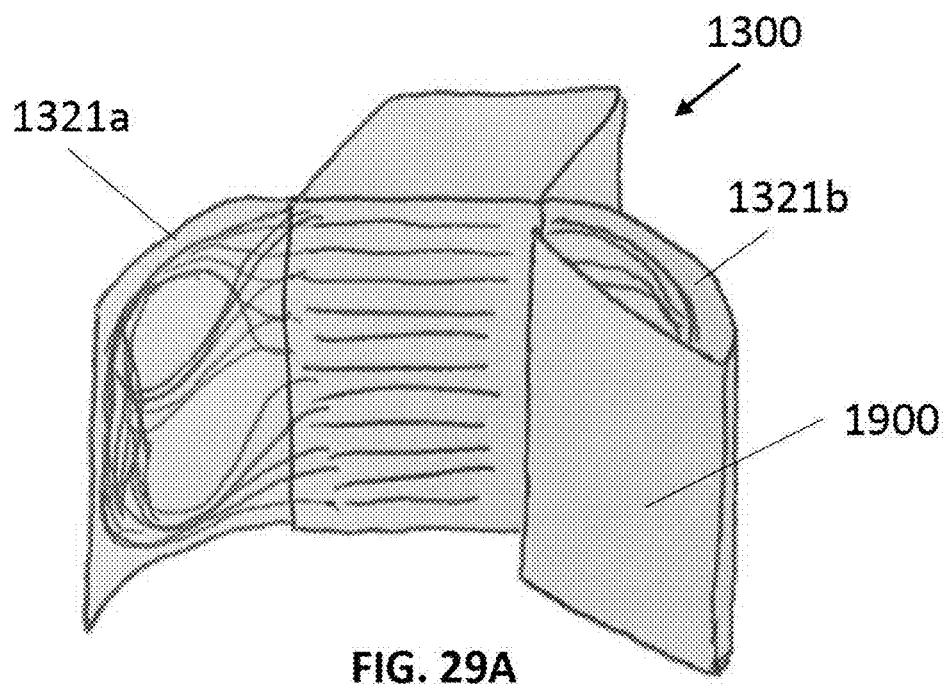
FIG. 29A is a perspective view of a recording sheet attached to the patch panel device of FIGS. 19A-D, the recording sheet in a stored condition.
Figure 29B:
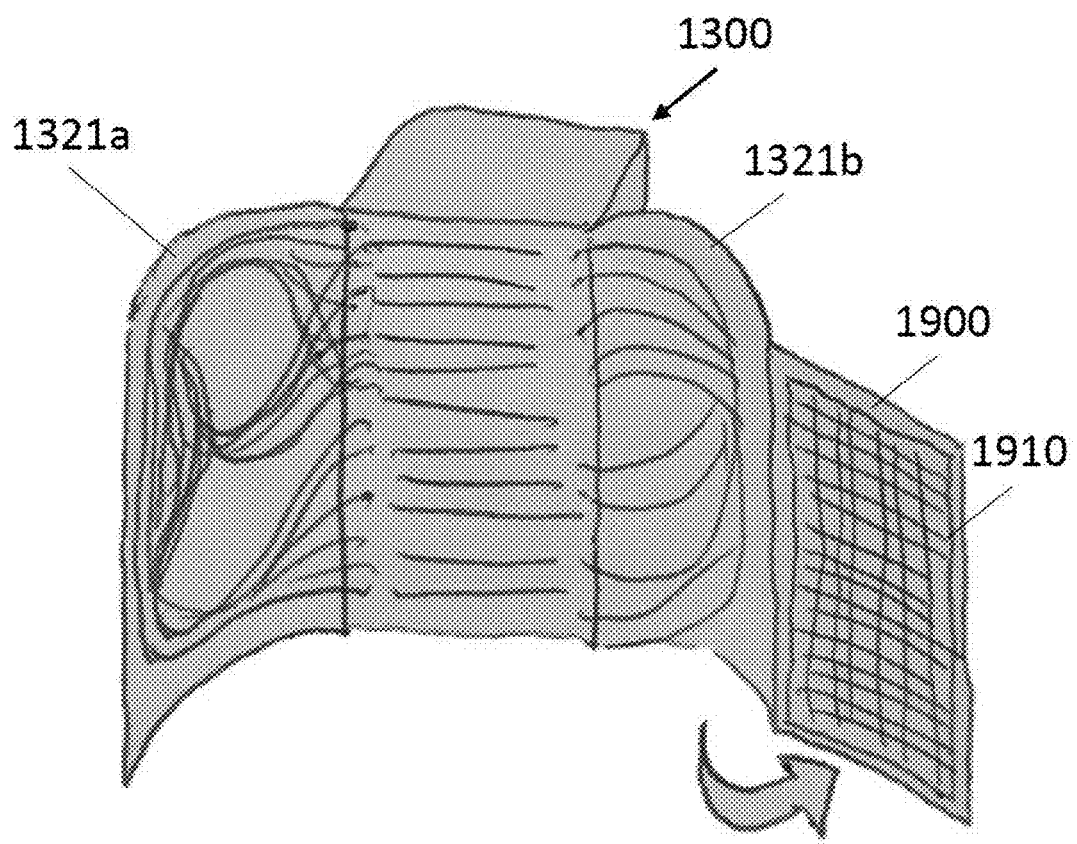
FIG. 29B is a perspective view of the recording sheet of FIG. 29A in a stored condition.

FIGS. 29A-B show patch panel system 1300 with an accessory in the form of a recording sheet 1900. Patch panel system 1300 is not described in greater detail below with the exception of the recording sheet 1900. However, it should be understood that recording sheet 1900 or a similar accessory may be used in conjunction with other patch panel systems described herein. The hanger plates 1321*a*, 1321*b* of patch panel system 1300 are shown in an open or maintenance condition in FIGS. 29A-29B, with recording sheet 1900 shown in a stored condition in FIG. 29A and an operable condition in FIG. 29B. Recording sheet 1900 may take the form of a rectangular-shaped sheet, such as a plastic sheet, and include paper or a paper-like material on a face of the sheet that can be recorded on, for example by pen or pencil. In the illustrated embodiment, recording sheet 1900 has a lateral edge that is hingedly coupled to a free edge of hanger plate 1321*b*. However, it should be understood that recording sheet 1900 may instead be provided on hanger plate 1321*a*. Similarly, two recording sheets 1900 may be provided, one on each hanger plate 1321*a*, 1321*b*. Recording sheet 1900 may include indicia 1910 on at least one face thereof, the indicia 1910 providing information to the user to assist in maintenance of patch panel system 1300. For example, indicia 1910 may include one or more connection diagrams. Further, indicia 1910 may include spaces on which the user may record information regarding patch panel system 1300 during or after maintenance, for example to provide a record for later reference. Although recording sheet 1900 is illustrated as having a lateral edge hingedly coupled to a free edge of hanger plate 1321*b*, it should be understood that a top edge of recording sheet 1900 may be hingedly coupled at a top edge of the frame or inner chassis of patch panel system 1300 so that it folds upward to the operable condition, or otherwise a bottom edge of recording sheet 1900 may be hingedly coupled at a bottom edge of the frame or inner chassis of patch panel system 1300 so that if folds downward to the operable condition.

Figure 30A:
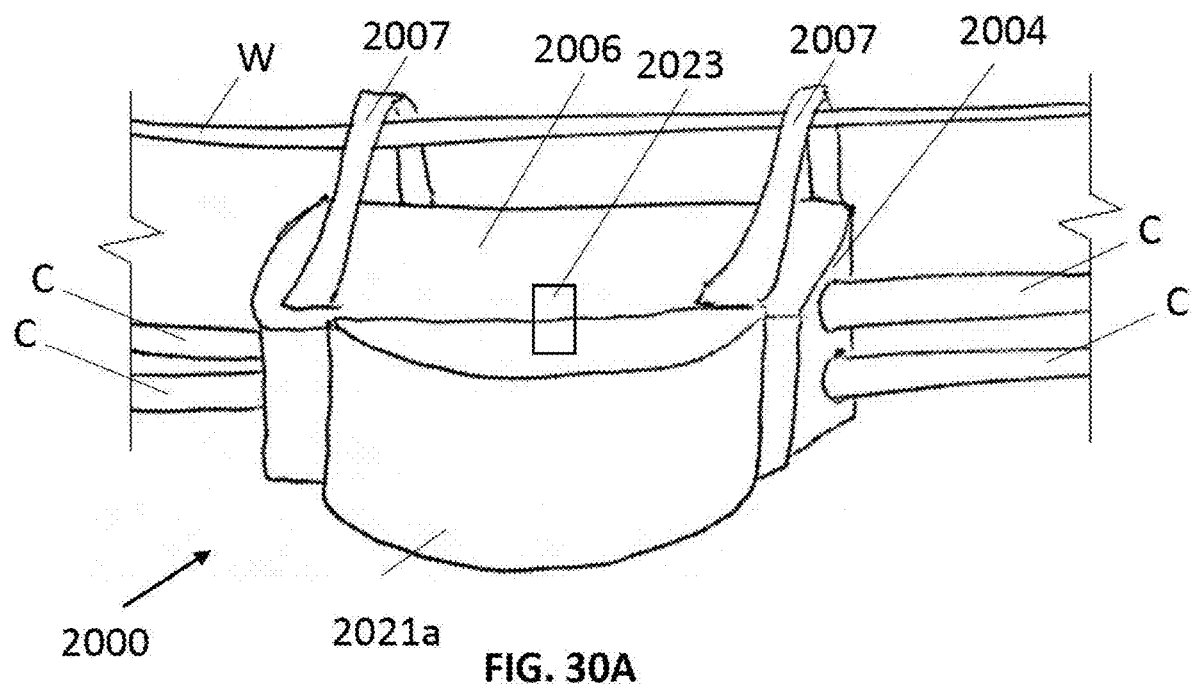
FIG. 30A is a perspective view of a patch panel system with hanger plates in a stored or installed condition according to another aspect of the disclosure.
Figure 30B:
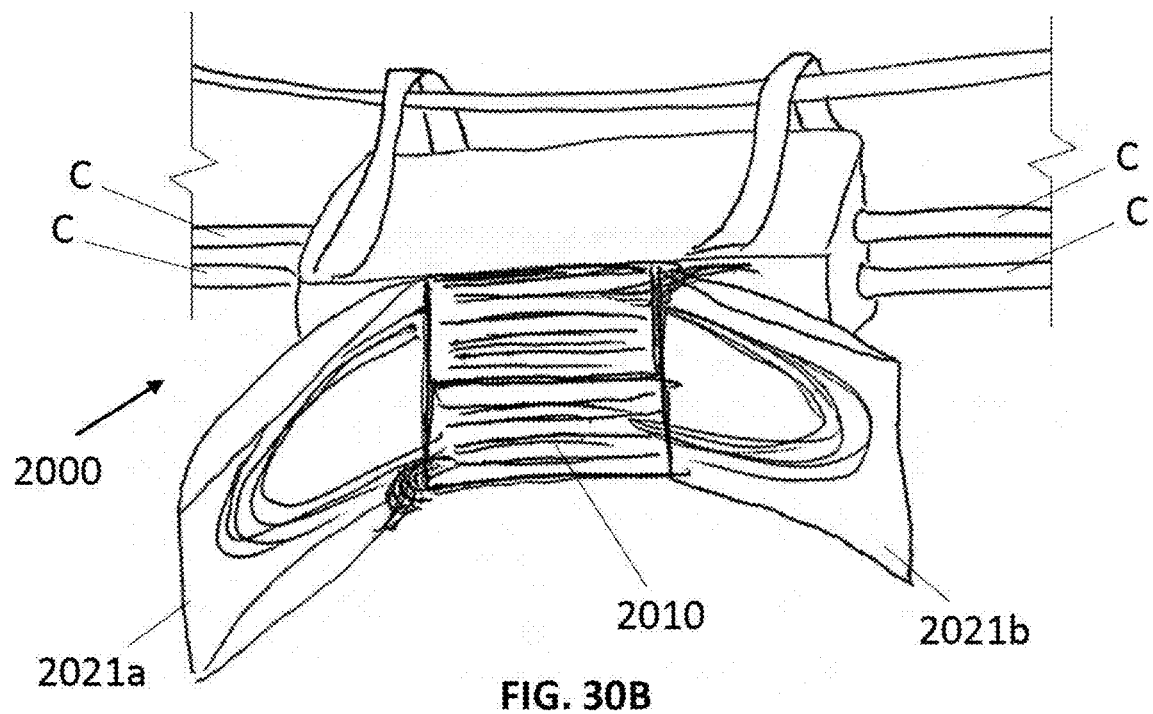
FIG. 30B is a perspective view of the patch panel system of FIG. 30A with hanger plates in an open or maintenance condition.

Patch panel systems 1200 and 1300 may be particularly well suited for applications in which environmental concerns, and in particular water-tight sealing, are of particular importance. However, in other applications in which patch panel systems may require less weather protection and/or less than water-tight sealing, patch panel systems may be used without separate covers. For example, FIG. 30A shows a patch panel system 2000 with hanger plates 2021*a*, 2021*b* in an installed or stored condition in accordance with another embodiment of the disclosure. FIG. 30B shows the hanger plates 2021*a*, 2021*b* of patch panel system 2000 in an open or maintenance condition. Patch panel system 2000 may include a housing or frame, which in the illustrated embodiment is substantially rectangular with side walls 2004, which may include ports for incoming and outgoing cables (or cable bundles) C. It should be understood that cables C may be positioned within sheaths or other protective members that couple to or enter the ports in the side walls 2004, and it should be understood that more or fewer ports may be provided, and the ports may be positioned on different portions of the housing than side walls 2004. The ports of patch panel system 2000 may be similar to other ports described herein. A top wall 2006 of the frame may include one or more hanging elements 2007 coupled thereto. In the illustrated embodiment, two hanging elements 2007 each have a first end coupled to top wall 2006 and a second end coupled to a rear wall of the housing. However, it should be understood that one or more than two hanging elements 2007 may be provided, and the hanging elements may be coupled to other portions of the housing of patch panel system 2000. In the illustrated embodiment, the hanging elements 2007 each form a closed boundary with the housing so that a wire W may pass through the closed boundaries and the patch panel system 2000 may hang from the wire W via the hanging elements 2007. Hanging elements 2007 may be rigid and formed of similar materials as the housing of patch panel system 2000, for example a metal that may be used to ground the system 2000. In other embodiments, hanging elements 2007 may be straps or other soft materials that provide sufficient strength to support patch panel system 2000 while it hangs from wire W. In still other embodiments, hanging elements 2007 need not be coupled on two ends to the housing of patch panel system 2000. For example, hanging elements 2007 may have a first end coupled to the housing of patch panel system 2000 and a second free end shaped to hook over wire W, or to otherwise be secured to wire W.

In the open or maintenance condition of the hanger plates 2021*a*, 2021*b* of system 2000, as shown in FIG. 30B, a plurality of cassettes 2010 may be accessible, the cassettes 2010 being in a vertically stacked configuration in a manner substantially similar or identical to patch panel systems 1200, 1300. As cassettes have been described in connection with other embodiments above, cassettes 2010 are not described in additional detail here. In the closed or installed condition of hanger plates 2021*a*, 2021*b*, as shown in FIG. 30A, hanger plates 2021*a*, 2021*b* may cover and/or enclose cassettes 2010 in conjunction with other portions of the housing of patch panel system 2000. Hanger plates 2021*a*, 2021*b* may be substantially similar or identical to hanger plates 1321*a*, 1321*b*, and are not described in significant additional detail below other than to describe certain possible differences. For example, hanger plates 2021*a*, 2021*b* may include hangers and cable retainers on interior walls similar or identical to embodiments described above in order to help organize and route cables within patch panel system 2000. While hanger plates 1321*a*, 1321*b* may include windows and other recesses to facilitate passing cables from inside the frame 1302 to areas outside the frame (but still within cover 1380), it may be preferable that hanger plates 2021*a*, 2021*b* do not include such recesses or windows. The omission of such windows or recesses may help protect the interior of the patch panel system 2000, as patch panel system 2000 may be used without additional covers. Also, similar to patch panel system 1300, it may be preferable for hanger plates 2021*a* and 2021*b* to be constructed so that hanger plate 2021*b* is positioned nearer cassettes 2010 when the hangers of patch panel system 2000 are in the closed or installed condition, with hanger plate 2021*a* facing the outside environment in the closed or installed condition. It may be preferable for hanger plate 2021*a* to include lips or other features on the edges of the hanger plate 2021*a* so that, in the closed or installed condition, hanger plate 2021 completely or substantially completely encloses hanger plate 2021*b* and forms a complete or substantially complete seal with the housing of patch panel system 2000. Hanger plate 2021*a* may also include one or more latches 2023 to help keep hangers 2021*a*, 2021*b* in the closed or installed condition shown in FIG. 30A. In some examples, the housing of patch panel system 2000 may include latch mechanisms or portions of a latch mechanism to interact with a corresponding latch mechanism on hanger plate 2021*a*.

Figure 31A:
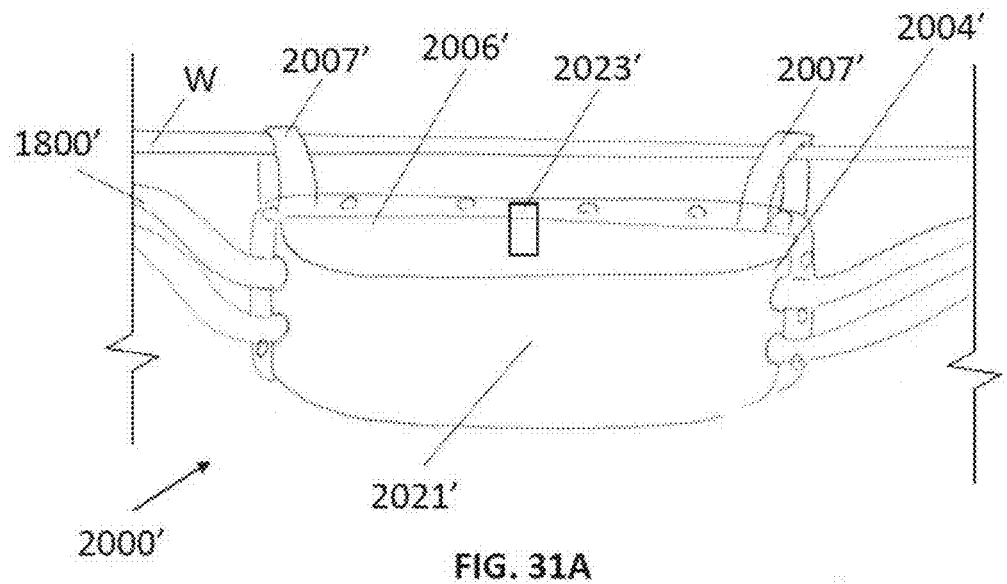
FIG. 31A is a perspective view of a patch panel system with a hanger plate in a stored or installed condition according to yet another aspect of the disclosure.
Figure 31B:
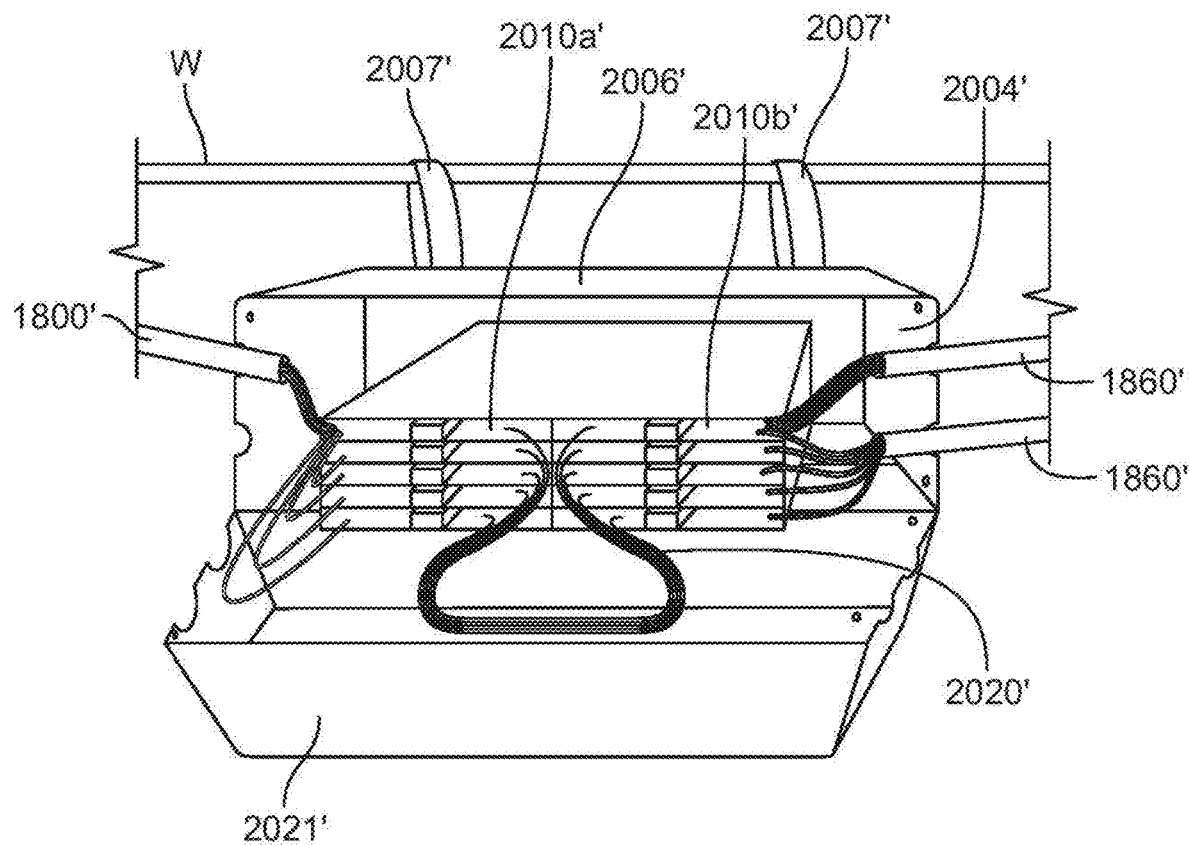
FIG. 31B is a perspective view of the patch panel system of FIG. 31A with the hanger plate in an open or maintenance condition.

FIG. 31A shows a patch panel system 2000' with a hanger plate 2021' in a closed or installed condition that is similar to patch panel system 2000 in most respects, with one main difference being that patch panel system 2000' has a hanger plate 2021' that rotates in a vertical direction, downwardly to the maintenance condition (as shown in FIG. 31B), compared to hanger plates 2021*a*, 2021*b* that rotate in a horizontal direction to the maintenance condition. However, it should be understood that the "vertical" and "horizontal" directions referenced above may be dependent on the installation context of the patch panel system. For example, the difference in "vertical" rotation and "horizontal" rotation as referenced above is intended to refer to when the patch panel systems 2000, 2000' are used in a hanging installation as shown in the figures. Patch panel system 2000' may include a housing or frame, which in the illustrated embodiment is substantially rectangular with side walls 2004', which may include ports for incoming and outgoing cables (or cable bundles). It should be understood that cables may be positioned within sheaths or other protective members that couple to or enter the ports in the side walls 2004', and it should be understood that more or fewer ports may be provided, and the ports may be positioned on different portions of the housing than side walls 2004'. The ports may be partially formed in side walls 2004' and partially formed in hanger plate 2021'. The ports of patch panel system 2000' may be similar to other ports described herein. A top wall 2006' of the frame may include one or more hanging elements 2007' coupled thereto. In the illustrated embodiment, two hanging elements 2007' each have a first end coupled to top wall 2006' and a second end coupled to a rear wall of the housing. However, it should be understood that one or more than two hanging elements 2007' may be provided, and the hanging elements may be coupled to other portions of the housing of patch panel system 2000'. In the illustrated embodiment, the hanging elements 2007' form a closed boundary with the housing so that a wire W may pass through the closed boundaries and the patch panel system 2000' may hang from the wire W via the hanging elements 2007'. Hanging elements 2007' may be substantially similar or identical to hanging elements 2007 and are not described in greater detail herein.

Figure 31C:
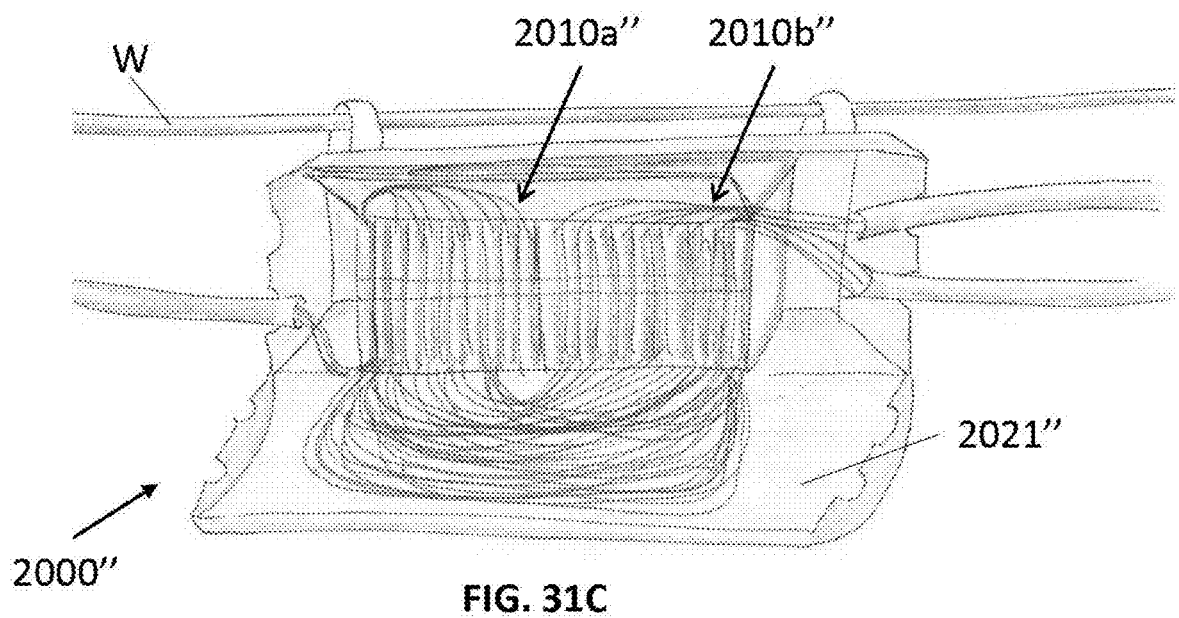
FIG. 31C is a perspective view of a further embodiment of a patch panel system similar in certain respects to the system of FIG. 31A.

In the open or maintenance condition of hanger plate 2021', as shown in FIG. 31B, a plurality of cassettes 2010*a'*, 2010*b'* may be accessible, the cassettes being in a vertically stacked configuration. In the illustrated embodiment, input cables 1800' may enter one or more cassettes 2010*a'*, which cassettes may include splitters similar to that described in connection with FIG. 28A. Cassettes 2010*a'* may be positioned adjacent a second group of vertically stacked cassettes 2010*b'*, which may be distribution patch panels similar to cassettes 1310*b* of FIG. 28A. Cables 2020' may couple ports within cassettes 2010*a'* to ports in cassettes 2010*b'*, with output cables 1860' extending from cassettes 2010*b'* to individual subscribers, similar to the configuration of FIG. 28A. In the closed or installed condition of hanger plate 202*a'*, as shown in FIG. 31A, hanger plate 2021' may cover and/or enclose cassettes 2010*a'*, 2010*b'* in conjunction with other portions of the housing of patch panel system 2000'. Hanger plate 2021' may include a plurality of hangers, similar to other hangers described herein, in one or more vertically stacked groups in order to help organize and guide cables within patch panel system 2000'. Preferably, hanger plate 2021' does not include windows or other recesses, similar to hanger plates 2021*a*, 2021*b*. While hanger plates 2021*a*, 2021*b* are coupled to their housing via hinges on side walls 2004 of patch panel system 2000, hanger plate 2021' is preferably hingedly coupled to a bottom surface of the housing of patch panel system 2000', so that the top of hanger plate 2021' may rotate downward and away from the front of the patch panel system 2000' to transition from the installed condition to the maintenance condition. Hanger plate 2021' may also include one or more latches 2023' to help keep hanger plate 2021' in the closed or installed condition shown in FIG. 31A. In some examples, the housing of patch panel system 2000' may include latch mechanisms or portions of a latch mechanism to interact with a corresponding latch mechanism 2023' on hanger plate 2021'. It should be understood that, although system 2000' is shown with two groups of vertically stacked cassettes 2010*a'*, 2010*b'*, system 2000' could instead include cassettes in a configuration similar to cassettes 2010 of system 2000, or cassettes in configurations similar to other embodiments of patch panel systems described herein. Patch panel system 2000", shown in FIG. 31C with hanger plate 2021" in an open or maintenance condition, may be similar or identical to patch panel system 2000' in all respects other than the configuration of cassettes therein. For example, whereas system 2000' includes a first group of vertically stacked cassettes 2010*a'* horizontally adjacent a second group of vertically stacked cassettes 2010*b'*, system 2000' may include a first group of horizontally stacked cassettes 2010*a"* positioned horizontally adjacent a second group of horizontally stacked cassettes 2010*b"*. Otherwise, cassettes 2010*a"* may be functionally similar to cassettes 2010*a'* and cassettes 2010*b"* may be functionally similar to cassettes 2010*b'*. It should be understood that for both patch panel system 2000', as well as other patch panel systems described herein, when hanger plate 2021' is in the maintenance condition shown in FIG. 31B, cables extending from cassettes 2010*a'*, 2010*b'* may remain positioned on an interior surface of the hanger plate, for example maintained on hangers or other cable-holding or cable-organizing structures.

Figure 32A:
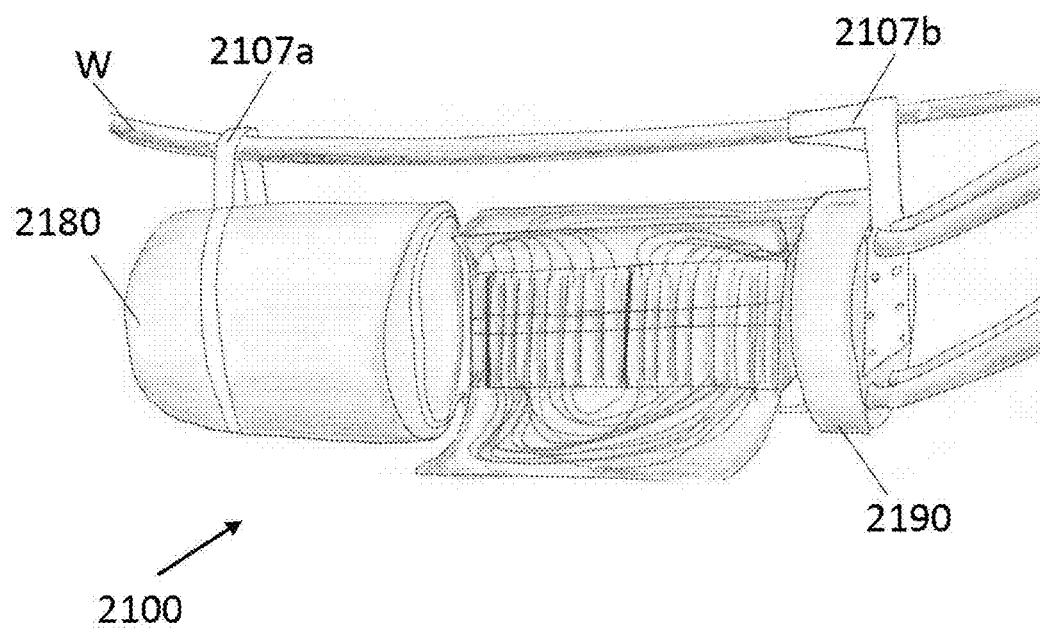
FIG. 32A is a perspective view of yet another embodiment of a patch panel system with hanger plates in an open or maintenance condition.

FIG. 32A shows an embodiment of a patch panel system 2100 that is similar to patch panel system 1300 in most respects, but is designed for hanging from a wire W similar to the patch panel systems of FIGS. 30A-31C. For example, patch panel system 2100 may include a frame and/or internal chassis similar or identical to the frame and/or internal chassis of patch panel system 1300, which may be coupled to a base 2190 similar or identical to base 1390. In addition, patch panel system 2100 may include a cover 2180 that is similar or identical to cover 1380 of patch panel system 1300. Patch panel system 2100 may include any of the accessories, such as latch mechanisms or water sensors, described in connection with patch panel system 1300. The main difference between patch panel system 2100 and patch panel system 1300 is that patch panel system 2100 may include one or more hanging elements 2107a, 2107b so that patch panel system 2100 may be hung from a wire W. For example, hanging element 2107a may be coupled to cover 2180, for example by partially or completely circumscribing the cover and defining an opening between the cover and the hanging member 2107a through which wire W may extend. Hanging element 2107b may be coupled to a terminal surface of base 2109 and form a closed boundary through which wire W may pass. It should be understood that hanging elements 2107a, 2107b may have other shapes and/or take other forms which allow cover 2180 and base 2190, respectively, to be suspended from wire W. Further, in the illustrated embodiment, the cassettes within patch panel system 2100 have the same configuration as those shown in patch panel system 2000", although it should be understood that other cassette configurations described herein may replace the configuration shown in FIG. 32A. In some embodiments, one or both of cover 2180 and the internal chassis of patch panel system 2100 may include or be operatively coupled to a device to limit the extent to which the cover 2180 may slide away from the base 2190. For example, cover 2180 may include an internal projection near its open end that may contact an external projection near the top of the internal chassis so that cover 2180 is restricted from completely disengaging with the internal chassis. Such a stopper or limiter structure may help ensure that the cover 2180 is able to be removed, such as by rotation or sliding, sufficiently such that the internal chassis may be fully accessed to perform maintenance, but still remains coupled to the internal chassis so that the structures do not become completely disengaged from one another.

Figure 32B:
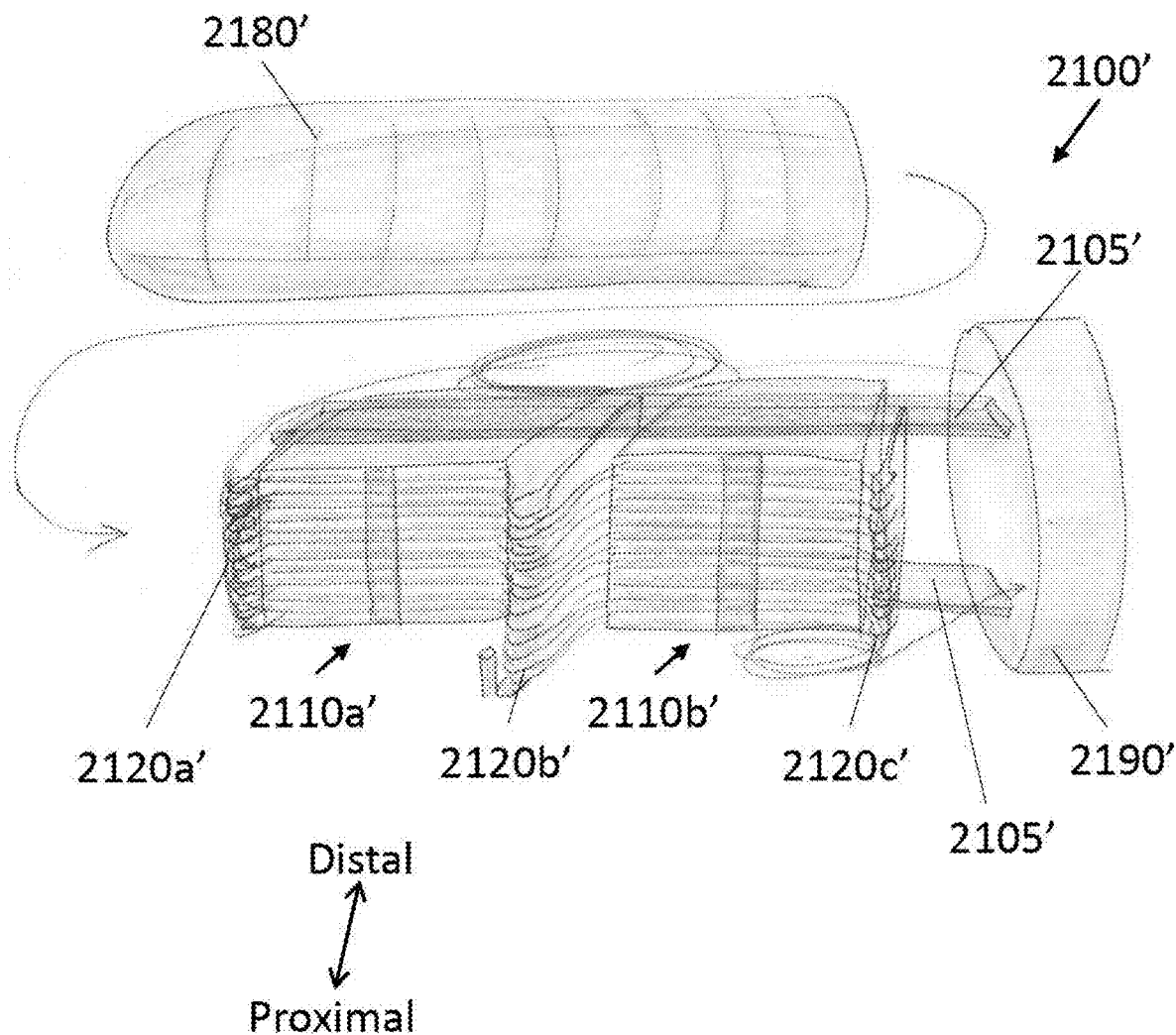
FIG. 32B is a perspective view of a patch panel system similar to the patch panel system of FIG. 32A with slidable hanger assemblies.

FIG. 32B illustrates an embodiment of a patch panel system 2100' that is similar to patch panel system 2100 of FIG. 32A in many respects. For example, patch panel system 2100' may include a frame and/or internal chassis similar or that of patch panel system 2100, which may be coupled to a base 2190' similar or identical to base 2190. In addition, patch panel system 2100' may include a cover 2180' that is similar or identical to cover 2180 of patch panel system 2100. Patch panel system 2100' may include any of the accessories, such as latch mechanisms or water sensors, described in connection with patch panel systems 1300 and 2100. Although not illustrated in FIG. 32B, patch panel system 2100' may include one or more hanging elements similar or identical to hanging elements 2107a, 2107b of system 2100 so that patch panel system 2100' may be hung from a wire. In the illustrated embodiment, the cassettes within patch panel system 2100' are arranged in a similar configuration to that shown in FIG. 31B. In other words, patch panel system 2100' may include two groups of vertically stacked cassettes positioned horizontally adjacent one another. It should be understood that the terms "vertical" and "horizontal" as used in connection with FIG. 32B are meant to provide clarity and it should be understood that the "vertical" and "horizontal" directions in practice may depend upon the orientation of the system 2100' with respect to another object, such as the ground or a wire from which the system hangs. In this particular embodiment, a first group of cassettes 2110a' is positioned adjacent a second group of cassettes 2110b', with both groups of cassettes being positioned between top and bottom frame elements 2105'. Although the particular use of the cassettes may vary, in the illustrated embodiment the first group of cassettes 2110a' includes a plurality of splitter cassettes as well as one or more cassettes adapted to receive a signal from a service provider, with these cassettes being linked to the splitter cassettes via one or more cables. Further, in this particular embodiment, the second group of cassettes 2110b' includes a plurality of cassettes adapted to convey a signal to a service subscriber. As illustrated, as many as three groups of hanger assemblies 2120a', 2120b' and 2120c' may be provided with patch panel system 2100', although it should be understood that in other embodiments, more or fewer hanger assemblies may be provided.

Hanger assembly 2120a' may be positioned adjacent the first group of cassettes 2120a' (to the left in the view of FIG. 32B) and may include one hanger for each cassette, the hanger being positioned in alignment with a corresponding cassette near a proximal face thereof. Hanger assembly 2120a' may be adapted to support cables, for example cables incoming from a service provider to the cassettes adapted to receive the signal from the service provider, as well as cables connecting the cassettes adapted to receive the signal from the service provider to splitter cassettes, which may all be in the first group of cassettes 2110a'. Hanger assembly 2120b' may be structurally similar or identical to hanger assembly 2120a', and is positioned between the first group of cassettes 2110a' and 2110b', and adapted to support cables connecting cassettes of the first group 2110a' to cassettes of the second group 2110b'. Hanger assembly 2120c' may be structurally similar or identical to hanger assemblies 2120a' and 2120b', and is positioned between the second group of cassettes 2110b' and the base 2190' (to the right in the view of FIG. 32B), and adapted to support cables connecting the cassettes of the second group 211b' to service subscribers. It should be understood that cassettes of the first group 2110a' and the second group 2110b' may be slid from a stored position (a distalmost position) to a maintenance position (a proximal position) after a user removes cover 2180' and desires to perform maintenance on the system 2100', for example by connecting a cable from a splitter cassette in the first group 2110a' to a cassette in the second group 2110b' to connect a service subscriber to the service provider. In order to keep the cables organized, it may be preferable that one or more of the hanger assemblies 2120a'-2120c' are similarly capable of sliding from a distal stored position to a proximal position during maintenance. Thus, in the illustrated embodiment, each hanger assembly 2120a'-2120c' is slidable in the proximal and distal directions. A sliding mechanism may be provided, for example, by corresponding tracks in the top and bottom frame elements 2105', or any other suitable mechanism. In one embodiment, hanger assemblies 2120a'-2120c' have a distalmost sliding position which corresponds to a position that allows the cover 2180' to be connected to base 2190', and a proximalmost position that corresponds to a proximalmost sliding position of the cassettes. Other features, such as handles, may be provided on one or more of the hanger assemblies 2120a'-2120c' to facilitate a user in sliding the hanger assemblies in the proximal and/or distal directions during maintenance.

Figure 32C:
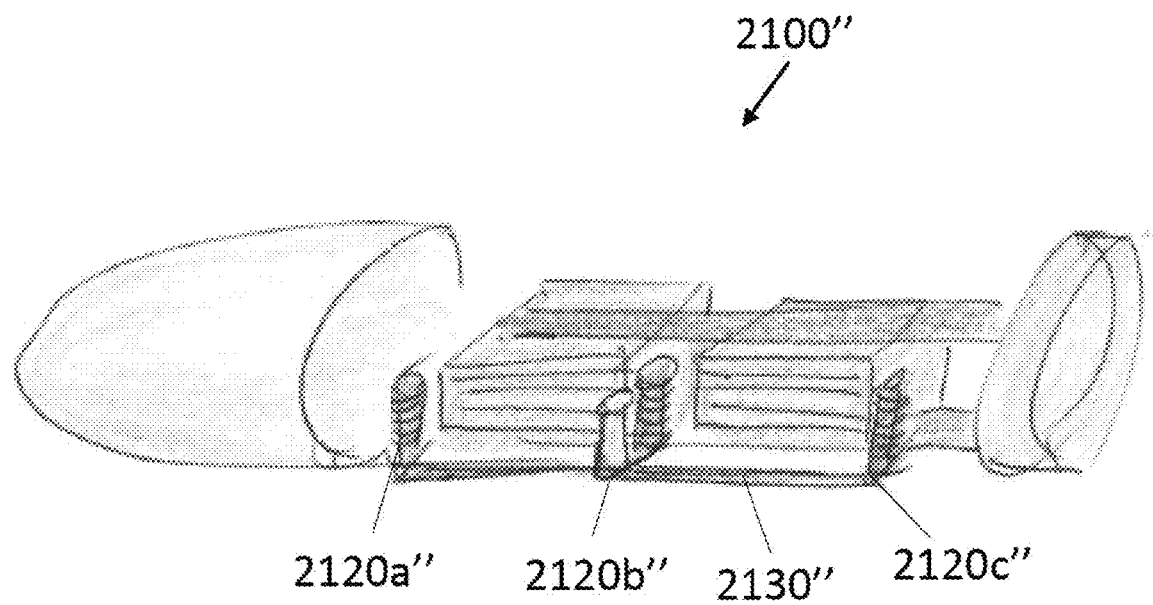
FIG. 32C is a perspective view of a patch panel system similar to the system of FIG. 32B with hanger assemblies that move in unison.
Figure 32D:
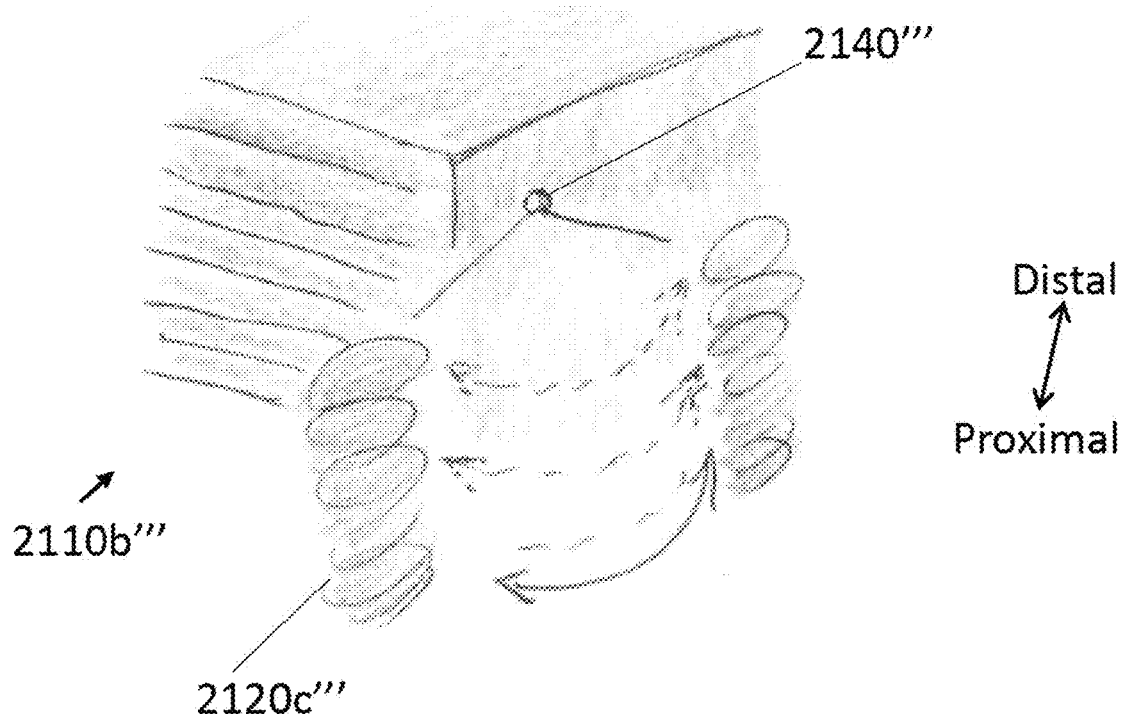
FIG. 32D is a partial view of an alternate version of a hanger assembly that may be used in place of the hanger assemblies of FIGS. 32B-C.

FIG. 32C illustrates an embodiment of a patch panel system 2100" that is identical to patch panel system 2100' in all respects but one. In particular, whereas the hanger assemblies 2120a'-2120c' of system 2100' are each individually able to slide in the proximal or distal direction, hanger assemblies 2120a"-2120c" are coupled by a coupling member 2130" so that hanger assemblies 2120a"-2120c" are capable of sliding together. In other words, if a user slides hanger assembly 2120b" in the proximal direction, the coupling member 21310", which may be a bar or any other suitable structure, causes the other hanger assemblies 2120a" and 2120c" to slide in unison with hanger assembly 2120b". Still further, while patch panel systems 2100' and 2100" are illustrated as including hanger assemblies that slide in the proximal and distal direction, any one of the hanger assemblies (or all of the hanger assemblies) could be replaced with similar hanger assemblies that swing about a pivot point between distal and proximal positions instead of sliding. For example, FIG. 32D illustrates a group of cassettes 2110b''' that may be used in a system similar to patch panel system 2100' and/or 2100". A hanger assembly 2120c''' is illustrated in both a distal position and a proximal position, although it should be understood that the two positions would not be achievable simultaneously. Similar to hanger assemblies 2120c' and 2120c", hanger assembly 2120c''' includes a plurality of hangers that correspond to individual cassettes 2110b", but may be coupled to a side wall of a chassis housing the cassettes 2110b' at a hinge or pivot point 2140'''. In a stored condition, with a cover covering the cassettes, hanger assembly 2120c''' is preferably in the distalmost position illustrated in FIG. 32D. During maintenance, the hanger assembly 2120c''' could be pivoted or hinged about pivot point 2140''', and moved through a path illustrated by arrows in FIG. 32D to the illustrated proximalmost position. It should be understood that one or both of the other hanger assemblies in such a system could include a similar pivoting or hinge mechanism instead of the sliding mechanisms of FIGS. 32B-C.

Figure 33A:
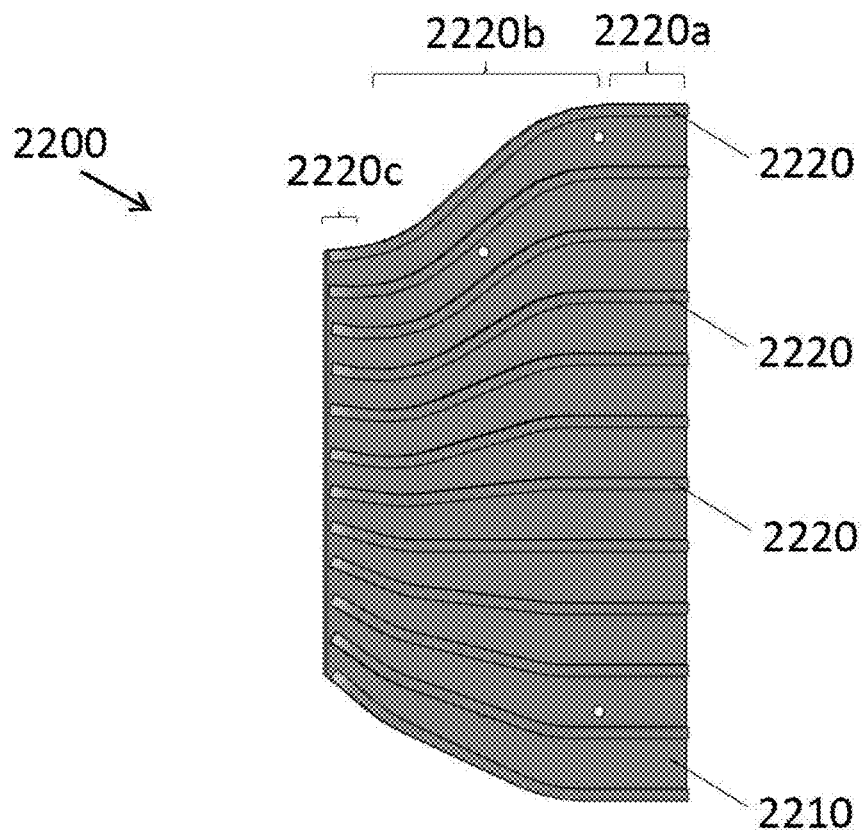
FIGS. 33A-33B are front and perspective isolated views, respectively, of a cable organizer for use with patch panel systems of the present disclosure.
Figure 33B:
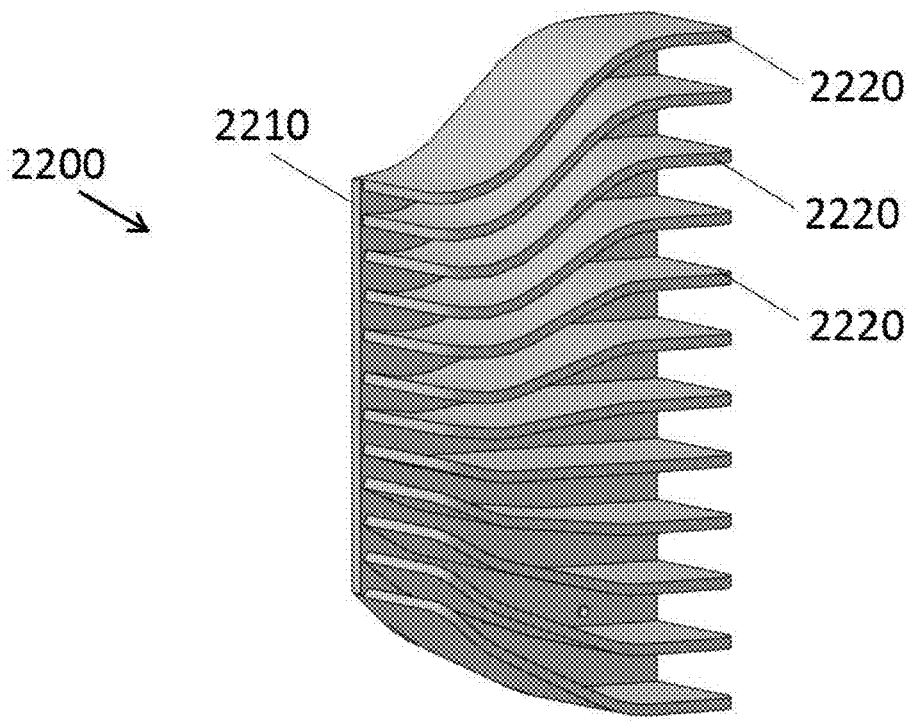

FIGS. 33A-B are front and perspective views, respectively, of a cable organizer 2200 that may be used with patch panel systems described herein. Generally, cable organizer 2200 may provide one or more functions, including (i) keeping cables extending in generally a first lateral direction (such as a horizontal direction) over a length of the cable, (ii) keeping individual cables or groups of cables layered and/or separated from other cables or groups of cables, (iii) routing cables that are spaced apart a relatively large distance at a first lateral end of the cable organizer toward a second lateral end of the cable organizer where the cables are relatively close to one another; and/or (iv) limiting positions of cable crossing, explained in greater detail below.

In the illustrated embodiment, cable organizer 2200 may include a plate or wall 2210. The wall 2210 may serve to couple a plurality of ribs 2220 to the wall, with the wall being coupled to an inner surface of a hanger plate. If wall 2210 is included, it may include one or more apertures or other features to facilitate fastening the wall to the hanger plate. In other embodiments, wall 2210 may be omitted and ribs 2220 may be directly coupled to the hanger plate, or otherwise may be formed integrally with the hanger plate. For the purpose of explanation only, the first lateral end of the cable organizer 2200 refers to the right edge of the cable organizer while the second lateral end of the cable organizer refers to the left edge of the cable organizer in the particular view of FIG. 33A. The direction between the first and second lateral ends is referred to as the horizontal direction. The direction perpendicular to the horizontal direction of FIG. 33A, extending between the bottom and the top of the cable organizer, is referred to as the vertical direction for purposes of explanation only. In the illustrated embodiment, each rib 2220 includes a first portion 2220a extending from the first lateral end that extends completely or substantially horizontally. Some or all of the ribs 2220 may include a second portion 2220b that curves or otherwise extends in a direction that has a component in the vertical direction. Preferably, the top-most rib 2220 includes a second portion 2220b that curves or extends generally downward toward the bottom-most rib 2220. On the other hand, the bottom-most rib 2220 preferably includes a second portion 2220b that curves or extends generally upward toward the top-most rib 2220. As illustrated, the second portions 2220b of the top-most and bottom-most ribs 2220 may have the greatest degree of curvature or extension in the vertical direction, while the rib 2220 positioned at or near the vertical center of the cable organizer 2200 may have a second portion 2220b with the smallest curvature or may even include no extension in the vertical direction. The extent of vertical curvature of the second portion 2220b may increase for ribs 2220 closer to the top and bottom edges. Some or all of the ribs 2220 may include a third portion 2220c that terminates at the second lateral end that has a degree of curvature toward the top of the cable organizer 2200.

Figure 33C:
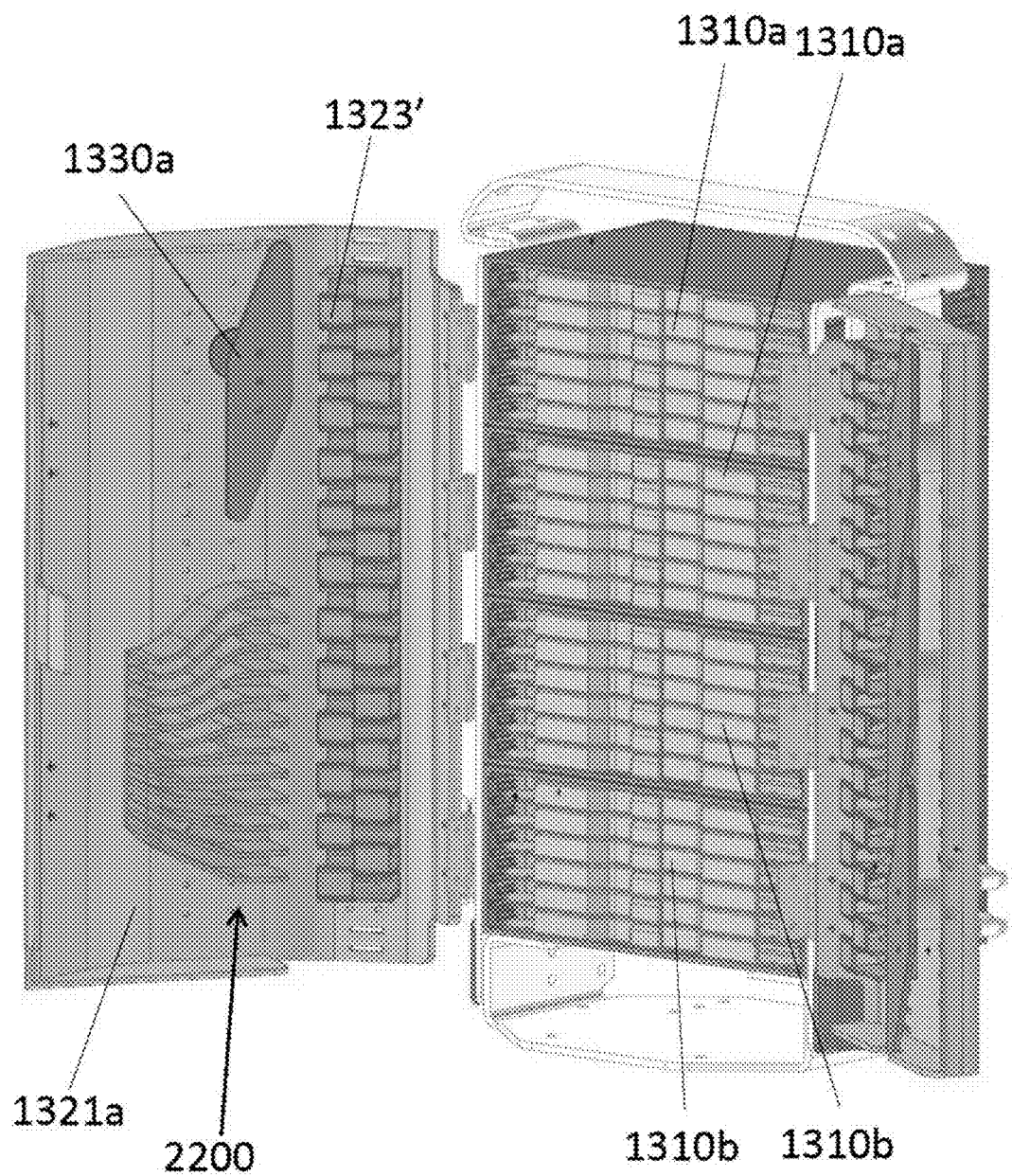
FIGS. 33C-D are views of the cable organizer of FIGS. 33A-B in use with the patch panel system of FIGS. 19A-D, without and with cables, respectively.
Figure 33D:
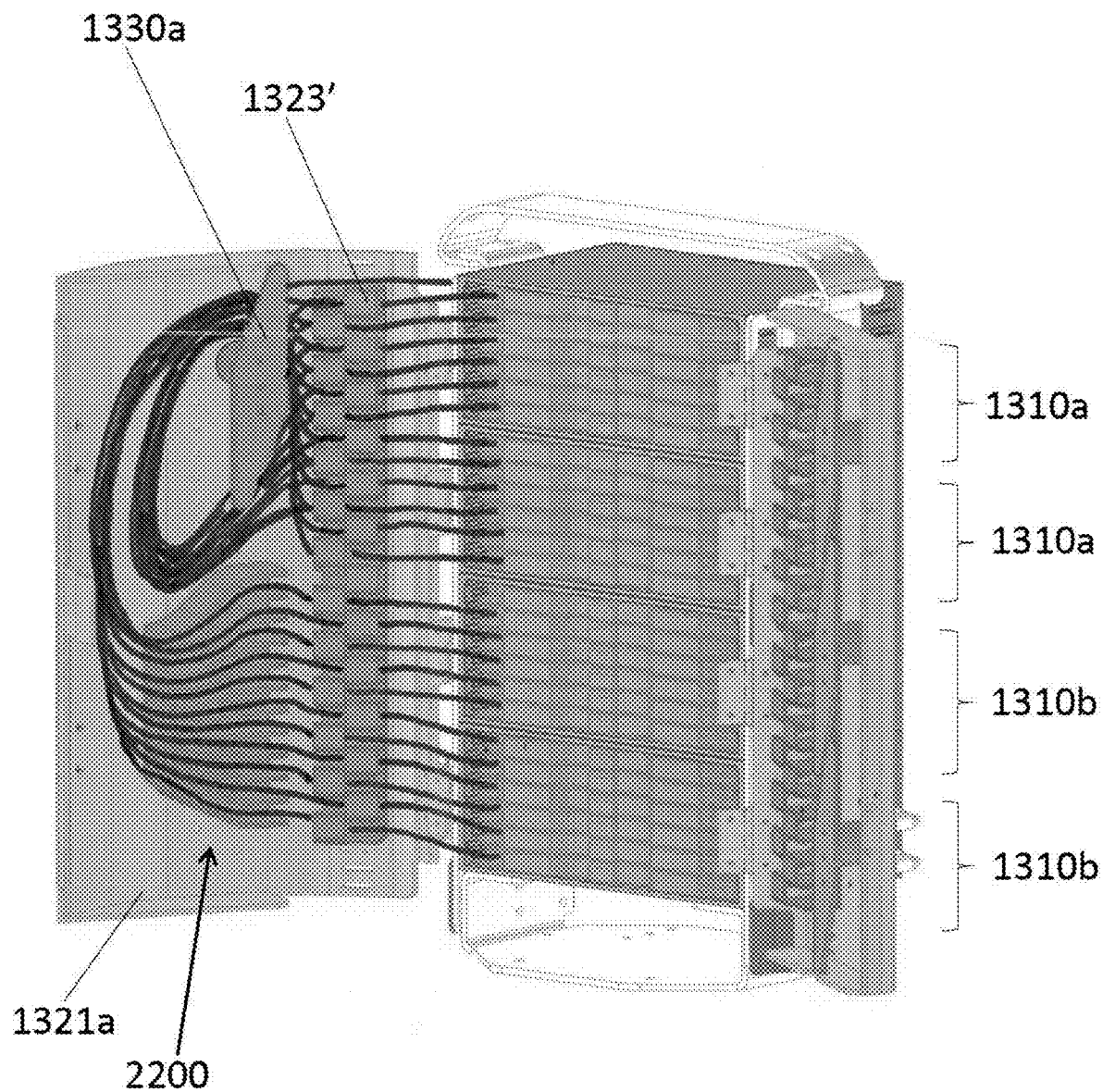

FIGS. 33C-33D show cable organizer 2200 being used in conjunction with a patch panel system similar or identical to patch panel system 1300. FIG. 33C omits the cables, and FIG. 33D illustrates cable in an exemplary use. In particular, cable organizer 2220 is coupled to an interior surface of hanger plate 1321a. In the embodiment of FIGS. 33C-D, two groups of stacked fiber distribution cassettes 1310b are positioned near a bottom of the patch panel system, while two groups of splitter cassettes 1310a are positioned near a top of the patch panel system. Generally, similar to the configuration shown in FIG. 28A, certain cables may exit a splitter cassette 1310a, pass along a corresponding hanger of hanger unit 1323', and then re-enter the same or another splitter cassette 1310a, or enter a fiber distribution cassette 1310b. As illustrated in FIG. 33D, cables that both exit and enter the same splitter cassette 1310a may loop around cable retainer 1330a to help support and organize the cables. If and when desired, a user may remove an end of a cable from a splitter cassette 1310a and connect the cable to a port in a fiber distribution cassette 1310b, as described above in connection with FIG. 28A. During such a transition, the cable may be routed along a surface of one of the ribs 2220 of cable organizer 2200, and then into the desired fiber distribution cassette 1310b. In one embodiment, the cables are routed along a bottom surface of each rib 2220, and the number of ribs is equal or substantially equal to the number of fiber distribution cassettes 1310b in the two groups. Preferably, each rib 2220 or one of the surfaces of each rib is substantially aligned with a corresponding fiber distribution cassette 1310b, so that portion of the cable extending between the first lateral end of the cable organizer 2200 and a corresponding fiber distribution cassette 1310b may extend in a direction substantially parallel (which may be referred to as the horizontal direction) to the first portions 2220a of the ribs 2220.

Due to the large number of cables extending in and out of the various splitter cassettes 1310a and fiber distribution cassettes 1310b, various cables may cross over one another and general cable congestion may make it difficult to easily re-route cables, for example, when a user desires to re-route an end of a cable from a splitter cassette 1310a to a fiber distribution cassettes 1310b. However, cable organizer 2200 may facilitate particular routing of the cables to reduce the congestion. For example, cables routed into one fiber distribution cassette 1310*b* may be generally kept separated or layered from other cables routed into other fiber distribution cassettes 1310*b*, with that separation being provided by ribs 2220 of the cable organizer 2200. Further, the cables routed through the second lateral end of the cable organizer 2200 may be condensed to a smaller area, which may be provided by the fact that the ribs 2220 are spaced closer to one another at the second lateral end compared to the first lateral end. These cables routed through the second lateral end of the cable organizer 2200 may extend in a direction substantially perpendicular to the first portions 2220*a* of the ribs 2220 (which may be referred to as the vertical direction). With this configuration, points at which cables cross over one another are generally limited to the portion of the cables extending vertically between the second end of the cable organizer 2200 and the cable retainer 1330*a*. It has been found that the vertical portion of the cables is generally more loosely packed than other bent portions of the cables, and as a result it is generally easier to grasp an individual cable and reposition that cable without significant hindrances from entanglement with other nearby cables.

In some embodiments using cable organizer 2200, additional covers may be provided to help protect the cables. For example, in one embodiment, a plate may be hingedly coupled to the free end of the hanger plate 1321, the plate configured to rotate to cover the vertical portion of the cables positioned near the free end of the hanger plate.

Figure 34:
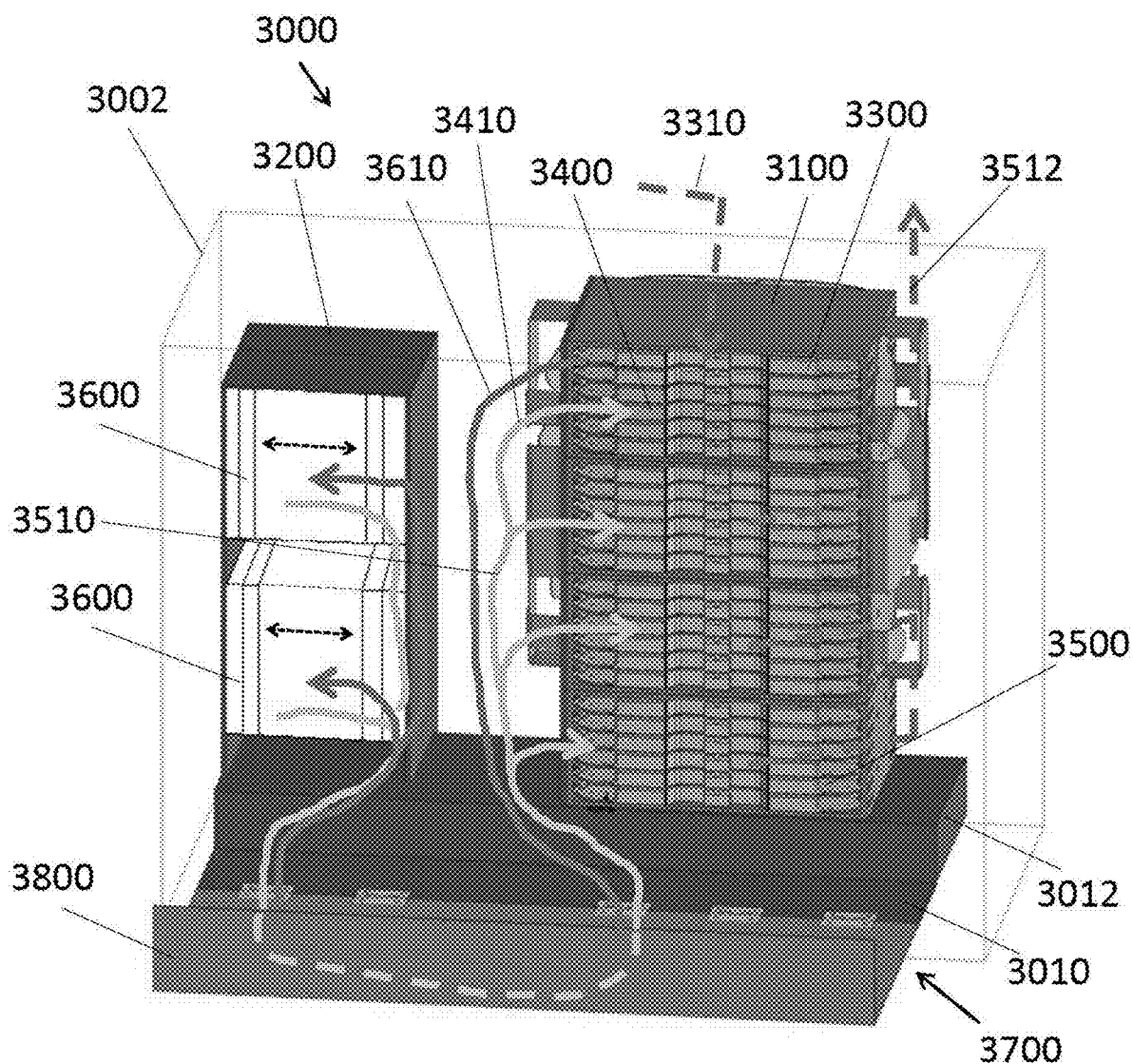
FIG. 34 is a perspective view of a communication system according to another embodiment of the disclosure.

FIG. 34 illustrates an example of a communication system 3000 according to another embodiment of the disclosure. System 3000 may include an enclosure or housing 3002 that may contain the remaining components of system 3000. Housing 3002 is shown with an open front, though it should be understood that a door or other component may be included with housing 3002 to allow for housing to fully or substantially fully seal the interior components. System 3000 may include a front base 3010 and a rear base 3012, which may be integral with one another. Rear base 3012 may have a greater height than front base 3010, with a first chassis 3100 and a second chassis 3200 on the rear base 3012. First chassis 3100 may be adapted to receive a plurality of cassettes in sliding configuration similar to other embodiments described herein. In the illustrated embodiment, first chassis may be configured to receive at least three types of cassettes, including a first group of cassettes 3300, a second group of cassettes 3400, and a third group of cassettes 3500. Second chassis 3200, which may be positioned a spaced distance from first chassis 3100, and may be configured to receive one or more groups of one or more splitter cassettes 3600.

The first group of cassettes 3300, illustrated in this embodiment as including two cassettes at the top of first chassis 3100, may be adapted for receiving a signal from a service provider and transmitting that signal to splitter cassettes 3600. For example, one or more cables 3310 may extend from a position outside housing 3002 and into one or more ports in the rear of cassettes 3300. Cables 3310 may be pre-installed to cassettes 3300, for example so that a user does not normally or frequently need to access the rear of cassettes 3300. However, it should be understood that cables 3310 may, in some circumstances, pass through the front face of cassettes 3300 and connect to a rear port, as opposed to passing through the rear face of cassette 3300 and connecting to the rear port. Further, as described in greater detail below, upon installation of a splitter cassette 3600, one or more cassettes 3300 may be slid partially or completely out of first chassis 3100 to allow for cable(s) 3610 to connect the splitter cassette 3600 to cassette 3300.

The third group of cassettes 3500, illustrated in this embodiment as including three groups of six cassettes each adjacent rear base 3012, may be patch panel or fiber distribution cassettes similar to patch panel cassettes 1310*b* of FIG. 28A. Patch panel cassettes 3500 may be adapted for receiving a signal from splitter cassettes 3600 and conveying the signal to service subscribers. For example, one or more cables 3512 may be coupled to one or more ports in the rear of cassettes 3500 and extend out of the housing 3002 to service subscribers. However, it should be understood that cables 3512 may, in some circumstances, pass through the front face of cassettes 3500 and connect to a rear port, as opposed to passing through the rear face of cassette 3500 and connecting to the rear port. Cables 3512 may also be pre-installed to cassettes 3500, for example so that a user does not normally or frequently need to access the rear of cassettes 3500. Further, as described in greater detail below, at the appropriate time following initial installation of system 3000, one or more cassettes 3500 may be slid partially or completely out of first chassis 3100 to allow for cable(s) 3410, which are stored in a storage cassette 3400, to be removed and connected to a port(s) in the patch panel cassette(s) 3500.

Based on the above description, it should be understood that system 3000 may be provided to a customer with first cassettes 3300, second cassettes 3400, and third cassettes 3500 installed in first chassis 3100 and with cables 3310 and 3512 also coupled to the rear of cassettes 3300 and 3500, respectively. Although, as described above, it should be understood that cables 3310 and 3512 may either pass directly to the rear of corresponding cassettes 3300, 3500, or otherwise may pass through a front face of those cassettes to access the port(s) in the rear of those cassettes. After installation of system 3000, one or more splitter cassettes 3600 may be installed into second chassis 3200, although in some embodiments one or more splitter cassettes 3600 may be pre-installed. One or more cables 3610 may then be coupled to ports in the front of first cassettes 3300 and coupled to splitter cassettes 3600 in order to convey a signal from the service provider to the splitter cassettes 3600. It should be understood that, although the arrow of cable 3610 is pointed toward the splitter cassettes 3600, the users may typically only need to couple the ends of cables 3610 to ports in cassettes 3300, as the splitter cassettes 3600 may typically be provided with cables 3610 connected thereto. In other words, the arrows provided on the cables in FIG. 34 are generally indicative of the direction of signal transmission from a service provider source point to a service subscriber end point. Initially, one or more cables 3410 may be connected from splitter cassettes 3600 to one or more of the second group of cassettes 3400. The second group of cassettes 3400 may serve as storage cassettes so that cables 3410 may be stored in an organized fashion prior to connecting a cable conveying a signal from the service provider to a particular service subscriber. The storage cassettes 3400 may include any suitable features to hold the ends of cables 3410, for example including structures similar to storage rack 1840 or 1840'. In the illustrated embodiment, system 3000 includes four storage cassettes 3400 positioned between the first group of cassettes 3300 and the third groups of cassettes 3500. As it becomes necessary to connect the service provider to particular service subscribers, a user or technician may remove a cable 3410 from a storage cassette 3400 and connect it to a port in the front of a patch panel cassette 3500. Cables connected to the patch panel cassettes 3500 are labeled in FIG. 34 as cable 3510, although the same cables when connected to storage cassettes 3400 are labeled as cables 3410.

It should be understood that a very large number of cables 3410 and 3510 may couple splitter cassettes 3600 to corresponding storage cassettes 3400 and patch panel cassettes 3500, with each of those cables capable of connecting to any port or storage location in any of the patch panel cassettes 3500 or storage cassettes 3400, respectively. As a result, a large number of cables, with a corresponding large mass, usually needs to be supported within system 3000, preferably in a manner that allows for easy access manipulation to change cables positions when needed. In the illustrated embodiment of system 3000, cables 3410, 3510, and 3610 may be largely positioned in a trough 3700. Trough 3700 may be formed by a front wall of rear base 3012, the top face of front base 3010, and a panel 3800. Panel 3800 may be hingedly coupled to front base 3010, and may be substantially flat or substantially "L"-shaped. Panel 3800 is illustrated in FIG. 34 in an open condition (for example for access during maintenance), and may be rotated upwards and toward rear base 3012 to transition to a stored condition (for example after completing maintenance). One or more hangers (not illustrated) may be provided on panel 3800 so that portions of cables 3410, 3510, and 3610 passing through trough 3700 may be secured to panel 3800. Thus, system 3000 may allow for cable maintenance with as little as a single hanger for securing the cables.

It should be understood that the exact number and positioning of cassettes 3300, 3400, and 3500 may be different than illustrated. For example, in some embodiments cassettes 3300 may be positioned near the bottom of first chassis 3100, with the top of first chassis 3100 receiving patch panel cassettes 3500. Similarly, second chassis 3200 is illustrated as receiving a first group of vertically oriented splitter cassettes 3600 stacked above a second group of vertically oriented splitter cassettes 3600. The second chassis 3200 may be adapted to receive any number of splitter cassettes 3600 in each group, as represented by the dashed double-arrowed lines within second chassis 3200. Second chassis 3200 may include slots or other structures to facilitate sliding splitter cassettes 3600 into or out of second chassis 3200. However, it should be understood that in some embodiments, second chassis 3200 may be adapted to receive a different number of splitter cassettes 3600, or a different number of groups of splitter cassettes 3600, in a same or different orientation as shown in FIG. 34.

Figure 35:
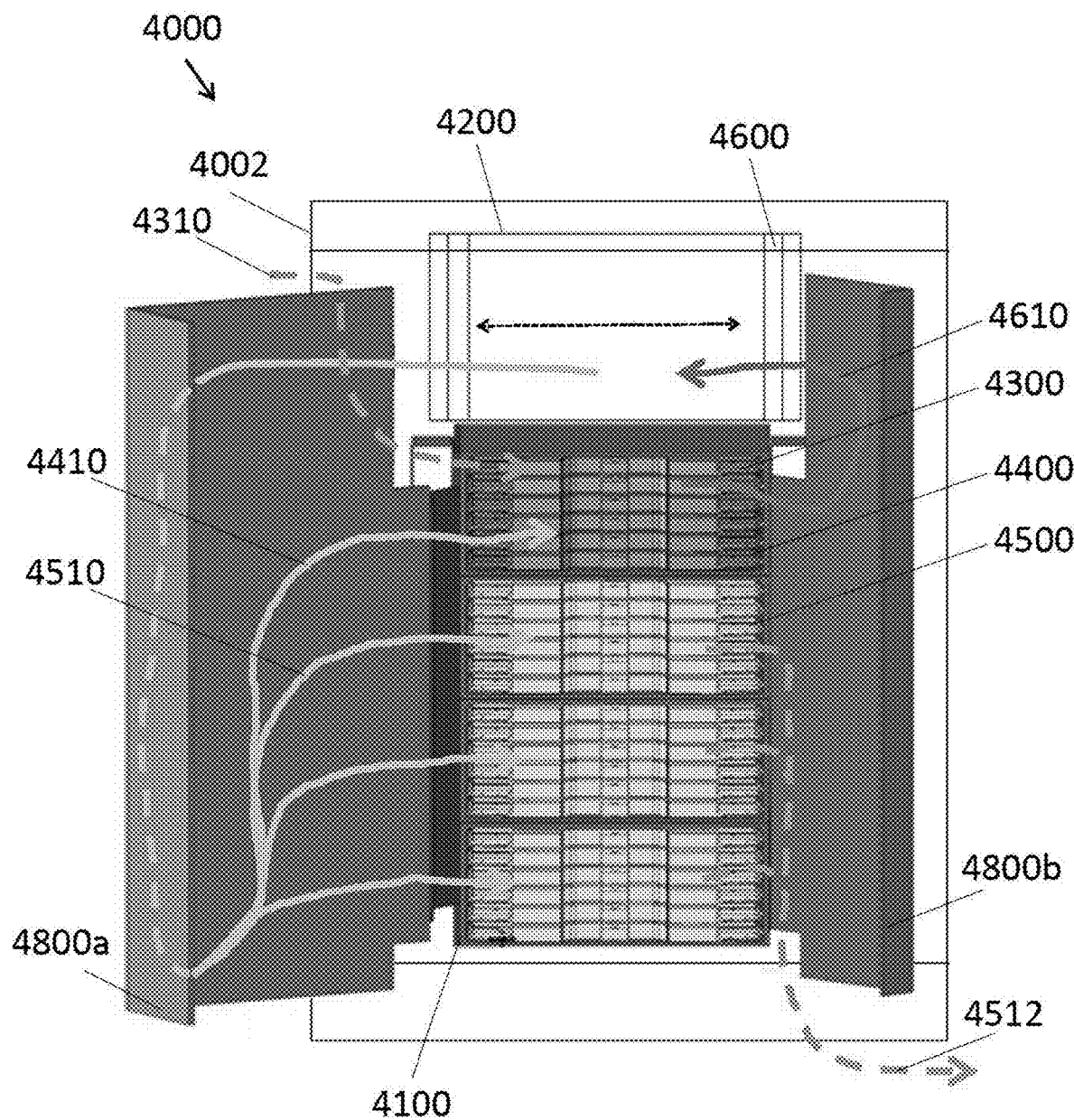
FIG. 35 is a front view of a communication system according to a further embodiment of the disclosure.

FIG. 35 illustrates a communication system 4000 similar to system 3000 of FIG. 34 with certain differences. Generally, similar or identical components of systems 3000 and 4000 are provided with part numbers that are 1000 apart. The components of system 4000 may be provided within an enclosure or housing 4002 substantially similar to housing 3002. First chassis 4100 may be substantially identical to first chassis 3100, and similarly adapted to receive a first group of cassettes 4300, a second group of storage cassettes 4400, and a third group of patch panel cassettes 4500. The cable components of system 4000 may be functionally identical to those of system 3000. For example, cable(s) 4310 may convey signal from a service provider to a rear of cassettes 4300, with cables 4610 conveying signals to splitter cassettes 4600 from a front of cassettes 4300. It should be understood that, in certain embodiments, cables 4310 may pass through a front opening in cassettes 4300 as they are routed toward the rear ports into cassettes 4300. Cables 4410 may extend from the front of splitter cassettes 4600 to storage locations within storage cassettes 4400. At the appropriate time, cables 4410 may be coupled to ports in the front of patch panel cassettes 4500, the connected cables labeled as 4510 in the figures. Cables 4512 may be coupled to the rear of patch panel cassettes 4500 and convey a signal from patch panel cassettes 4500 to service subscribers. As with cables 4310, it should be understood that cables 4512 may pass through front openings in patch panel cassettes 4500 as they are routed toward rear ports in those cassettes.

The main differences between system 3000 and 4000 are the position of second chassis 4200 and the configuration of panels 4800a, 4800b. In particular, second chassis 4200 may be provided directly on top of first chassis 4100, or spaced a distance from the top wall of first chassis 4100. Second chassis 4200 may be configured to receive any number of splitter cassettes 4600 therein. In one example, second chassis 4200 may be configured to receive a single group of splitter cassettes 4600 equal to the total number of splitter cassettes 3600 receivable within second chassis 3200. As with system 3000, a very large number of cables 4410, 4510, and 4610 may extend from the front of splitter cassettes 4600. Thus, it may be preferable that a front face of second chassis 4200 and front faces of splitter cassettes 4600 are set back a spaced distance from the front face of first chassis 4100. Those cables may be stored within a tray, bin, or trough positioned on top of first chassis 4100 in front of second chassis 4200. Preferably, second chassis 4200 is spaced a distance from the top of first chassis 4100 so that the cable trough (not separately shown in FIG. 35) does not interfere with sliding splitter cassettes 4600 into or out of second chassis 4200.

While the portions of cables 4410, 4510, and 4610 directly in front of second chassis 4200 may be stored within the trough described above, additional lengths of cables 4410, 4510, and 4610 may be desirably organized with additional hangers on panels 4800a and 4800b, which may be hingedly coupled to side walls of first chassis 4100. Panels 4800a and 4800b may include features similar or identical to the various hanger plates described herein, including for example the hanger plates shown and described in connection with FIG. 33C, and alternatively including any suitable accessories described in connection with such hanger plates, such as cable organizer 2200. It should be understood that the various alternative configurations of the number and relative positioning of cassettes 3300, 3400, 3500, and 3600 described in connection with system 3000 may apply similarly to cassettes 4300, 4400, 4500, and 4600 of system 4000.

FIG. 36A illustrates a communication system 5000 similar to systems 3000, 4000 of FIGS. 34-35 with certain differences. Generally, similar or identical components of systems 4000 and 5000 are provided with part numbers that are 1000 apart. The components of system 5000 may be provided within an enclosure or housing 5002 substantially similar to housing 4002. First chassis 5100 may be substantially identical to first chassis 4100, and similarly adapted to receive a first group of cassettes 5300, a second group of storage cassettes 5400, and a third group of patch panel cassettes 5500. In the illustrated embodiment of FIG. 36A, the storage cassettes 5400 are provided on the top of the first chassis 5100, the first group of cassettes 5300 are provided on the bottom of the first chassis 5100 adjacent the second chassis 5200, and the patch panel cassettes 5500 are positioned between the first group of cassettes 5300 and the second group of storage cassettes 5400. The cable components of system 5000 may be functionally identical to those of system 4000. For example, cable(s) 5310 may convey signal from a service provider to a rear of cassettes 5300, with cables 5610 conveying signals to splitter cassettes 5600 from a front of cassettes 5300. It should be understood that, in certain embodiments, cables 5310 may pass through a front opening in cassettes 5300 as they are routed toward the rear ports into cassettes 5300. Cables 5410 may extend from a front of splitter cassettes 5600 to storage locations within storage cassettes 5400. At the appropriate time, cables 5410 may be coupled to ports in the front of patch panel cassettes 5500, the connected cables labeled as 5510 in the figures. Cables 5512 may be coupled to the rear of patch panel cassettes 5500 and transmit signal from patch panel cassettes 5500 to service subscribers. As with cables 5310, it should be understood that cables 5512 may pass through front openings in patch panel cassettes 5500 as they are routed toward rear ports in those cassettes.

The main differences between system 5000 and systems 3000 and 4000 are the position of second chassis 5200 and the configuration of panels 5800*a*, 5800*b*. In particular, second chassis 5200 may be provided directly below first chassis 5100, and may be positioned on a base 5900. Second chassis 4200 may be configured to receive any number of splitter cassettes 5600 therein. In one example, second chassis 5200 may be configured to receive a single group of splitter cassettes 5600 similar to second chassis 4200. As with systems 3000 and 4000, a large number of cables 5410, 5510, and 5610 may extend from the front of splitter cassettes 5600. Although a front face of second chassis 5200 and front faces of splitter cassettes 5600 are illustrated as being set back a distance spaced from the front face of base 5900, it may be preferable that the front face of second chassis 5200, as well as the front faces of cassettes 5600, and the front face of base 5900 are substantially aligned (e.g. without a set-back) so that cables extending from splitter cassettes 5600 drop immediately into trough 5700. A portion of those cables may be stored within a trough 5700. Trough 5700 may be defined by a front face of base 5900 and an "L"-shaped extension member 5910. The use of trough 5700 at the bottom of system 5000 may be preferable because the large number of cables may have a large mass and storing the majority of those cables within trough 5700 may reduce the amount of remaining cable mass to be supported by other components of system 5000, such as panels 5800*a*, 5800*b*.

Panels 5800*a* and 5800*b* are illustrated as relatively narrow panels that are hingedly coupled to side walls of first chassis 5100. It should be understood that in other embodiments, one or both panels 5800*a* and 5800*b* may be fixed to first chassis without hinges, or otherwise may have a limited amount of rotation such as 45 or 90 degrees of rotation. Panels 5800*a* and 5800*b* may be significantly narrower than panels 4800*a*, 4800*b* of system 4000, as panels 5800*a* and 5800*b* only need to support a relatively small amount of cable mass compared to panels 4800*a* and 4800*b* of system 4000. In the illustrated embodiment, each panel 5800*a* and 5800*b* includes one or more hanger units similar or identical to hanger units 1323' of FIG. 23A.

It should be understood that the various alternative configurations of the number and relative positioning of cassettes 4300, 4400, 4500, and 4600 described in connection with system 4000 may apply similarly to cassettes 5300, 5400, 5500, and 5600 of system 5000. For example, in an alternative embodiment, the patch panel cassettes 5500 may be provided closer to the top of first chassis 5100, with storage cassettes 5400 positioned between the patch panel cassettes 5500 and the first group of cassettes 5310.

FIGS. 36B-E illustrate communication system 5000 with certain additional components and with certain modified components. In particular, the relative positioning of the first group of cassettes 5300, the storage cassettes 5400, and the patch panel cassettes 5500 is different in FIG. 36B, with the bottom-most cassettes (three cassettes in the illustration) being storage cassettes 5400, the top-most cassettes (three groups of six cassettes in the illustration) being patch panel cassettes 5500, and the cassettes between those two groups being the first group of cassettes 5300 (three cassettes in the illustration positioned directly above the storage cassettes 5400). Second chassis 5200 is illustrated as including splitter cassettes 5600 arranged in two groups of cassettes positioned side-by-side. The second chassis 5200 may be positioned on top of base 5900', which may be slightly narrower than the base 5900 shown in FIG. 36A. The trough 5700 may be formed between the front face of a plate connected to base 5900', one or more side extensions 5910' of that plate, and/or a bottom extension (best shown in FIG. 36E) extending between bottom ends of the side extensions 5910'. In addition, panel 5800*a* may be positioned on a cable guide 5810*a*', and panel 5810*b* may be positioned on a cable guide 5810*b*'. Cable guides 5810*a*' and 5810*b*' may be statically fixed to first chassis 5100, or may be hinged and rotatable with respect to first chassis 5100. Cable guide 5810*a*' may provide additional means for guiding and organizing cables of system 5000. As illustrated, cable guide 5810*a*' may include an outermost fin 5812*a*', a middle fin 5814*a*', and an inner fin 5816' which may each extend from a point near panel 5800*a*' in a direction away from the panel and downward toward trough 5700. The opposite panel 5800*b*' may similarly be positioned on or within a cable guide 5810*b*' that has an outermost fin 5812*b*', a middle fin 5814*b*', and an inner fin 5816*b*'. The cable guides 5810*a*' and 5810*b*' may include additional cable guide structures, such as retainers 5818*a*', which may help keep cables within the boundaries of cable guide 5810*a*', or spool member 5818*b*' around which cables may be wrapped while maintaining a minimum bending radius for the cables.

FIG. 36C illustrates system 5000 and certain cables being connected thereto and maintained by various portions of the cable guides 5810*a*', 5810*b*'. For example, FIG. 36C illustrates a cable 5610 extending from a splitter cassette 5600 to a cassette 5300 in the first group. This cable, as noted above, may convey a signal from the cassette 5300 to the splitter cassette 5600. It should be understood that splitter cassettes 5600 may be provided as units with cables already attached thereto, so that a free end of cable 5610 is attached to one of the first cassettes 5300, as indicated by the arrow, to couple the two cassettes to each other, even though a signal is generally conveyed in the direction opposite the arrow of cable 5610 (although it should be understood that in many fiber optic cables, signal transmission or conveyance can be bi-directional). In some examples, each splitter cassette 5600 may include a single cable 5610 coupled thereto, each of which may be stored and/or supported in and by trough 5700. In addition, FIG. 36C illustrates a cable 5410 extending from a splitter cassette 5600 to a storage cassette 5400, with the cable 5410 stored and/or supported in and by trough 5700. Cable 5410 is provided in dashed lines to indicate that cable 5410 may be positioned only temporarily in storage cassette 5400, until a user desires to connect cable 5410 to a patch panel cassette 5500, the newly connected cable indicated as cable 5510 in FIG. 36C. Cables 5510, in addition to being stored and/or supported in or by trough 5700, may further be organized and guided by elements of cable guide 5810*a*'. For example, all cables 5510 may pass behind cable retainers 5818*a*' to keep the cables 5510 within the general confines of cable guide 5810*a*'. Cables 5510 routed to the top-most group of cassettes 5500 may be guided between the outermost fin 5812a' and the middle fin 5814a'. Cables 5510 routed to the middle group of cassettes 5500 may be guided between the middle fin 5814a' and the inner fin 5816a'. Cables 5510 routed to the bottom-most group of cassettes 5500 may be guided between the inner fin 5816a' and the inner cable retainer 5818a'. It should be understood that generally, cables 5510 (or cables 5410 prior to connection to patch panel cassettes 5500) may be the largest volume of cables in system 5000. Thus, the various fins of cable guide 5810a' may help separate and organize the large mass of cables extending from splitter cassettes 5600 to patch panel cassettes 5500. Another cable 5520 is illustrated in FIG. 36C connecting two patch panel cassettes 5500, with cable 5520 being wrapped or otherwise spooled around spool member 5818b' to guide and support the cable. It should be understood that cable guide 5810b' may be used similarly to cable guide 5810a', and although certain cables are shown on in FIG. 36C as being routed along either cable guide 5810a' or 5810b', any cable could be routed along either of the cable guides 5810a', 5810b', depending on the preference of the user. Further, although an outer housing is not illustrated in connection with FIGS. 36B-C, it should be understood that any suitable outer housing may be used, including housings for mounting as wall mounts, pole mounts, or pad mounts (e.g. mounted to concrete pads).

FIG. 36D is a perspective view of system 5000 showing cable guides 5810a' and 5810b' in a first position. Although enclosure or housing 5002 is not separately illustrated in FIG. 36D, it should be understood that, in the illustrated first position, cable guides 5810'a and 5810b' may both be positioned fully within the housing, for example so that a housing door can close to fully contain the components of system 5000 within the housing. As can be seen in FIG. 36D, a side hanger 1340a may be provided on a side wall of first chassis 5100, which may be similar or identical to side hanger 1340a of FIG. 21A. However, it should be understood that other types and numbers of side hangers, including side hanger 1340b or FIG. 21B, may be positioned on either side wall of first chassis 5100 to help store, guide, and/or organize cables associated with system 5000. If a user desires to access the sides or rear of portions of system 5000 within housing 5002, for example to access cables on side hanger 1340a, the user may rotate one or both cable guides 5810a', 5810b' (and associated plates 5800a, 5800b) in a direction so that the hanger units on plates 5800a, 5800b move toward the front face of the cassettes 5300, 5400, 5500 within the first chassis 5100. FIG. 36E illustrates cable guide 5810b' and associated plate 5800b having been rotated so that the hanger unit associated with plate 5800b has moved to be positioned at the front of the cassettes, while cable guide 5810a' and associated plate 5800a remain in the first position illustrated in FIG. 36B. In some embodiments, the range of rotation of cable guides 5810a' and 5810b' (and associated cable plates 5800a and 5800b, respectively) may be limited to a range of about 90 degrees, or to a range of about 180 degrees. As with various other embodiment disclosed herein, the cable guides 5810a' and 5810b' (and associated hanger units and cable plates 5800a and 5800b) may be coupled directly or indirectly to first chassis 5100 via one or more hinges so that the cable guides rotate about an axis that is substantially orthogonal to plane that is substantially coplanar with bottom faces of the patch panel cassettes 5500. In other words, the direction in which patch panel cassettes 5500 may slide is orthogonal the axis about which the cable guides are rotatable.

FIGS. 36F-G illustrate views of system 5000 in an embodiment of housing 5002 to illustrate one exemplary configuration for securing system 5000 to the housing 5002. In the illustrated example, housing 5002 may include one or more top mounting rails 5004 secured to a bottom surface of the top wall of housing 5002. Similarly, housing 5002 may include one or more bottom mounting rails 5006 secured a top surface of the bottom wall of housing 5002. In the illustrated example, housing 5002 includes two top mounting rails 5004 and two bottom mounting rails 5006, although more or fewer of each rail may be provided as desired. As best illustrated in FIG. 36G, each of the mounting rails 5004, 5006 may take the form of a bracket having an "L"-shape or a "U"-shape, although other shapes may be suitable. In the illustrated example, a top wall of first chassis 5100 (or otherwise a separate plate or support mounted to the top wall of first chassis 5100) may be coupled to the top mounting rails 5004, for example via screws, bolts, or any other suitable fasteners. The bottom surface of base 5900' (or otherwise a separate plate or support mounted to the bottom surface of base 5900') may similarly be coupled to the bottom mounting rails 5006 via screws, bolts, or any other suitable fasteners. With this configuration, system 5000 may be secured within housing 5002 to reduce the likelihood of any unintentional movement of the system 5000 with respect to the housing 5002. It should be noted that housing 5002 is illustrated with an access port in the bottom of the housing 5002, similar to port 1004 of housing 1002 described above, but more access ports may be provided in any desired position of housing 5002.

FIG. 36H illustrates an enlarged perspective view of one half of the second chassis 5200 of system 5000, which is shown as including three splitter cassettes 5600 inserted into three corresponding cassette slots. However, it should be understood that the splitter cassette housing of FIG. 36H may be used with other systems described herein, including systems 3000 and 4000. FIG. 36H illustrates, among other things, that second chassis 5200 does not need to include vertical walls extending completely from top to bottom walls of the chassis or other separator members to keep the various splitter cassettes 5600 organized in their desired positions. For example, second chassis 5200 may include a plurality of biased or spring-loaded members 5210 to help maintain splitter cassettes 5600 in position. In the illustrated example, the top wall of chassis 5200 includes two spring members 5210 protruding downward aligned with one another, while the bottom wall includes another two spring members 5220 protruding upward aligned with one another, for each splitter cassette 5600 that may be received in the second chassis 5200. Each spring member 5210 may be angled so that the portions near the front and rear of second chassis 5200 extend farther toward the top wall of the chassis, while spring members 5220 may be similarly angled so that the portions near the front and the rear of second chassis 5200 extend farther toward the bottom wall of the chassis. However, the portions of spring members 5210 and 5220 nearest the front or rear of second chassis 5200 may include a ramped surface, such that the portion of the spring members with the greatest protrusion is positioned a distance away from the front or the rear of the second chassis 5200. With this configuration, as a cassette 5600 is slid into a respective slot within chassis 5200, the springs of spring members 5210, 5220 begin to compress to provide clearance for the cassette 5600 to move into the slot. As the cassette 5600 slides into position, the springs of spring members 5210, 5220 may begin to relax a small amount, resulting in lips 5222 of the front spring members 5220 projecting upward so that cassettes 5600 cannot be unintentionally removed from the second chassis 5200. In some embodiments, the front spring members 5210 may also include lips similar to lips 5222. The rear spring members 5210, 5220 may not need similar lips, particularly when the rear of second chassis 5200 is closed, but in some circumstances similar lips may be appropriate. Further, in some embodiments, the rear spring members 5210, 5220 may be omitted. In other embodiments, cassettes 5600 may include indentations, tracks, grooves, or similar features so that spring members 5210, 5220 protrude into those grooves to further help secure the cassettes 5600 in the desired position or slot within second chassis 5200. Still further, it should be understood that the spring members 5210, 5220 may be positioned such that side edges of the spring members that protrude above a bottom wall of the second chassis 5200 may be adapted to contact bottom and top side edges of a splitter cassette 5600 as the splitter cassette is inserted into the chassis 5200, so that the spring members serve as an additional guide during insertion and support after insertion.

FIGS. 36I-J illustrate an additional locking bar 5230 in unlocked and locked conditions, respectively. Locking bar 5230 may be provided to further secure cassettes 5600 within second chassis 5200. It should be understood that locking bar 5230 may be provided in addition to, or instead of, the lips 5222. Locking bar 5230 may include one or two side members 5230a having a first end pivotably coupled to one or two corresponding side walls of second chassis 5200. Side member(s) 5230a may extend from the first end to a second end near the front of second chassis 5200. A bar member 5230b may be coupled to the second end of the side member 5230a. If two side members 5230a are included, the bar member 5230b may extend between the second ends of the two side members 5230a. In the unlocked position of locking bar 5230 shown in FIG. 36I, bar member 5230b is positioned at or above the tops of cassettes 5600 so that the bar member 5230b does not restrict or substantially restrict the cassettes 5600 from sliding into or out of the second chassis 5200. As shown in FIG. 36J, the locking bar 5230 may be transitioned to the locked condition by pivoting the second end(s) of the side member(s) 5230a, about the first end of the side member(s) 5230a, toward the bottom wall of second chassis 5200. This motion causes the bar member 5230b to drop downward as well, so that the bar member 5230b is in contact with or is adjacent the fronts of the cassettes 5600. In the illustrated example, in the locked condition of the locking bar 5230, the bar member 5230b is in contact with or positioned adjacent to the handles 5620 of the cassettes 5600, described in greater detail below. In the illustrated example, side members 5230a are positioned outside the side walls of second chassis 5200, and second chassis 5200 includes a slot through which bar member 5230b extends, the slot generally following the path along which bar member 5230b moves as the locking bar 5230 transitions between the locked and unlocked conditions. However, in other embodiments, the side members 5230a may be positioned inside the side walls of the second chassis 5200. In one embodiment, locking bar 5230 may be biased, for example via a spring, to the locked condition. In another example, the locking bar 5230 may tend to fall into the locked condition due mainly or solely to the force of gravity pulling the locking bar 5230 downward. Whether the locking bar 5230 is actively biased or passively biased (e.g. due to gravity) to the locked condition, any cassettes 5600 within chassis 5200 will be highly unlikely to unintentionally slide out of the second chassis 5200, for example due to vibrations of system 5000. If a user desires to slide a cassette 5600 into or out of the second chassis 5200, the user may temporarily transition the locking bar 5230 to the unlocked condition, at which point the bar member 5230b is positioned so that cassettes 5600 may be slid into or out of the second chassis 5200. After the cassette(s) 5600 have been slid into or removed from the second chassis 5200, the user may simply let go of the locking bar 5230, which will transition to the locked condition due to the active or passive bias. However, in other embodiments, locking bar 5230 need not be biased at all, so that the locking bar 5230 only transitions between the locked and unlocked conditions upon application of intentional force by the user. The slot(s) through which the second end of side member(s) 5230a slide as the locking bar 5230 transitions between the locked and unlocked conditions may also include a bump 5232 or other protrusion adjacent a bottom end of the slot. In other words, the bump 5232 may be spaced a distance from the bottom of the slot equal or slightly larger than the diameter of bar member 5230b. With this configuration, the bump 5232 may help resist any unintentional movement of the bar member 5230b upward toward the unlocked condition, as the bump 5232 may provide additional frictional engagement, although that frictional engagement may be readily overcome with an intentional force applied to locking bar 5230 upward or downward.

FIG. 36K illustrates in more detail an example of a splitter cassette 5600, although it should be understood that the splitter cassette shown in FIG. 36K may be used in place of other splitter cassettes described in connection with other embodiments of communication systems herein. Splitter cassette may include a handle 5620 to assist a user in sliding the cassette 5600 into or out of a housing such as second chassis 5200. In the illustrated embodiment, a front face of handle 5620 is substantially coplanar with other front portions of the cassette 5600, the front portions of the cassette 5600 directly adjacent the handle 5620 being recessed or indented in order to form the handle 5620. A single cable 5610 may extend from splitter cassette 5600, and may pass through a strain relief element 5612 coupled to the front face of the cassette. Cable 5610 of FIG. 36K corresponds to cable 5610 of FIGS. 36A and 36C, and may be intended to connect the splitter cassette 5600 to another cassette 5300 that is coupled via additional cables to service provider, such that the signal from the service provider is conveyed to cassette 5300, and then through cable 5610 to splitter cassette 5600. Further, a plurality of additional cables 5410 may extend from splitter cassette 5600, for example via another strain relief member. The number of cables 5410 may be dependent upon the particular splitter cassette 5600, and may be any desired number, such as eight, sixteen, thirty-two, etc. It should be understood that cables 5410 of FIG. 36K correspond to cables 5410 of FIGS. 36A and 36C when coupled to a storage cassette 5400, while cables 5410 of FIG. 36K correspond to cables 5510 of FIGS. 36A and 36C when coupled to a patch panel cassette 5500. When initially provided, a connector 5412 of each cable 5410 of splitter cassette 5600 may be stored in a holding element 5614 of a storage plate 5616. The storage plate 5616 and holding elements 5614 may be similar to storage rack 1840 of FIG. 28B-C or storage rack 1840' of FIG. 28D. Connectors 5412 may be pre-installed on holding elements 5614 of storage plate 5616 so that, upon initial installation of splitter cassette 5600 into second chassis 5200, the storage plate 5616 may be readily be clipped into, snapped into, or otherwise coupled to a corresponding receiving structure within a storage cassette 5400. This may eliminate the need for a user to individually couple each connector 5412 of each cable 5410 to a corresponding port within a storage cassette 5400 for storage prior to the connector being removed and connected to a port in a patch panel cassette 5500.

Although system 5000 may include hanger units 1323', alternative types of hanger units 1323" may be preferable for system 5000. Hanger unit 1323" may include a support 1324" and a plurality of individual hangers 1325" extending from the support 1324". The free end of each hanger 1325" may include a latch member 1326" that is hingedly coupled to the free end, for example by a living hinge mechanism. The free end of each hanger 1325" may also include a lip similar to lips 1327' of hanger units 1323'. It should be understood that hanger unit 1323" may include substantially the same components of hanger unit 1323', with the main exception being that hangers 1325", and thus latch members 1326", may be angled with respect to a longitudinal axis of support 1324". For example, as shown in FIG. 37B, hangers 1325" may form an angle $\alpha 5$ of between about 30 degrees and about 60 degrees, including about 45 degrees, with respect to the longitudinal axis of support 1324". Whereas hanger units 1323' may be used interchangeably on hanger plates or panels on either side of a patch panel system, hanger units 1323" may be designed for use on a hanger plate on a first side of a patch panel system, while a mirror image of hanger unit 1323" may be preferably used on a hanger plate on a second side of patch panel system. For example, the hanger unit 1323" illustrated in FIGS. 37A-C may be best suited for use on panel 5800a of system 5000, whereas a mirror image of hanger unit 1323" may be best suited for use on panel 5800b of system 5000. One potential benefit of hanger unit 1323" compared to hanger unit 1323' is that cables C resting on hangers 1325" may encounter a more gradual angle compared to cables C resting on hangers 1325' of hanger unit 1323', and thus provide that a minimum bending radius for the cables C is maintained. For example, as shown in FIG. 37C, cables extending beyond each side of hangers 1325" encounter angles $\alpha 6$ and a of about 135 degrees if $\alpha 5$ is about 45 degrees. This may be a gentler angle compared to the 90 degree angle that cables supported by hangers 1325' of hanger unit 1323' may encounter in addition to the rounded edge(s) that may typically be fabricated on edges of the parts of hangers 1325' that contact cables. In other words, hangers 1325' of hanger unit 1323' may include rounded edges or rounded extensions to help maintain a minimum bending radius of cables supported by the hangers 1325', but such features may require that hangers 1325' are relatively wide. It may be difficult to provide such rounded edges or rounded extensions on hangers 1325" of hanger units 1323" because hungers 1325" are narrower than hangers 1325'. Instead, as described above, a minimum bending radius may be obtained in that narrow space by positioning hangers 1325" at an angle relative to the longitudinal axis of support 1324". As noted above, the same angles may be achieved for cables on panel 5800b of system 5000 by using a hanger unit having a mirrored configuration of hanger unit 1323". Although hanger unit 1323" (and corresponding mirror configurations) may be particularly suited for system 5000 having narrow panels 5800a, 5800b, it should be understood that hanger 1323" may be used with other communication systems described herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical fiber distribution system comprising:
    a housing having at least one main cabinet unit, wherein the housing includes a first sidewall and an opposing second sidewall, each sidewall having at least one port configured to permit passage of the optical fiber cables from an exterior of the housing to an interior of the housing;
    a patch panel positioned within an inside of the at least one main cabinet unit and including a plurality of ports configured to receive the plurality of optical fiber cables;
    a hanger plate assembly coupled to the at least one main cabinet unit and having a closed condition in which the inside of the at least one main cabinet unit is substantially unexposed, and an open condition in which the inside of the at least one main cabinet unit is exposed; and
    at least one hanging element coupled to an outer surface of the housing and configured to engage a wire to suspend the housing from the wire, wherein the hanger plate assembly is adapted to transition between the closed condition and the open condition while the housing remains suspended from the wire.

2. The optical fiber distribution system of claim 1, wherein the housing extends lengthwise along a primary axis from the first sidewall to the second sidewall, wherein the hanger plate assembly is adapted to transition between the closed condition and the open condition without changing an orientation of the housing about the primary axis.

3. The optical fiber distribution system of claim 1, further comprising one or more hanging elements coupled to a top wall of the housing, wherein the top wall faces in a direction towards the wire.

4. The optical fiber distribution system of claim 3, wherein each hanging element is a strap having a first end coupled to the top wall and an opposing second end coupled to a back wall of the housing, wherein the strap is configured to form a loop for suspending the housing from the wire.

5. The optical fiber distribution system of claim 3, wherein each hanging element includes a first end coupled to the top wall and a second free end shaped to hook over the wire.

6. An optical fiber distribution system comprising:
    a housing having at least one main cabinet unit;
    a patch panel positioned within an inside of the at least one main cabinet unit and including a plurality of ports configured to receive the plurality of optical fiber cables;
    a hanger plate assembly coupled to the at least one main cabinet unit and having a closed condition in which the inside of the at least one main cabinet unit is substantially unexposed, and an open condition in which the inside of the at least one main cabinet unit is exposed;
    a plurality of hangers connected to an interior-facing surface of the hanger plate assembly, wherein each hanger is adapted to support an optical fiber cable thereon; and
    at least one hanging element coupled to an outer surface of the housing and configured to engage a wire to suspend the housing from the wire, wherein the hanger plate assembly is adapted to transition between the closed condition and the open condition while the housing remains suspended from the wire.

7. The optical fiber distribution system of claim 6, wherein the hanger plate assembly comprises:
   a first hanger plate hingedly coupled to a first edge of a front wall of the housing; and
   a second hanger plate hingedly coupled to a second edge of the front wall of the housing,
   wherein the plurality of hangers are mounted to the interior surface of the hanger plate assembly at one or both of the first and second hanger plates.

8. The optical fiber distribution system of claim 7, wherein the first hanger plate assembly includes a first portion of the hangers, and wherein the second hanger plate assembly includes a second portion of the hangers.

9. The optical fiber distribution system of claim 8, wherein, in the closed condition of the hanger plate assembly, an interior-facing surface of the first hanger plate at least partially overlies an exterior-facing surface of the second hanger plate and the exterior-facing surface of the second hanger plate is positioned between optical fiber cables supported by the first hanger plate and the patch panel.

10. The optical fiber distribution system of claim 6, wherein the hanger plate assembly comprises a hanger plate hingedly coupled to a front edge of a bottom wall of the housing facing in a direction away from the wire, wherein the plurality of hangers are mounted to an interior face surface of the hanger plate.

11. The optical fiber distribution system of claim 10, wherein the patch panel comprises a first portion of cable ports vertically stacked within an interior of the housing, and a second portion of cable ports vertically stacked within the interior of the housing adjacent to the first portion of cable ports, and wherein the plurality of hangers are adapted to support optical fiber cables routed between the first portion of cable ports and the second portion of cable ports.

12. The optical fiber distribution system of claim 10, wherein the patch panel comprises a first portion of cable ports horizontally stacked within an interior of the housing, and a second portion of cable ports horizontally stacked within the interior of the housing adjacent to the first portion of cable ports, and wherein the plurality of hangers are adapted to support optical fiber cables routed between the first portion of cable ports and the second portion of cable ports.

13. An optical fiber distribution system comprising:
   a base;
   a patch panel mounted to the base and including a plurality of ports configured to receive optical fiber cables, the optical fiber distribution system having a closed condition in which the patch panel is substantially unexposed, and an open condition in which the patch panel is exposed;
   a cover configured to be removably coupled to the base and adapted to enclose the patch panel when coupled to the base, wherein the optical fiber distribution system is in the closed condition when the cover is coupled to the base and in the open condition when the cover is separated from base; and
   a first hanging element affixed to and extending outward from the base and configured to engage a wire to suspend the base and the patch panel from the wire; and
   a second hanging element affixed to and extending outward from the cover and configured to engage the wire to suspend the cover from the wire.

14. The optical fiber distribution system of claim 13, wherein the base includes one or more apertures configured to permit passage of the optical fiber cables through the base.

15. The optical fiber distribution system of claim 13, further comprising a hanger plate assembly including a plurality of hangers, wherein each hanger is adapted to support an optical fiber cable thereon.

16. The optical fiber distribution system of claim 15, wherein the hanger plate is hingedly coupled to the patch panel, and has each of a closed condition in which the plurality of ports of the patch panel are at least partially covered and the cover fits over the patch panel, and an open condition in which the plurality of ports of the patch panel are exposed.

17. The optical fiber distribution system of claim 15, further comprising a plurality of supporting members mounted to and extending from the base, wherein the patch panel is mounted to the plurality of supporting members.

18. The optical fiber distribution system of claim 17, wherein the patch panel comprises a first portion of cable ports vertically stacked the between two supporting members, and a second portion of cable ports vertically stacked between the two supporting members, and wherein the plurality of hangers are adapted to support optical fiber cables routed between the first portion of cable ports and the second portion of cable ports.

19. The optical fiber distribution system of claim 18, wherein each of the first portion of cable ports and the second portion of cable ports is slidable between a distal position in which the cover fits over the patch panel, and an open condition in which the plurality of ports of the patch panel are exposed.

20. The optical fiber distribution system of claim 18, further comprising:
   a second hanger assembly comprising a plurality of hangers; and
   a bar coupled to both hanger assemblies and configured to cause the hanger assemblies to slide in unison.

21. The optical fiber distribution system of claim 13, wherein the first and second hanging elements are configured to engage a wire extending longitudinally a first direction, and wherein the cover and base are configured to be coupled to one another along the first direction.

22. The optical fiber distribution system of claim 1, wherein the hanger plate assembly includes a first surface facing toward the inside of the at least one main cabinet unit and an opposing second surface facing a surrounding environment of the at least one main cabinet unit.

* * * * *